US010453183B2

(12) United States Patent
Hayasaka et al.

(10) Patent No.: US 10,453,183 B2
(45) Date of Patent: *Oct. 22, 2019

(54) IMAGE PROCESSING APPARATUS AND IMAGE PROCESSING METHOD

(71) Applicant: SONY CORPORATION, Tokyo (JP)

(72) Inventors: Kengo Hayasaka, Kanagawa (JP); Katsuhisa Ito, Tokyo (JP); Makibi Nakamura, Tokyo (JP)

(73) Assignee: SONY CORPORATION, Tokyo (JP)

( * ) Notice: Subject to any disclaimer, the term of this patent is extended or adjusted under 35 U.S.C. 154(b) by 142 days.

This patent is subject to a terminal disclaimer.

(21) Appl. No.: 15/565,721

(22) PCT Filed: Apr. 15, 2016

(86) PCT No.: PCT/JP2016/062066
§ 371 (c)(1),
(2) Date: Oct. 11, 2017

(87) PCT Pub. No.: WO2016/175046
PCT Pub. Date: Nov. 3, 2016

(65) Prior Publication Data
US 2018/0075583 A1 Mar. 15, 2018

(30) Foreign Application Priority Data
Apr. 28, 2015 (JP) ................. 2015-091113

(51) Int. Cl.
G06T 5/00 (2006.01)
G06T 1/00 (2006.01)
(Continued)

(52) U.S. Cl.
CPC ............. G06T 5/001 (2013.01); G02B 27/22 (2013.01); G06T 1/0007 (2013.01); G06T 5/003 (2013.01);
(Continued)

(58) Field of Classification Search
None
See application file for complete search history.

(56) References Cited

U.S. PATENT DOCUMENTS 7,692,859 B2 * 4/2010 Redert ................. G02B 26/005
359/478
2015/0124052 A1 5/2015 Ito et al.

FOREIGN PATENT DOCUMENTS

| CN | 104255026 A | 12/2014 |
| CN | 105518740 A | 4/2016 |

(Continued)

OTHER PUBLICATIONS

International Search Report and Written Opinion of PCT Application No. PCT/JP2016/062066, dated Jul. 5, 2016, 08 pages of ISRWO.

Primary Examiner — Bernard Krasnic
(74) Attorney, Agent, or Firm — Chip Law Group

(57) ABSTRACT

The present technology relates to an image processing apparatus and an image processing method to accurately reproduce a blur degree of an optical lens with a small data amount. A light condensing process for condensing rays to be incident to a virtual lens having a synthetic aperture configured from a plurality of image pickup sections that pick up images of a plurality of visual points from a real space point in a real space on a virtual sensor through an emulation lens of an emulation target is performed. The light condensing process is performed using lens information that is generated for a real space point corresponding to a plurality of information points that are a plurality of positions of part of a plane of the virtual sensor and defines rays that pass the emulation lens.

14 Claims, 72 Drawing Sheets

(51) Int. Cl.
   *G06T 5/50*      (2006.01)
   *H04N 5/232*     (2006.01)
   *G02B 27/22*     (2018.01)
   *H04N 5/235*     (2006.01)
   *H04N 13/232*    (2018.01)

(52) U.S. Cl.
   CPC .............. *G06T 5/50* (2013.01); *H04N 5/232* (2013.01); *H04N 5/2353* (2013.01); *H04N 13/232* (2018.05); *G06T 2200/21* (2013.01); *G06T 2207/10004* (2013.01); *G06T 2207/10016* (2013.01); *G06T 2207/10052* (2013.01)

(56) References Cited

FOREIGN PATENT DOCUMENTS

| | | | | |
|---|---|---|---|---|
| GB | 2506405 | * | 4/2014 | ......... G02B 26/0833 |
| JP | 11-284903 | * | 10/1999 | ............. H04N 5/232 |
| JP | 2013-238927 A | | 11/2013 | |
| JP | 2014-010783 A | | 1/2014 | |
| JP | 2014-107631 A | | 6/2014 | |
| TW | 201401220 A | | 1/2014 | |
| WO | 2013/168381 A1 | | 11/2013 | |
| WO | 2015/037472 A1 | | 3/2015 | |

* cited by examiner

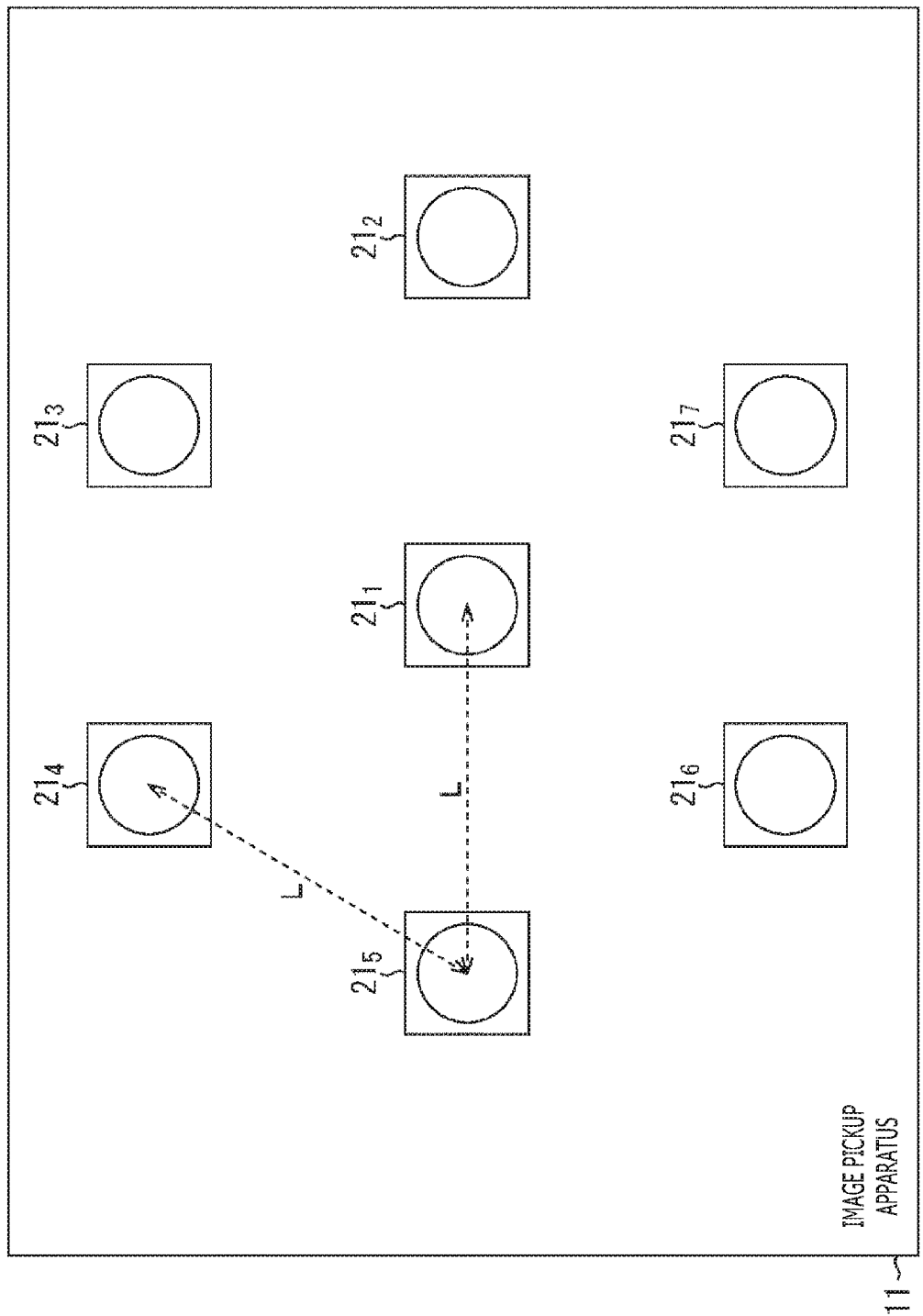

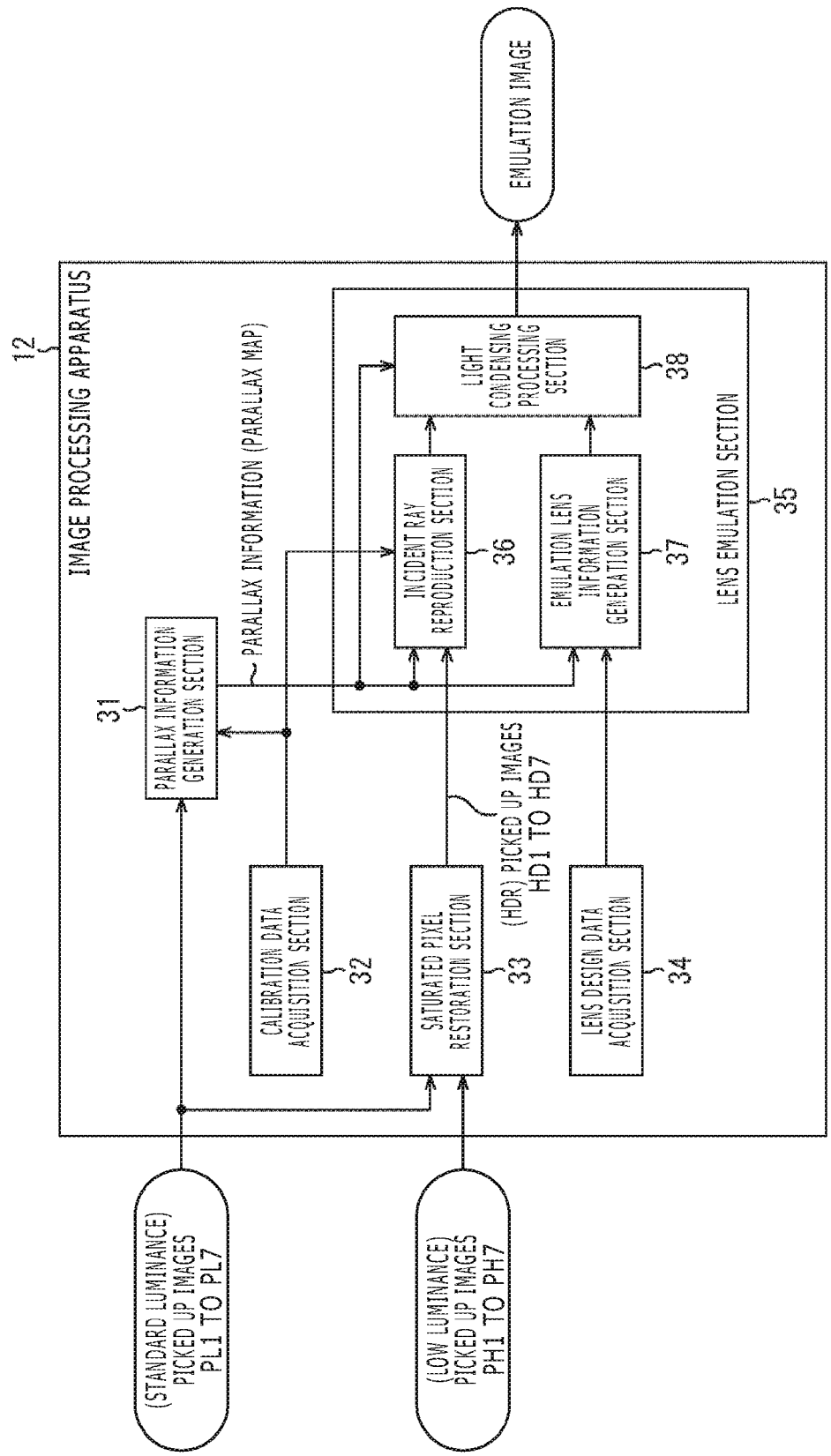

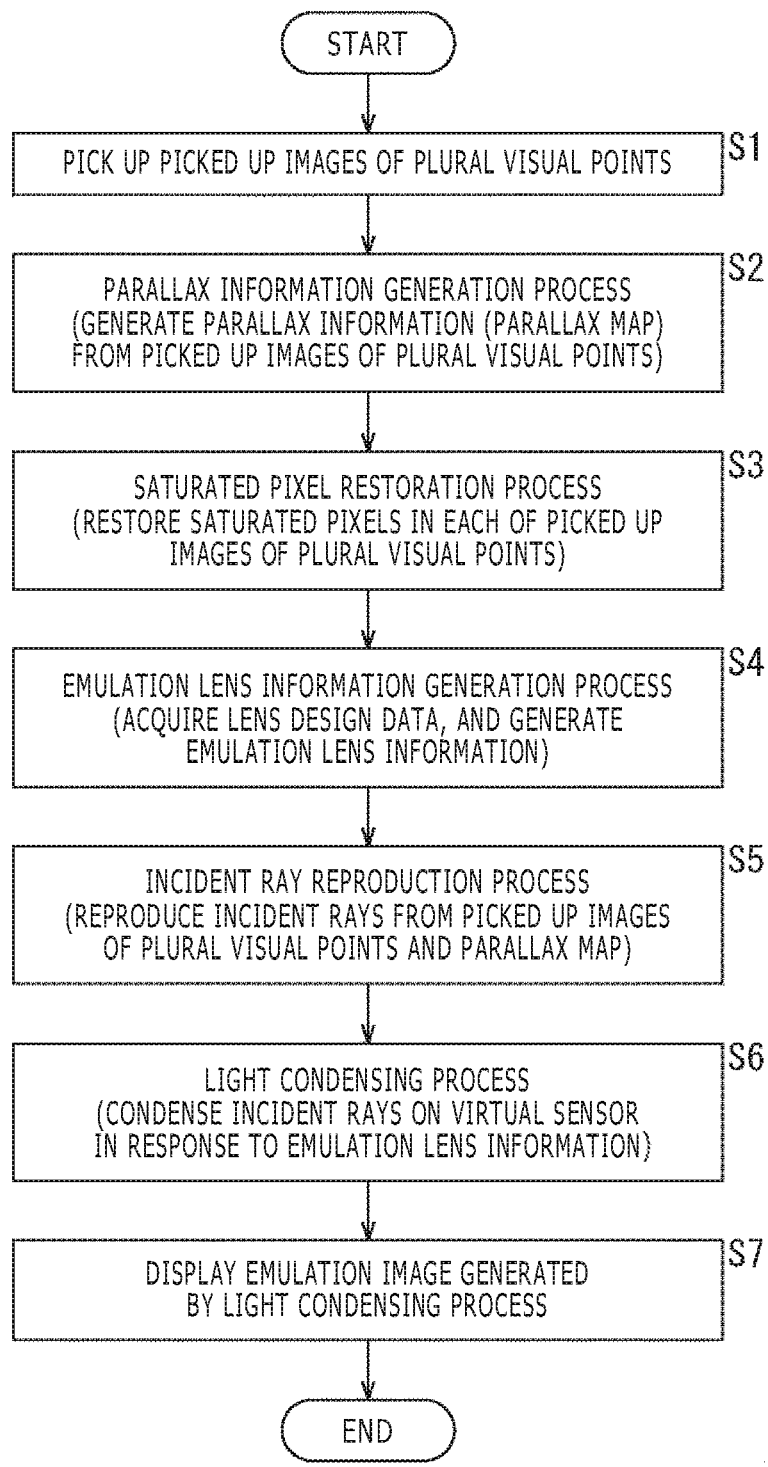

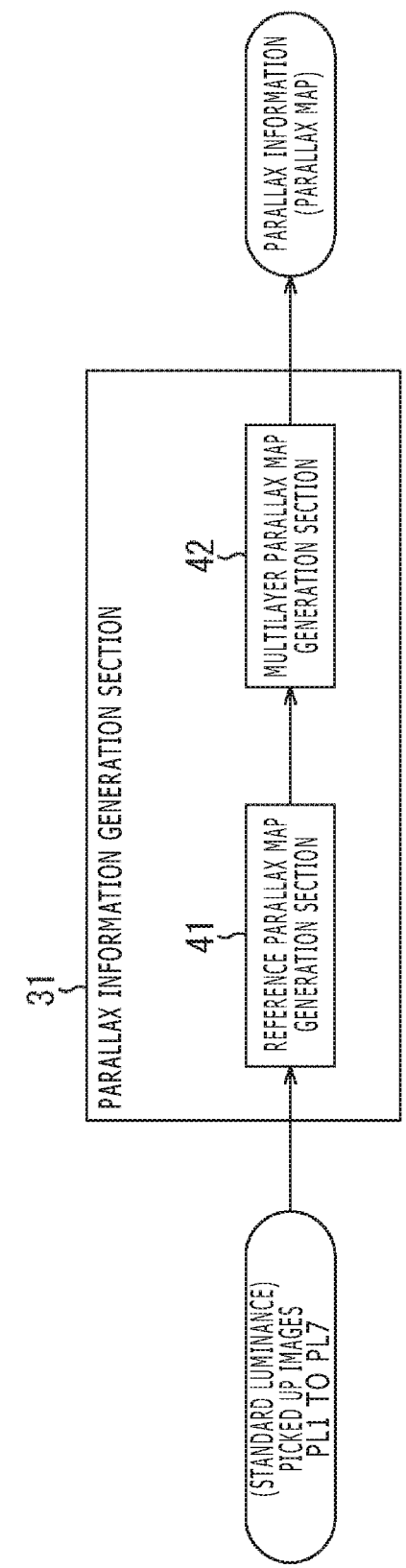

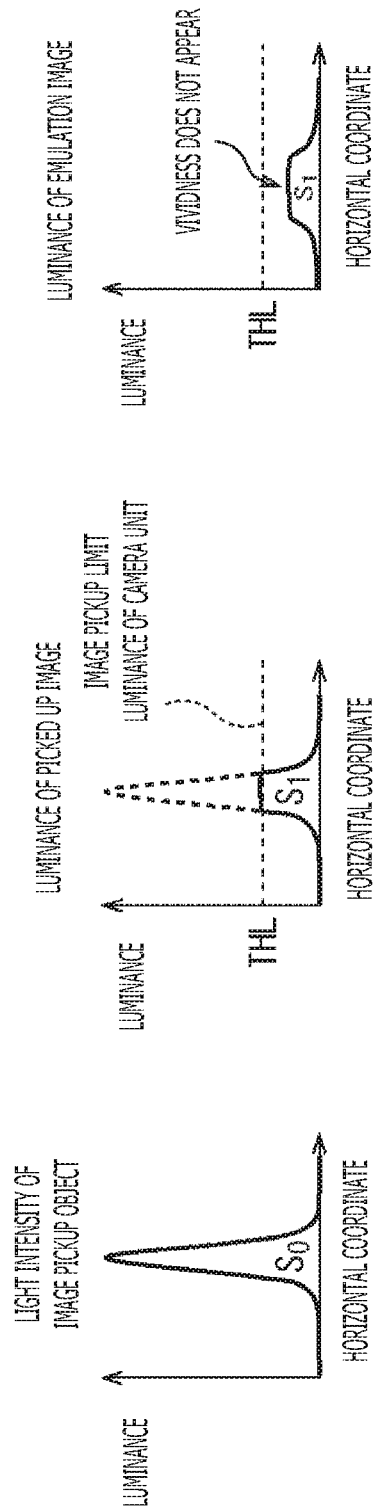

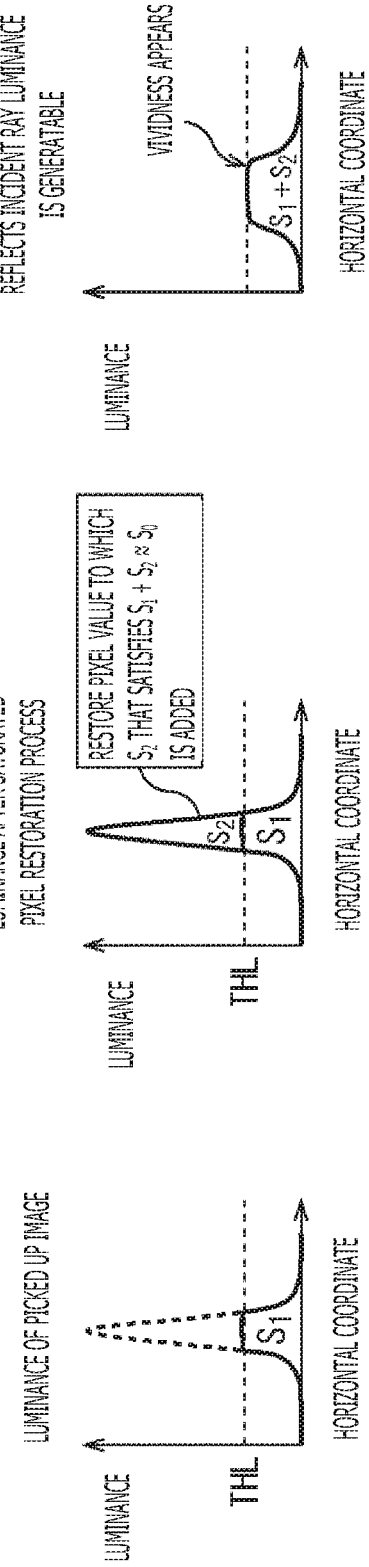

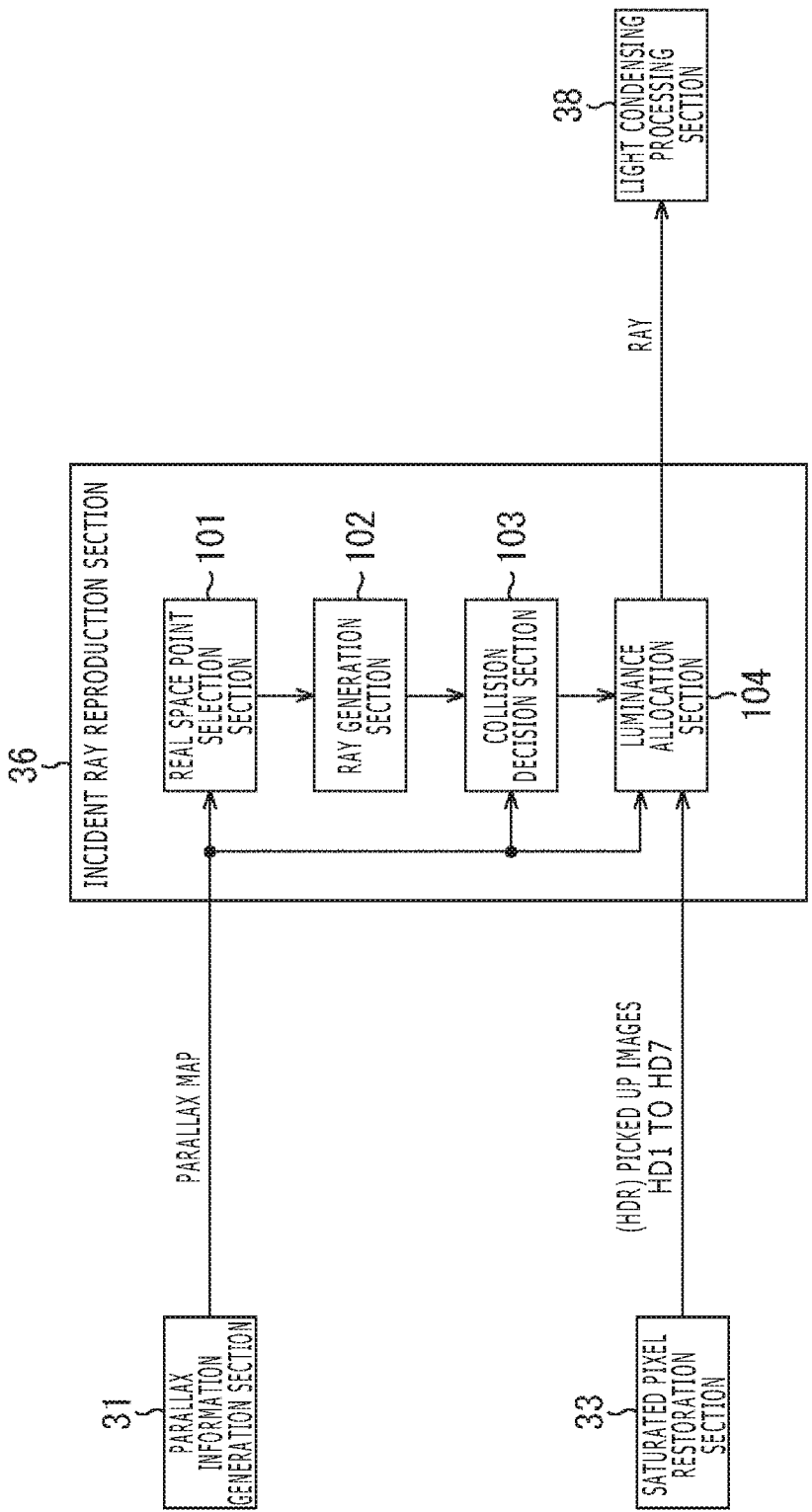

FIG. 36

─ EMULATION LENS INFORMATION ─

- PSF INTENSITY DISTRIBUTION ··· RESPONSE OF EMULATION LENS TO POINT LIGHT SOURCE

- IMAGE PLANE PITCH ··· SCALE OF PSF INTENSITY DISTRIBUTION

- PSF ANGLE COMPONENT INFORMATION ··· REACHING POSITION ON PSF INTENSITY DISTRIBUTION AT WHICH RAYS INCIDENT AT VARIOUS ANGLES TO POSITIONS OF EMULATION LENS REACH

- IMAGE PLANE SHIFT INFORMATION ··· REACHING POSITION ON VIRTUAL SENSOR AT WHICH PRINCIPAL RAY INCIDENT TO EMULATION LENS REACHES

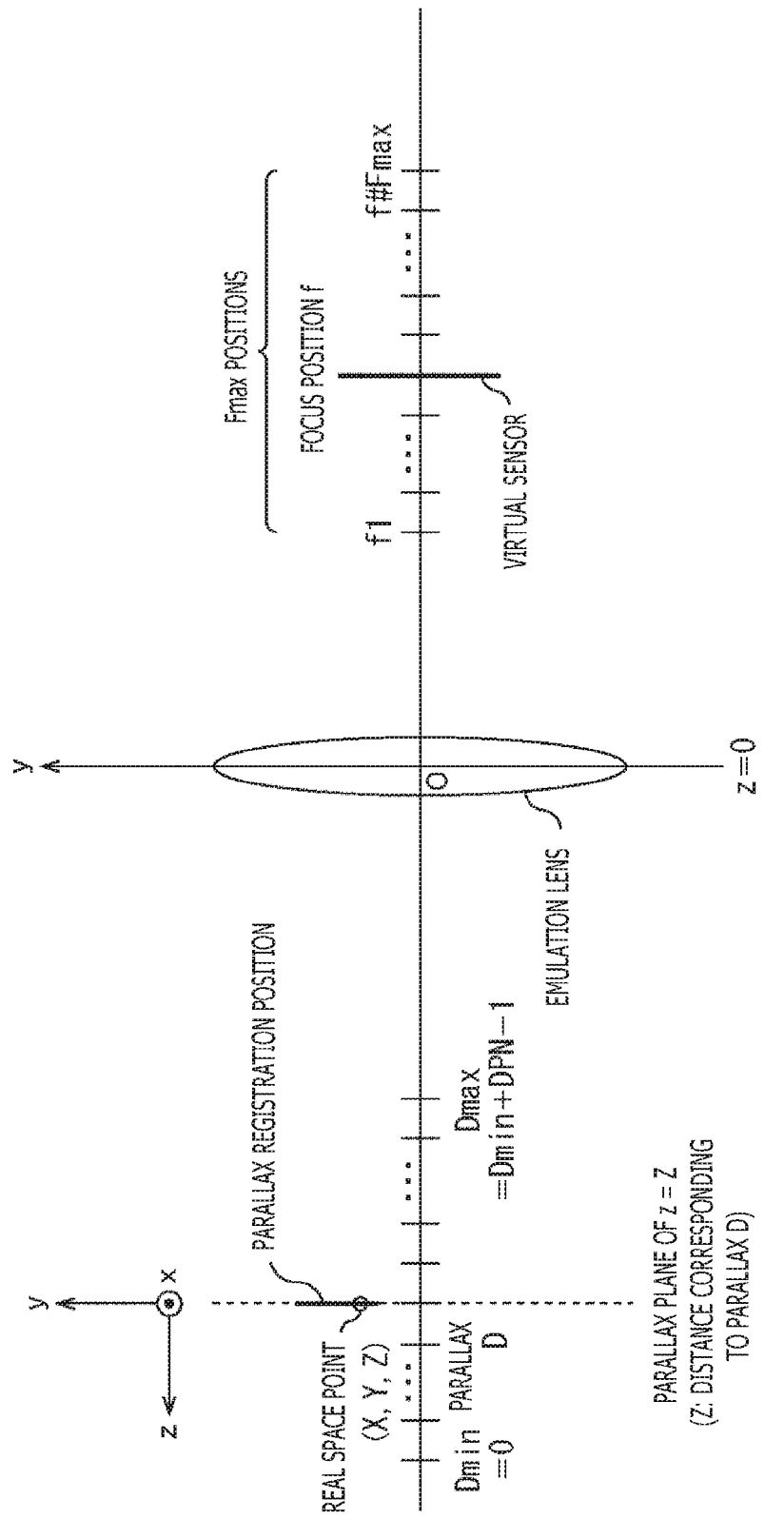
F I G. 3 7

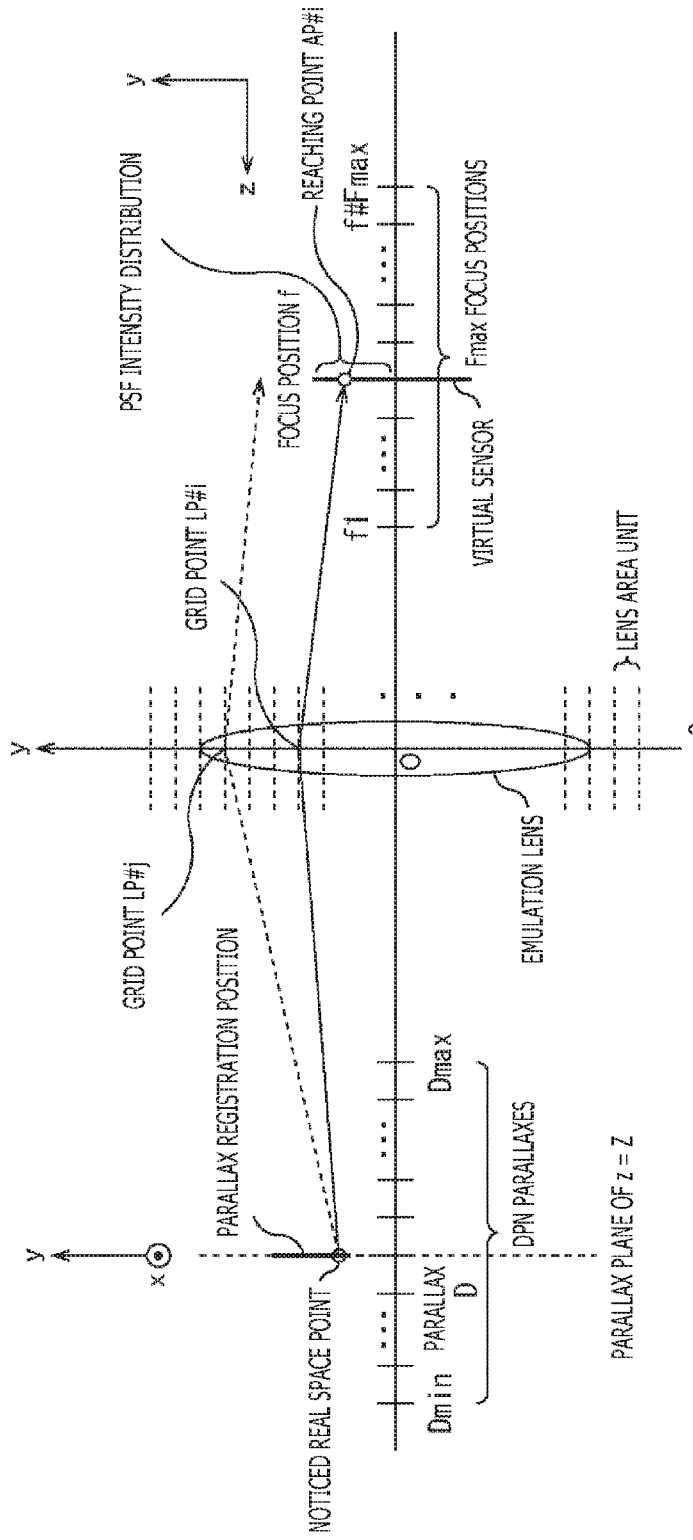
F I G. 4 3

FIG.48

IMAGE PLANE SHIFT INFORMATION TABLE OF f = f3
  IMAGE PLANE SHIFT INFORMATION TABLE OF f = f2
    IMAGE PLANE SHIFT INFORMATION TABLE OF f = f1

DPN COLUMNS

|  | PARALLAX Dmin | ... | PARALLAX Dmax |
|---|---|---|---|
| PIXEL pix1 | IMAGE PLANE SHIFT INFORMATION | ... | IMAGE PLANE SHIFT INFORMATION |
| PIXEL pix2 | IMAGE PLANE SHIFT INFORMATION | ... | IMAGE PLANE SHIFT INFORMATION |
| ... | ... | ... | ... |
| PIXEL pix#N | IMAGE PLANE SHIFT INFORMATION | ... | IMAGE PLANE SHIFT INFORMATION |

N PIXELS

IMAGE PLANE SHIFT INFORMATION TABLE OF f = f#Fmax

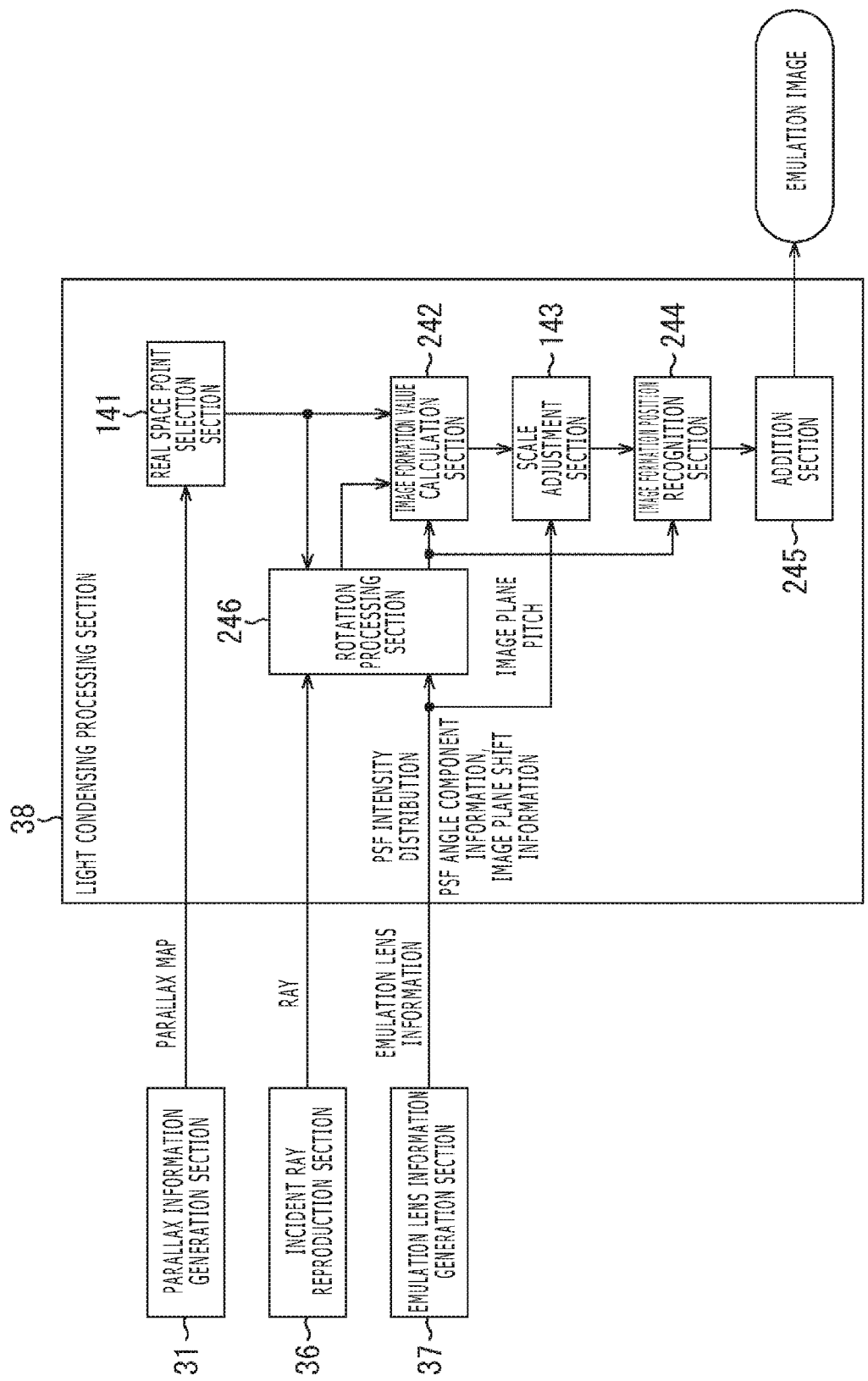

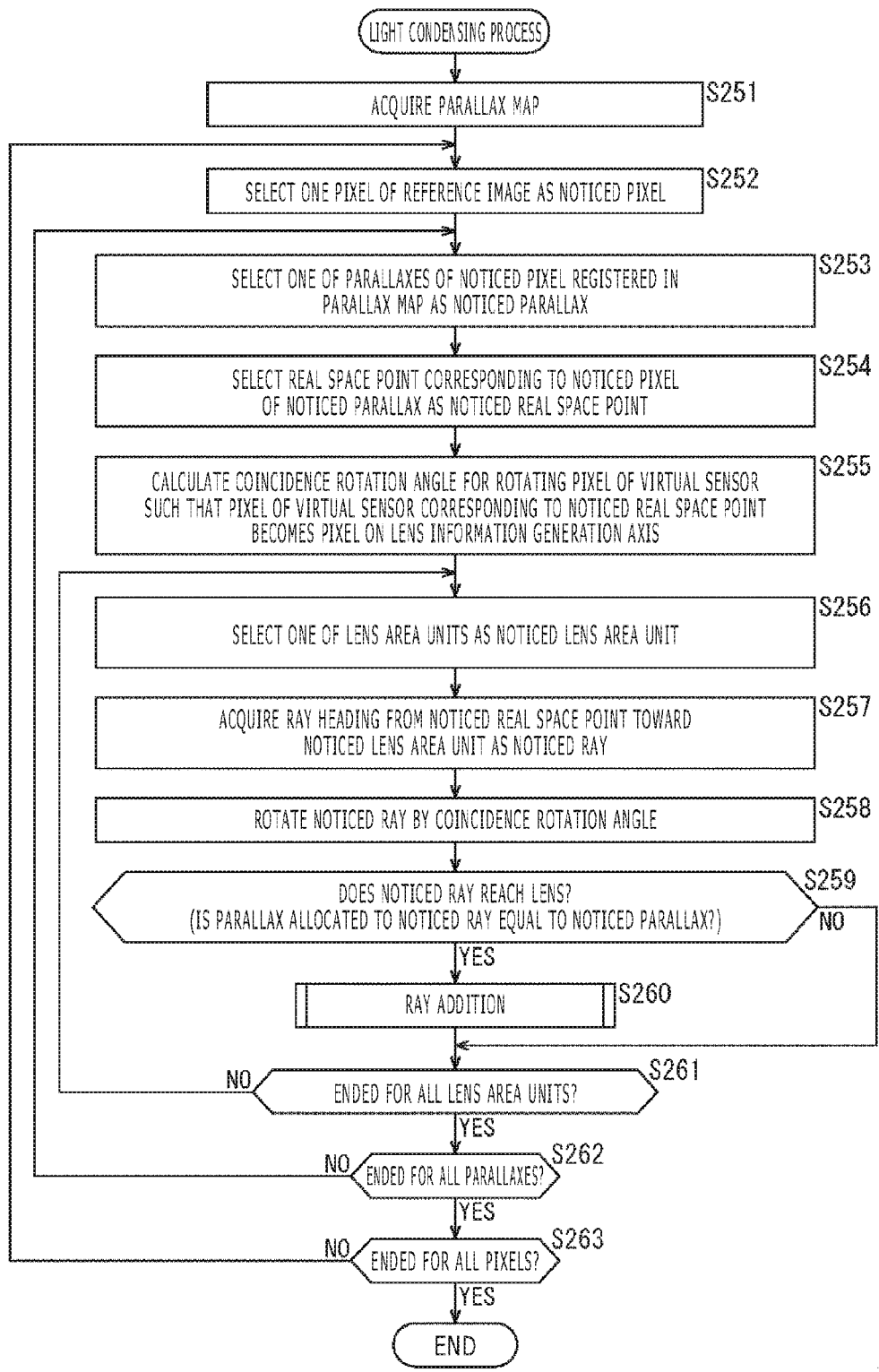

NO IMAGE PLANE SHIFT INFORMATION INTERPOLATION

NO IMAGE PLANE SHIFT INFORMATION

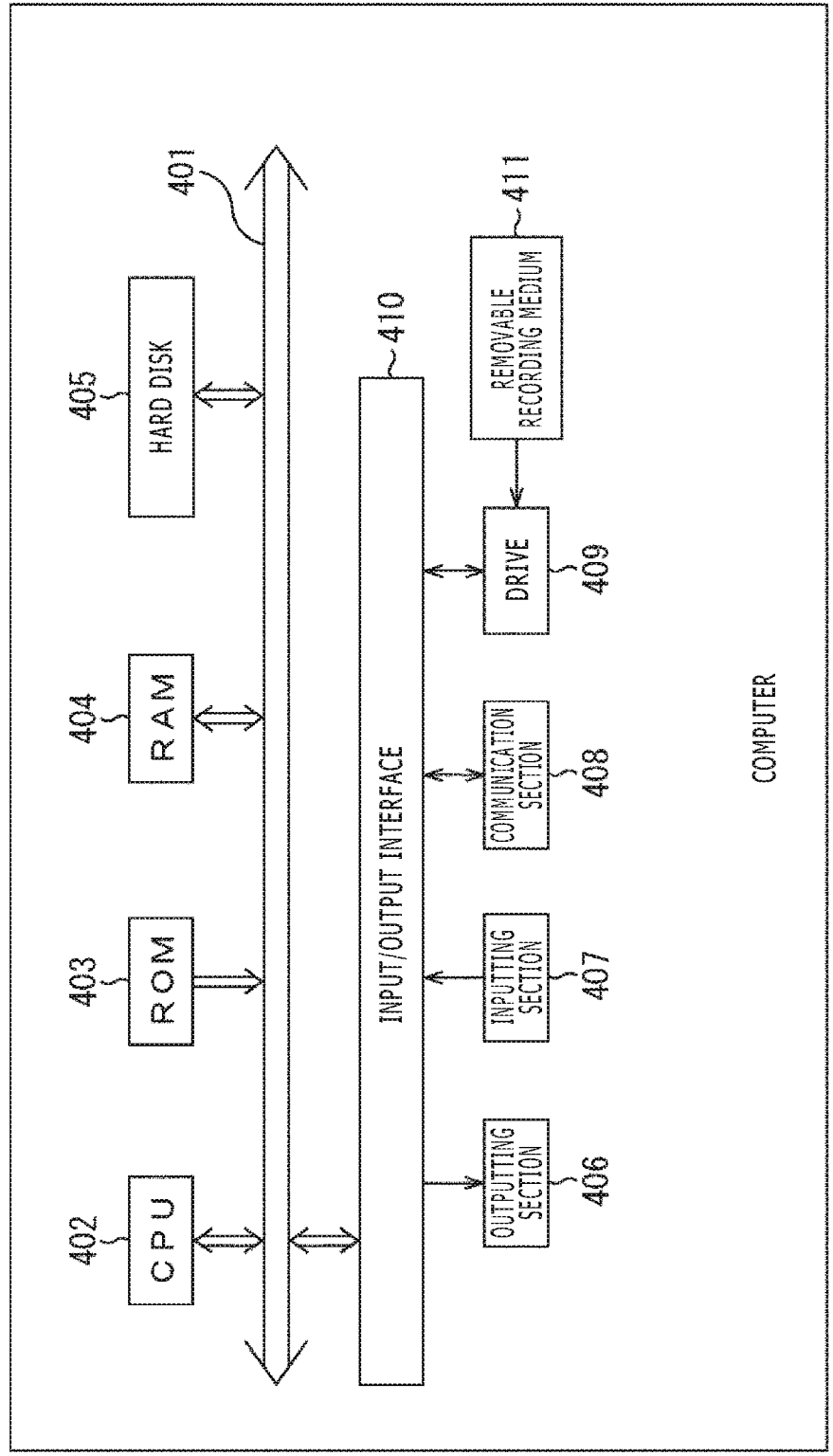

IMAGE PROCESSING APPARATUS AND IMAGE PROCESSING METHOD

CROSS REFERENCE TO RELATED APPLICATIONS

This application is a U.S. National Phase of International Patent Application No. PCT/JP2016/062066 filed on Apr. 15, 2016, which claims priority benefit of Japanese Patent Application No. JP 2015-091113 filed in the Japan Patent Office on Apr. 28, 2015. Each of the above-referenced applications is hereby incorporated herein by reference in its entirety.

TECHNICAL FIELD

The present technology relates to an image processing apparatus and an image processing method, and particularly to an image processing apparatus and an image processing method that make it possible to accurately reproduce, for example, a blur degree of an optical lens with a small data amount.

BACKGROUND ART

A light field technology is proposed which reconstructs, for example, an image for which refocusing is performed, namely, an image that looks as if image pickup were performed changing the focus position of an optical system or a like image from images of a plurality of visual points (for example, refer to PTL 1).

CITATION LIST

Patent Literature

[PTL 1]
JP 2013-238927A

SUMMARY

Technical Problem

For the light field technology, it is demanded to accurately reproduce a blur degree, which appears on an image when image pickup is performed using an actual optical lens, with a small data amount.

The present technology has been made in view of such a situation as described above and makes it possible to accurately reproduce a blur degree of an actual optical lens with a small data amount.

Solution to Problem

The image processing apparatus of the present technology is an image processing apparatus including a light condensing processing section configured to perform a light condensing process for condensing rays to be incident to a virtual lens having a synthetic aperture configured from a plurality of image pickup sections that pick up images of a plurality of visual points from a real space point in a real space on a virtual sensor through an emulation lens of an emulation target using lens information that is generated for a real space point corresponding to a plurality of information points that are a plurality of positions of part of a plane of the virtual sensor and defines rays that pass the emulation lens.

The image processing method of the present technology is an image processing method including performing a light condensing process for condensing rays to be incident to a virtual lens having a synthetic aperture configured from a plurality of image pickup sections that pick up images of a plurality of visual points from a real space point in a real space on a virtual sensor through an emulation lens of an emulation target using lens information that is generated for a real space point corresponding to a plurality of information points that are a plurality of positions of part of a plane of the virtual sensor and defines rays that pass the emulation lens.

In the image processing apparatus and the image processing method of the present technology, the light condensing process for condensing rays to be incident to the virtual lens having the synthetic aperture configured from the plurality of image pickup sections that pick up images of the plurality of visual points from a real space point in a real space are condensed on the virtual sensor through the emulation lens of an emulation target is performed using lens information that is generated for a real space point corresponding to the plurality of information points that are the plurality of positions of part of the plane of the virtual sensor and defines rays that pass the emulation lens.

It is to be noted that the image processing apparatus may be an independent apparatus or may be an internal block configuring a single apparatus.

Further, the image processing apparatus can be implemented by causing a computer to execute a program, and the program can be provided by transmitting the same through a transmission medium or by recording the same on a recording medium.

Advantageous Effect of Invention

According to the present technology, for example, a blur degree of an optical lens can be reproduced accurately with a small data amount.

It is to be noted that the effect described here is not necessarily restrictive and may be any of effects described in the present disclosure.

BRIEF DESCRIPTION OF DRAWINGS

FIG. 2 is a plan view depicting an example of a configuration of an image pickup apparatus 11.

FIG. 3 is a block diagram depicting an example of a configuration of an image processing apparatus 12.

FIG. 4 is a flow chart illustrating an example of a process of the image processing system.

FIG. 5 is a block diagram depicting an example of a configuration of a parallax information generation section 31.

FIGS. 13A, 13B and 13C are views illustrating a principle by which a clear blur is not reproduced when a saturated pixel restoration process is not performed.

FIGS. 14A, 14B and 14C are views illustrating a principle by which a clear blur is reproduced by performing the saturated pixel restoration process.

FIG. 27 is a block diagram depicting an example of a configuration of an incident ray reproduction section 36.

FIG. 36 is a view illustrating lens information generated by an emulation lens information generation section 37.

FIG. 37 is a view illustrating a real space point that is a target for generation of lens information and a focus position.

FIG. 43 is a view illustrating an example of a method for generating PSF angle component information.

FIG. 48 is a view schematically depicting image plane shift information generated by the emulation lens information generation section 37.

FIG. 64 is a block diagram depicting an example of a configuration of the light condensing processing section 38 that performs a light condensing process using lens information generated for the lens information generation axis.

FIG. 65 is a flow chart illustrating an example of the light condensing process performed by the light condensing processing section 38.

DESCRIPTION OF EMBODIMENT

<Embodiment of Image Processing System to which Present Technology is Applied>

Figure 1:
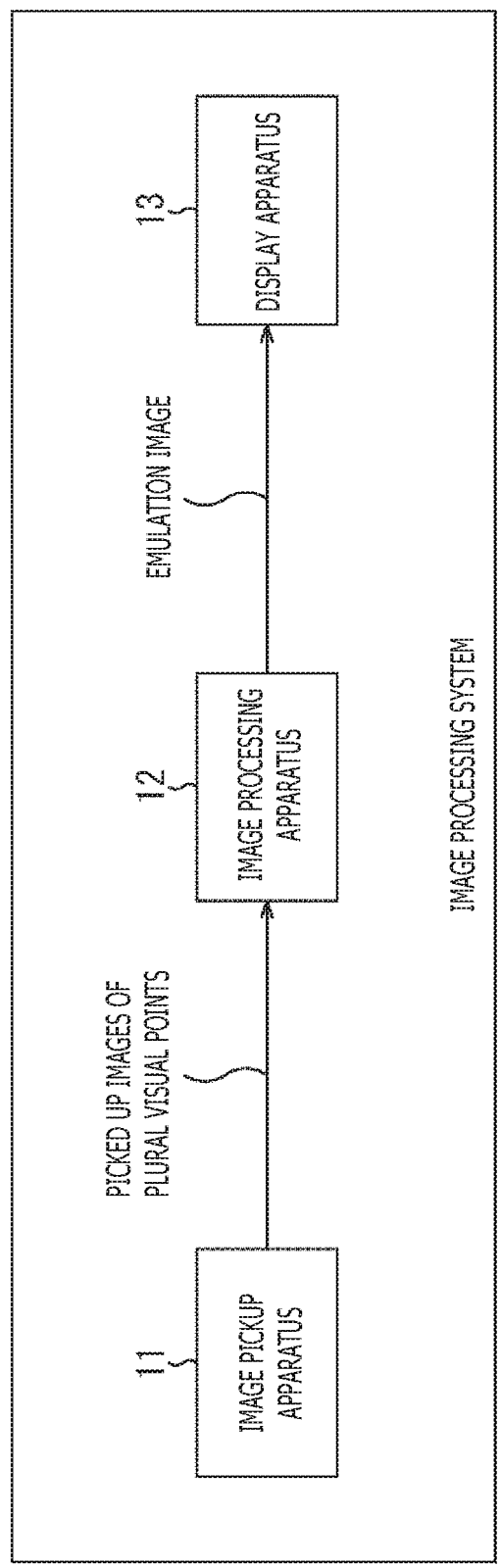
FIG. 1 is a block diagram depicting an example of a configuration of an embodiment of an image processing system to which the present technology is applied.

FIG. 1 is a block diagram depicting an example of a configuration of an embodiment of an image processing system to which the present technology is applied.

In FIG. 1, the image processing system includes an image pickup apparatus 11, an image processing apparatus 12 and a display apparatus 13.

The image pickup apparatus 11 picks up an image of an image pickup object from a plurality of visual points and supplies picked up images of the plurality of visual points obtained as a result of image pickup to the image processing apparatus 12.

The image processing apparatus 12 performs an image process using the picked up images of the plurality of visual points from the image pickup apparatus 11 to generate an emulation image similar to that where an image of the image pickup object is picked up using an emulation lens that is an optical lens of an emulation target and supplies the emulation image to the display apparatus 13.

The display apparatus 13 displays the emulation image from the image processing apparatus 12.

The emulation image is an image by which, for example, a blur degree generated in an image of an image pickup object picked up using an optical lens removably mounted on a single-lens reflex camera or a mirror-less camera is reproduced faithfully. Therefore, the user can enjoy the blur degree of such an expensive optical lens without purchasing the expensive optical lens.

It is to be noted that, in FIG. 1, the image pickup apparatus 11, the image processing apparatus 12 and the display apparatus 13 configuring the image processing system can be built in an independent apparatus such as, for example, a digital (still/video) camera or a portable terminal such as a smartphone.

Further, the image pickup apparatus 11, the image processing apparatus 12 and the display apparatus 13 can be individually built in an independent apparatus.

Further, arbitrary two and a remaining one of the image pickup apparatus 11, the image processing apparatus 12 and the display apparatus 13 can be individually built in an independent apparatus.

For example, the image pickup apparatus 11 and the display apparatus 13 can be built in a portable terminal the user possesses and the image processing apparatus 12 can be built in a server on a cloud.

Further, blocks of the image processing apparatus 12 can be built in a server on a cloud and the remaining blocks of the image processing apparatus 12 and the image pickup apparatus 11 and the display apparatus 13 can be built in a portable terminal.

<Example of Configuration of Image Pickup Apparatus 11>

FIG. 2 is a plan view depicting an example of a configuration of the image pickup apparatus 11.

The image pickup apparatus 11 includes a plurality of camera units $21_i$ and picks up picked up images of a plurality of visual points by the plurality of camera units $21_i$.

In FIG. 2, the image pickup apparatus 11 includes a plurality of, for example, seven camera units $21_1$, $21_2$, $21_3$, $21_4$, $21_5$, $21_6$ and $21_7$, and the seven camera units $21_1$ to $21_7$ are disposed on a two-dimensional plane.

Further, in FIG. 2, for example, centering around the camera unit $21_1$ that is one of the seven camera units $21_1$ to $21_7$, the other six camera units $21_2$ to $21_7$ are disposed around the camera unit $21_1$ so as to configure a regular hexagon.

Accordingly, in FIG. 2, the distance between (the optical axes of) an arbitrary one camera unit $21_i$ (i=1, 2, . . . , 7) from among the seven camera units $21_1$ to $21_7$ and another camera unit $21_j$ (j=1, 2, . . . , 7) nearest to the camera unit $21_i$ is the equal distance L.

As the distance L between the camera units $21_i$ and $21_j$, for example, approximately 20 mm can be adopted. In this case, the image pickup apparatus 11 can be configured in the size of a card such as an IC (Integrated Circuit) card.

It is to be noted that the number of the camera units $21_i$ configuring the image pickup apparatus 11 is not limited to seven and a number equal to or greater than two but equal to or smaller than six or a number equal to or greater than eight can be adopted.

Further, in the image pickup apparatus 11, the plurality of camera units $21_i$ can be disposed so as to configure a regular polygon such as a regular hexagon as described above or can be disposed at arbitrary positions.

Here, the camera unit $21_1$ disposed at the center from among the camera units $21_1$ to $21_7$ is referred to also as reference camera unit $21_1$ and the camera units $21_2$ to $21_7$ disposed around the reference camera unit $21_1$ are referred to sometimes as peripheral camera units $21_2$ to $21_7$.

<Example of Configuration of Image Processing Apparatus 12>

FIG. 3 is a block diagram depicting an example of a configuration of the image processing apparatus 12 of FIG. 1.

In FIG. 3, the image processing apparatus 12 includes a parallax information generation section 31, a calibration data acquisition section 32, a saturated pixel restoration section 33, a lens design data acquisition section 34 and a lens emulation section 35.

To the image processing apparatus 12, picked up images of seven visual points picked up by the camera units $21_1$ to $21_7$ are supplied from the image pickup apparatus 11.

Here, as the picked up images of the seven visual points supplied to the image processing apparatus 12 by the image pickup apparatus 11, standard luminance picked up images PL1 to PL7 and low luminance picked up images PH1 to PH7 are available.

A standard luminance picked up image PL#i is an image picked up in a predetermined exposure time period (at a shutter speed) (hereinafter referred to also as standard exposure time period) estimated suitable, for example, upon image pickup by the camera unit $21_i$. As the standard exposure time period, for example, an exposure time period set by an automatic exposure function or the like can be adopted.

A low luminance picked up image PH#i is an image picked up in an exposure time period shorter than the standard exposure time period (at a shutter speed higher than the shutter speed corresponding to the standard exposure time period) by the camera unit $21_i$.

Accordingly, in the low luminance picked up image PH#i, roughly an image pickup object that is reflected in the standard luminance picked up image PL#i is reflected dark.

In the image processing apparatus 12, the standard luminance picked up image PL#i is supplied to the parallax information generation section 31 and the saturated pixel restoration section 33, and the low luminance picked up image PH#i is supplied to the saturated pixel restoration section 33.

The parallax information generation section 31 determines parallax information using the standard luminance picked up image PL#i supplied from the image pickup apparatus 11 and supplies the parallax information to an incident ray reproduction section 36, an emulation lens information generation section 37 and a light condensing processing section 38 hereinafter described that configure the lens emulation section 35.

In particular, the parallax information generation section 31 performs a process for determining parallax information of each of the standard luminance picked up images PL#i supplied from the image pickup apparatus 11 from the different standard luminance picked up image PL#j as an image process of the standard luminance picked up images PL#i of the plurality of visual points. Then, the parallax information generation section 31 generates a parallax map in which the parallax information is registered and supplies the generated parallax map to the lens emulation section 35.

Further, the parallax information generation section 31 generates a multilayer parallax map hereinafter described in regard to the standard luminance picked up image PL1 picked up by the reference camera unit $21_1$ from among the standard luminance picked up images PL#i and supplies the generated multilayer parallax map to the lens emulation section 35.

Here, as the parallax information, not only the parallax (disparity) itself but also the distance (depth) corresponding to the parallax can be adopted. In the present embodiment, as the parallax information, the parallax, for example, from between the parallax and the distance is adopted.

The calibration data acquisition section 32 acquires a distortion value and a shading coefficient of the optical lens of each of the camera units $21_1$ to $21_7$ as calibration data.

Here, the calibration data is stored, for example, in a memory not depicted or is provided from a server or the like on the Internet. The calibration data acquisition section 32 acquires calibration data from the memory or the server on the Internet and supplies the acquired calibration data to the parallax information generation section 31 and the incident ray reproduction section 36.

The parallax information generation section 31 and the incident ray reproduction section 36 perform a calibration process for making picked up images picked up by the peripheral camera units $21_2$ to $21_7$ (standard luminance picked up images PL2 to PL7 or HDR picked up images HD2 to HD7 hereinafter described) coincide with a picked up image picked up by the reference camera unit $21_1$ (a standard luminance picked up image PL1 or an HDR picked up image HD1 hereinafter described) using the calibration data supplied from the calibration data acquisition section 32.

In particular, the parallax information generation section 31 and the incident ray reproduction section 36 perform, using the calibration data, a calibration process for correcting picked up images picked up by the peripheral camera units $21_2$ to $21_7$ to a picked up image that may be obtained if image pickup is performed using the reference camera unit $21_1$ in place of the peripheral camera units $21_2$ to $21_7$.

Then, the parallax information generation section 31 and the incident ray reproduction section 36 perform a process for the picked up image picked up by the peripheral camera units $21_2$ to $21_7$ using the picked up images after the calibration process.

It is to be noted that the calibration process is not hereinafter described in order to simplify the description.

The saturated pixel restoration section 33 restores a pixel value of a saturated pixel whose pixel is saturated from among pixels of the standard luminance picked up image PL#i supplied from the camera unit $21_i$ using the low luminance picked up image PH#i supplied from the camera unit $21_i$.

The saturated pixel restoration section 33 converts the standard luminance picked up image PL#i into a picked up image HD#i of a higher dynamic range than that of the standard luminance picked up image PL#i (in which the number of bits allocated to a pixel value is greater) by the restoration of the pixel value of the saturated pixel and supplies the picked up image HD#i to the incident ray reproduction section 36.

It is to be noted that, in the saturated pixel restoration section 33, the picked up image HD#i having a higher dynamic range than that of the standard luminance picked up image PL#i can be supplied not only to the incident ray reproduction section 36 but also to the parallax information generation section 31.

In this case, in the parallax information generation section 31, an image process for determining parallax information can be performed using the picked up image HD#i having the high dynamic range in place of the standard luminance picked up image PL#i. Where the parallax information is determined using the picked up image HD#i having the high dynamic range, the parallax information can be determined with a higher degree of accuracy.

Here, the picked up image HD#i of a high dynamic range obtained by the restoration of the pixel value of a saturated pixel is referred to also as HDR picked up image HD#i.

Further, the standard luminance picked up image PL1 and the low luminance picked up image PH1 picked up by the reference camera unit $21_1$ and the HDR picked up image HD1 (obtained from the standard luminance picked up image PL1 and the low luminance picked up image PH1) are hereinafter referred to each as reference image.

Further, the standard luminance picked up image PL#i and the low luminance picked up image PH#i picked up by the peripheral camera unit $21_i$ and the HDR picked up image HD#i (obtained from the standard luminance picked up image PL#i and the low luminance picked up image PH#i) are hereinafter referred to each as peripheral image.

The lens design data acquisition section 34 acquires lens design data of the emulation lens that is an optical lens of an emulation target and supplies the acquired lens design data to the emulation lens information generation section 37.

Here, the lens design data is stored, for example, in a memory not depicted or is provided from a server or the like on the Internet. The lens design data acquisition section 34 acquires and supplies the lens design data from the memory or the server on the Internet to the emulation lens information generation section 37.

It is to be noted that the emulation lens need not be an existing optical lens but may be an optical lens that does not exist actually. An optical lens that does not exist actually may be an optical lens that may exist theoretically or may be an optical lens that may not exist theoretically.

Where an optical lens that does not exist is adopted as the emulation lens, the lens design data of the emulation lens is inputted, for example, by a user operating an operation section not depicted. The lens design data acquisition section 34 acquires the lens design data inputted by the user.

The lens emulation section 35 performs a lens emulation process and supplies an emulation image obtained by the lens emulation process to the display apparatus 13 (FIG. 1).

In the lens emulation process, the lens emulation section 35 generates an emulation image, which is an image that may be obtained if an image of an image pickup object is picked up using the emulation lens, using a parallax map supplied from the parallax information generation section 31 (as occasion demands, including a multilayer parallax map hereinafter described), picked up images HD1 to HD7 of the seven visual points supplied from the saturated pixel restoration section 33 and lens design data supplied from the lens design data acquisition section 34.

Accordingly, the lens emulation section 35 functions as an emulator that performs emulation of an image pickup apparatus (not depicted) having an emulation lens.

The lens emulation section 35 includes the incident ray reproduction section 36, the emulation lens information generation section 37 and the light condensing processing section 38.

The incident ray reproduction section 36 performs an incident ray reproduction process for reproducing (information of) rays incident to a virtual lens, which is a virtual optical lens, from a real space point in a real space as an image process for the picked up images HD1 to HD7 of the seven visual points using the picked up images HD1 to HD7 of the seven visual points supplied from the saturated pixel restoration section 33 and a parallax map supplied from the parallax information generation section 31.

Here, the virtual lens to which rays reproduced by the incident ray reproduction section 36 are incident is a virtual lens having a synthetic aperture provided by the camera units $21_1$ to $21_7$ as a plurality of image pickup sections for picking up picked up images HD1 to HD7 (PL1 to PL7) of the seven visual points supplied to the incident ray reproduction section 36.

Where the camera units $21_1$ to $21_7$ are disposed, for example, in a regular hexagon as depicted in FIG. 2 and the distance between one camera unit $21_i$ and another camera unit $21_j$ positioned nearest to the camera unit $21_i$ is L, the synthetic aperture that is the aperture of the virtual lens has a substantially circular shape that interconnects the optical axes of the peripheral camera units $21_2$ to $21_7$ to each other and has a diameter of 2L.

The incident ray reproduction section 36 reproduces rays incident to the virtual lens and supplies the rays to the light condensing processing section 38.

The emulation lens information generation section 37 generates emulation lens information, which defines characteristics of the emulation lens, namely, defines rays that pass the emulation lens, using the parallax map supplied from the parallax information generation section 31 and lens design data supplied from the lens design data acquisition section 34 and supplies the emulation lens information to the light condensing processing section 38.

Here, in the following description, the emulation lens information is also referred to simply as lens information.

Since the lens information has a value equivalent to that of the emulation lens, it can be made a target of buying and selling. Since the lens information is electronic data and is easy to duplicate, in order to prevent illegal duplication, it is possible to require certification for use of the lens information.

The light condensing processing section 38 performs a (digital) light condensing process for condensing, using the parallax map supplied from the parallax information generation section 31, rays supplied from the incident ray reproduction section 36 and lens information supplied from the emulation lens information generation section 37, the rays on the virtual sensor, which is a virtual image sensor, through the emulation lens.

Then, the light condensing processing section 38 supplies an emulation image obtained as a result of the light condensing process to the display apparatus 13 (FIG. 1).

It is to be noted that it is possible to configure the image processing apparatus 12 as a server and also possible to configure the image processing apparatus 12 as a client. Further, it is possible to configure the image processing apparatus 12 as a server-client system. Where the image processing apparatus 12 is configured as a server-client system, it is possible to configure an arbitrary block or blocks of the image processing apparatus 12 from a server and configure the remaining blocks from a client.

<Process of Image Processing System>

FIG. 4 is a flow chart illustrating an example of a process of the image processing system of FIG. 1.

At step S1, the image pickup apparatus 11 picks up picked up images PL1 to PL7 and PH1 to PH7 of the seven visual points as a plurality of visual points. The picked up images PL#i are supplied to the parallax information generation section 31 and the saturated pixel restoration section 33 of the image processing apparatus 12 (FIG. 3) and the picked up images PH#i are supplied to the saturated pixel restoration section 33.

Then, the processing advances from step S1 to step S2, at which the parallax information generation section 31 performs a parallax information generation process for determining parallax information using the picked up images PL#i supplied from the image pickup apparatus 11 and generating a parallax map (including a multilayer parallax map) in which the parallax information is registered.

The parallax information generation section 31 supplies the parallax map obtained by the parallax information generation process to the incident ray reproduction section 36, the emulation lens information generation section 37 and the light condensing processing section 38 that configure the lens emulation section 35, and then the processing advances from step S2 to step S3.

At step S3, the saturated pixel restoration section 33 performs a saturated pixel restoration process for restoring the pixel value of a saturated pixel from among the pixels of the picked up image PL#i supplied from the camera unit $21_i$ using the picked up image PH#i supplied from the camera unit $21_i$.

The saturated pixel restoration section 33 supplies a picked up image HD#i of a high dynamic range obtained by the saturated pixel restoration process to the incident ray reproduction section 36, and then, the processing advances from step S3 to step S4.

At step S4, the lens design data acquisition section 34 acquires lens design data of the emulation lens and supplies the lens design data to the emulation lens information generation section 37.

Further, at step S4, the emulation lens information generation section 37 performs an emulation lens information generation process for generating lens information of the emulation lens using the parallax map supplied from the parallax information generation section 31 and the lens design data supplied from the lens design data acquisition section 34.

The emulation lens information generation section 37 supplies the lens information obtained by the emulation lens information generation process to the light condensing processing section 38, and then the processing advances from step S4 to step S5.

At step S5, the incident ray reproduction section 36 performs an incident ray reproduction process for reproducing rays to enter the visual lens from a real space point in a rear space using the picked up images HD1 to HD7 of the seven visual points supplied from the saturated pixel restoration section 33 and the parallax map supplied from the parallax information generation section 31.

The incident ray reproduction section 36 supplies (the information of) the rays obtained by the incident ray reproduction process to the light condensing processing section 38, and then, the processing advances from step S5 to step S6.

At step S6, the light condensing processing section 38 performs a light condensing process for condensing the rays on the virtual sensor through the emulation lens using the parallax map supplied from the parallax information generation section 31, rays supplied from the incident ray reproduction section 36 and lens information supplied from the emulation lens information generation section 37.

The light condensing processing section 38 supplies an emulation image obtained as a result of the light condensing process to the display apparatus 13, and then, the processing advances from step S6 to step S7.

At step S7, the display apparatus 13 displays the emulation image from the light condensing processing section 38.

<Generation of Parallax Map>

FIG. 5 is a block diagram depicting an example of a configuration of the parallax information generation section 31 of FIG. 3.

Referring to FIG. 5, the parallax information generation section 31 includes a reference parallax map generation section 41 and a multilayer parallax map generation section 42.

To the reference parallax map generation section 41, picked up images PL1 to PL7 are supplied from the image pickup apparatus 11.

The reference parallax map generation section 41 generates a reference parallax map, which is a parallax map in which parallaxes of the reference image PL1 that is one of the picked up images PL1 to PL7 from the image pickup apparatus 11 from the other picked up images (peripheral images) PL2 to PL7 are registered, and supplies the reference parallax map to the multilayer parallax map generation section 42.

The multilayer parallax map generation section 42 uses, for example, the reference parallax map from the reference parallax map generation section 41 to generate parallax maps of the peripheral images PL2 to PL7.

Then, the multilayer parallax map generation section 42 uses the reference parallax map of the reference image PL1 and the parallax maps of the peripheral images PL2 to PL7 to generate a multilayer parallax map in which parallaxes with reference to the visual point (position) of the reference camera unit $21_1$ are registered.

A necessary parallax map or maps from among the reference parallax map of the reference image PL1, the parallax maps of the peripheral images PL2 to PL7 and the multilayer parallax map are supplied to the incident ray reproduction section 36, the emulation lens information generation section 37 and the light condensing processing section 38 (FIG. 3).

Figure 6:
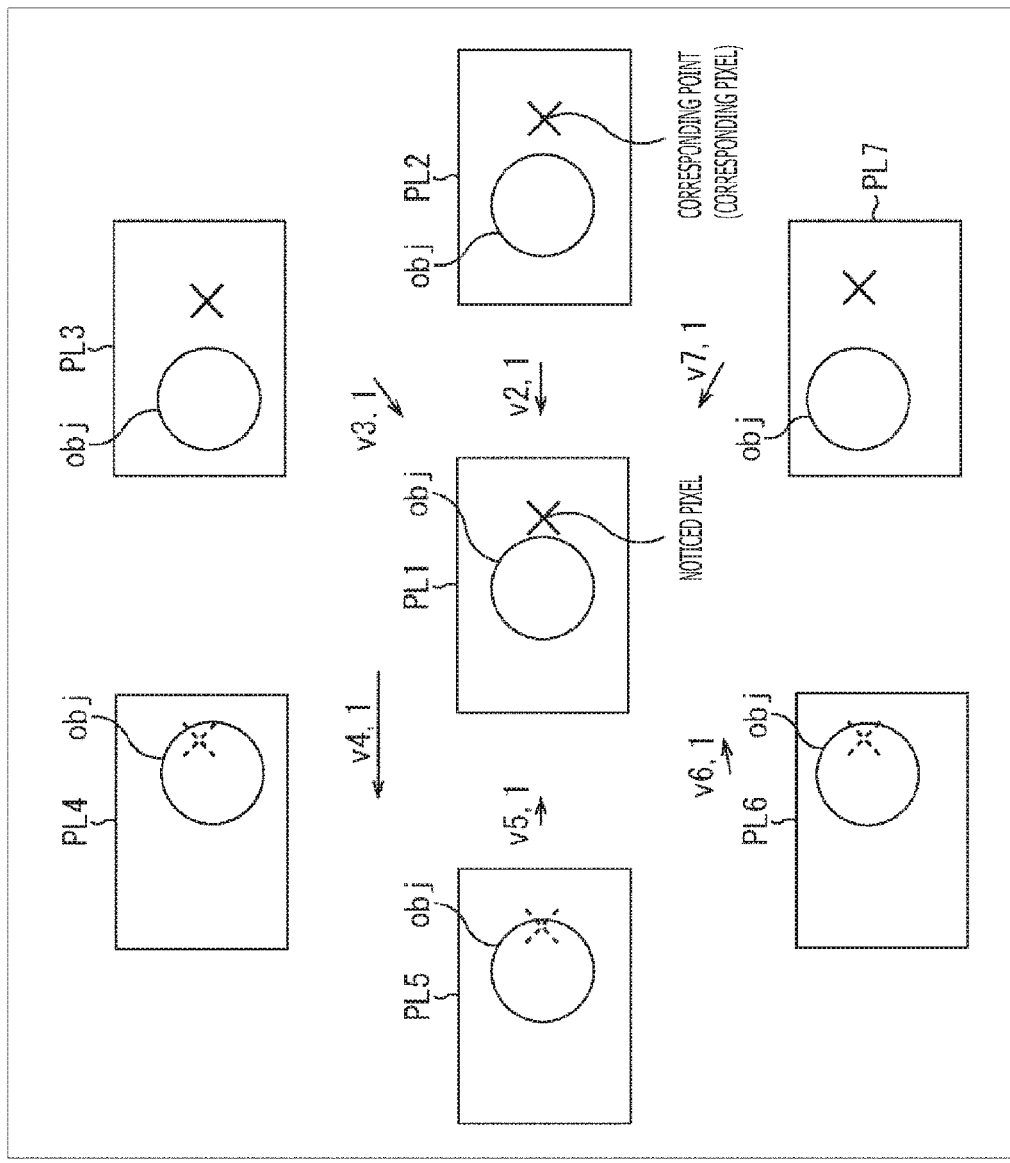
FIG. 6 is a view illustrating an example of generation of a reference parallax map by a reference parallax map generation section 41.

FIG. 6 is a view illustrating an example of generation of a reference parallax map by the reference parallax map generation section 41 of FIG. 5.

In particular, FIG. 6 depicts an example of the picked up images PL1 to PL7.

In FIG. 6, in the picked up images PL1 to PL7, a predetermined object obj is reflected as a foreground at the front side of a predetermined background. Since the picked up images PL1 to PL7 are different in visual point from each other, the positions of the object obj reflected, for example, in the picked up images PL2 to PL7 are displaced by distances corresponding to differences in visual point from the position of the object obj reflected in the reference image PL1.

The reference parallax map generation section 41 successively selects the pixels of the reference image PL1 as a noticed pixel and detects a corresponding pixel (corresponding point) corresponding to the noticed pixel from within each of the other picked up images PL2 to PL7, namely, from within each of the peripheral images PL2 to PL7.

As a method for detecting a corresponding pixel of each of the peripheral images PL2 to PL7 corresponding to the noticed pixel of the reference image PL1, an arbitrary method such as, for example, block matching can be adopted.

Here, a vector heading from the noticed pixel of the reference image PL1 toward a corresponding pixel of a peripheral image PL#i, namely, a vector representative of a positional displacement between the noticed pixel and the corresponding pixel, is referred to as parallax vector v#i,1.

The reference parallax map generation section 41 determines parallax vectors v2,1 to v7,1 of the respective peripheral images PL2 to PL7. Then, the reference parallax map generation section 41 performs majority vote on magnitude of the parallax vectors v2,1 to v7,1 and determines the magnitude of the parallax vector v#i,1 that wins in the majority vote as a parallax of the (position of) the noticed pixel.

Here, where the distances between the reference camera unit $21_1$ that picks up the reference image PL1 and the peripheral camera units $21_2$ to $21_7$ that pick up the peripheral images PL2 to PL7 are the equal distance L in the image pickup apparatus 11 as described hereinabove with reference to FIG. 2, if a portion reflected at the noticed pixel of the reference image PL1 is reflected also in the peripheral images PL2 to PL7, then vectors having an equal magnitude although the directions are different from each other are determined as the parallax vectors v2,1 to v7,1.

In particular, in this case, the parallax vectors v2,1 to v7,1 are vectors that have an equal magnitude but have directions according to the positions (visual points) of the peripheral images PL2 to PL7 with respect to the reference camera unit $21_1$.

However, since the picked up images PL1 to PL7 have visual points different from each other, the peripheral images PL2 to PL7 possibly include an image that suffers from occlusion, namely, in which a portion reflected at the noticed pixel of the reference image PL1 is hidden by the foreground and is not reflected.

In regard to the peripheral image (hereinafter referred to also as occlusion image) PL#i in which a portion reflected at the noticed pixel of the reference image PL1 is not reflected, it is difficult to detect a correct pixel as the corresponding pixel that corresponds to the noticed pixel.

Therefore, as regards the occlusion image PL#i, a parallax vector v#i,1 having a magnitude different from that of a parallax vector v#j,1 of a peripheral image PL#j in which a portion reflected at the noticed pixel of the reference image PL1 is reflected is determined.

It is estimated that the number of images that suffers from occlusion in regard to the noticed pixel is smaller than that of images that suffers from occlusion among the peripheral images PL2 to PL7. Therefore, the reference parallax map generation section 41 performs majority vote on magnitude of the parallax vectors v2,1 to v7,1 as described above and determines the magnitude of the parallax vector v#i,1 that wins in the majority vote as a parallax of the noticed pixel.

In FIG. 6, the three parallax vectors v2,1, v3,1 and v7,1 are vectors having an equal magnitude among the parallax vectors v2,1 to v7,1. Meanwhile, in the reference vectors v4,1, v5,1 and v6,1, parallax vectors having an equal magnitude do not exist.

Therefore, the magnitude of the three parallax vectors v2,1, v3,1 and v7,1 is determined as a parallax of the noticed pixel.

It is to be noted that the direction of the parallax of the noticed pixel of the reference image PL1 from an arbitrary peripheral image PL#i can be recognized from a positional relationship between the reference camera unit $21_1$ and the peripheral camera unit $21_i$.

The reference parallax map generation section 41 successively selects the pixels of the reference image PL1 as a noticed pixel and determines the parallax. Then, the reference parallax map generation section 41 generates a parallax map in which the parallax of each pixel of the reference image PL1 in association with the position (xy coordinates) of the pixel is registered as a reference parallax map. Accordingly, the parallax map is a map (table) in which positions of pixels and parallaxes of the pixels are associated with each other.

Here, in addition to the parallax map of the reference image PL1 (reference parallax map), also the parallax map of each peripheral image PL#i can be generated similarly.

However, in generation of the parallax map of the peripheral image PL#i, the majority vote of parallax vectors is performed with the magnitude of the parallax vector adjusted on the basis of a relationship in visual point between the peripheral image PL#i and each of the other picked up images PL#j (positional relationship between the camera units $21_i$ and $21_j$).

In particular, for example, where the parallax map of the peripheral image PL5 is to be generated, the parallax vector obtained, for example, between the peripheral image PL5 and the reference image PL1 has a magnitude equal to twice the parallax vector obtained between the peripheral image PL5 and the peripheral image PL2.

This is because, while the baseline length that is a distance between the optical axes of the peripheral camera unit $21_5$ that picks up the peripheral image PL5 and the reference camera unit $21_1$ that picks up the reference image PL1 is the distance L, the baseline length between the peripheral camera unit $21_5$ that picks up the peripheral image PL5 and the peripheral camera unit $21_2$ that picks up the peripheral image PL2 is the distance 2L.

Therefore, if it is assumed that, for example, the distance L that is the baseline length between the peripheral camera unit $21_5$ and the reference camera unit $21_1$ is called reference baseline length, then the majority vote on parallax vector is performed after the magnitude of the parallax vectors is adjusted such that the baseline length is converted into the reference baseline length L.

In particular, for example, since the baseline length L, for example, between the peripheral camera unit $21_5$ that picks up the peripheral image PL5 and the reference camera unit $21_1$ that picks up the reference image PL1 is equal to the reference baseline length L, the parallax vector obtained between the peripheral image PL5 and the reference image PL1 is adjusted in magnitude to one time.

Meanwhile, since the baseline length 2L, for example, between the peripheral camera unit $21_5$ that picks up the peripheral image PL5 and the peripheral camera unit $21_2$ that picks up the peripheral image PL2 is equal to twice the reference baseline length L, the parallax vector obtained between the peripheral image PL5 and the reference image PL1 is adjusted in magnitude to ½ time (n times where n is a value of the ratio of the baseline length between peripheral camera unit $21_5$ and the peripheral camera unit $21_2$ to the reference baseline length).

Also the parallax vector obtained between the peripheral image PL5 and any other picked up image PL#i is adjusted in magnitude to n times where n is a value of the ratio to the reference baseline length L similarly.

Then, the majority vote on parallax vector is performed using the parallax vectors after the adjustment in magnitude.

It is to be noted that the reference parallax map generation section 41 can determine the parallax of (each of the pixels of) the reference image PL1, for example, with the accuracy of a pixel of a picked up image picked up by the image pickup apparatus 11. Further, the parallax of the reference image PL1 can be determined, for example, with a finer accuracy than a pixel of a picked up image picked up by the image pickup apparatus 11 (hereinafter referred to as sub-pixel accuracy), in particular, for example, with an accuracy of a ¼ pixel or the like.

Where a parallax is determined with a subpixel accuracy, in a process in which a parallax is used, not only it is possible to use the parallax of the subpixel accuracy as it is but also it is possible to use the parallax by integrating the parallax of the subpixel accuracy by rounding down, rounding up or rounding off decimal places of the parallax.

In the present embodiment, the parallax is determined with a subpixel accuracy and, unless otherwise specified, the parallax with the subpixel accuracy is integrated and used in order to facilitate calculation.

Figure 7:
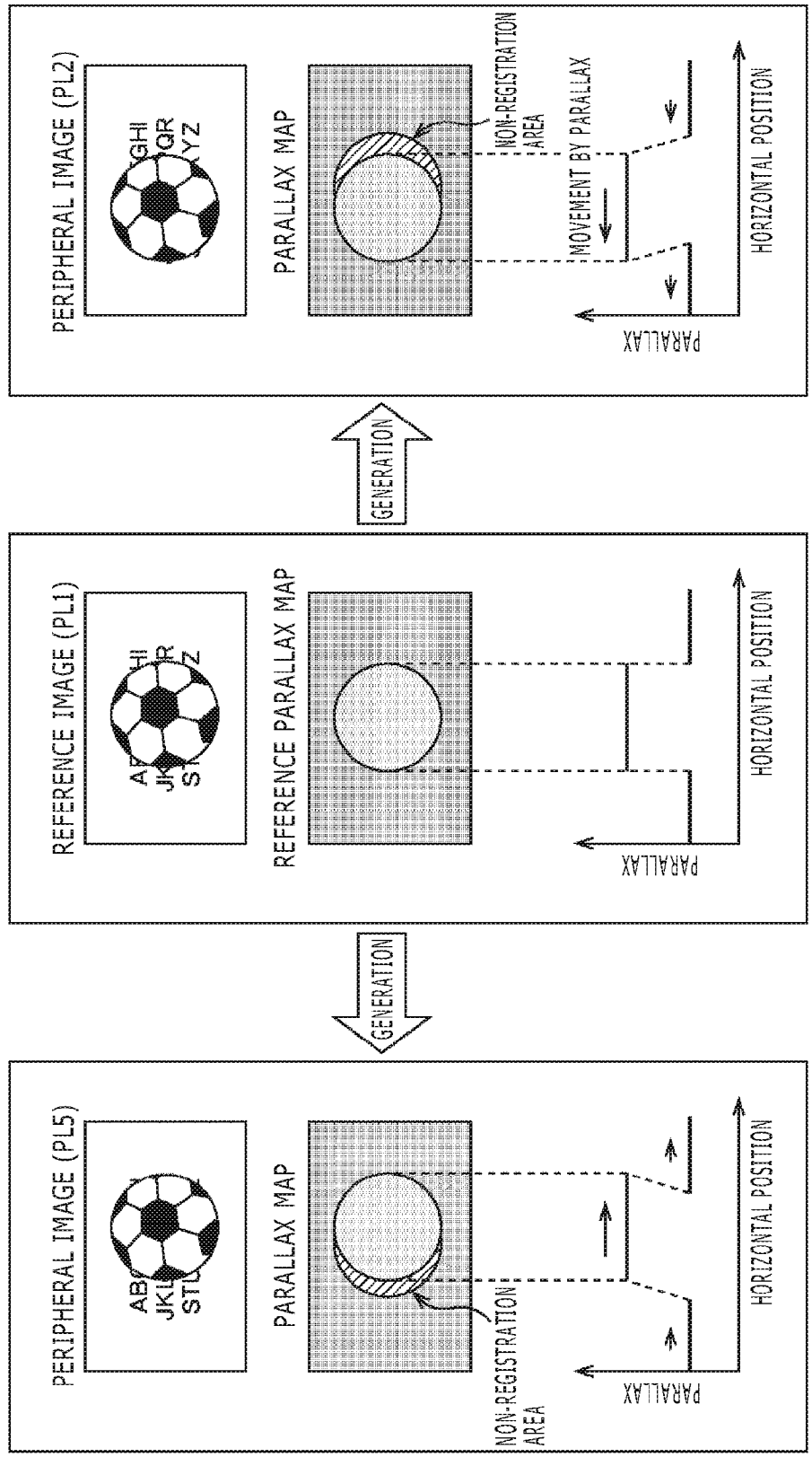
FIG. 7 is a view illustrating an example of generation of a parallax map of a peripheral image PL#i.

FIG. 7 is a view illustrating an example of generation of a parallax map of a peripheral image PL#i.

The parallax map of the peripheral image PL#i not only can be generated similarly to the parallax map of the reference image PL1 (reference parallax map) but also can be generated, as it were, simply and easily utilizing the reference parallax map.

The multilayer parallax map generation section 42 (FIG. 5) can generate the parallax map of the peripheral image PL#i utilizing the reference parallax map.

In FIG. 7, the parallax maps of the peripheral images PL2 and PL5 are generated utilizing the reference parallax map.

Here, in FIG. 7, the reference image PL1 and the peripheral images PL2 and PL5 and the parallax maps of the reference image PL1 and the peripheral images PL2 and PL5 are depicted.

As the parallax map of the reference image PL1 (reference parallax map), a plan view of a parallax map in which the parallaxes of the pixels are represented by shading and a parallax map in which the axis of abscissa indicates the horizontal position of a pixel and the axis of ordinate indicates the parallax are depicted.

This similarly applies also to the parallax maps of the peripheral images PL2 and PL5.

When the multilayer parallax map generation section 42 is to utilize the reference parallax map to generate a parallax map of a peripheral image PL#i, it moves the parallaxes registered at the positions of pixels by the parallaxes in directions according to the positional relationship between the camera unit $21_1$ that picks up the reference image and the peripheral camera unit $21_i$ that picks up the peripheral image PL#i (the direction is hereinafter referred to as camera position relation direction) in the reference parallax map to generate the parallax map of the peripheral image PL#i.

For example, when the parallax map of the peripheral image PL2 is to be generated, determining the leftward direction, which is a direction when the camera unit $21_1$ that picks up the reference image is viewed from the camera unit $21_2$ that picks up the peripheral image PL2 as the camera position relation direction, the parallax registered at the position of each pixel of the reference parallax map is moved by the parallax in the leftward direction that is the camera position relation direction to generate the parallax map of the peripheral image PL2.

On the other hand, for example, when the parallax map of the peripheral image PL5 is to be generated, determining the rightward direction, which is a direction when the camera unit $21_1$ that picks up the reference image is viewed from the camera unit $21_5$ that picks up the peripheral image PL5 as the camera position relation direction, the parallax registered at the position of each pixel of the reference parallax map is moved by the parallax in the rightward direction that is the camera position relation direction to generate the parallax map of the peripheral image PL5.

When the parallax map of the peripheral image PL#i is generated utilizing the reference parallax map in such a manner as described above, in the parallax map of the peripheral image PL#i, an area corresponding to pixels in a region that is not reflected in the reference image P1 although it is reflected in the peripheral image PL#i is a non-registration area (portion indicated by slanting lines in FIG. 7) in which no parallax is registered.

Therefore, the multilayer parallax map generation section 42 interpolates parallaxes in a non-registration area of the parallax map of the peripheral image PL#i generated utilizing the reference parallax map to complete the parallax map of the peripheral image PL#i.

Figure 8:
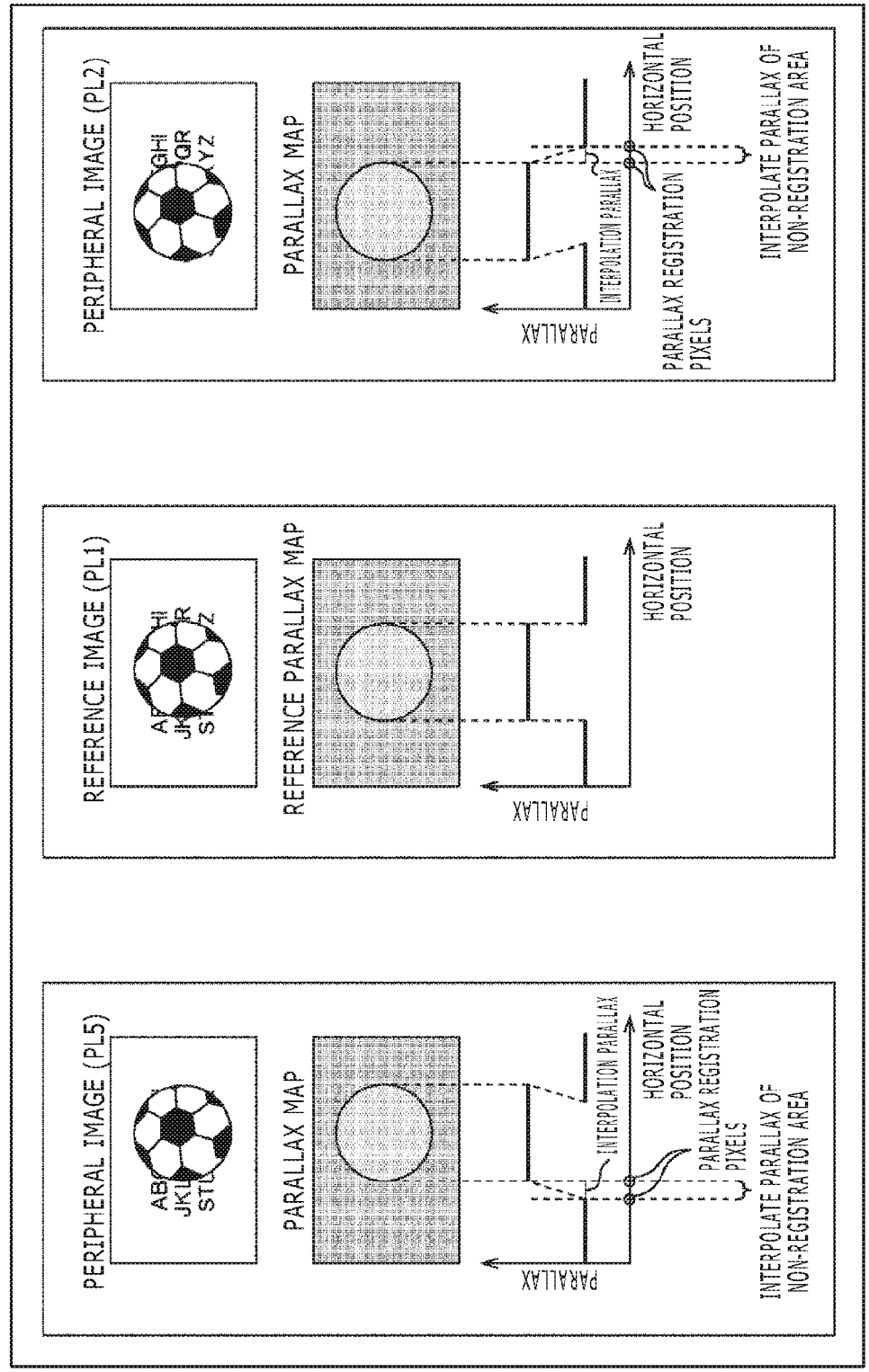
FIG. 8 is a view illustrating interpolation of a parallax to a non-registration area of the parallax map of the peripheral image PL#i.

FIG. 8 is a view illustrating interpolation of a parallax into a non-registration area of the parallax map of the peripheral image PL#i.

Here, also in FIG. 8, the reference image PL1 and the peripheral images PL2 and PL5 and the parallax maps of the reference image PL1 and the peripheral images PL2 and PL5 are depicted similarly as in FIG. 7.

The multilayer parallax map generation section 42 follows a straight line of the camera position relation direction, which is a straight line extending in the camera position relation direction from a pixel in a non-registration area in the parallax map of the peripheral image PL#i, in both of one direction and the opposite direction and detects a parallax registration pixel that is reached first in the following process and is a pixel whose parallax is registered.

Further, the multilayer parallax map generation section 42 selects a smaller parallax (parallax corresponding to a greater distance) from between the parallax of the parallax registration pixel in the one direction and the parallax of the parallax registration pixel in the opposite direction of the camera position relation direction straight line as an interpolation parallax to be used for interpolation of a pixel in the non-registration area.

Then, the multilayer parallax map generation section 42 interpolates the parallax of the pixel in the non-registration area with the interpolation parallax (registers the interpolation parallax as the parallax of the pixel in the non-registration area) to complete the parallax map of the peripheral image PL#i.

In FIG. 8, in the parallax map of the peripheral image PL2, a parallax registered at a pixel (parallax registration pixel) neighboring with the boundary at the right side of the non-registration area (FIG. 7) is selected as an interpolation parallax, and parallaxes of pixels in the non-registration area are interpolated as interpolation parallaxes (interpolation parallaxes are propagated as parallaxes of pixels in the non-registration area).

Further, in FIG. 8, in the parallax map of the peripheral image PL5, a parallax registered at a pixel (parallax registration pixel) neighboring with the boundary at the left side of the non-registration area (FIG. 7) is selected as an interpolation parallax, and parallaxes of pixels in the non-registration area are interpolated as interpolation parallaxes.

Figure 9:
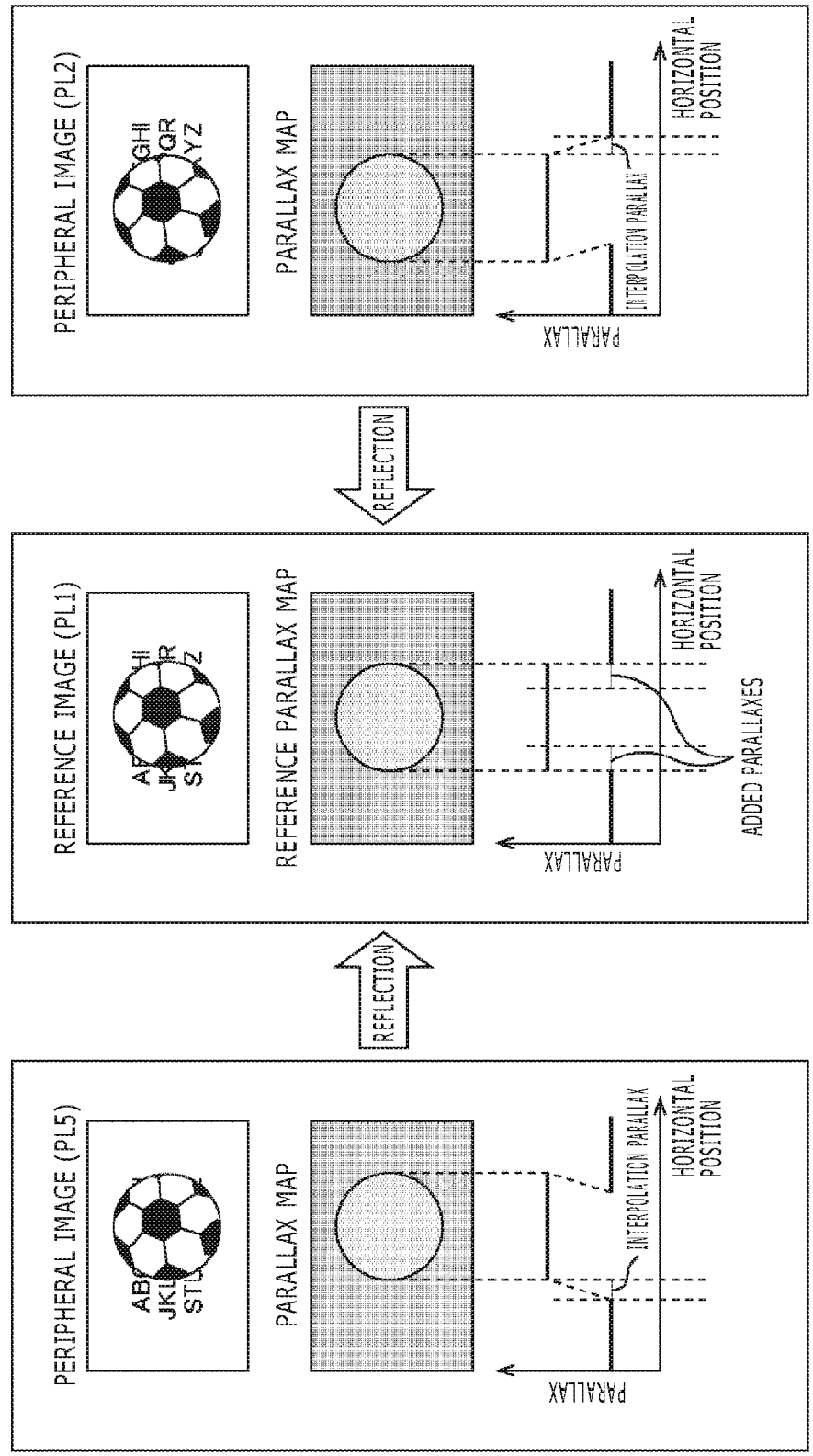
FIG. 9 is a view illustrating an example of generation of a multilayer parallax map.

FIG. 9 is a view illustrating an example of generation of a multilayer parallax map.

Here, also in FIG. 9, the reference image PL1 and the peripheral images PL2 and PL5 and the parallax maps of the reference image PL1 and the peripheral images PL2 and PL5 are depicted similarly as in FIGS. 7 and 8.

The multilayer parallax map generation section 42 uses the reference parallax map of the reference image PL1 and (one or more of) the parallax maps of the peripheral images PL2 to PL7 to generate a multilayer parallax map.

In particular, the multilayer parallax map generation section 42 successively selects the pixels of the peripheral image PL#i as a noticed pixel and detects a corresponding pixel of the reference image corresponding to the noticed pixel.

For example, a pixel of the reference image PL1 at a position moved in the camera position relation direction (here, in the direction in which the camera unit $22_i$ is viewed from the camera unit $21_1$) by the parallax registered at the noticed pixel of the parallax map of the peripheral image PL#i from the position of the noticed pixel of the peripheral image PL#i is detected as a corresponding pixel of the reference image PL1 corresponding to the noticed pixel of the peripheral image PL#i.

Then, the parallax of the noticed pixel of the peripheral image PL#i is registered into the corresponding pixel of the reference image PL1 in the reference parallax map.

In generation of a multilayer parallax map, although a parallax is registered already at the corresponding pixel of the reference image PL1 in the reference parallax map, where the parallax of the noticed pixel of a peripheral image PL#i is different from the parallax registered already at the corresponding pixel, it is registered in such a form that it is added to the parallax registered already.

As described above, a parallax registered in the parallax map of the peripheral image PL#i is, as it were, reflected in the reference parallax map in such a form that it is added, and the reference parallax map after the reflection is the multilayer parallax map.

As a result, the multilayer parallax map is a parallax map in which, in addition to parallaxes in a region that can be viewed from the visual point of the reference camera unit $21_1$ (hereinafter referred to sometimes as reference visual point), parallaxes at least at a portion of a region that cannot be viewed hiding behind the foreground (region in which occlusion occurs) are registered.

In the multilayer parallax map, for example, at a pixel in the region of the foreground, as it were, multilayer parallaxes (a plurality of parallaxes) like parallaxes corresponding to distances to the foreground and parallaxes corresponding to distances to the background that cannot be viewed hiding behind the foreground from the reference visual point are registered.

Figure 10:
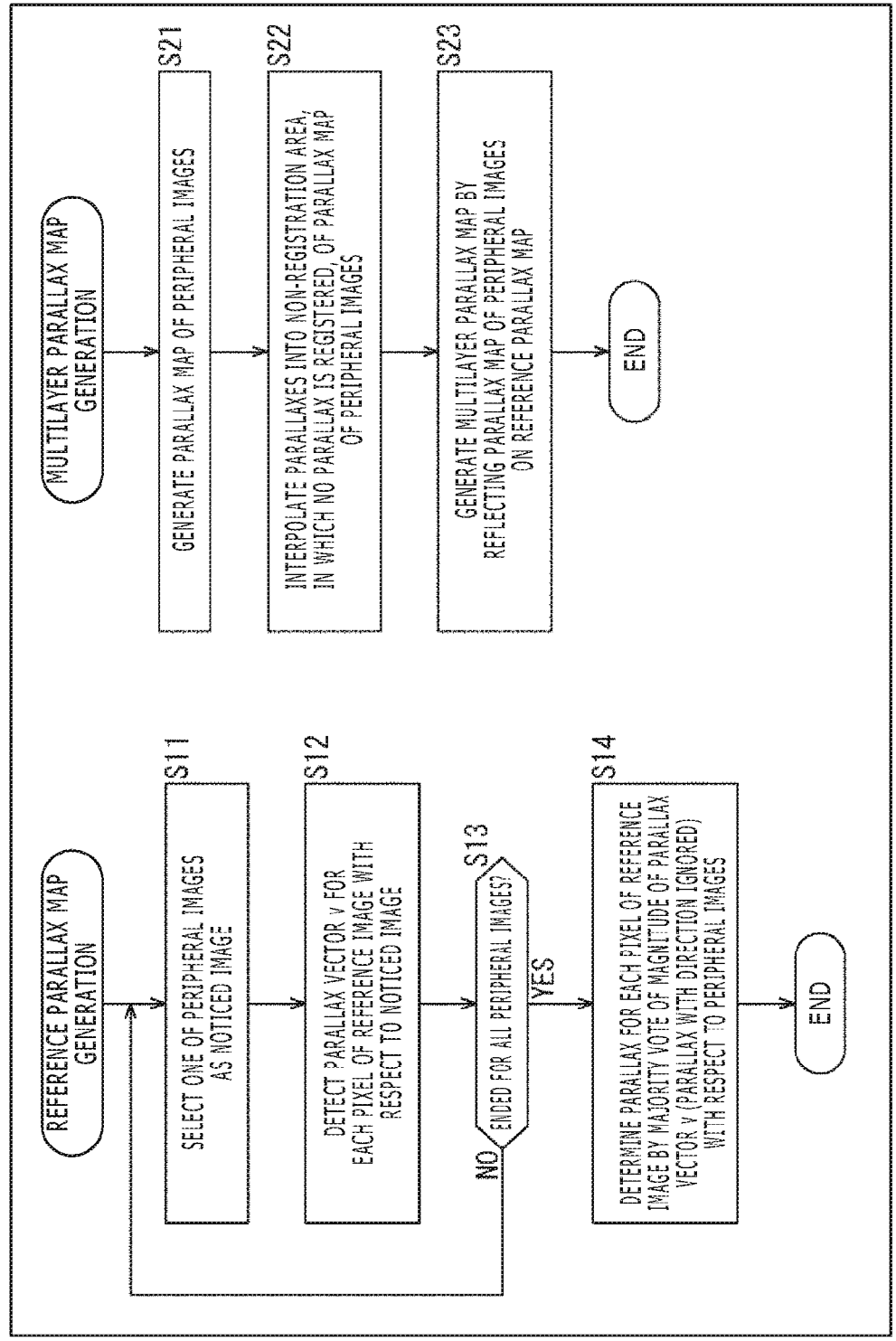
FIG. 10 is a flow chart illustrating an example of a process of generation of the reference parallax map and the multilayer parallax map by the parallax information generation section 31.

FIG. 10 is a flow chart illustrating an example of a process for generation of a reference parallax map and a multilayer parallax map by the parallax information generation section 31 of FIG. 5.

In the reference parallax map generation process for generating a reference parallax map, at step S11, the reference parallax map generation section 41 selects one of images, which have not been selected as a noticed image as yet, from among the peripheral images PL2 to PL7 from the image pickup apparatus 11 as a noticed image. Thereafter, the processing advances to step S12.

At step S12, the reference parallax map generation section 41 detects a parallax vector v (FIG. 6) between the noticed image and each pixel of the reference image PL1 from the image pickup apparatus 11. Thereafter, the processing advances to step S13.

At step S13, the reference parallax map generation section 41 decides whether or not all of the peripheral images PL2 to PL7 have been selected as a noticed image.

If it is decided at step S13 that all of the peripheral images PL2 to PL7 have not been selected as a noticed image as yet, then the processing returns to step S11, and thereafter, similar processes are repeated.

On the other hand, if it is decided at step S13 that all of the peripheral images PL2 to PL7 have been selected as a noticed image, then the processing advances to step S14.

At step S14, the reference parallax map generation section 41 performs majority vote on magnitude of the parallax vectors v2,1 to v7,1 of the peripheral images PL2 to PL7 in regard to each pixel of the reference image as described hereinabove with reference to FIG. 6 and determines the magnitude of the parallax vector v#i,1 that wins the majority vote as a parallax.

Then, the reference parallax map generation section 41 generates a reference parallax map in which the parallaxes are registered for each pixel of the reference image and supplies the reference parallax map to the multilayer parallax map generation section 42, thereby ending the reference parallax map generation process.

In the multilayer parallax map generation process for generating a multilayer parallax map, at step S21, the multilayer parallax map generation section 42 generates parallax maps of the peripheral images PL2 to PL7 using the reference parallax map from the reference parallax map generation section 41 as described hereinabove with reference to FIG. 7. Thereafter, the processing advances to step S22.

At step S22, the multilayer parallax map generation section 42 interpolates parallaxes into non-registration areas of the parallax maps of the peripheral images PL#i as described hereinabove with reference to FIG. 8 to complete the parallax maps of the peripheral images PL#i. Thereafter, the processing advances to step S23.

At step S23, the multilayer parallax map generation section 42 reflects the parallax maps of the peripheral images PL2 to PL7 on the reference parallax map to generate a multilayer parallax map as described hereinabove with reference to FIG. 9, thereby ending the multilayer parallax map generation process.

<Restoration of Saturated Pixel>

Figure 11A:
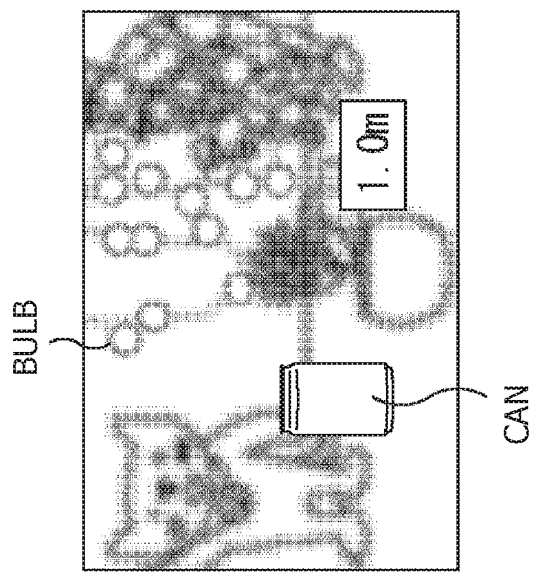
FIGS. 11A and 11B are views depicting an example of an actual image obtained by picking up an image of a predetermined image pickup object using an actual optical lens.
Figure 11B:
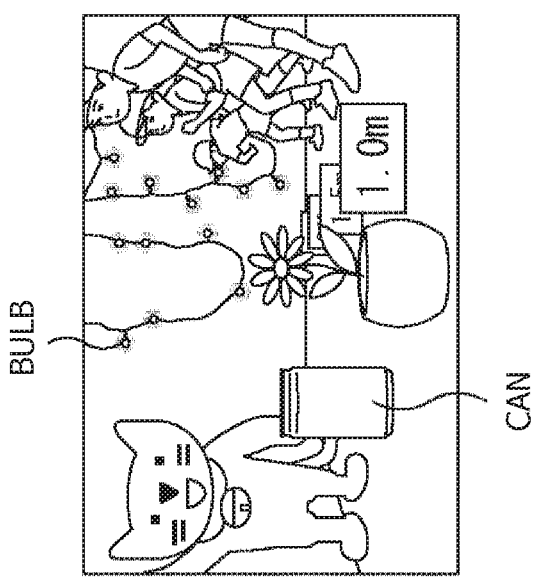

FIGS. 11A and 11B are views schematically depicting an example of an actual image obtained by image pickup of a predetermined image pickup object using an actual optical lens.

FIG. 11A depicts an example of an actual image when the focus is set to pan focus.

In the actual image of FIG. 11A, a bulb positioned at the back side is reflected comparatively clearly without a blur.

FIG. 11B depicts an example of an actual image when the focus is set to a comparatively near position, for example, to a distance of 1 m (from the principal point of the optical lens).

In the actual image of FIG. 11B, although the image pickup object (in FIGS. 11A and 11B, a can) at the distance of 1 m is reflected clearly without a blur, other image pickup objects at different distances are reflected blurred. Further, while, in the actual image of FIG. 11B, a bulb positioned at the back side is blurred, since it is high in luminance, it is reflected comparatively clearly.

Figure 12B:
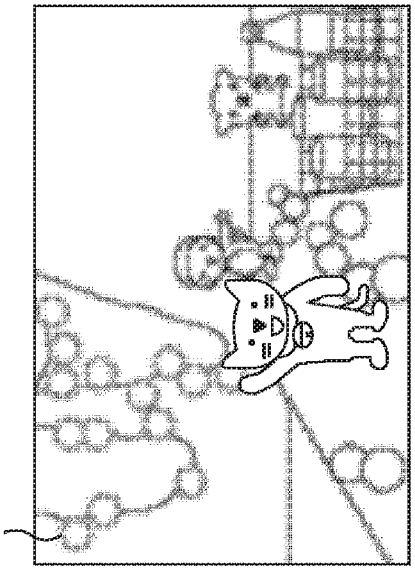
FIGS. 12A and 12B are views depicting an example of an emulation image obtained by the image processing apparatus 12.
Figure 12A:
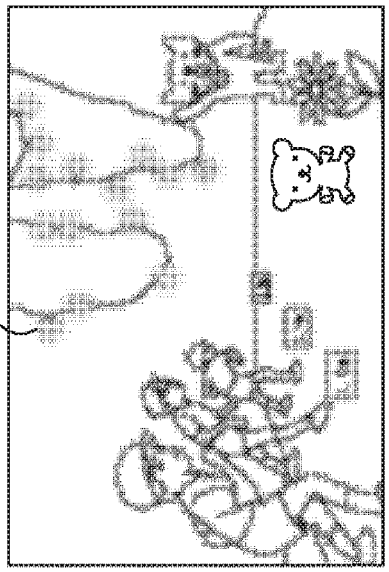

FIGS. 12A and 12B are views depicting an example of an emulation image obtained by the image processing apparatus 12 of FIG. 3.

FIG. 12A depicts an example of an emulation image obtained when the image processing apparatus 12 does not perform a saturated pixel restoration process.

In the emulation image of FIG. 12A, the focus is set to a position at the near side similarly as in the case of FIG. 11B, and therefore, the bulb positioned at the back side is blurred.

However, although, in the emulation image of FIG. 12A, the bulb positioned at the back side is blurred, different from the case of FIG. 11B, the bulb is not very clear.

FIG. 12B depicts an example of an emulation image obtained when the image processing apparatus 12 performs a saturated pixel restoration process.

In the emulation image of FIG. 12B, the focus is set to a position at the near side similarly as in the case of FIG. 11B, and therefore, the bulb positioned at the back side is blurred.

Furthermore, in the emulation image of FIG. 12B, the bulb positioned at the back side is blurred clearly similarly as in the case of FIG. 11B.

Accordingly, according to the saturated pixel restoration process, a blur degree of an actual optical lens can be reproduced accurately by an emulation process performed later.

In particular, according to the saturated pixel restoration process, a clear blur similar to that of an actual image picked up using an actual optical lens can be reproduced.

FIGS. 13A, 13B and 13C are views illustrating a principle by which a clear blur is not reproduced when the saturated pixel restoration process is not performed.

FIG. 13A depicts an example of light intensity of an image pickup object.

In FIG. 13A, the axis of abscissa indicates a position in the horizontal direction (horizontal coordinate) of an image sensor not depicted from which the camera unit $21i$ is configured, and the axis of ordinate indicates the light intensity of light from an image pickup object irradiated on the image sensor.

In FIG. 13A, light of a very high light intensity S0 irradiates (the image sensor of) the camera unit $21i$.

FIG. 13B depicts an example of the luminance of a picked up image outputted from the camera unit $21i$ when light of the light intensity S0 is received.

In FIG. 13B, the axis of abscissa represents the position of a pixel in the horizontal direction of a picked up image outputted from the camera unit $21i$, which receives light of the light intensity S0, and the axis of ordinate represents the luminance of a pixel of the picked up image.

The luminance corresponding to light of the light intensity $S_0$ exceeds an image pickup limit luminance THL that is a maximum value that can be outputted as a pixel value from the camera unit $21_i$, and therefore, in the picked up image, the luminance of an image pickup object from which light of the light intensity $S_0$ is emitted is cut (clamped) to the image pickup limit luminance THL.

Here, the light intensity corresponding to the image pickup limit luminance THL is represented as $S_1$ ($<S_0$).

FIG. 13C depicts an example of an emulation image generated by a lens emulation process in which a picked up image whose luminance corresponding to light of the light intensity S0 is cut to the image pickup limit luminance THL corresponding to the light intensity S1 is used.

In FIG. 13C, the axis of abscissa indicates the position of a pixel in the horizontal direction of an emulation image, and the axis of ordinate indicates the luminance of the pixel of the emulation image.

When, in generation of an emulation image, an image pickup object reflected on pixels having a pixel value equal to the image pickup limit luminance THL corresponding to the light intensity $S_1$ is blurred, the light intensity $S_1$ is spread around the pixels on which the image pickup object is reflected, and the luminance of the image pickup object further drops from the image pickup limit luminance THL.

As described above, an image pickup object that emits light of the light intensity $S_0$ higher than the light intensity $S_1$ corresponding to the image pickup limit luminance THL (for example, a bulb or the like) is reflected as an image pickup object that emits light of the light intensity $S_1$ corresponding to the image pickup limit luminance THL in a picked up image.

Then, if, in generation of an emulation image in which a picked up image in which an image pickup object that emits light of the light intensity $S_1$ corresponding to the image pickup limit luminance THL is reflected is used, the image pickup object is blurred, then the light intensity $S_1$ lower than the original light intensity $S_0$ is spread and clearness does not appear on the image pickup object.

FIGS. 14A, 14B and 14C are views illustrating a principle by which a clear blur is reproduced by performing the saturated pixel restoration process.

FIG. 14A depicts an example of the luminance of a picked up image outputted when light of the light intensity S0 is received by the camera unit $21i$.

The luminance of the picked up image of FIG. 14A is similar to that of FIG. 13B, and the luminance of an image pickup object that emits light of the light intensity S0 is cut to the image pickup limit luminance THL corresponding to the light intensity S1 that is lower than the light intensity S0.

FIG. 14B depicts an example of the luminance of a picked up image after the saturated pixel restoration process.

In the saturated pixel restoration process, as a pixel value of an image pickup object having a pixel value cut to the image pickup limit luminance THL in a picked up image, a luminance obtained by adding a luminance corresponding to a light intensity $S_2$ that satisfies an expression $S_1+S_2 \approx S_0$ to the image pickup limit luminance THL is restored.

As a result, in the picked up image after the saturated pixel restoration process, a pixel whose pixel value is cut to the image pickup limit luminance THL has a luminance substantially corresponding to the original light intensity $S_0 \approx S_1+S_2$ as a pixel value.

FIG. 14C depicts an example of an emulation image generated using a picked up image after the saturated pixel restoration process.

In FIG. 14C, the axis of abscissa represents a position of a pixel in the horizontal direction of an emulation image, and the axis of ordinate represents the luminance of the pixel of the emulation image.

When, in generation of an emulation image, an image pickup object reflected on a pixel having a luminance corresponding to the light intensity $S_1+S_2$ as a pixel value is blurred, although the light intensity $S_1+S_2$ is spread around the pixel on which the image pickup object is reflected, since the light intensity $S_1+S_2$ is very high, even if the light intensity $S_1+S_2$ is spread, the luminance of the image pickup object is higher than that when the saturated pixel restoration process is not performed.

As described above, according to the saturated pixel restoration process, the luminance of an image pickup object (for example, a bulb or the like) that emits light of the high light intensity $S_0$ and whose pixel value is cut to the image pickup limit luminance THL is restored to a luminance corresponding to the (substantially) original high light intensity $S_0$.

Then, when, in generation (lens emulation process) of an emulation image in which a picked up image in which an image pickup object of a luminance corresponding to such a high light intensity $S_0$ as described above is reflected is used, the image pickup object is blurred, a clear blur appears on the image pickup object.

Accordingly, a clear blur similar to that in an actual image picked up using an actual optical lens can be reproduced.

Here, the saturated pixel restoration section 33 performs a saturated pixel restoration process by which a pixel value of a saturated pixel whose pixel value is saturated from among pixels of the standard luminance picked up image PL#i supplied from the camera unit $21_i$ is restored using the low luminance picked up image PH#i supplied from the camera unit $21_i$ as described hereinabove with reference to FIG. 3.

That the pixel value of a pixel of the standard luminance picked up image PL#i is saturated signifies that the pixel value of the pixel of the standard luminance picked up image PL#i is cut to the image pickup limit luminance THL or the pixel value of the pixel of the standard luminance picked up image PL#i is proximate to the image pickup limit luminance THL as described hereinabove with reference to FIGS. 13A, 13B, 13C, 14A, 14B and 14C.

Further, in the saturated pixel restoration process, a standard luminance picked up image PL#i and a low luminance picked up image PH#i in both of which the same image pickup object is reflected are required. As a method for acquiring the standard luminance picked up image PL#i and the low luminance picked up image PH#i in both of which the same image pickup object is reflected, an arbitrary method can be adopted.

In the following, as the method for acquiring a standard luminance picked up image PL#i and a low luminance picked up image PH#i in both of which the same image pickup object is reflected, a first acquisition method, a second acquisition method and a third acquisition method are described.

It is to be noted that a picked up image that is a target of the saturated pixel restoration process is an image of RAW data or preferably is a demosaic image before gamma correction in order to keep the linearity of the luminance.

Figure 15:
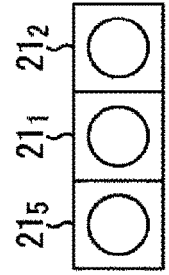
FIG. 15 is a view illustrating a first acquisition method for acquiring a standard luminance picked up image PL#i and a low luminance picked up image PH#i.

FIG. 15 is a view illustrating the first acquisition method for acquiring a standard luminance picked up image PL#i and a low luminance picked up image PH#i.

In the first acquisition method, a plural number of times such as two times of image pickup are performed in a short period of time while the exposure time period (shutter speed) is changed for all of the camera units $21_1$ to $21_7$ configuring the image pickup apparatus 11.

In particular, in the first acquisition method, image pickup in a standard exposure time period (exposure time period estimated to be appropriate upon image pickup, for example, set by an automatic exposure function or the like) and image pickup in an exposure time period shorter than the standard exposure time period are successively performed by all of the camera units $21_1$ to $21_7$ that configure the image pickup apparatus 11.

Each picked up image picked up in the standard exposure time period is a standard luminance picked up image PL#i, and each picked up image picked up in the exposure time period shorter than the standard exposure time period is a low luminance picked up image PH#i.

Accordingly, the standard luminance picked up image PL#i and the low luminance picked up image PH#i obtained by the first acquisition method are images picked up at timings different from each other.

Now, if the standard exposure time period is represented as X (seconds), then as the exposure time period of the low luminance picked up image PH#i shorter than the standard exposure time period X, for example, X/16 (second) or the like can be adopted.

FIG. 15 depicts an example of the standard luminance picked up images PL1, PL2 and PL5 and the low luminance picked up images PH1, PH2 and PH5 picked up by the camera units $21_1$, $21_2$ and $21_5$, respectively.

Since the exposure time period of the low luminance picked up image PH#i is shorter than the standard exposure time period of the standard luminance picked up image PL#i, an image pickup object in the low luminance picked up image PH#i is reflected darker than that in the standard luminance picked up image PL#i.

Figure 16:
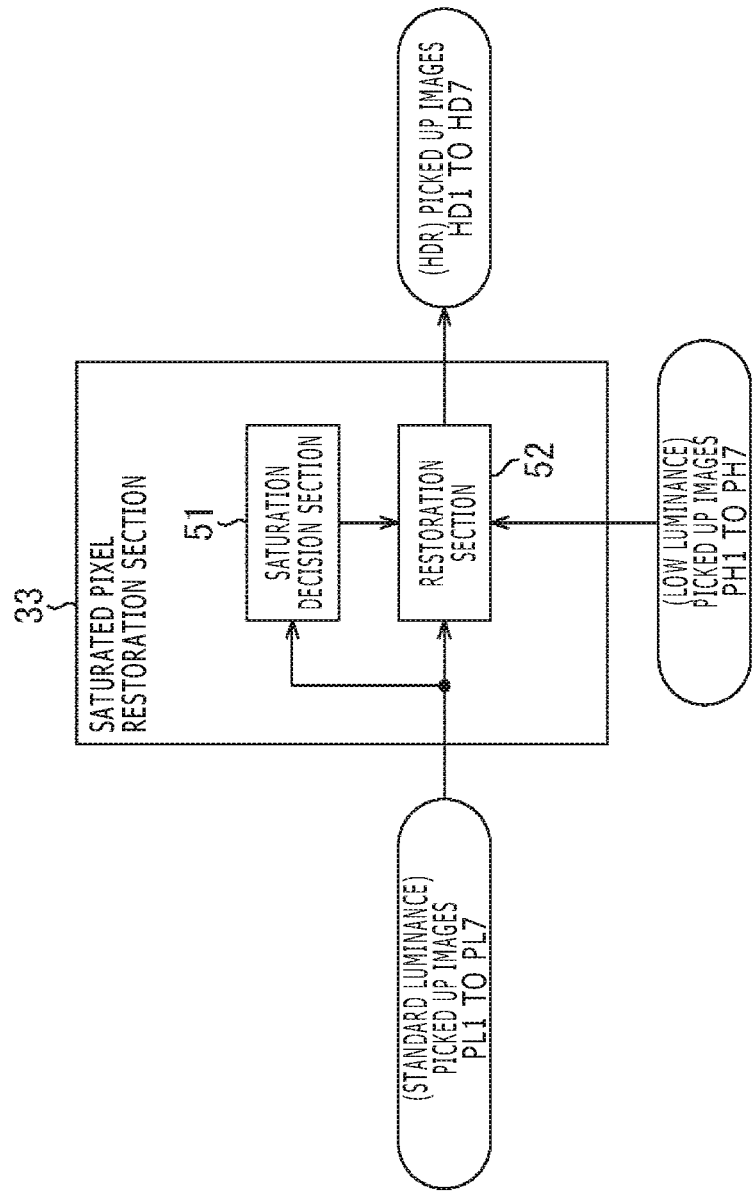
FIG. 16 is a block diagram depicting a first example of a configuration of a saturated pixel restoration section 33.

FIG. 16 is a block diagram depicting a first configuration example of the saturated pixel restoration section 33 of FIG. 3.

In particular, FIG. 16 depicts an example of a configuration of the saturated pixel restoration section 33 where the standard luminance picked up image PL#i and the low luminance picked up image PH#i are acquired by the first acquisition method.

Referring to FIG. 16, the saturated pixel restoration section 33 includes a saturation decision section 51 and a restoration section 52.

To the saturation decision section 51, standard luminance picked up images PL#i are supplied from the image pickup apparatus 11 (FIG. 1).

The saturation decision section 51 performs a saturation decision for deciding whether or not each of the pixels of the standard luminance picked up image PL#i from the image pickup apparatus 11 is a saturated pixel and supplies a decision result of the saturation decision to the restoration section 52.

To the restoration section 52, in addition to a decision result of the saturation decision from the saturation decision section 51, standard luminance picked up images PL#i and low luminance picked up images PH#i are supplied from the image pickup apparatus 11.

The restoration section 52 specifies saturated pixels from among the pixels of the standard luminance picked up images PL#i from the image pickup apparatus 11 in response to the decision results (saturation decision results) of the saturation decision from the saturation decision section 51.

Further, the restoration section 52 restores the pixel value of each saturated pixel using the low luminance picked up images PH#i from the image pickup apparatus 11 as occasion demands and supplies HDR picked up images HD#i of a higher dynamic range than that of the standard luminance picked up images PL#i to the incident ray reproduction section 36 (FIG. 3), the HDR picked up images HD#i being obtained by the restoration.

Figure 17:
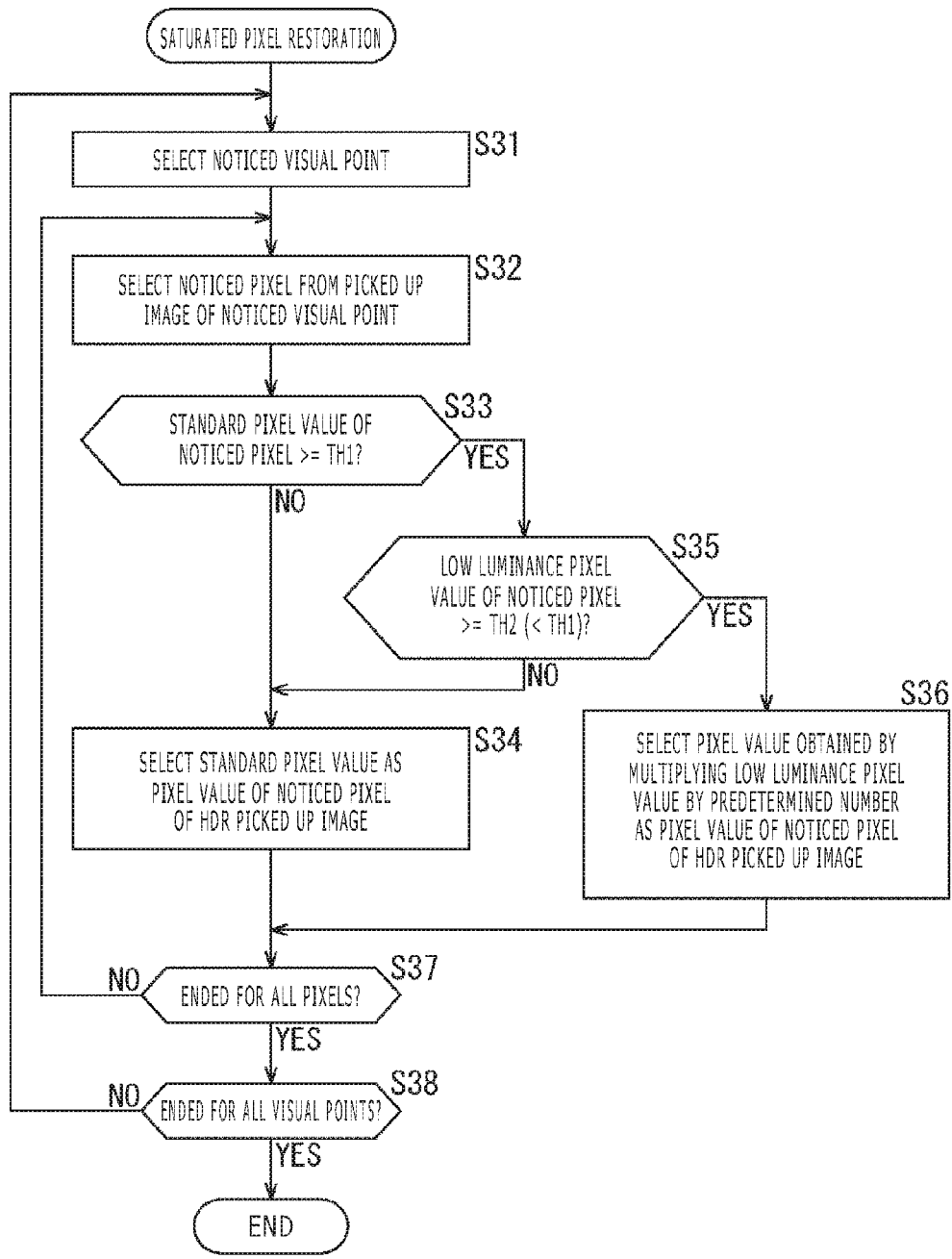
FIG. 17 is a flow chart illustrating an example of the saturated pixel restoration process performed by the saturated pixel restoration section 33.

FIG. 17 is a flow chart illustrating an example of the saturated pixel restoration process performed by the saturated pixel restoration section 33 of FIG. 16.

At step S31, the saturation decision section 51 selects, from among the visual points (positions) of the seven camera units $21_1$ to $21_7$, one visual point that has not been selected as a noticed visual point as yet as a noticed visual point. Thereafter, the processing advances to step S32.

At step S32, the saturation decision section 51 selects, from among the pixels of the standard luminance picked up image PL#i of the noticed visual point from among the standard luminance picked up images PL1 to PL7 of the seven visual points supplied from the image pickup apparatus 11, one pixel that has not been selected as a noticed pixel as yet as a noticed pixel. Thereafter, the processing advances to step S33.

At step S33, the saturation decision section 51 performs a saturation decision of whether or not the standard pixel value that is a pixel value of the noticed pixel of the standard luminance picked up image PL#i of the noticed visual point is equal to or higher than a predetermined threshold value TH1.

If it is decided at step S33 that the standard pixel value of the noticed pixel of the standard luminance picked up image PL#i of the noticed visual point is not equal to or higher than the threshold value TH1, namely, if the standard pixel value of the noticed pixel of the standard luminance picked up image PL#i of the noticed visual point is not in a saturated state, then the saturation decision section 51 supplies a saturation decision result that the standard pixel value is not in a saturated state to the restoration section 52. Then, the processing advances to step S34.

At step S34, the restoration section 52 selects, in response to the saturation decision result that the standard pixel value is not in a saturated state from the saturation decision section 51, the standard pixel value of the noticed pixel of the standard luminance picked up image PL#i of the noticed visual point from the image pickup apparatus 11 as a pixel value of a pixel at the position of the noticed pixel in the HDR picked up image HD#i of the noticed visual point (also the pixel at the position of the noticed pixel is hereinafter referred to as noticed pixel). Thereafter, the processing advances to step S37.

On the other hand, if it is decided at step S33 that the standard pixel value of the noticed pixel of the standard luminance picked up image PL#i of the noticed visual point is equal to or higher than the threshold value TH1, namely, if the standard pixel value of the noticed pixel of the standard luminance picked up image PL#i of the noticed visual point is in a saturated state or the possibility of such saturation is high, then the saturation decision section 51 supplies the saturation decision result that the standard pixel value is in a saturated state to the restoration section 52. Then, the processing advances to step S35.

At step S35, the restoration section 52 decides, in response to the saturation decision result that the standard pixel value is in a saturated state from the saturation decision section 51, whether or not the low luminance pixel value that is a pixel value of a pixel at the position of the noticed pixel of the low luminance picked up image PH#i of the noticed visual point from the image pickup apparatus 11 (also the pixel at the position of the noticed pixel is referred to as noticed pixel) is equal to or higher than a predetermined threshold value TH2 that is lower than the threshold value TH1.

If it is decided at step S35 that the low luminance pixel value of the noticed pixel of the low luminance picked up image PH#i of the noticed visual point is not equal to or higher than the threshold value TH2, namely, if the low luminance pixel value of the noticed pixel of the low luminance picked up image PH#i of the noticed visual point is low and the possibility that the low luminance pixel value may be noise is high, then the processing advances to step S34.

At step S34, the restoration section 52 selects the standard pixel value of the noticed pixel of the standard luminance picked up image PL#i of the noticed visual point as a pixel value of the noticed pixel of the HDR picked up image HD#i of the noticed visual point as described above. Then, the processing advances to step S37.

On the other hand, if it is decided at step S35 that the low luminance pixel vale of the noticed pixel of the low luminance picked up image PH#i of the noticed visual point is equal to or higher than the threshold value TH2, namely, if the low luminance pixel value of the noticed pixel of the low luminance picked up image PH#i of the noticed visual point is a value of a certain level with which it can be regarded not as noise, the processing advances to step S36.

At step S36, the restoration section 52 multiplies the low luminance pixel value of the noticed pixel of the low luminance picked up image PH#i of the noticed visual point by a predetermined number and determines a resulting pixel value as a restored pixel value restored from the saturated pixel. Further, the restoration section 52 selects the restored pixel value as a pixel value of the noticed pixel of the HDR picked up image HD#i of the noticed visual point. Then, the processing advances from step S36 to step S37.

Here, as the predetermined number for multiplication (hereinafter referred to as restoration gain) that is used when a restored pixel value is to be determined, the value of the ratio between the exposure time period of the standard luminance picked up image PL#i (standard exposure time period) and the exposure time period of the low luminance picked up image PH#i is adopted.

Accordingly, for example, as described hereinabove with reference to FIG. 15, where the standard exposure time period is X (seconds) and the exposure time period of the low luminance picked up image PH#i is X/16 (seconds), the restoration gain is 16=X/(X/16) times.

At step S37, the saturation decision section 51 decides whether or not all of the pixels of the standard luminance picked up image PL#i of the noticed visual point have been selected as a noticed pixel.

If it is decided at step S37 that all of the pixels of the standard luminance picked up image PL#i of the noticed visual point have not been selected as a noticed pixel, then the processing returns to step S32 and then similar processes are repeated.

On the other hand, if it is decided at step S37 that all of the pixels of the standard luminance picked up image PL#i of the noticed visual point have been selected as a noticed pixel, then the processing advances to step S38.

At step S38, the saturation decision section 51 decides whether or not all of the seven visual points have been selected as a noticed visual point.

If it is decided at step S38 that all of the seven visual points have not been selected as a noticed visual point, then the processing returns to step S31, and thereafter, similar processes are repeated.

On the other hand, if it is decided at step S38 that all of the seven visual points have been selected as a noticed visual point, then the restoration section 52 supplies the HDR picked up images HD1 to HD7 of the seven visual points obtained by the processes described above to the incident ray reproduction section 36 (FIG. 3), thereby ending the saturated pixel restoration process.

It is to be noted that, as the low luminance picked up image PH#i, a first low luminance picked up image whose exposure time period is shorter than the standard exposure time period and a second low luminance picked up image whose exposure time period is shorter than that of the first low luminance picked up image can be adopted.

In the first acquisition method, the image pickup apparatus 11 can acquire a standard luminance picked up image PL#i, a first low luminance picked up image and a second low luminance picked up image by successively performing image pickup by three times changing the exposure time period.

The second low luminance picked up image can be used to restore, where a pixel value of a standard luminance picked up image is in a saturated state and also a pixel value of a first low luminance picked up image is in a saturated state, the saturated pixel whose pixel value is in a saturated state.

Figure 18:
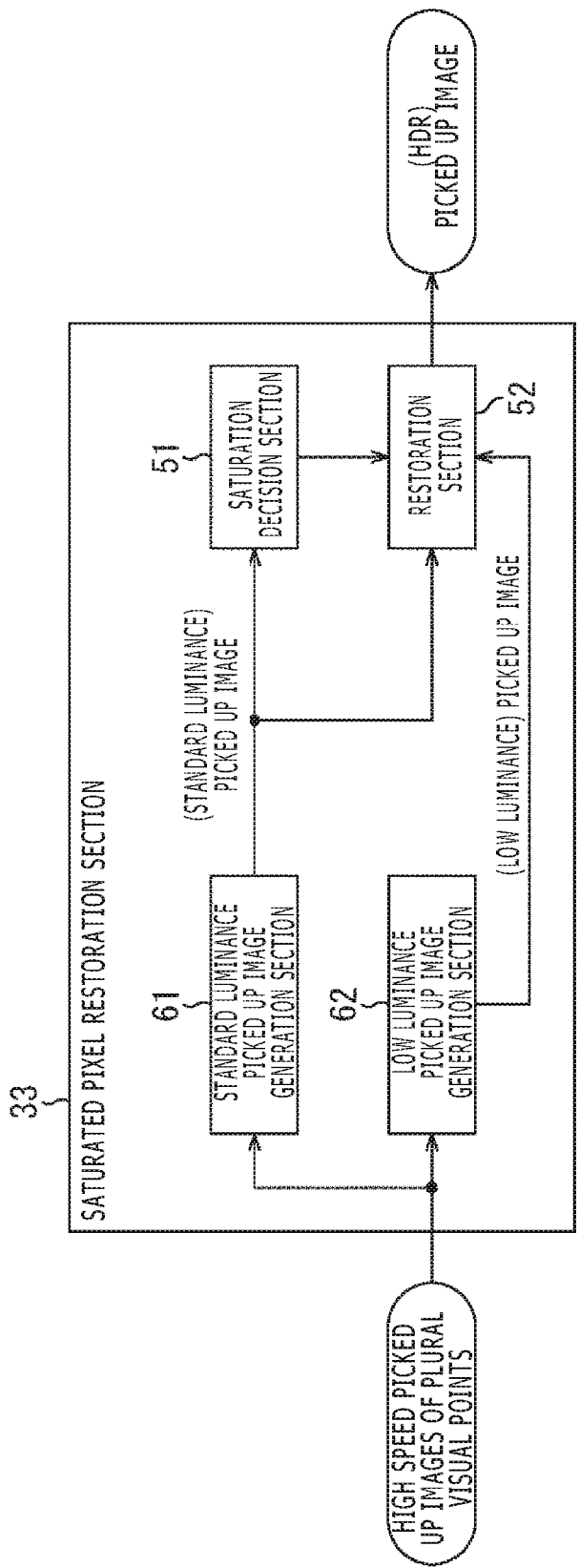
FIG. 18 is a block diagram depicting a second example of a configuration of the saturated pixel restoration section 33.

FIG. 18 is a block diagram depicting a second configuration example of the saturated pixel restoration section 33.

In particular, FIG. 18 depicts a configuration example of the saturated pixel restoration section 33 where a standard luminance picked up image PL#i and a low luminance picked up image PH#i in both of which the same image pickup object is reflected are acquired by the second acquisition method.

It is to be noted that, in FIG. 18, like elements to those of FIG. 16 are denoted by like reference numerals, and in the following description, description of them is suitably omitted.

In the second acquisition method, all of the camera units $21_1$ to $21_7$ configuring the image pickup apparatus 11 perform high speed image pickup by which a plurality of times of image pickup are performed in a short period of time with a fixed exposure time period shorter than a standard exposure time period.

Further, in the second acquisition method, from among a plurality of high speed picked up images obtained by high speed image pickup of the camera unit $21_i$, different numbers of high speed picked up images are added to generate (acquire) a standard luminance picked up image PL#i and a low luminance picked up image PH#i.

For example, where the exposure time period of high speed image pickup is 1/4000 second, if the exposure time period (standard exposure time period) of the standard luminance picked up image PL#i is set to 1/60 second and the exposure time period of the low luminance picked up image PH#i is set to 1/1000 second, then the standard luminance picked up image PL#i and the low luminance picked up image PH#i can be generated in the following manner.

In particular, the standard luminance picked up image PL#i can be generated by adding 66 or 67 high speed picked up images. Meanwhile, the low luminance picked up image PH#i can be generated by adding four high speed picked up images.

In FIG. 18, assuming that high speed picked up images are supplied from the image pickup apparatus 11, the saturated pixel restoration section 33 acquires (generates), from the high speed picked up image, a standard luminance picked up image PL#i and a low luminance picked up image PH#i by the second acquisition method. Then, the saturated pixel restoration section 33 performs a saturated pixel restoration process using the standard luminance picked up image PL#i and the low luminance picked up image PH#i.

In particular, referring to FIG. 18, the saturated pixel restoration section 33 includes a saturation decision section 51, a restoration section 52, a standard luminance picked up image generation section 61 and a low luminance picked up image generation section 62.

Accordingly, the saturated pixel restoration section 33 of FIG. 18 is common to that in the case of FIG. 16 in that it includes the saturation decision section 51 and the restoration section 52.

However, the saturated pixel restoration section 33 of FIG. 18 is different from that in the case of FIG. 16 in that it includes the standard luminance picked up image generation section 61 and the low luminance picked up image generation section 62.

To the standard luminance picked up image generation section 61 and the low luminance picked up image generation section 62, high speed picked up images of the seven visual points obtained by high speed image pickup are supplied from the image pickup apparatus 11.

The standard luminance picked up image generation section 61 adds, for each of the seven visual points, a predetermined number of high speed picked up images from the image pickup apparatus 11 to generate a standard luminance picked up image PL#i and supplies the standard luminance picked up image PL#i to the saturation decision section 51 and the restoration section 52.

The low luminance picked up image generation section 62 adds, for each of the seven visual points, the number of high speed picked up images from the image pickup apparatus 11 smaller than the number of those by the standard luminance picked up image generation section 61 to generate a low luminance picked up image PH#i and supplies the low luminance picked up image PH#i to the saturation decision section 51 and the restoration section 52.

Figure 19:
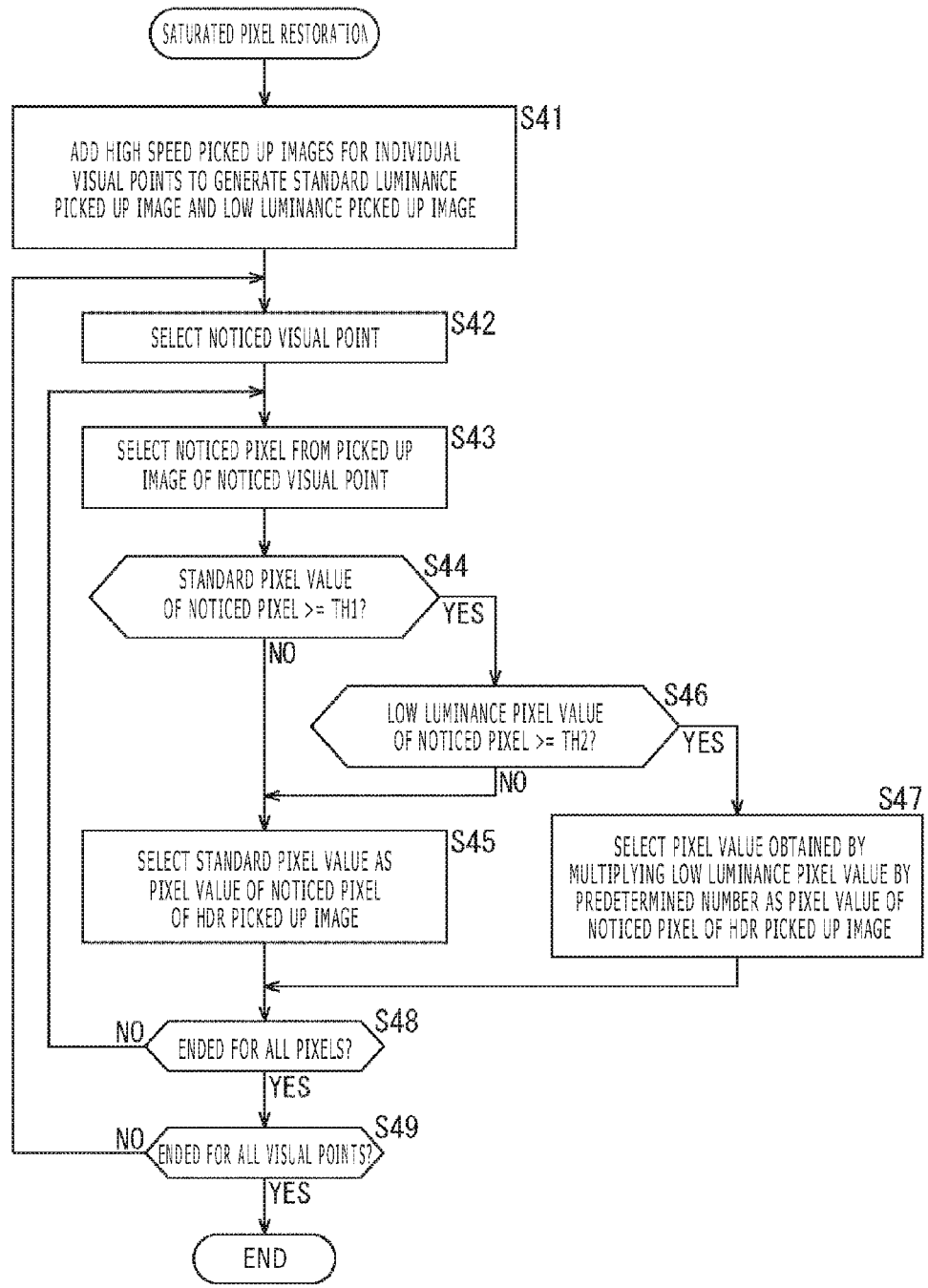
FIG. 19 is a flow chart illustrating an example of the saturated pixel restoration process performed by the saturated pixel restoration section 33.

FIG. 19 is a flow chart illustrating an example of a saturated pixel restoration process performed by the saturated pixel restoration section 33 of FIG. 18.

At step S41, the standard luminance picked up image generation section 61 adds, for each of the seven visual points, high speed picked up images from the image pickup apparatus 11 to generate a standard luminance picked up image PL#i and supplies the standard luminance picked up image PL#i to the saturation decision section 51 and the restoration section 52.

Further, at step S41, the low luminance picked up image generation section 62 adds, for each of the seven visual points, high speed picked up images from the image pickup apparatus 11 to generate a low luminance picked up image PH#i and supplies the low luminance picked up image PH#i to the saturation decision section 51 and the restoration section 52.

Then, the processing advances from step S41 to step S42, and thereafter, processes similar to those at steps S31 to S38 in FIG. 17 are performed at steps S42 to S49, respectively.

Figure 20:
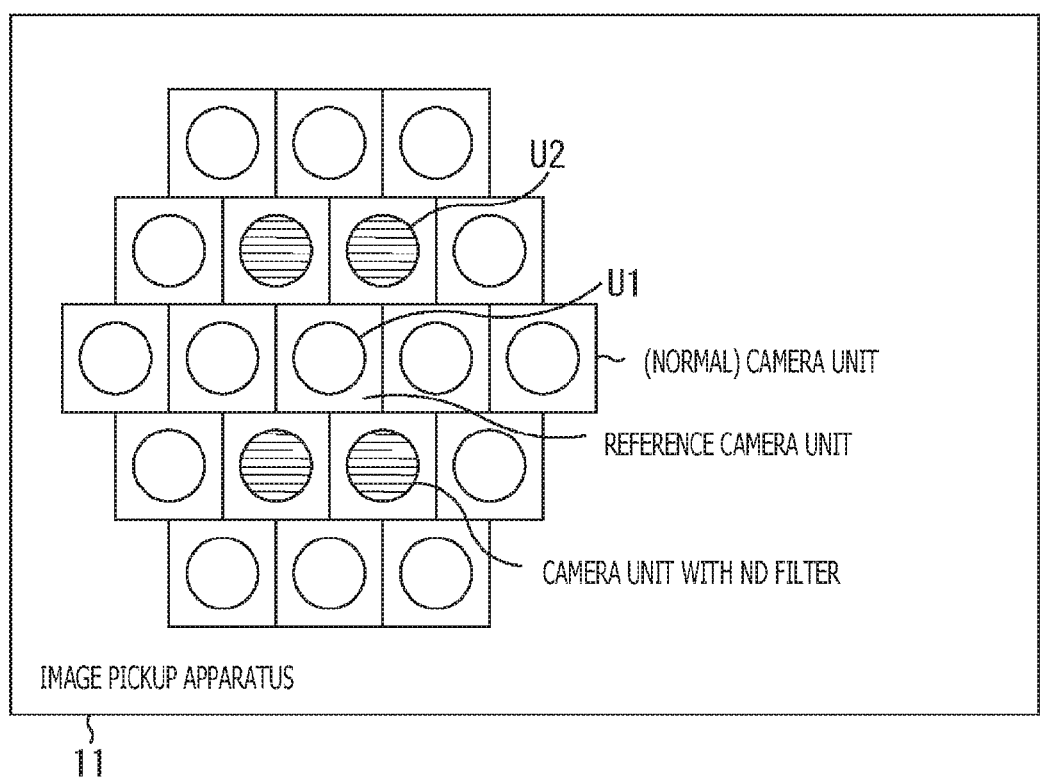
FIG. 20 is a plan view depicting another example of a configuration of the image pickup apparatus 11.

FIG. 20 is a plan view depicting another configuration example of the image pickup apparatus 11.

In particular, FIG. 20 depicts an example of a configuration of the image pickup apparatus 11 where a standard luminance picked up image PL#i and a low luminance picked up image PH#i in both of which the same image pickup object is reflected are acquired by the third acquisition method.

In FIG. 20, the image pickup apparatus 11 is configured from 19 camera units.

In particular, in FIG. 20, one camera unit is set as a reference camera unit, and five camera units are disposed in a horizontal direction centering around the reference camera unit.

Further, above and below the five camera units centered at the reference camera unit, individually four camera units juxtaposed in the horizontal direction are disposed.

Further, above the four camera units at the upper side of the five camera units centered at the reference camera unit, three camera units juxtaposed in the horizontal direction are disposed.

Furthermore, under the four camera units at the lower side of the five camera units centered at the reference camera unit, three camera units juxtaposed in the horizontal direction are disposed.

Further, in FIG. 20, from among the 19 camera units configuring the image pickup apparatus 11, four camera units neighboring at the left upper side, left lower side, right upper side and right lower side of the reference camera unit are camera units with an ND (Neutral Density) filter on each of which an ND filter is mounted.

Here, in the following description, each camera unit on which no ND filter is mounted is referred to as ordinary camera unit.

Referring to FIG. 20, reference symbol U1 denotes an ordinary camera unit, and U2 denotes a camera unit with an ND filter.

While, according to the first and second acquisition methods, image pickup is performed by a plural number of times to acquire a standard luminance picked up image PL#i and a low luminance picked up image PH#i that reflect the same image pickup object but are different from each other in exposure time period, according to the third acquisition method, a standard luminance picked up image PL#i and a low luminance picked up image PH#i are acquired by a single time of image pickup (one-shot image pickup).

In particular, in the third acquisition method, the 15=19−4 ordinary camera units U1 of the image pickup apparatus 11 and the four camera units U2 with an ND filter perform image pickup, for example, for the standard exposure time period.

By the ordinary camera units U1 performing image pickup for the standard exposure time period, a standard luminance picked up image for the standard exposure time period can be acquired.

On the other hand, it is assumed now that the luminance of light observed through an ND filter by the four camera units U2 with an ND filter is, for example, $1/16$, $1/256$, $1/4096$ and $1/65536$ that when no ND filter is interposed. In other words, the sensitivity of the four camera units U2 with an ND filter is $1/16$, $1/256$, $1/4096$ and $1/65536$ that of the ordinary camera units U1.

In this case, when image pickup for the standard exposure time period is performed by the four camera units U2 with an ND filter, a first low luminance picked up image, a second low luminance picked up image, a third low luminance picked up image and a fourth low luminance picked up image of exposure time periods that are equivalently $1/16$, $1/256$, $1/4096$ and $1/65536$ the standard exposure time period, respectively, can be acquired.

Accordingly, the standard luminance picked up image and the first to fourth low luminance picked up images obtained by the third acquisition method are images of different visual points picked up at the same timing but with different sensitivities from each other.

Figure 21:
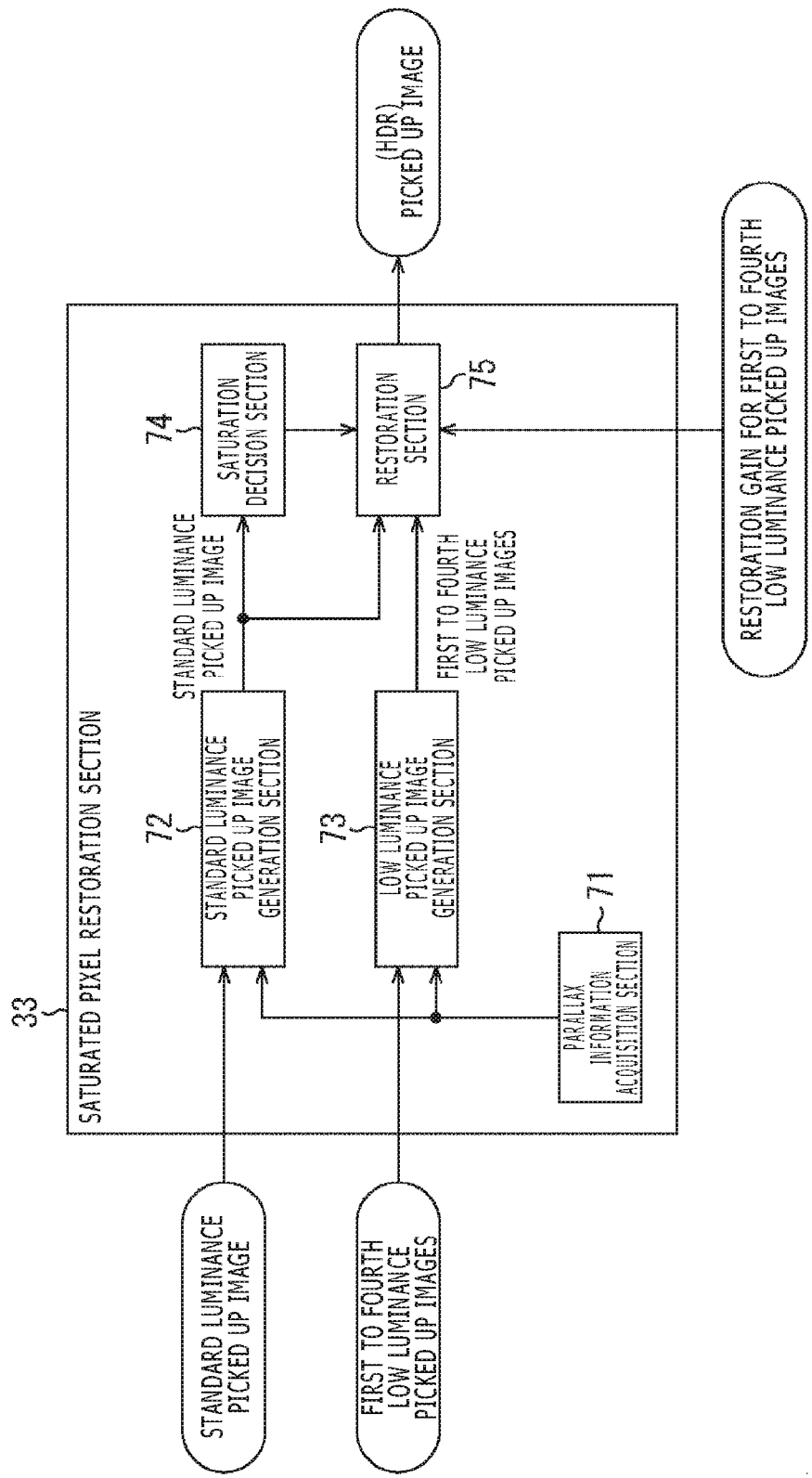
FIG. 21 is a block diagram depicting a third example of a configuration of the saturated pixel restoration section 33.

FIG. 21 is a block diagram depicting a third configuration example of the saturated pixel restoration section 33.

In particular, FIG. 21 depicts an example of a configuration of the saturated pixel restoration section 33 where a standard luminance picked up image and a low luminance picked up image in both of which the same image pickup object is reflected are acquired by the third acquisition method.

Referring to FIG. 21, the saturated pixel restoration section 33 includes a parallax information acquisition section 71, a standard luminance picked up image generation section 72, a low luminance picked up image generation section 73, a saturation decision section 74 and a restoration section 75.

The parallax information acquisition section 71 acquires parallax maps of individual picked up images (standard luminance picked up image and first to fourth low luminance picked up images) picked up by the (19) camera units of the 19 visual points configuring the image pickup apparatus 11 (FIG. 20) and supplies the parallax maps to the standard luminance picked up image generation section 72 and the low luminance picked up image generation section 73.

The parallax information acquisition section 71 can generate the parallax maps of the individual picked up images picked up by the camera units of the 19 visual points using the picked up images picked up by the camera units of the 19 visual points in a similar manner as in the case of the parallax information generation section 31 (FIG. 3). Alternatively, the parallax information acquisition section 71 can acquire parallax maps of the picked up images picked up by the camera units of the 19 visual points from the parallax information generation section 31.

To the standard luminance picked up image generation section 72, the parallax maps are supplied from the parallax information acquisition section 71, and also standard luminance picked up images picked up by the ordinary camera units U1 of the 15 visual points are supplied from the image pickup apparatus 11.

The standard luminance picked up image generation section 72 generates standard luminance picked up images of the four visual points of the four camera units U2 with an ND filter (each hereinafter referred to also as ND camera visual point) using standard luminance picked up images of the 15 visual points of the 15 ordinary camera units U1 from the image pickup apparatus 11 (each hereinafter referred to also as ordinary camera visual point) and the parallax maps from the parallax information acquisition section 71 and supplies the generated standard luminance picked up images to the saturation decision section 74 and the restoration section 75 together with the standard luminance picked up images of the 15 ordinary camera visual points from the image pickup apparatus 11.

In particular, the standard luminance picked up image generation section 72 successively selects the pixels of the (first to fourth) low luminance picked up images of the ND camera visual point as a noticed pixel and refers to the parallax map from the parallax information acquisition section 71 to detect a corresponding pixel of the standard luminance picked up image of the ordinary camera visual point corresponding to the noticed pixel. Then, the standard luminance picked up image generation section 72 adopts the pixel value of the corresponding pixel of the standard luminance picked up image of the ordinary camera visual point as a pixel value of the noticed pixel of the standard luminance picked up image of the ND camera visual point to generate a standard luminance picked up image of the ND camera visual point.

It is to be noted that the corresponding pixel corresponding to the noticed pixel of the low luminance picked up image of the ND camera visual point can be detected from each of the standard luminance picked up images of the 15 ordinary camera visual points.

As the pixel value of the noticed pixel of the ordinary luminance picked up image of the ND camera visual point, the pixel value of the corresponding pixel of the standard luminance picked up image, for example, of the reference camera unit (camera unit at the center of the 19 camera units) from among the 15 corresponding pixels detected individually from the standard luminance picked up images of the 15 ordinary camera visual points can be adopted.

Further, as the pixel value of the noticed pixel of the ordinary luminance picked up image of the ND camera visual point, an average value of pixel values of corresponding pixels, for example, of a set in which the number of corresponding pixels is greatest from among sets of corresponding pixels having close pixel values to each other from among the 15 corresponding pixels detected from each of the standard luminance picked up images of the 15 ordinary camera visual points can be adopted.

To the low luminance picked up image generation section 73, not only a parallax map is supplied from the parallax information acquisition section 71, but also the first to fourth low luminance picked up images picked up by the camera units U2 with an ND filter of the four ND camera visual points are supplied from the image pickup apparatus 11.

The low luminance picked up image generation section 73 generates first to fourth low luminance picked up images of the 15 ordinary camera visual points using the first to fourth low luminance picked up images of the four ND camera visual points from the image pickup apparatus 11 and a parallax map from the parallax information acquisition section 71 and supplies the generated first to fourth low luminance picked up images to the restoration section 75 together with the first to fourth low luminance picked up images of the four ND camera visual points from the image pickup apparatus 11.

In particular, the low luminance picked up image generation section 73 successively selects the pixels of the standard luminance picked up image of each ordinary camera visual point as a noticed pixel and refers to the parallax map from the parallax information acquisition section 71 to detect a corresponding pixel of each of the first to fourth low luminance picked up images of the ND camera visual points corresponding to the noticed pixel. Then, the low luminance picked up image generation section 73 adopts the pixel values of the corresponding pixels of the first to fourth low luminance picked up image of the ND camera visual points as the pixel values of the noticed pixels of the first to fourth low luminance picked up images of the ordinary camera visual points to generate first to fourth low luminance picked up images of the ordinary camera visual points.

As described above, the standard luminance picked up image generation section 72 generates standard luminance picked up images of the four ND camera visual points and the low luminance picked up image generation section 73 generates first to fourth low luminance picked up images of the 15 ordinary camera visual points. Consequently, standard luminance picked up images and first to fourth low luminance picked up images can be obtained from all of the 19 visual points of the 19 camera units configuring the image pickup apparatus 11 (FIG. 20).

It is to be noted that, while, in the present embodiment, standard luminance picked up images of the four ND camera visual points and first to fourth low luminance picked up images of the 15 ordinary camera visual points are generated in advance in order to facilitate description, the pixel values of standard luminance picked up images of the four ND camera visual points and the pixel values of the first to fourth low luminance picked up images of the 15 ordinary camera visual points can be generated when necessary for a pixel or pixels which require such pixel values.

The saturation decision section 74 performs a saturation decision for deciding whether or not each pixel of the standard luminance picked up images of the 19 visual points from the standard luminance picked up image generation section 72 is a saturated pixel and supplies a decision result (saturation decision result) of the saturation decision to the restoration section 75.

To the restoration section 75, a decision result of a saturation decision is supplied from the saturation decision section 74 as described hereinabove. Further, to the restoration section 75, standard luminance picked up images of the 19 visual points are supplied from the standard luminance picked up image generation section 72 and first to fourth low luminance picked up images of the 19 visual points are supplied from the low luminance picked up image generation section 73 as described hereinabove.

Further, to the restoration section 75, restoration gains for first to fourth low luminance picked up images are supplied, for example, from the image pickup apparatus 11 of FIG. 20.

Here, the restoration gain for the first low luminance picked up image is a restoration gain described hereinabove with reference to FIG. 17, which is used to perform restoration of a saturated pixel using the first low luminance picked up image.

Accordingly, the restoration gain for the first low luminance picked up image is a value of the ratio between the exposure time period (standard exposure time period) of the standard luminance picked up image and the exposure time period of the first low luminance picked up image.

For example, if the exposure time period of the first low luminance picked up image is (equivalently) $1/16$ time the standard exposure time period as described hereinabove with reference to FIG. 20, then the restoration gain for the first low luminance picked up image is $16=1/(1/16)$ times.

Also the restoration gains for the second to fourth low luminance picked up images can be determined similarly to the restoration gain for the first low luminance picked up image.

The restoration section 75 specifies, for each of the standard luminance picked up images of the 19 visual points from the standard luminance picked up image generation section 72, a saturated pixel in response to a saturation decision result from the saturation decision section 74.

Further, the restoration section 75 restores pixel values of saturated pixels using restoration gains for the first to fourth low luminance picked up images from the low luminance picked up image generation section 73 and the first to fourth low luminance picked up images from the image pickup apparatus 11 (FIG. 20) as occasion demands and supplies HDR picked up images of a higher dynamic range than that of the standard luminance picked up images to the incident ray reproduction section 36 (FIG. 3), the HDR picked up images being obtained by restoration.

Figure 22:
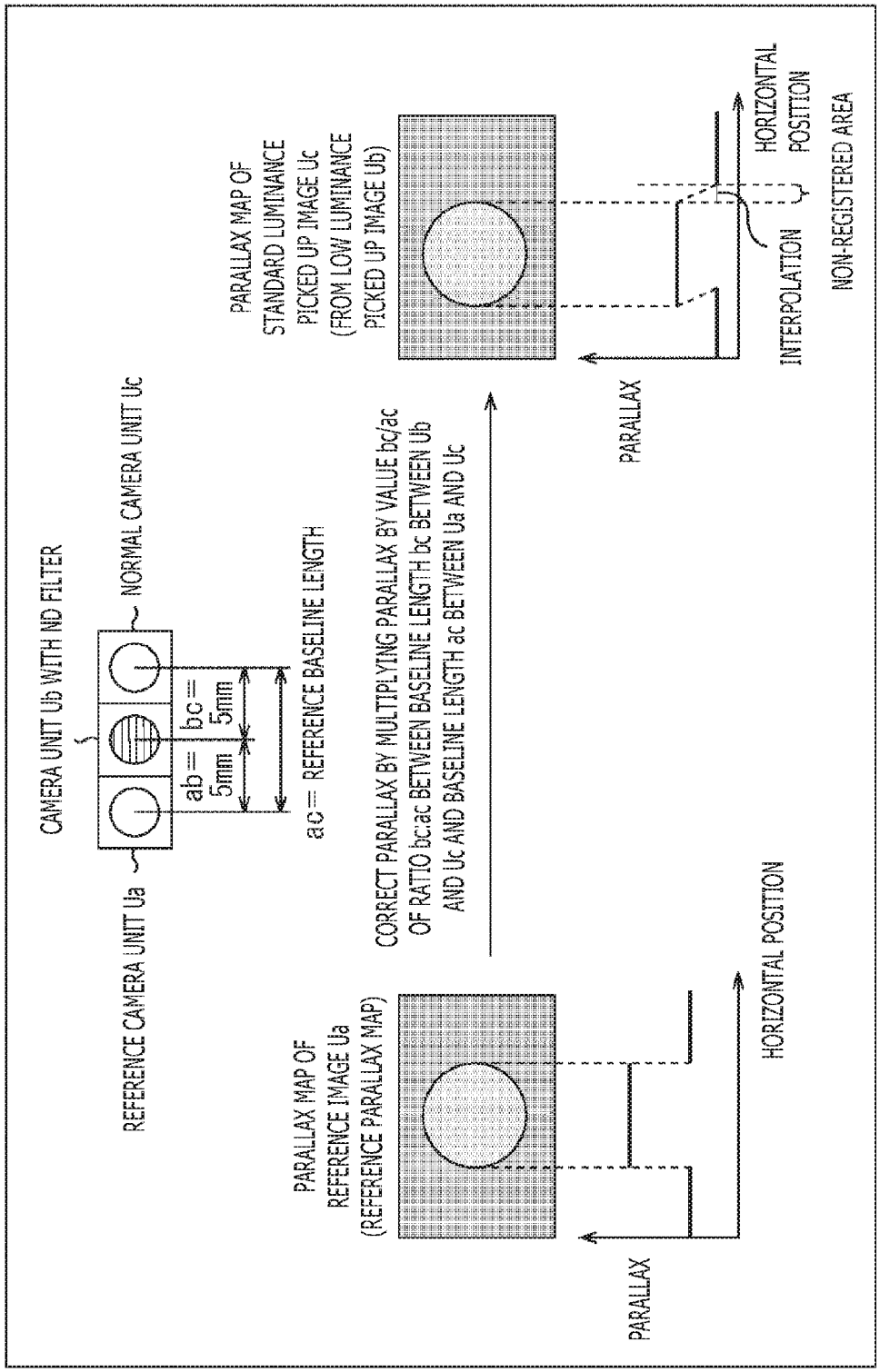
FIG. 22 is a view illustrating an example of correction of a parallax of a parallax map.

FIG. 22 is a view illustrating an example of correction of a parallax of a parallax map.

In the saturated pixel restoration section 33 of FIG. 21, the standard luminance picked up image generation section 72 refers to a parallax map acquired by the parallax information acquisition section 71 to detect a corresponding pixel of a standard luminance picked up image of the ordinary camera visual point corresponding to a noticed pixel of a low luminance picked up image of the ND camera visual point. Further, the low luminance picked up image generation section 73 refers to the parallax map acquired by the parallax information acquisition section 71 to detect corresponding pixels of (first to fourth) low luminance picked up images of the ND camera visual points corresponding to the noticed pixel of the standard luminance picked up image of the ordinary camera visual point.

A parallax registered in a parallax map that is referred to when a corresponding pixel of an image of one visual point corresponding to a noticed pixel of the other one visual point is to be detected as described above by the standard luminance picked up image generation section 72 and the low luminance picked up image generation section 73 is corrected as occasion demands.

Here, it is assumed that the image pickup apparatus 11 is configured from three camera units Ua, Ub and Uc juxtaposed in the horizontal direction as depicted in FIG. 22 in order to simplify the description.

Further, it is assumed that, for example, the camera unit Ua at the most left side from among the three camera units Ua, Ub and Uc is determined as a reference camera unit that picks up a reference image of a target for which a multilayer parallax map is to be generated.

Further, it is assumed that the reference camera unit Ua and the camera unit Uc at the most right side are ordinary camera units and the central camera unit Ub is a camera unit with an ND filter. The reference camera unit Ua and the ordinary camera unit Uc pick up a standard luminance picked up image and the camera unit Ub with an ND filter picks up a low luminance picked up image.

Here, the standard luminance picked up image picked up by the reference camera unit Ua is referred to as reference image Ua or standard luminance picked up image Ua. Meanwhile, a low luminance picked up image picked up by the camera unit Ub with an ND filter is referred to also as low luminance picked up image Ub. Further, the standard luminance picked up image picked up by the ordinary camera unit Uc is referred to also as standard luminance picked up image Uc.

Now, it is assumed that the parallax information acquisition section 71 generates a parallax map (reference parallax map) of the standard luminance picked up image (reference image) Ua picked up by the reference camera unit Ua using a baseline length (distance between optical axes) between the reference camera unit Ua and the ordinary camera unit Uc as a reference baseline length.

The parallax map of a visual point other than the visual point (reference visual point) of the reference camera unit Ua, namely, the parallax map of the standard luminance picked up image Uc picked up, for example, by the ordinary camera unit Uc can be generated simply and easily utilizing a reference parallax map as described hereinabove with reference to FIGS. 7 and 8.

In particular, the parallax map of the standard luminance picked up image Uc picked up by the ordinary camera unit Uc can be generated by moving, on the reference parallax map, the parallax registered at the position of each pixel in the camera position relation direction according to the positional relationship between the reference camera unit Ua and the ordinary camera unit Uc by a distance equal to the parallax as described hereinabove with reference to FIG. 7, and then interpolating an interpolation parallax in a non-registration area as described hereinabove with reference to FIG. 8.

The parallax generated utilizing the reference parallax map and registered in the parallax map of the standard luminance picked up image Uc is a parallax regarding two points spaced by the reference baseline length that is a baseline length between the reference camera unit Ua and the ordinary camera unit Uc.

Therefore, when a corresponding pixel of the low luminance picked up image Ub corresponding to a noticed pixel of the standard luminance picked up image Uc is to be detected, the parallax registered in the parallax map of the standard luminance picked up image Uc is corrected so as to become a parallax regarding two points spaced from each other by a baseline length between the ordinary camera unit Uc that picks up the standard luminance picked up image Uc and the camera unit Ub with an ND filter that picks up the low luminance picked up image Ub.

In particular, if it is assumed now that the reference baseline length that is the baseline length between the reference camera unit Ua and the ordinary camera unit Uc is represented by ac and the baseline length between camera unit Ub with an ND filter and the ordinary camera unit Uc is represented by bc, then the parallax registered in the parallax map of the standard luminance picked up image Uc is corrected so as to be multiplied by the value bc/ac of the ratio between the baseline length bc and the reference baseline length.

For example, it is assumed that both the baseline length ab between the reference camera unit Ua and the camera unit Ub with an ND filter and the baseline length bc between the camera unit Ub with an ND filter and the ordinary camera unit Uc are 5 mm.

In this case, the reference baseline length that is the baseline length ac between the reference camera unit Ua and the ordinary camera unit Uc is 10 mm.

Now, if it is assumed that the parallax of the noticed pixel generated utilizing the reference parallax map and registered in the parallax map of the standard luminance picked up image Uc is, for example, 10 (pixels), then the parallax of 10 is multiplied by the value 5/10 of the ratio between the baseline length bc=5 mm and the reference baseline length ac=10 mm and corrected to the parallax of 5.

Then, as the corresponding pixel of the low luminance picked up image Ub corresponding to the noticed pixel of the standard luminance picked up image Uc, a pixel of the low luminance picked up image Ub at a position displaced by the parallax of 5 from the position of the noticed pixel is detected.

Figure 23:
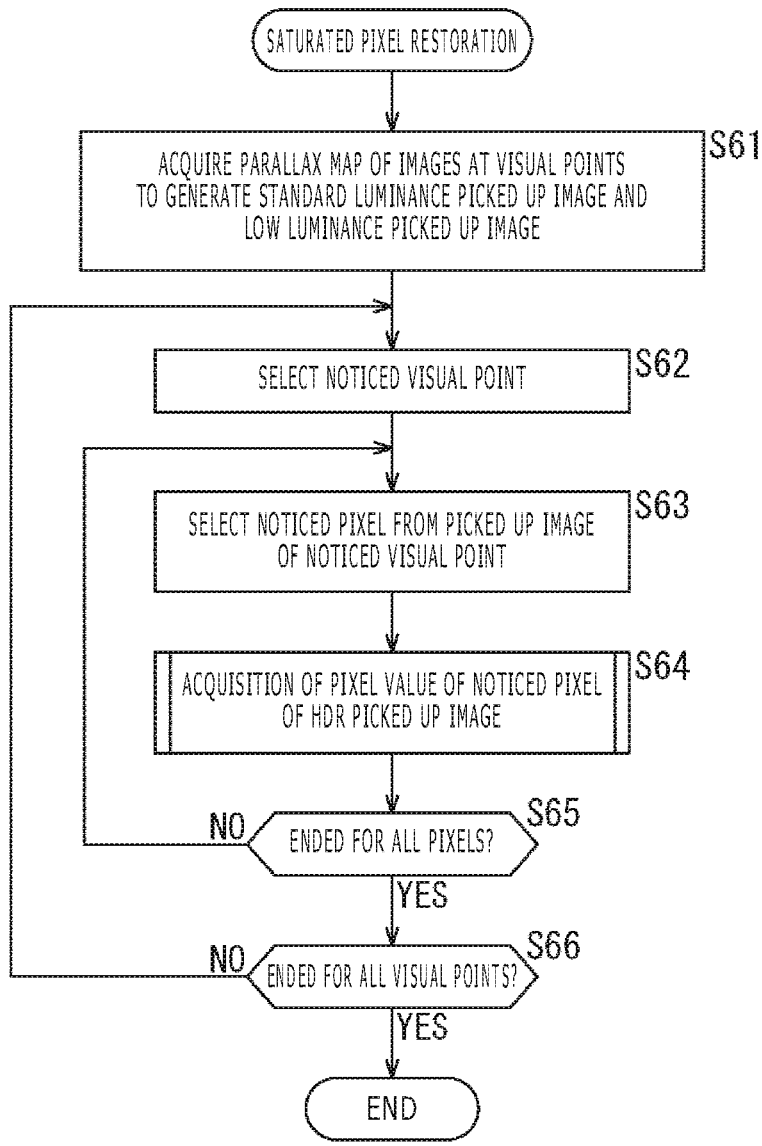
FIG. 23 is a flow chart illustrating an example of the saturated pixel restoration process performed by the saturated pixel restoration section 33.

FIG. 23 is a flow chart illustrating an example of the saturated pixel restoration process performed by the saturated pixel restoration section 33 of FIG. 21.

At step S61, the parallax information acquisition section 71 acquires parallax maps of picked up images (standard luminance picked up image and first to fourth low luminance picked up images) picked up by the camera units of the 19 visual points configuring the image pickup apparatus 11 (FIG. 20) and supplies the parallax maps to the standard luminance picked up image generation section 72 and the low luminance picked up image generation section 73.

Further, at step S61, the standard luminance picked up image generation section 72 generates standard luminance picked up images of the four ND camera visual points using the standard luminance picked up images of the 15 ordinary camera visual points from among the camera units of the 19 visual points configuring the image pickup apparatus 11 (FIG. 20) and the parallax maps from the parallax information acquisition section 71 and supplies the generated standard luminance picked up images to the saturation decision section 74 and the restoration section 75 together with the standard luminance picked up images of the 15 ordinary camera visual points.

Furthermore, at step S61, the low luminance picked up image generation section 73 generates first to fourth low luminance picked up images of the 15 ordinary camera visual points using the first to fourth low luminance picked up images of the four ND camera visual points from the image pickup apparatus 11 and the parallax maps from the parallax information acquisition section 71 and supplies the generated first to fourth low luminance picked up images to the restoration section 75 together with the first to fourth low luminance picked up images of the four ND camera visual points.

Then, the processing advances from step S61 to step S62, at which the saturation decision section 74 selects, from among the 19 visual points of the 19 camera units configuring the image pickup apparatus 11 (FIG. 20), one visual point that has not been selected as a noticed visual point as yet as a noticed visual point. Thereafter, the processing advances to step S63.

At step S63, the saturation decision section 74 selects, from among the pixels of the standard luminance picked up image of the noticed visual point from among the standard luminance picked up images of the 19 visual points supplied from the standard luminance picked up image generation section 72, one pixel that has not been selected as a noticed pixel as yet as a noticed pixel. Thereafter, the processing advances to step S64.

At step S64, a process for acquiring the pixel value of the noticed pixel of the HDR picked up image of the noticed visual point (pixel at the same position as that of the noticed pixel of the standard luminance picked up image of the noticed visual point) is performed. Then, the processing advances to step S65.

At step S65, the saturation decision section 74 decides whether or not all of the pixels of the standard luminance picked up image of the noticed visual point have been selected as a noticed pixel.

If it is decided at step S65 that all of the pixels of the standard luminance picked up image of the noticed visual point have not been selected as a noticed pixel, then the processing returns to step S63, and thereafter, similar processes are repeated.

On the other hand, if it is decided at step S65 that all of the pixels of the standard luminance picked up image of the noticed visual point have been selected as a noticed pixel, then the processing advances to step S66.

At step S66, the saturation decision section 74 decides whether or not all of the 19 visual points of the 19 camera units configuring the image pickup apparatus 11 (FIG. 20) have been selected as a noticed visual point.

If it is decided at step S66 that all of the 19 visual points have not been selected as a noticed visual point as yet, then the processing returns to step S62, and thereafter, similar processes are repeated.

On the other hand, if it is decided at step S66 that all of the 19 visual points have been selected as a noticed visual point, then the restoration section 52 supplies the HDR picked up images of the 19 visual points obtained by the processes described above to the incident ray reproduction section 36 (FIG. 3), thereby ending the saturated pixel restoration process.

It is to be noted that, while, in FIG. 23, the saturated pixel restoration process is performed for all of the 19 visual points of the 19 camera units configuring the image pickup apparatus 11, the saturated pixel restoration process can be performed only for the 15 ordinary camera visual points from among the 19 visual points.

In this case, the HDR picked up images obtained by the saturated pixel restoration process are not the HDR picked up images of the 19 visual points but are the HDR picked up images of the 15 ordinary camera visual points, the saturated pixel restoration section 33 of FIG. 21 can be configured without provision of the standard luminance picked up image generation section 72.

Figure 24:
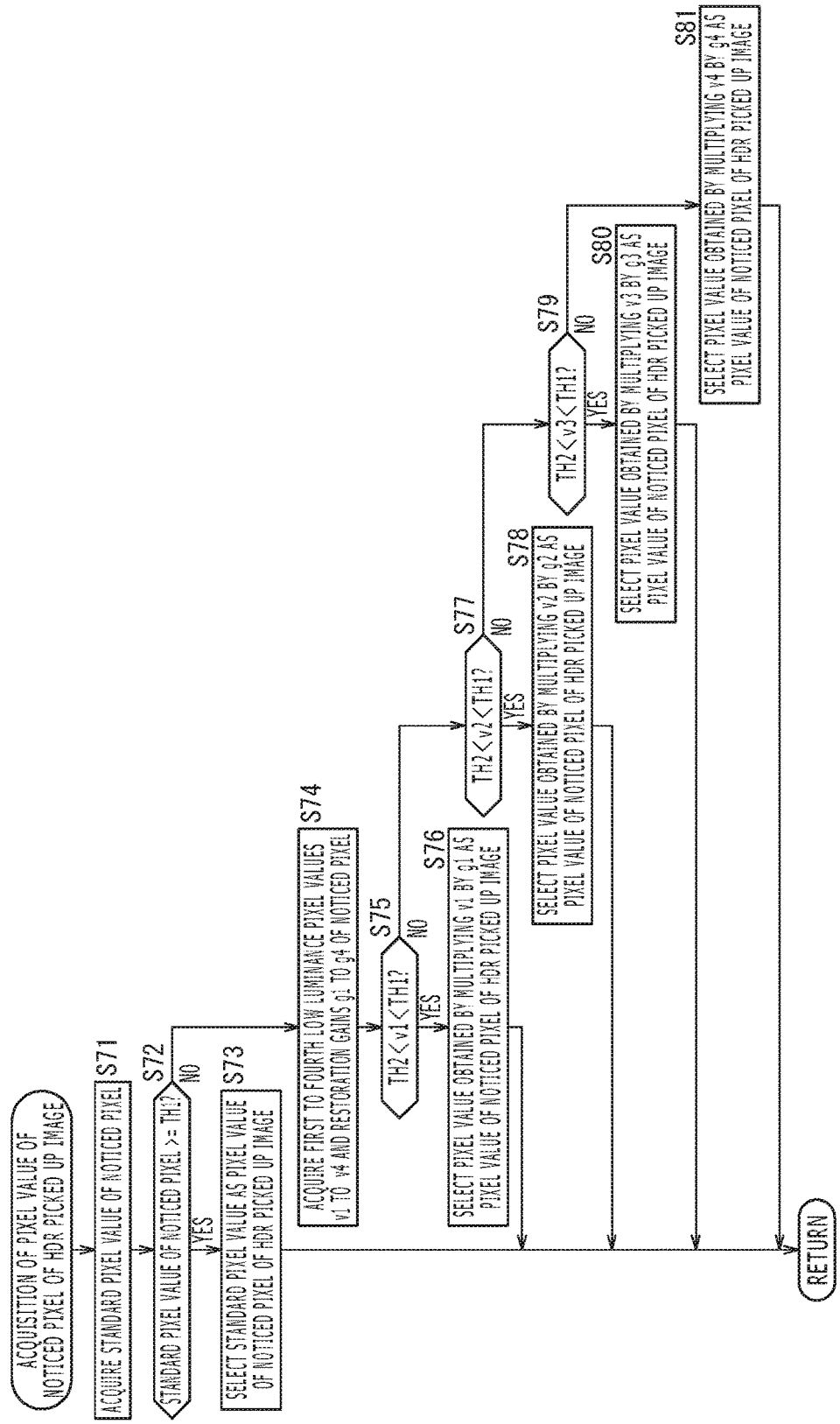
FIG. 24 is a flow chart illustrating an example of a process for acquiring a pixel value of a noticed pixel of an HDR (High Dynamic Range) picked up image at a noticed visual point.

FIG. 24 is a flow chart illustrating an example of a process for acquiring a pixel value of a noticed pixel of an HDR picked up image of a noticed visual point performed at step S64 of FIG. 23.

At step S71, the saturation decision section 74 acquires a pixel value of a noticed pixel of a standard luminance picked up image of a noticed visual point from the standard luminance picked up image generation section 72 as a standard pixel value of the noticed pixel. Then, the processing advances to step S72.

At step S72, the saturation decision section 74 decides a saturation decision of whether or not the standard pixel value of the noticed pixel of the standard luminance picked up image of the noticed visual point is equal to or higher than a threshold value TH1.

If it is decided at step S72 that the standard pixel value of the noticed pixel of the standard luminance picked up image of the noticed visual point is not equal to or higher than the threshold value TH1, namely, if the standard pixel value of the noticed pixel of the standard luminance picked up image of the noticed visual point is not in a saturated state, then the saturation decision section 74 supplies a saturation decision result that the standard pixel value is not in a saturated state to the restoration section 75 (FIG. 21). Then, the processing advances to step S73.

At step S73, the restoration section 75 selects, in response to the saturation decision result from the saturation decision section 74 that the standard pixel value is not in a saturated state, the standard pixel value of the noticed pixel of the standard luminance picked up image of the noticed visual point from the standard luminance picked up image generation section 72 as a pixel value of the noticed pixel of the HDR picked up image of the noticed visual point (pixel at a position same as that of the noticed pixel of the standard luminance picked up image of the noticed visual point). Thereafter, the processing returns.

On the other hand, if it is decided at step S72 that the standard pixel value of the noticed pixel of the standard luminance picked up image of the noticed visual point is equal to or higher than the threshold value TH1, namely, if the standard pixel value of the noticed pixel of the standard luminance picked up image of the noticed visual point is in a saturated state or may be in a saturated state with a high degree of possibility, the saturation decision section 74 supplies a saturation decision result that the standard pixel value is in a saturated state to the restoration section 75. Then, the processing advances to step S74.

At step S74, the restoration section 75 acquires, in response to the saturation decision result that the standard pixel value is in a saturated state from the saturation decision section 74, pixel values of noticed pixels of the respective first to fourth low luminance picked up images of the noticed visual point (pixels at the same position as that of the noticed pixel of the standard luminance picked up image of the noticed visual point) from the low luminance picked up image generation section 73 as first to fourth low luminance pixel values v1 to v4 of the noticed pixel.

Further, the restoration section 75 acquires restoration gains g1 to g4 for the first to fourth low luminance picked up images from the image pickup apparatus 11. Then, the processing advances from step S74 to step S75.

At step S75, the restoration section 75 decides whether or not the first low luminance pixel value v1 that is the pixel value of the noticed pixel of the first low luminance picked up image of the noticed visual point satisfies an expression TH2<v1<TH1 that uses a threshold value TH1 and another threshold value TH2 that is lower than the threshold value TH1.

If it is decided at step S75 that the first low luminance pixel value v1 satisfies the expression TH2<v1<TH1, namely, if the first low luminance pixel value v1 is not such a low value as that of noise and besides is not in a saturated state, then the processing advances to step S76.

At step S76, the restoration section 75 multiplies the first low luminance pixel value v1 that is the pixel value of the noticed pixel of the first low luminance picked up image of the noticed visual point by the restoration gain g1 for the first low luminance picked up image and determines a resulting pixel value of the multiplication as a restoration pixel value when the saturated pixel is restored. Further, the restoration section 75 selects the restoration pixel value as a pixel value of the noticed pixel of the HDR picked up image of the noticed visual point. Then, the processing returns.

On the other hand, if it is decided at step S75 that the first low luminance pixel value v1 does not satisfy the expression TH2<v1<TH1, then the processing advances to step S77.

At step S77, the restoration section 75 decides whether or not the second low luminance pixel value v2 that is the pixel value of the noticed pixel of the second low luminance picked up image of the noticed visual point satisfies the expression TH2<v2<TH1.

If it is decided at step S77 that the second low luminance pixel value v2 satisfies the expression TH2<v2<TH1, namely, if the second low luminance pixel value v2 is not such a low value as that of noise and besides is not in a saturated state, then the processing advances to step S78.

At step S78, the restoration section 75 multiplies the second low luminance pixel value v2 that is the pixel value of the noticed pixel of the second low luminance picked up image of the noticed visual point by the restoration gain g2 for the second low luminance picked up image and determines the resulting pixel value as a restoration pixel value restored from that of the saturated pixel. Further, the restoration section 75 selects the restoration pixel value as the pixel value of the noticed pixel of the HDR picked up image of the noticed visual point. Thereafter, the processing is returned.

On the other hand, if it is decided at step S77 that the second low luminance pixel value v2 does not satisfy the expression TH2<v2<TH1, then the processing advances to step S79.

At step S79, the restoration section 75 decides whether or not the third low luminance pixel value v3 that is the pixel value of the noticed pixel of the third low luminance picked up image of the noticed visual point satisfies an expression TH2<v3<TH1.

If it is decided at step S79 that the third low luminance pixel value v3 satisfies the expression TH2<v3<TH1, namely, if the third low luminance pixel value v3 is not such a low value as that of noise and besides is not in a saturated state, then the processing advances to step S80.

At step S80, the restoration section 75 multiplies the third low luminance pixel value v3 that is the pixel value of the noticed pixel of the third low luminance picked up image of the noticed visual point by the restoration gain g3 for the third low luminance picked up image and determines the resulting pixel value as the restoration pixel value restored from that of the saturated pixel. Further, the restoration section 75 selects the restoration pixel value as the pixel value of the noticed pixel of the HDR picked up image of the noticed visual point. Thereafter, the processing returns.

On the other hand, if it decided at step S79 that the third low luminance pixel value v3 does not satisfy the expression TH2<v3<TH1, then the processing advances to step S81.

At step S81, the restoration section 75 multiplies the fourth low luminance pixel value v4 that is the pixel value of the noticed pixel of the fourth low luminance picked up image of the noticed visual point by the restoration gain g4 for the fourth low luminance picked up image and determines the resulting pixel value as the restoration pixel value restored from that of the saturated pixel. Further, the restoration section 75 selects the restoration pixel value as the pixel value of the noticed pixel of the HDR picked up image of the noticed visual point. Thereafter, the processing returns.

It is to be noted that the (HDR) picked up images of the plurality of visual points of the high dynamic range obtained as a result of the saturated pixel restoration process can be made a target not only for generation of parallax information by the parallax information generation section 31 and generation of an emulation image by the lens emulation section 35 but also for an arbitrary image process for which picked up images of a plurality of visual points are required.

Further, if the saturated pixel restoration process is performed not only for picked up images of a plurality of visual points picked up by the image pickup apparatus 11 having the plurality of camera units $21_i$ or the like but also for arbitrary images to which the light field technology can be applied, then a clear blur can be reproduced.

As a method for picking up an image to which the light field technology can be applied, in addition to a method for picking up picked up images of a plurality of visual points using the image pickup apparatus 11 having the plurality of camera units $21_i$, for example, a method for performing image pickup using an MLA (Micro Lens Array) disclosed, for example, in Ren. Ng. and seven others, "Light Field Photography with a Hand-Held Plenoptic Camera," Stanford Tech Report CTSR 2005-02 is available.

<Outline of Lens Emulation Process of Lens Emulation Section 35>

Figure 25:
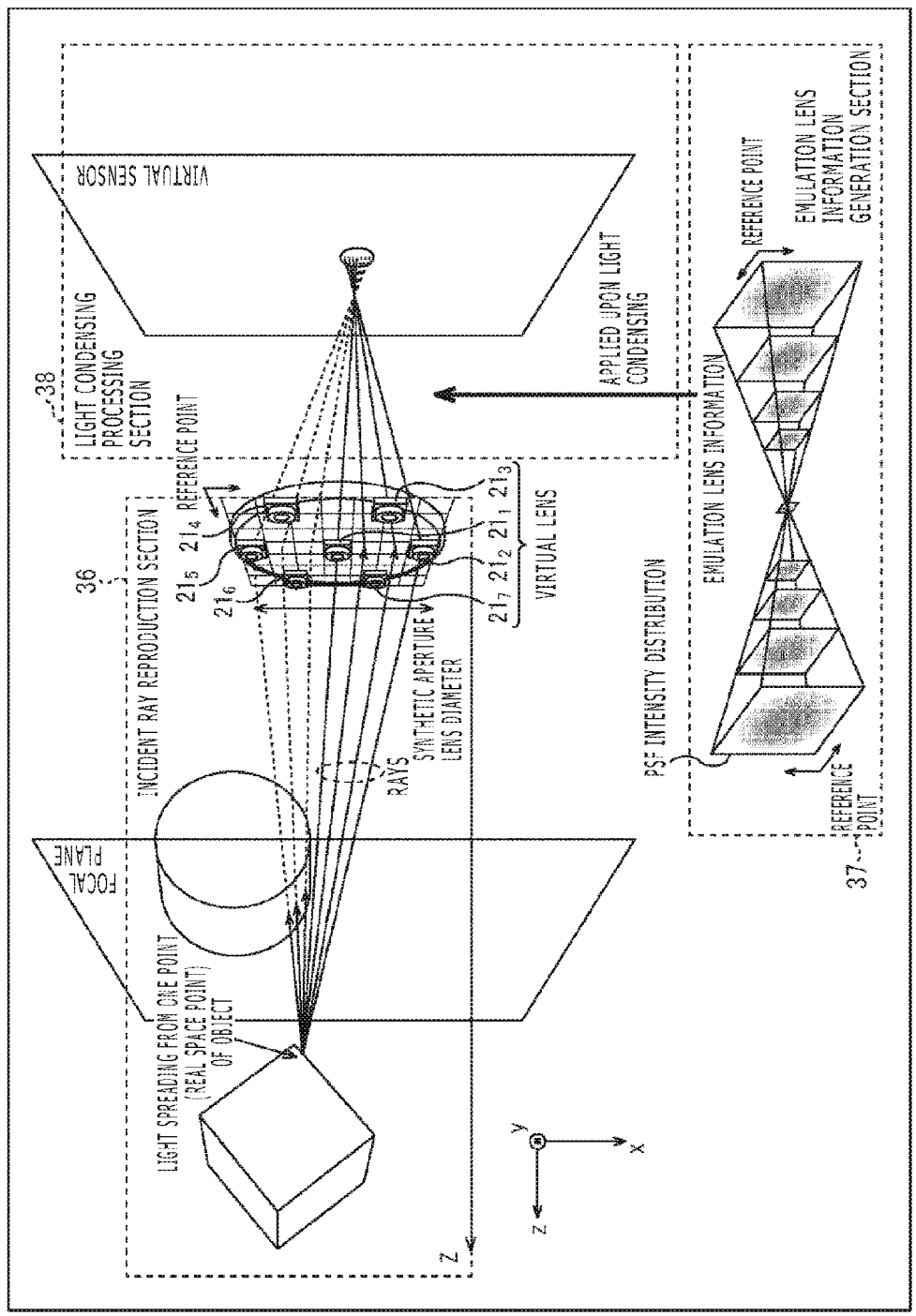
FIG. 25 is a view illustrating an outline of a lens emulation process of a lens emulation section 35.

FIG. 25 is a view illustrating an outline of a lens emulation process of the lens emulation section 35 of FIG. 3.

In the lens emulation process, the incident ray reproduction section 36 (FIG. 3) reproduces rays incident to a virtual lens from among rays emitted from a real space point such as a point on an object existing in a real space which has become an image pickup object upon image pickup by the image pickup apparatus 11 (including not only light emitted from the real space point where the real space point emits light but also reflected light reflected by the real space point).

The virtual lens is a virtual lens having a synthetic aperture provided by the camera units $21_1$ to $21_7$ configuring the image pickup apparatus 11 (FIG. 2), and the entity of the virtual lens is the camera units $21_1$ to $21_7$.

Further, by the lens emulation process, lens information (emulation lens information) that defines rays that pass the emulation lens is generated by the emulation lens information generation section 37 (FIG. 3).

As described hereinabove with reference to FIG. 3, the emulation lens may be an optical lens that actually exists or may be an optical lens that does not exist actually.

Further, the lens information includes a PSF intensity distribution representative of a response of the emulation lens to a point light source and so forth.

In the lens emulation process, the light condensing processing section 38 (refer to FIG. 3) performs a digital signal process as a light condensing process for condensing rays reproduced by the incident ray reproduction section 36 using lens information obtained by the emulation lens information generation section 37 on the virtual sensor through the emulation lens.

The entity of the virtual sensor is, for example, a memory not depicted, and in the light condensing process, lens information is used to add a value corresponding to the luminance of rays to (a storage value of) the memory to generate an emulation image.

Figure 26A:
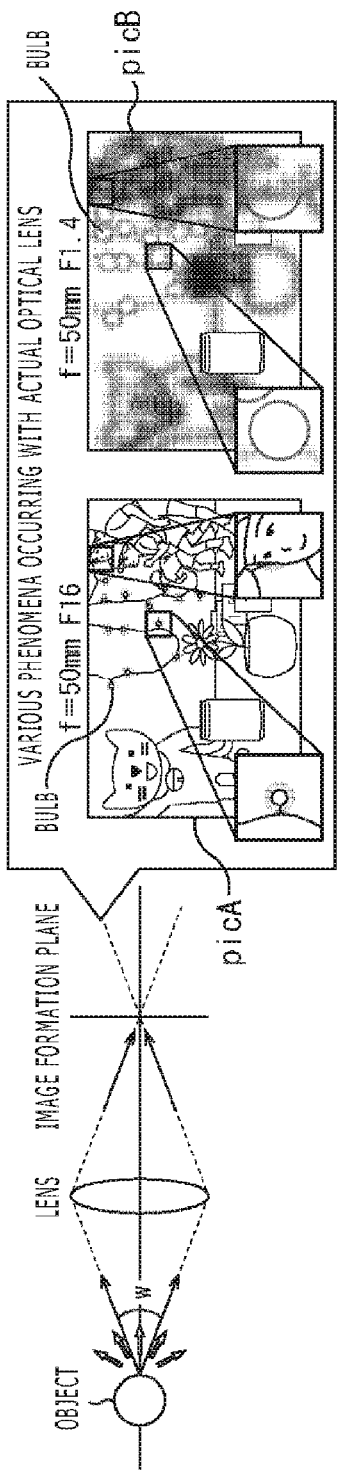
FIGS. 26A and 26B are views illustrating a light condensing process by an actual optical lens and a light condensing process of the lens emulation process.
Figure 26B:
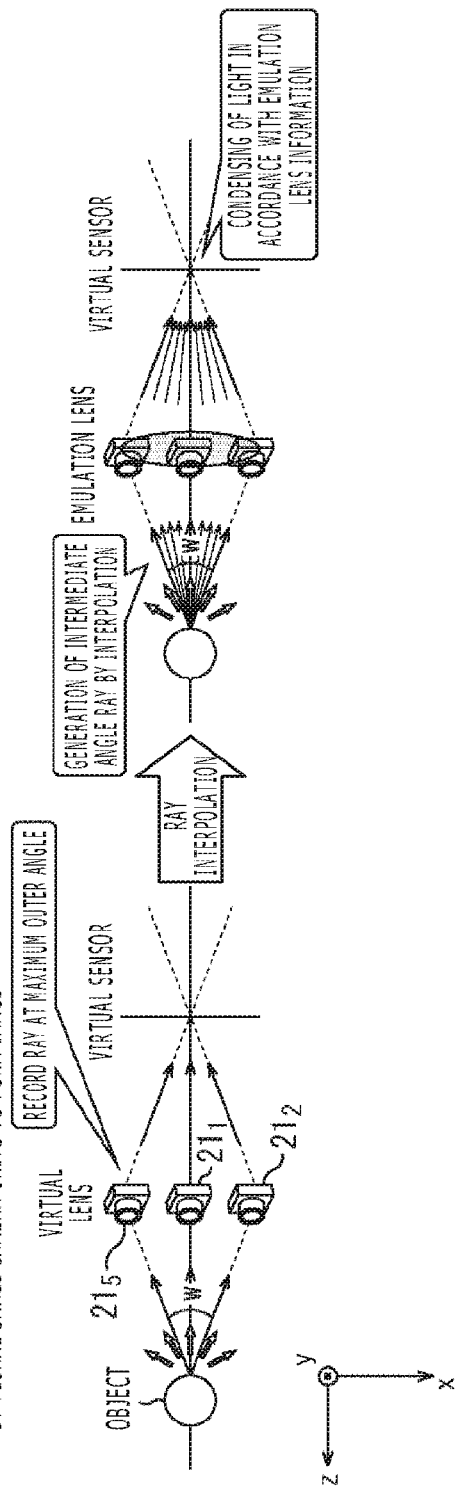

FIGS. 26A and 26B are views illustrating a light condensing process by an actual optical lens and a light condensing process of the lens emulation process.

FIG. 26A depicts a light condensing process by an actual optical lens.

The actual optical lens samples a large number of rays emitted from an object in a real space to form an image on an image plane in accordance with lens characteristics of the actual optical lens.

In the actual optical lens, the angle of rays to be sampled by the optical lens varies, for example, depending upon the aperture.

In particular, if the aperture is restricted, then rays that are spread at a large angle w with respect to the optical axis from the object are not sampled by the optical lens. On the other hand, if the aperture is opened, then rays spread at a large angle w with respect to the optical axis from the object are sampled by the optical lens.

An image picA of FIG. 26A is an image picked up with the aperture restricted and is an image in which the depth of field is deep and which is generally in focus. Further, in the image picA, although a bulb exists behind a character of a child in a right upper region, rays spread at a large angle with respect to the optical axis from the bulb are not sampled by the optical lens, and therefore, the bulb is not reflected behind the character of the child.

Another image picB of FIG. 26A is an image picked up with the aperture opened and is an image in which the depth of field is shallow and which is in focus only at a portion thereof and is blurred at the other most part thereof. Further, in the image picB, the bulb exists behind the character of the child in the right upper region, and rays spread at a large angle with respect to the optical axis from the bulb are sampled by the optical lens. Therefore, part of the bulb is reflected behind the character of the child.

FIG. 26B depicts a light condensing process of the lens emulation process.

In the light condensing process of the lens emulation process, rays emitted from an object in a real space and imaged (recorded) by the plurality of camera units $21_i$ of the image pickup apparatus 11 are used to reproduce (generate) rays that are incident to the virtual lens having a synthetic aperture provided by the plurality of camera units $21_i$.

Here, in FIG. 26B, three rays are imaged by the three camera units 211, 212 and 215 as a plurality of camera units. Further, rays to be incident to the virtual lens are reproduced such that rays among the three rays are interpolated.

In the light condensing process of the lens emulation process, after rays to be incident to the virtual lens are reproduced in such a manner as described above, the rays are condensed on the virtual sensor in accordance with the lens information of the emulation lens. Consequently, in the emulation image obtained as a result of the light condensing, a blur degree similar to that where an image is picked up actually using the emulation lens is reproduced.

<Reproduction of Rays Incident to Virtual Lens>

FIG. 27 is a block diagram depicting an example of a configuration of the incident ray reproduction section 36 of FIG. 3.

Referring to FIG. 27, the incident ray reproduction section 36 includes a real space point selection section 101, a ray generation section 102, a collision decision section 103 and a luminance allocation section 104.

To the real space point selection section 101, parallax maps are supplied from the parallax information generation section 31.

The real space point selection section 101 selects a space point in a real space whose image is picked up by the image pickup apparatus 11 using a multilayer parallax map from among the parallax maps from the parallax information generation section 31 as a noticed real space point and supplies the noticed real space point to the ray generation section 102.

The ray generation section 102 generates (straight lines as) rays to be incident to the virtual lens from the noticed real space point from the real space point selection section 101 and supplies the rays to the collision decision section 103.

To the collision decision section 103, not only rays are supplied from the collision decision section 103, but also parallax maps are supplied from the parallax information generation section 31.

The collision decision section 103 uses the multilayer parallax map from among the parallax maps from the parallax information generation section 31 to perform a collision decision for deciding whether or not the rays from the collision decision section 103 collide with an object in the real space before they enter the virtual lens.

Then, the collision decision section 103 supplies rays that remain as a result of the collision decision to the luminance allocation section 104.

To the luminance allocation section 104, not only the rays are supplied from the collision decision section 103, but also parallax maps are supplied from the parallax information generation section 31, and also (HDR) picked up images HD#i of the seven visual points as plural visual points are supplied from the saturated pixel restoration section 33.

The luminance allocation section 104 uses the parallax maps from the parallax information generation section 31 and the picked up images HD#i from the saturated pixel restoration section 33 to allocate a luminance to the rays from the collision decision section 103, namely, to the rays remaining as a result of the collision decision, and supplies the rays after the allocation of the luminance to the light condensing processing section 38 (FIG. 3).

Figure 28:
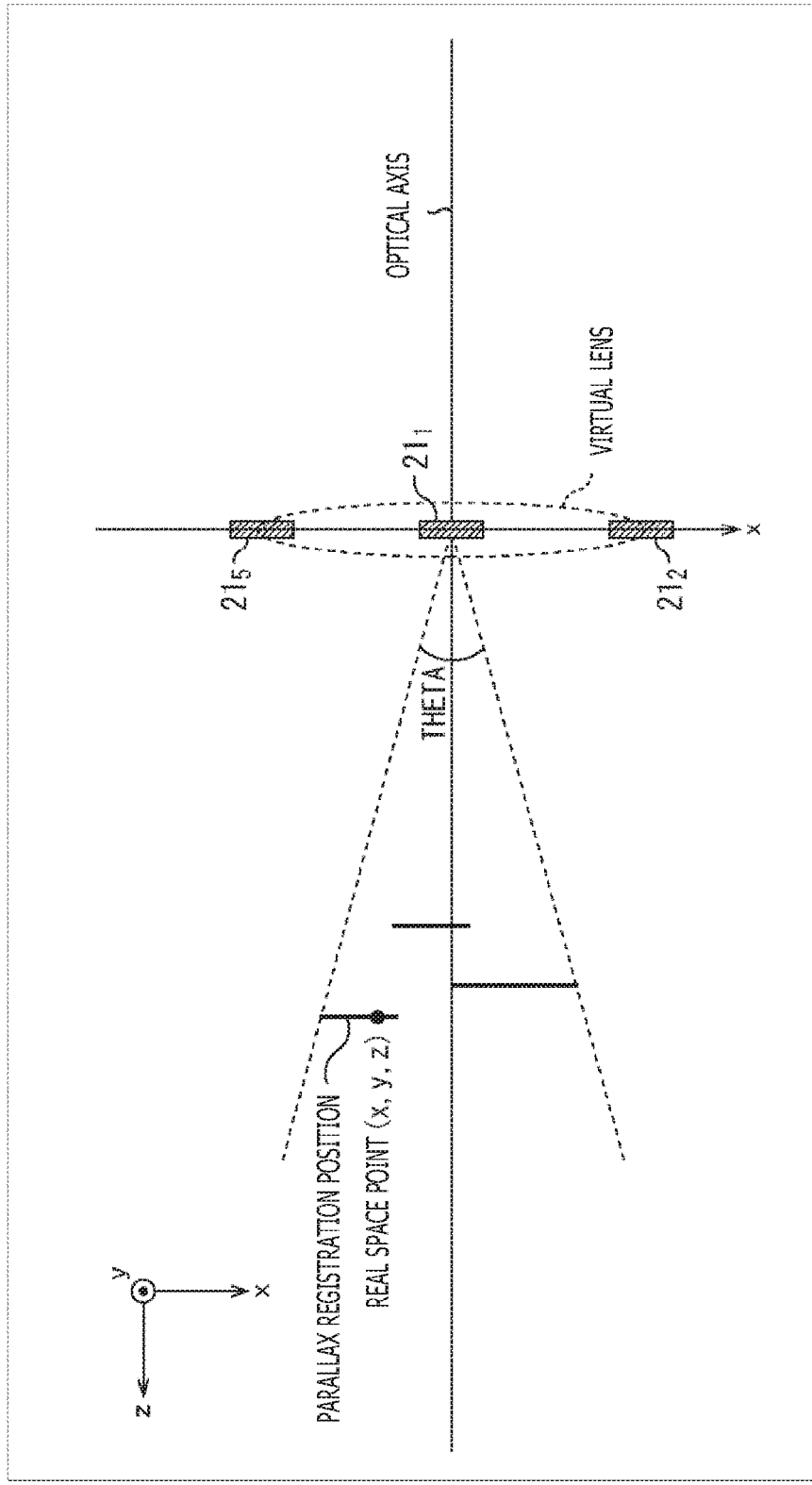
FIG. 28 is a view illustrating a real space point.

FIG. 28 is a view illustrating a real space point.

In particular, FIG. 28 is a schematic plan view when a real space whose image is picked up by a camera unit $21_i$ configuring the image pickup apparatus 11 serving as the virtual lens is viewed from above.

Here, as a three-dimensional coordinate system that defines a position in the real space (real space point), a three-dimensional coordinate system is used which has the origin at the principal point of the virtual lens or the emulation lens and has an x axis and a y axis along a horizontal direction and a vertical direction, respectively, when the image pickup apparatus 11 (FIG. 2) is viewed from the front and a z axis along a depthwise direction from the origin (direction of an image pickup object).

A real space point (x, y, z) that is a position in the real space of an object (image pickup object) reflected at a certain pixel p of a reference image can be determined from the position of the pixel p on the reference image (position on an image sensor not depicted of the camera unit $21_1$) and the parallax d of the pixel p.

Therefore, the real space point selection section 101 determines a real space point corresponding to the pixel p having the parallax d (position in the real space of an object that may be reflected at the pixel p) from the position and the parallax d of the pixel p registered in the multilayer parallax map.

Now, if it is assumed that (a set of) real space points having the parallax d registered in the multilayer parallax map are referred to as parallax registration position, then the real space point selection section 101 successively selects the real space points configuring the parallax registration position as a noticed real space point.

It is to be noted that, in FIG. 28, THETA denotes an angle of view in the horizontal direction of the reference image (reference camera unit $21_1$). The parallax registration position exists within a range that is spread by the angle THETA of view centered at the optical axis of the virtual lens.

The axis of the virtual lens is a straight line that passes the center of the reference image and is perpendicular to the reference image (optical axis of the reference camera unit $21_1$).

Figure 29:
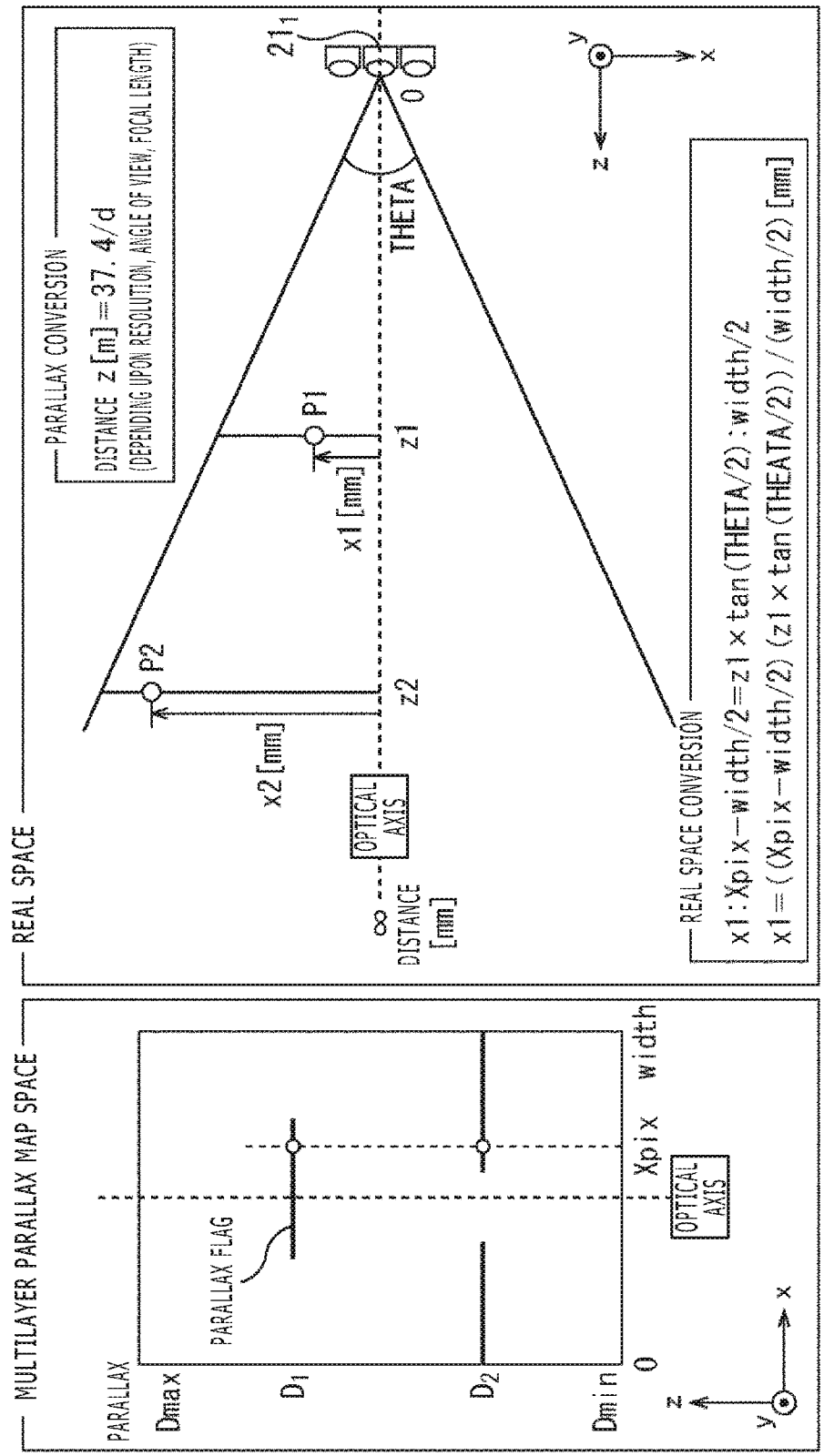
FIG. 29 is a view illustrating a determination method for determining a real space point using a multilayer parallax map.

FIG. 29 is a view illustrating a determination method for determining a real space point using a multilayer parallax map.

It is assumed now that, as a multilayer parallax map space for representing a multilayer parallax map, a three-dimensional space is used which has an x axis and a y axis at the positions of the reference image in the horizontal direction and the vertical direction and has a z axis by which a value that can be assumed by a parallax obtained by the parallax information generation section 31 (FIG. 3) is represented.

In such a multilayer parallax map space as described above, a parallax d of a pixel at the position (x, y) can be registered by making a parallax flag representing that a parallax is registered at the position (x, y, d).

Here, in the present embodiment, a maximum value of the parallax that can be registered into the multilayer parallax map is represented as Dmax and a minimum value is represented as Dmin. In this case, the size of the multilayer parallax map space in the z-axis direction is Dmax−Dmin+1. It is to be noted that, as Dmin, for example, 0 (infinity) can be adopted.

Further, each parallax d registered in the multilayer parallax map can be converted into a distance z in the real space in the depthwise direction from the principal point of the virtual lens (reference camera unit $21_1$), for example, in accordance with an expression z=37.4/d.

It is to be noted that the expression for converting the parallax d into the distance z is not limited to the expression z=37.4/d and differs depending upon the resolution, angle of view and focal length of the reference camera unit $21_1$.

Now, if the pixel p of the reference image whose x coordinate is Xpic is noticed as noticed pixel p, then in the multilayer parallax map of FIG. 29, parallaxes $D_1$ and $D_2$ are registered for the noticed pixel p.

The real space point selection section 101 successively selects the parallaxes $D_1$ and $D_2$ for the noticed pixel p as a noticed parallax to be noticed and selects a real space point corresponding to the noticed pixel p having the noticed parallax as noticed real space point.

Now, it is assumed that, from between the parallaxes $D_1$ and $D_2$, the parallax $D_1$ is selected as noticed parallax.

Further, the number of pixels in the horizontal direction (x-axis direction) of the reference image (parallax map) is represented as width and the angle of view in the horizontal direction of the reference image is represented by THEATA. Furthermore, the position (distance) of a real space point P1, which corresponds to the noticed pixel p having the reference parallax $D_1$, in the x-axis direction from the optical axis is represented as x1.

The real space point selection section 101 first converts the reference parallax $D_1$ into the distance z=z1 in the real space.

Then, the real space point selection section 101 uses the distance z=z1 corresponding to the reference parallax $D_1$ to determine a position (distance) x1 of the real space point P1, which corresponds to the noticed pixel p having the reference parallax $D_1$, in the x-axis direction from the optical axis.

In particular, the distance x1 in the real space and the number of pixels Xpic−width/2 in the multilayer parallax map space correspond to each other. Further, the distance z1×tan(THEATA/2) representing one half the angle of view in the horizontal direction in the real space and the number of pixels width/2 representative of one half the angle of view in the horizontal direction in the multilayer parallax map space correspond to each other.

Since the ratio between x1 and Xpic−width/2 and the ratio between z1×tan(THEATA/2) and width/2 coincide with each other, an expression x1:Xpic−width/2=z1×tan(THEATA/2): width/2 is satisfied.

Accordingly, the position x1 of the real space point P1, which corresponds to the noticed pixel p having the reference parallax $D_1$, in the x-axis direction from the optical axis can be determined in accordance with the expression x1= ((Xpix−width/2)(z1×tan(THEATA/2))/(width/2).

The real space point selection section 101 determines the position x1 of the real space point P1, which corresponds to the noticed pixel p having the reference parallax $D_1$, in the x-axis direction from the optical axis in such a manner as described above.

The real space point selection section 101 similarly determines the position of the real space point P1, which corresponds to the noticed pixel p having the reference parallax $D_1$, in the y-axis direction from the optical axis thereby to determine (the xyz coordinates of) the real space point P1 corresponding to the noticed pixel p having the reference parallax $D_1$.

Also the real space point corresponding to the pixel p having the parallax $D_2$ can be determined in a similar manner.

Figure 30:
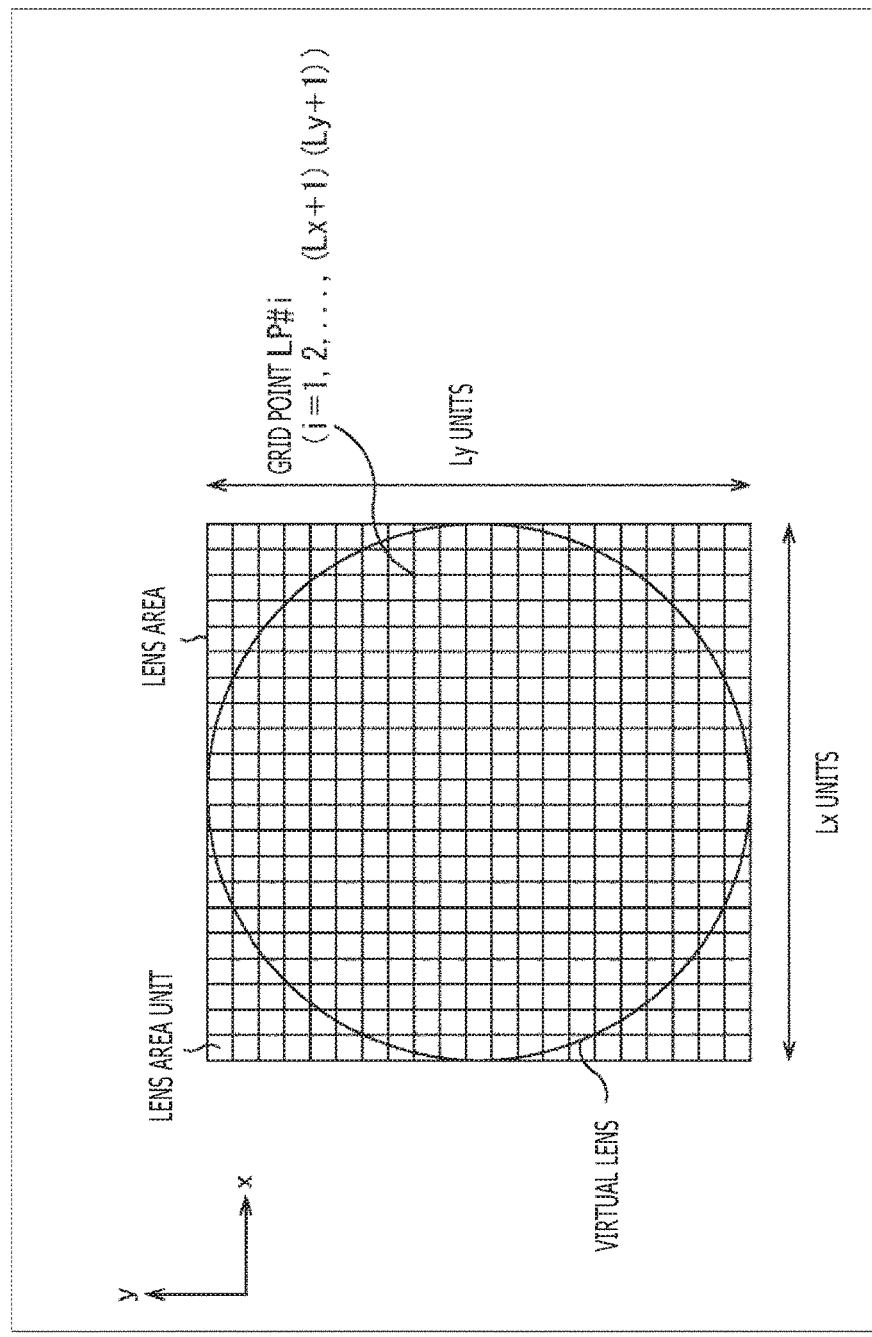
FIG. 30 is a view illustrating an example of generation of rays performed by a ray generation section 102.

FIG. 30 is a view illustrating an example of generation rays performed by the ray generation section 102 of FIG. 27.

In particular, FIG. 30 is a front elevational view of the virtual lens as viewed from the front (image pickup object side).

The ray generation section 102 sets an area including (the synthetic aperture of) the virtual lens as lens area.

In FIG. 30, for example, a minimum rectangular area surrounding the virtual lens is set as a lens area.

The ray generation section 102 divides (the virtual lens surrounded by) the lens area into lens area units that are small regions and performs, considering a real space point as a point light source, generation of a ray to be incident to (for example, the center of) each lens area unit from the real space point as point light source, namely, calculation of a straight line as a ray to be incident to each lens area unit from the real space point.

In FIG. 30, the lens area is divided into totaling Lx×Ly lens area units including Lx lens area units in the horizontal direction and Ly lens area units in the vertical direction.

In this case, the ray generation section 102 generates, in regard to one real space point, Lx×Ly straight lines individually interconnecting the real space point and the Lx×Ly lens area units densely as rays to be incident to the virtual lens.

Here, it is assumed that the distance between (the centers of) the lens area units positioned adjacent each other in the horizontal direction or the vertical direction is referred to as angle resolution with which an angle between two rays emitted from the real space point can be distinguished.

For example, if it is assumed that the synthetic aperture (diameter of the virtual lens) is 40 mm and the numbers Lx and Ly of the lens area units in the horizontal direction and the vertical direction of the lens area are 21, then the angle resolution is 40/21 mm.

Further, a grid point that is a cross point between a straight line in the horizontal direction and another straight line in the vertical direction by which the lens area is divided into the lens area units is referred to also as grid point LP#i (i=1, 2, . . . , (Lx+1) (Ly+1)).

The distance between grid points LP#i and LP#j positioned adjacent each other in the horizontal direction or the vertical direction represents the angle resolution.

Figure 31:
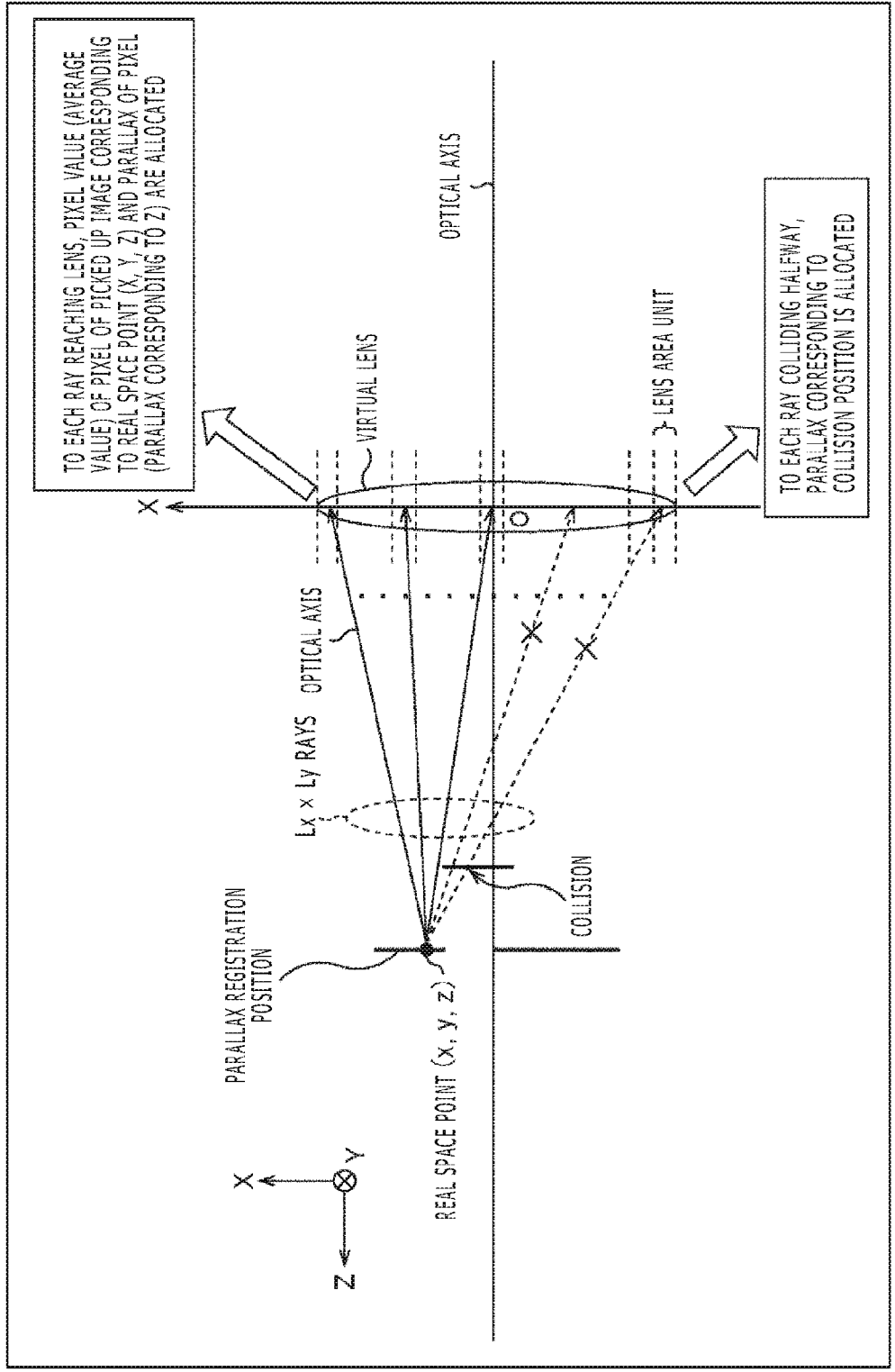
FIG. 31 is a view illustrating collision decision performed by a collision decision section 103 and allocation of luminance to rays performed by a luminance allocation section 104.

FIG. 31 is a view illustrating a collision decision performed by the collision decision section 103 of FIG. 27 and allocation of a luminance to a ray performed by the luminance allocation section 104.

In particular, FIG. 31 is a schematic plan view when a real space whose image is picked up by the camera units $21_i$ configuring the image pickup apparatus 11 as the virtual lens is viewed from above.

The collision decision section 103 performs a collision decision for deciding whether or not the Lx×Ly rays from the collision decision section 103, which are emitted from the real space point and directed toward the Lx×Ly lens area units of the virtual lens, collide with an object in the real space before they enter the virtual lens using the multilayer parallax map.

In particular, if a ray emitted from the real space point and directed toward a lens area unit of the virtual lens collides (crosses) with a parallax registration position before it enters the lens area unit, then the collision decision section 103 decides that the ray collides.

On the other hand, if a ray emitted from the real space point and directed toward a lens area unit of the virtual lens does not collide with a parallax registration position before it enters the lens area unit, then the collision decision section 103 decides that the ray does not collide.

Then, the collision decision section 103 supplies those rays that remain as a result of the collision decision, namely, the rays that are determined not to collide, to the luminance allocation section 104.

It is to be noted that the collision decision section 103 allocates the parallax d=D corresponding to the real space point (x, y, z) from which the ray is emitted to each of the rays that remain as a result of the collision decision and allocates, to each ray decided to collide, the parallax d=D' corresponding to the parallax registration position at which the ray collides.

Whether a ray emitted from a certain real space point (x, y, z) enters the virtual lens without colliding with an object after the collision decision can be recognized depending upon whether the parallax allocated to the ray coincides with the parallax of the real space point (x, y, z) from which the ray is emitted.

In particular, when the parallax allocated to the ray coincides with the parallax of the real space point (x, y, z) from which the ray is emitted, the ray does not collide with an object and enters the virtual lens. On the other hand, if the parallax allocated to the ray does not coincide with the parallax of the real space point (x, y, z) from which the ray is emitted, then the ray collides with an object at the depthwise position corresponding to the parallax allocated to the ray and does not reach the virtual lens.

The luminance allocation section 104 allocates a luminance to rays remaining as a result of the collision decision from the collision decision section 103 using the multilayer parallax map and the picked up images HD#i.

In particular, the luminance allocation section 104 determines a corresponding pixel corresponding to the real space point (x, y, z) from which the rays remaining as a result of the collision decision are emitted for each of the picked up images HD1 to HD7 of the seven visual points.

Further, the luminance allocation section 104 refers to the parallax maps to detect, from among the corresponding pixels of the picked up images HD1 to HD7, each pixel with regard to which a parallax coincident with the parallax d=D corresponding to the depth z of the real space point (x, y, z) is registered as a ray luminance allocation pixel to be used for allocation of a luminance.

Then, the luminance allocation section 104 allocates a luminance to the ray using values of R (Red), G (Green) and B (Blue) as a pixel value of the ray luminance allocation pixel.

In particular, the luminance allocation section 104 allocates, for example, an average value of the pixel values (values of R, G and B) of the ray luminance allocation pixel as a luminance of the ray to the ray.

As described above, when a ray emitted from the real space point (x, y, z) collides with an object and does not enter the virtual lens, the collision decision section 103 allocates a parallax, which corresponds to a parallax registration position at which the ray collides, to the ray.

On the other hand, if a ray emitted from the real space point (x, y, z) does not collide with an object and enters the virtual lens, then the collision decision section 103 allocates a parallax corresponding to the real space point (x, y, z) from which the ray is emitted to the ray.

Further, to a ray that does not collide with an object and enters the virtual lens, the luminance allocation section 104 allocates a pixel value (values of R, G and B) as a luminance.

Figure 32:
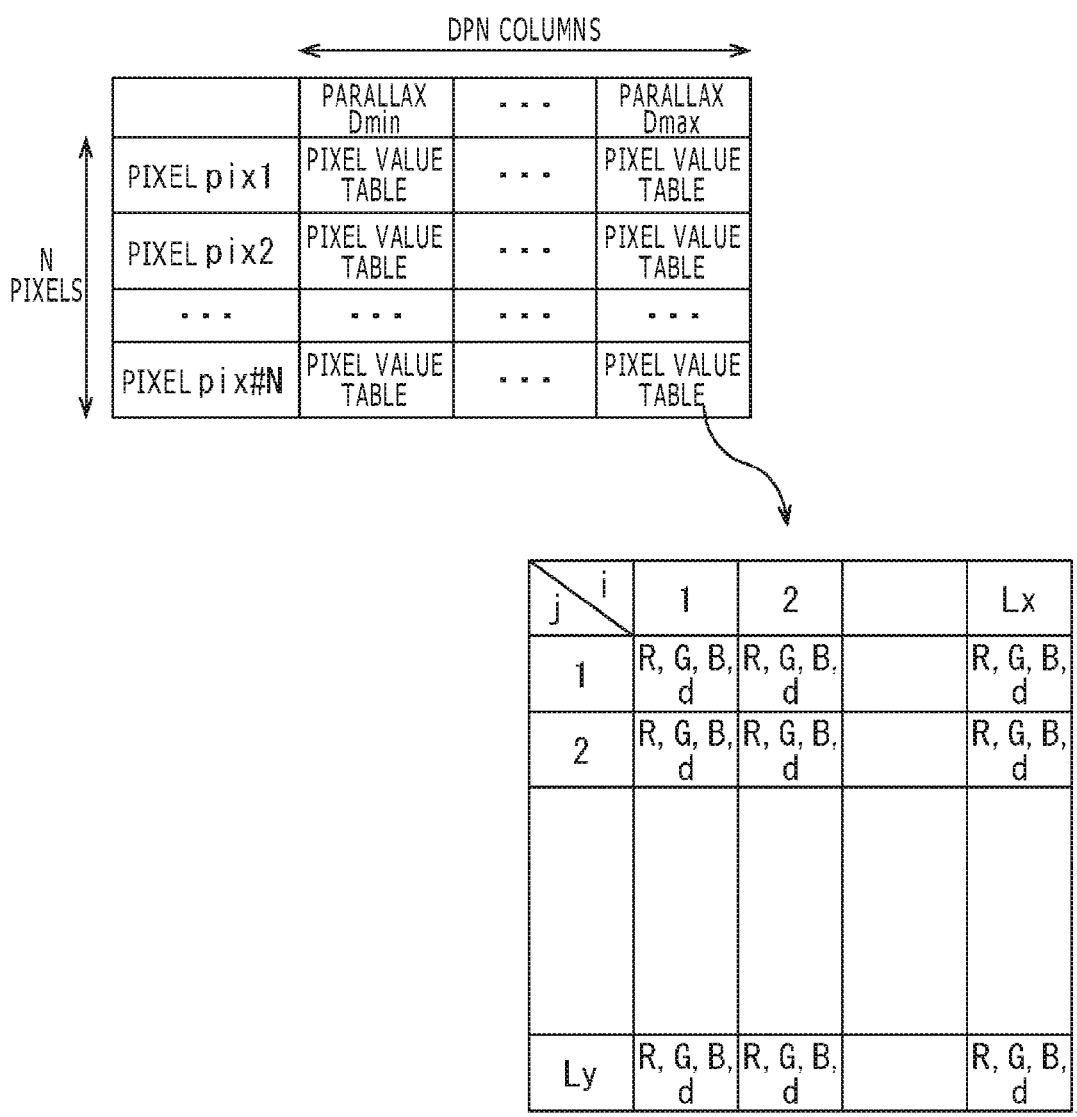
FIG. 32 is a view schematically depicting a maximum number of data obtained by an incident ray reproduction process performed by the incident ray reproduction section 36.

FIG. 32 is a view schematically depicting a maximum number of data obtained by the incident ray reproduction process performed by the incident ray reproduction section 36 of FIG. 27.

Now, it is assumed that the reference image HD1 is configured from N pixels pix1, pix2, . . . , pix#N and the number of parallaxes d that can be registered into a parallax map (multilayer parallax map) is DPN=Dmax−Dmin+1 integral values in 1 pixel increments from the minimum value Dmin to the maximum value Dmax.

In this case, in the incident ray reproduction process, a pixel value table is registered for a real space point corresponding to a combination (pix#n, d) of an arbitrary pixel pix#n from among the N pixels pix1, pix2, . . . , pix#N and an arbitrary parallax d from among the DPN parallaxes Dmin, Dmin+1, . . . , Dmax at most as depicted in FIG. 32.

Into the pixel value table for the real space point corresponding to the combination (pix#n, d), a parallax D allocated to a ray heading from the real space point corresponding to the combination (pix#n, d) toward a lens area unit (i, j) of the ith from the left and jth from above from among the Lx×Ly lens area units of the lens area (FIG. 30) is registered as depicted in FIG. 32.

Further, where values of R, G and B as a luminance are allocated to a ray heading from the real space point corresponding to the combination (pix#n, d) toward the lens area unit (i, j), into the pixel value table for the real space point corresponding to the combination (pix#n, d), the values of R, G and B as a luminance are registered.

Figure 33:
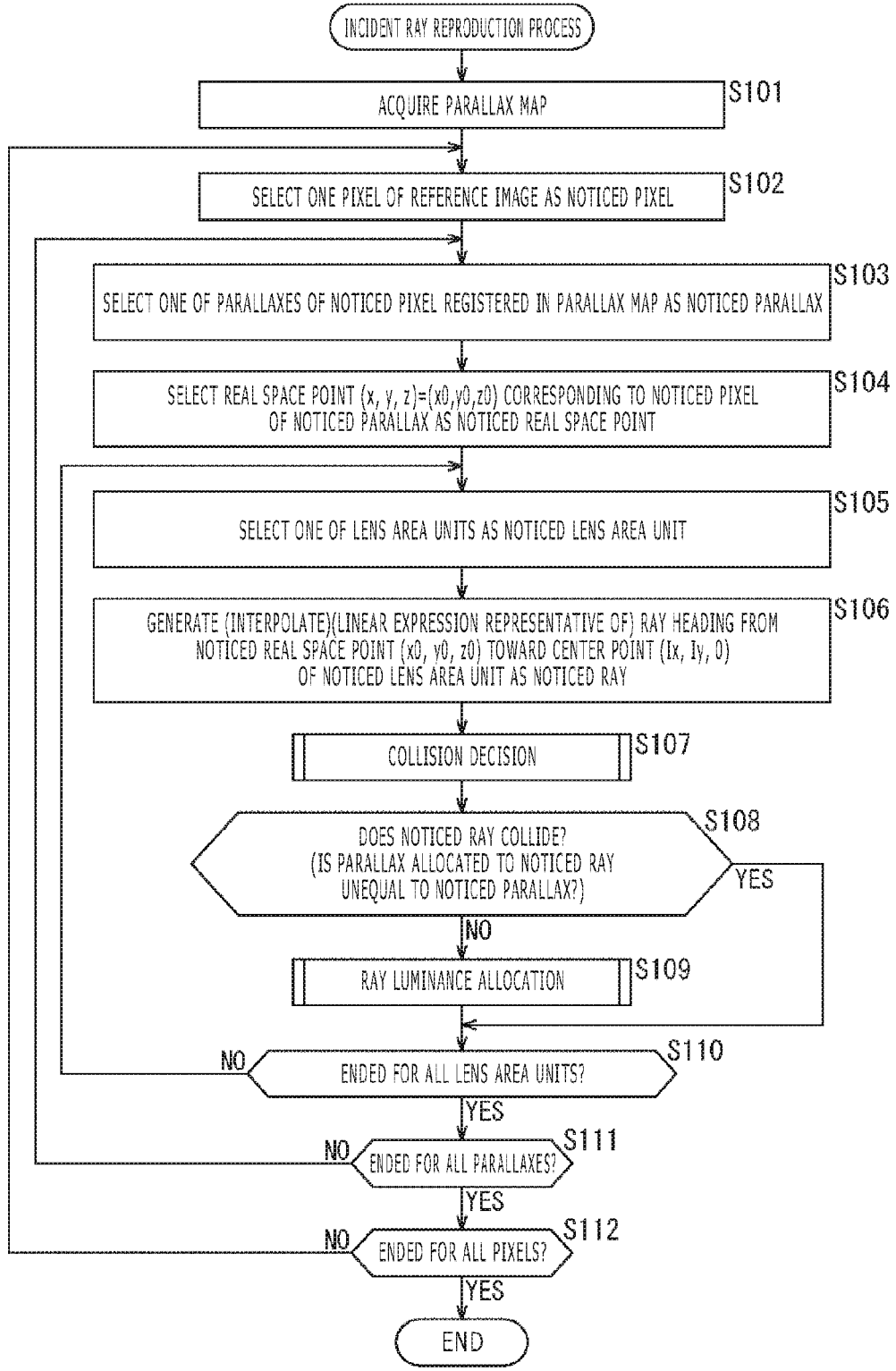
FIG. 33 is a flow chart illustrating an example of the incident ray reproduction process performed by the incident ray reproduction section 36.

FIG. 33 is a flow chart illustrating an example of the incident ray reproduction process performed by the incident ray reproduction section 36 of FIG. 27.

At step S101, the real space point selection section 101, the collision decision section 103 and the luminance allocation section 104 of the incident ray reproduction section 36 (FIG. 27) acquire parallax maps from the parallax information generation section 31. Then, the processing advances to step S102.

At step S102, the real space point selection section 101 selects, from among the pixels of the reference image HD1, one pixel that has not been selected as a noticed pixel as yet as a noticed pixel. Then, the processing advances to step S103.

At step S103, the real space point selection section 101 refers to the parallax maps (multilayer parallax map) from the parallax information generation section 31 to select, from among the parallaxes registered for the noticed pixel, one parallax that has not been selected as a noticed parallax as yet as a noticed parallax. Then, the processing advances to step S104.

At step S104, the real space point selection section 101 selects a real space point (x, y, z)=(x0, y0, z0) corresponding to the noticed pixel of the noticed parallax (noticed pixel having the noticed parallax) as a noticed real space point, and supplies the noticed real space point to the ray generation section 102. Then, the processing advances to step S105.

At step S105, the ray generation section 102 selects, from among the lens area units of the virtual lens (FIG. 30), one lens area unit that has not been selected as a noticed lens area unit as yet as a noticed lens area unit. Then, the processing advances to step S106.

At step S106, the ray generation section 102 generates (a straight line expression of) a ray heading from the noticed real space point (x0, y0, z0) toward the center point (lx, ly, 0) of the noticed lens area unit as a noticed ray and supplies the noticed ray to the collision decision section 103. Then, the processing advances to step S107.

Here, the straight line as a ray heading from the noticed real space point (x0, y0, z0) toward the center point (lx, ly, 0) of the noticed lens area unit is represented by an expression $(x-lx)/(x0-lx)=(y-ly)/(y0-ly)=z/z0$.

At step S107, the collision decision section 103 performs a collision decision taking the noticed ray from the ray generation section 102 as a target. Then, the processing advances to step S108.

At step S108, the luminance allocation section 104 decides on the basis of a decision result of the collision decision (collision decision result) by the collision decision section 103 whether or not the noticed ray collides.

If it is decided at step S108 that the noticed ray does not collide, namely, if, in the collision decision at step S107 by the collision decision section 103, a parallax equal to the parallax corresponding to the noticed real space point (noticed parallax) is allocated to the noticed ray, then the processing advances to step S109.

At step S109, the luminance allocation section 104 performs ray luminance allocation for allocating a luminance to the noticed ray and supplies the allocated luminance to the light condensing processing section 38. Then, the processing advances to step S110.

On the other hand, if it is decided at step S108 that the noticed ray collides, namely, if, in the collision decision at step S107 by the collision decision section 103, a parallax that is not equal to the parallax (noticed parallax) corresponding to the noticed real space point is allocated to the noticed ray, then the processing skips step S109 and advances to step S110.

Accordingly, when a noticed ray collides, the ray luminance allocation at step S109 is not performed for the noticed ray.

At step S110, the ray generation section 102 decides whether or not all of the lens area units of the virtual lens have been selected as a noticed lens area unit.

If it is decided at step S110 that all of the lens area units of the virtual lens have not been selected as a noticed lens area unit, then the processing returns to step S105, and thereafter, similar processes are repeated.

On the other hand, at step S110, if it is decided that all of the lens area units of the virtual lens have been selected as a noticed lens area unit, then the processing advances to step S111.

At step S111, the real space point selection section 101 decides whether or not all of the parallaxes registered for the noticed pixel in the multilayer parallax map have been selected as a noticed parallax.

At step S111, if it is decided that all of the parallaxes registered for the noticed pixel in the multilayer parallax map have not been selected as a noticed parallax as yet, then the process returns to step S103, and thereafter, similar processes are repeated.

On the other hand, if it is decided at step S111 that all of the parallaxes registered for the noticed pixel in the multilayer parallax map have been selected as a noticed parallax, then the processing advances to step S112.

At step S112, the real space point selection section 101 decides whether or not all of the pixels of the reference image HD1 have been selected as a noticed pixel.

If it is decided at step S112 that all of the pixels of the reference image HD1 have not been selected as a noticed pixel as yet, then the processing returns to step S102, and thereafter, similar processes are repeated.

On the other hand, if it is decided at step S112 that all of the pixels of the reference image HD1 have been selected as a noticed pixel, then the incident ray reproduction process is ended.

Figure 34:
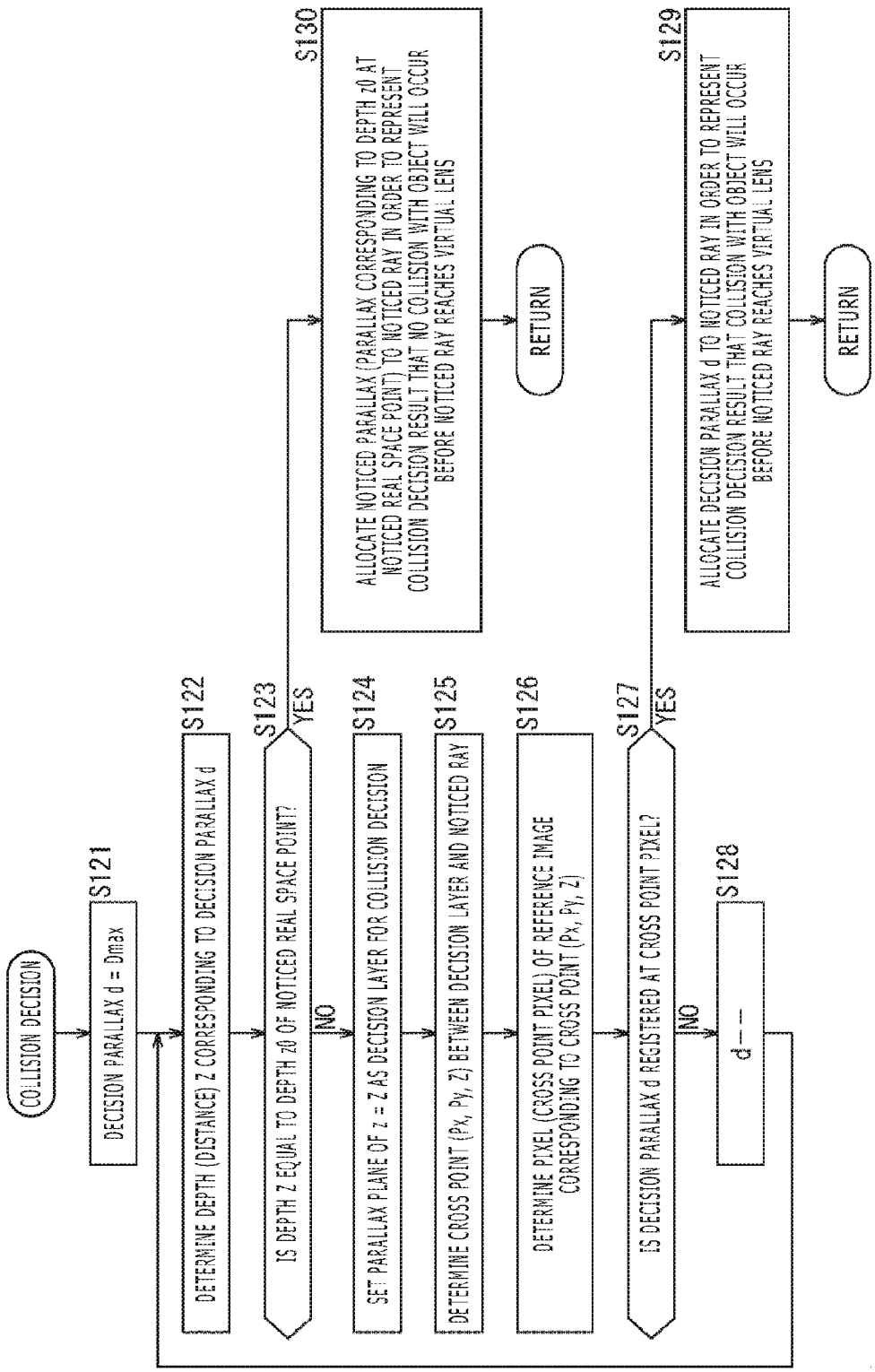
FIG. 34 is a flow chart illustrating an example of a process for collision decision.

FIG. 34 is a flow chart illustrating an example of the process for collision decision at step S107 of FIG. 33.

At step S121, the collision decision section 103 sets the parallax d for collision decision to the maximum value Dmax as an initial value. Then, the processing advances to step S122.

At step S122, the collision decision section 103 determines the depth (distance) Z corresponding to the decision parallax d. Then, the processing advances to step S123.

At step S123, the collision decision section 103 decides whether or not the depth Z corresponding to the decision parallax d is equal to the depth z0 of the noticed real space point (x0, y0, z0).

If it is decided at step S123 that the depth Z corresponding to the decision parallax d is not equal to the depth z0 of the noticed real space point (x0, y0, z0), then the processing advances to step S124.

At steps beginning with step S124, it is confirmed whether or not the noticed ray heading from the noticed real space point (x0, y0, z0) toward the center point (lx, ly, 0) of the noticed lens area unit collides with an object at the depth Z corresponding to the decision parallax d.

In particular, at step S124, the collision decision section 103 sets a plane represented by an expression z=Z, namely, a plane perpendicular to the optical axis at the position of the depth Z, as a decision layer as a plane for collision decision. Then, the processing advances to S125.

Here, the plane represented by the expression z=Z, which is perpendicular to the optical axis at the depth (distance) Z corresponding to the parallax d, is hereinafter referred to also as parallax plane of z=Z. At step S124, the parallax plane of z=Z is set as a decision layer.

At step S125, the collision decision section 103 determines a cross point (Px, Py, Z) between the noticed ray and the decision layer. Then, the processing advances to step S126.

Here, the straight line as the noticed ray is represented by $(x-lx)/(x0-lx)=(y-ly)/(y0-ly)=z/z0$ as described hereinabove with reference to FIG. 33.

Accordingly, the x coordinate and the y coordinate of the noticed ray are represented by an expression $x=z/z0(x0-lx)+lx$ and another expression $y=z/z0(y0-ly)+ly$, respectively.

By substituting Z into the expression $x=z/z0(x0-lx)+lx$ and the expression $y=z/z0(y0-ly)+ly$, the x coordinate and the y coordinate of the noticed ray on the decision layer represented by the expression z=Z, namely, the x coordinate Px and the y coordinate Py of the cross point (Px, Py, Z) between the noticed ray and the decision layer, can be determined.

Accordingly, the x coordinate Px and the y coordinate Py can be determined in accordance with the expression $x=Z/z0(x0-lx)+lx$ and the expression $y=Z/z0(y0-ly)+ly$, respectively.

At step S126, the collision decision section 103 determines a pixel of the reference image corresponding to the cross point (Px, Py, Z) between the noticed ray and the decision layer (the pixel is hereinafter referred to also as cross point pixel). Then, the processing advances to step S127.

At step s127, the collision decision section 103 decides whether or not the decision parallax d is registered at (the position of) the cross point pixel in the multilayer parallax map (whether or not the parallax registered for the cross point pixel is equal to the decision parallax d).

If it is decided at step S127 that the decision parallax d is not registered at the cross point pixel, namely, if no object exists at the cross point (Px, Py, Z) between the noticed ray and the decision layer and the noticed ray does not collide with the cross point (Px, Py, Z), then the processing advances to step S128.

At step S128, the collision decision section 103 decrements (decreases) the decision parallax d by 1. Then, the processing returns to step S122, and thereafter, similar processes are repeated.

Here, as the decision parallax d is decreased at step S128, the decision layer moves from the position nearest to the virtual lens corresponding to the maximum value Dmax of the parallax toward the noticed real space point (x0, y0, z0).

On the other hand, if it is decided at step S127 that the decision parallax d is registered for the cross point pixel, namely, if an object exists at the cross point (Px, Py, Z) between the noticed ray and the decision layer and the noticed ray collides at the noticed point (Px, Py, Z), then the processing advances to step S129.

At step S129, the collision decision section 103 allocates the decision parallax d to the noticed ray in order to represent the collision decision result that the noticed ray collides with an object before it reaches the virtual lens. Then, the processing returns.

On the other hand, if it is decided at step S123 that the depth Z corresponding to the decision parallax d is equal to the depth z0 of the noticed real space point (x0, y0, z0), namely, if the noticed ray does not collide with an object while the decision layer moves from the position nearest to the virtual lens corresponding to the maximum value Dmax of the parallax to the noticed real space point (x0, y0, z0), then the processing advances to step S130.

At step S130, the collision decision section 103 allocates, in order to represent the collision decision result that the noticed ray does not collide with an object before it reaches the virtual lens, the noticed parallax (this also is the decision parallax d at this point of time), namely, the parallax d corresponding to the noticed real space point (x0, y0, z0) to the noticed ray. Thereafter, the processing returns.

It is to be noted that, while, in FIG. 34, the maximum value Dmax of the parallax is used as an initial value and the decision parallax is successively decremented from the initial value to a parallax of a goal that corresponds to the noticed real space point (x0, y0, z0), the value of the decision parallax may be changed in any manner over the range of the maximum value Dmax of the parallax to the parallax corresponding to the noticed real space point (x0, y0, z0).

Figure 35:
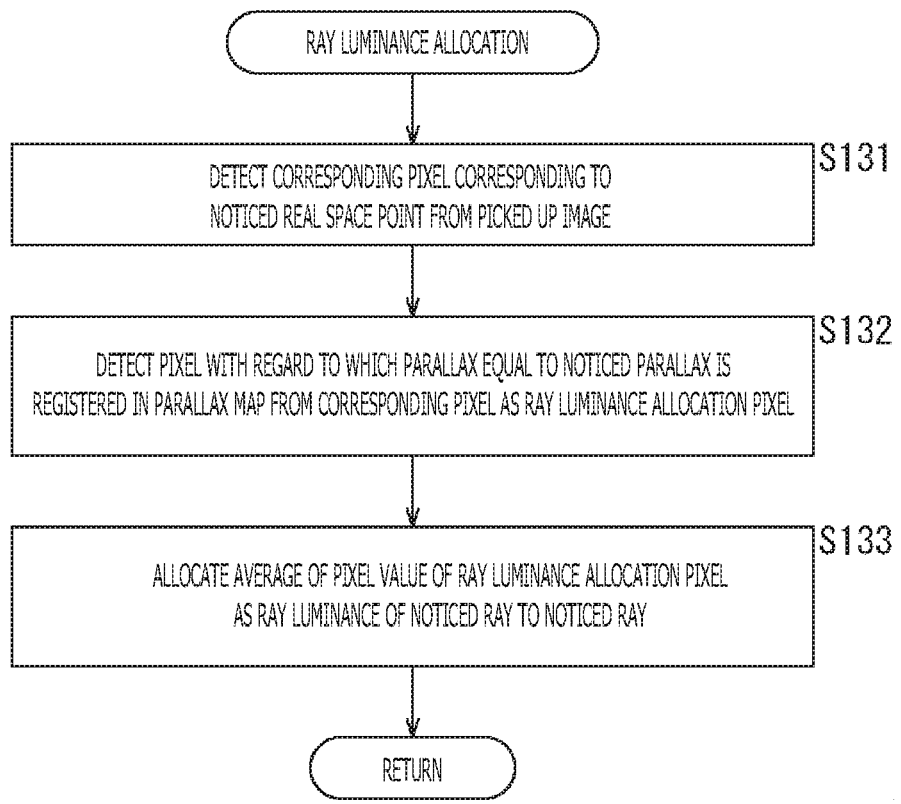
FIG. 35 is a flow chart illustrating an example of a process for ray luminance allocation.

FIG. 35 is a flow chart illustrating an example of the process for ray luminance allocation at step S109 of FIG. 33.

At step S131, the luminance allocation section 104 detects a corresponding pixel corresponding to the noticed real space point (x0, y0, z0) from each of the picked up images HD1 to HD7 of the seven visual points. Then, the processing advances to step S132.

At step S132, the luminance allocation section 104 refers, for example, to the parallax maps of the picked up images HD1 to HD7 to detect, from among the corresponding pixels of the picked up images HD1 to HD7, the parallax d corresponding to the depth z0 of the noticed real space point (x0, y0, z0), namely, a pixel for which a parallax coincident with the target parallax is registered, as a ray luminance allocation pixel to be used for allocation of a luminance. Then, the processing advances to step S133.

At step S133, the luminance allocation section 104 allocates, for example, an average value of the pixel values (values of R, G and B) of the ray luminance allocation pixel as a luminance of a ray to the noticed ray. Then, the processing returns.

In this manner, in the incident ray reproduction section 36 (FIG. 27), the ray generation section 102 generates a straight line as a ray that is incident to the virtual lens, which has a synthetic aperture provided by the camera unit $21_1$ to $21_7$ of the seven visual points configuring the image pickup apparatus 11, from a real space point with regard to which a parallax is registered in the multilayer map, namely, from a point on an object existing in a real space whose image pickup is to be performed by the image pickup apparatus 11. In other words, the incident ray reproduction section 36 determines a straight line that describes, as a ray incident to the virtual lens from the real space point, the ray geometrically.

Further, in the incident ray reproduction section 36, the collision decision section 103 performs a collision decision for deciding whether or not a ray collides with an object before it enters the virtual lens.

Then, in the incident ray reproduction section 36, the luminance allocation section 104 allocates a luminance to rays that remain as a result of the collision decision using the picked up images HD1 to HD7 of the seven visual points picked up by the camera units $21_1$ to $21_7$.

Accordingly, it is possible to use the picked up images HD1 to HD7 of the seven visual points to reproduce a ray group incident to the virtual lens and hence to the emulation lens.

In other words, by making, for example, a so-called front lens that configures the emulation lens correspond to the virtual lens, a ray group incident to the virtual lens becomes a ray group that enters the emulation lens. Accordingly, by reproducing a ray group to be incident to the virtual lens, a ray group that is to enter the emulation lens can be reproduced.

As a result, a blur degree originating from that a ray group incident to the emulation lens is condensed by the emulation lens can be reproduced by a light condensing process hereinafter described.

<Generation of Lens Information>

FIG. 36 is a view illustrating lens information generated by the emulation lens information generation section 37 of FIG. 3.

As the lens information (emulation lens information), a PSF intensity distribution, an image plane pitch, PSF angle component information and image plane shift information are available.

The PSF intensity distribution represents a response of the emulation lens to rays emitted from a point light source.

The image plane pitch represents a scale of the PSF intensity distribution.

The PSF angle component information represents a position of the PSF intensity distribution when a ray emitted from a point light source reaches through the emulation lens.

The image plane shift information represents the image plane shift position that is a position on the virtual sensor that is reached, from among rays emitted from a real space point, by a principal ray through the emulation lens.

FIG. 37 is a view illustrating a real space point and a focus position that become a target for generation of lens information.

In particular, FIG. 37 is a schematic side elevational view when a real space whose image is to be picked up by a camera unit $21_i$ configuring the image pickup apparatus 11 as the virtual lens is viewed from the right with respect to the front of the image pickup apparatus.

The lens information is information that defines rays that pass the emulation lens, and the rays are emitted from a real space point.

Further, although the rays that pass the emulation lens are condensed on the virtual sensor, the manner of condensing of rays differs depending upon the focus position (focal length) f of the emulation lens.

Accordingly, the lens information can be generated as the number of pieces of information equal to a maximum number of real space points to be handled at most by the image processing apparatus 12 (FIG. 3) (the number is hereinafter referred to as maximum real space point number) for each focus position f of the emulation lens.

Now, it is assumed that the reference image HD1 is configured from N pixels pix1, pix2, . . . , pix#N and the number of parallaxes d that can be registered into a parallax map (multilayer parallax map) is an integral value of DPN=Dmax−Dmin+1 in one pixel increments from the minimum value Dmin to the maximum value Dmax as described hereinabove with reference to FIG. 32.

In this case, the maximum real space point number is N×DPN.

Further, it is assumed now that the focus position f of the emulation lens can assume Fmax positions of f1, f2, . . . , f#Fmax.

In this case, the lens information can be formed as information of Fmax×N×DPN pieces at most.

Here, in the present embodiment, the size (scale) of the virtual sensor is defined on the basis of the emulation lens.

For example, where the emulation lens is an optical lens for an image sensor of the 35 mm full size, the size of the virtual sensor is set to the 35 mm full size on the basis of such an emulation lens as just described. In particular, the horizontal and vertical sizes of the virtual sensor are set, for example, to 36 mm and 24 mm, respectively.

Furthermore, in the present embodiment, the pixel pitch of the virtual sensor is defined on the basis of the number of pixels (resolution) of a reference image such that the virtual sensor has the number of pixels equal to the number of pixels of the reference image (or the number of pixels smaller than the number of pixels of the reference image).

For example, where the emulation lens is an optical lens for an image sensor of the 35 mm full size and the number of pixels of the reference image in the horizontal direction is Nx, since the horizontal size of the virtual sensor is 36 mm as described above, the pixel pitch of the virtual sensor is 36 mm/Nx.

It is to be noted that a certain real space point (X, Y, Z) corresponds to a certain pixel of a reference image having a parallax d=D corresponding to the depth z=Z.

Further, since the pixel pitch of the virtual sensor is defined on the basis of the number of pixels (resolution) of the reference image, the pixels of the virtual sensor can be made correspond to the pixels of the reference image. Where the virtual sensor has the number of pixels equal to the number of pixels of the reference image, a pixel of the reference image and a pixel of the virtual sensor positioned at the same position as that of the pixel correspond to each other.

Further, if the parallax of a certain pixel of the reference image is adopted as it is as the parallax of a pixel of the virtual sensor corresponding to the pixel, then the real space point (X, Y, Z) corresponds to a certain pixel of the virtual sensor having a parallax d=D corresponding to the depth z=Z.

In this case, the lens information in regard to a certain real space point can be considered lens information regarding a combination of a pixel (position) and a parallax of the virtual sensor corresponding to the real space point.

Figure 38:
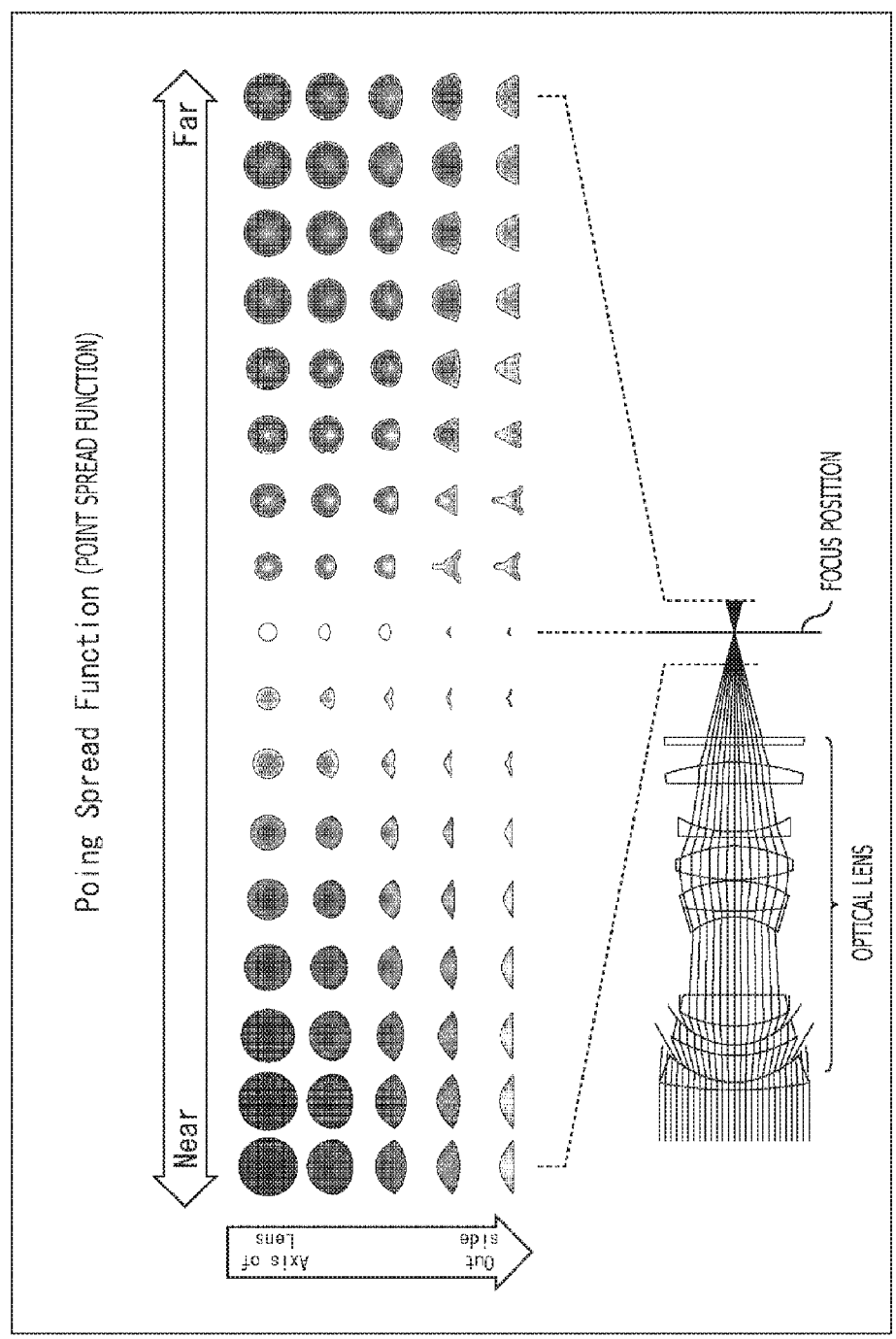
FIG. 38 is a view depicting an example of a PSF (Point Spread Function) intensity distribution of an optical lens.

FIG. 38 is a view depicting an example of a PSF intensity distribution of a certain optical lens.

Referring to FIG. 38, the horizontal direction represents the focus position f of the optical lens and the vertical direction indicates an image height that is a distance of an image formation position on an image formation plane, on which light from the optical lens forms an image, from the optical center.

Here, the image formation plane corresponds to the plane of the virtual sensor. Meanwhile, regarding the horizontal direction of FIG. 38, the leftward direction represents the focus position f near to the optical lens and the rightward direction represents the focus position f far from the optical lens. Furthermore, regarding the vertical direction of FIG. 38, the upward direction represents a small image height and the downward direction represents a great image height.

As depicted in FIG. 38, the PSF intensity distribution differs depending upon the focus position f of the optical lens.

Further, the PSF intensity distribution differs depending upon the image height of the image formation position, namely, upon the position on the plane of the virtual sensor.

Further, the PSF intensity distribution differs also depending upon the distance from the principal point of the optical lens to the image pickup object (here, a point light source), namely, upon the parallax of the image pickup object.

Accordingly, the PSF intensity distribution differs depending, for example, upon a set of the focus position f, (the position of) the pixel of the virtual sensor and the parallax of the image pickup object.

Figure 39:
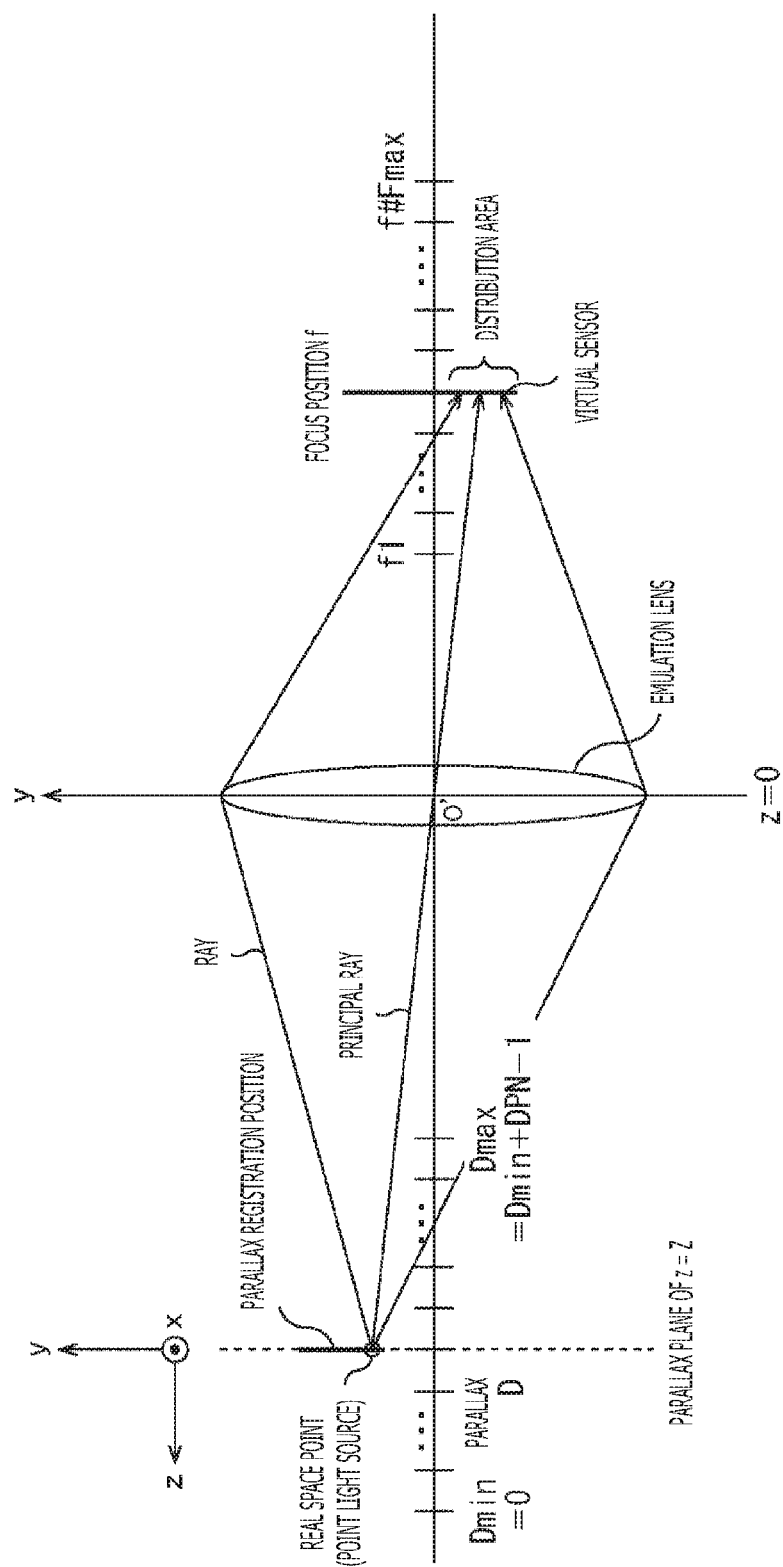
FIG. 39 is a view illustrating an example of a method for generating a PSF intensity distribution.

FIG. 39 is a view illustrating an example of a method for generating a PSF intensity distribution.

FIG. 39 depicts an outline where a real space whose image is picked up by a camera unit $21_i$ configuring the image pickup apparatus 11 as the virtual lens is viewed from the right with respect to the front of the image pickup apparatus similarly as in FIG. 37.

The emulation lens information generation section 37 generates a PSF intensity distribution for a real space point corresponding to each of a maximum real space point number N×DPN of real space points, namely, for each of combinations of a maximum number N of pixels configuring the virtual sensor and DPN parallaxes d that can be registered into a multilayer parallax map for each of the Fmax focus positions f at most.

Here, the maximum number N of the pixels configuring the virtual sensor is equal to the number N of the pixels pix1 to pix#N configuring the reference image HD1. As described hereinabove with reference to FIG. 37, in the present embodiment, the virtual sensor is configured from N pixels of the pixels pix1 to pix#N similarly to the reference image HD1 in order to simplify the description.

The emulation lens information generation section 37 sets a point light source to a real space point and performs ray tracing for tracing a ray emitted from the point light source set to the real space point using lens design data of the emulation lens to generate a PSF intensity distribution.

In the ray tracing, setting a ray emitted from the point light source as an incident vector, a cross point between the incident vector and a refractive surface at the most image pickup object side of the emulation lens is calculated, and a vector when the incident vector as a ray incident from the cross point is refracted by and emitted from the refractive surface is calculated as an outgoing vector.

Further, in the ray tracing, using the outgoing vector as an incident vector to a next refractive surface, a cross point between the incident vector and the next refractive surface is calculated.

In the ray tracing, such processes as described above are repeated up to the last refractive surface of the emulation lens.

Then, the emulation lens information generation section 37 observes the outgoing vector emitted from the last refractive surface of the emulation lens on the virtual sensor and records the light intensity of the ray as the outgoing vector obtained as a result of the observation to generate a PSF intensity distribution.

It is assumed now that, in the emulation lens information generation section 37, a rectangular area having a center (center of gravity) at a position of the virtual sensor when a principal ray emitted from (the point light source of) the real space point, namely, a principal ray that is a ray that passes the principal point O of the emulation lens from among rays emitted from the real space point, reaches the virtual sensor is referred to as distribution area.

As the distribution area, for example, a rectangular area that is centered at a principal ray emitted from the real space point and is a minimum (or close to the minimum) rectangular area that surrounds points on the virtual sensor reached by rays emitted from the real space point through the emulation lens can be adopted. Further, it is assumed that the distribution area is an area into which information can be recorded with a resolution of PX×PY by width×length. For PX and PY, for example, 255 can be adopted.

The emulation lens information generation section 37 records light intensities, which become a PSF intensity distribution, in the resolution of PX×PY by width×length into the distribution area to generate a PSF intensity distribution.

Figure 40:
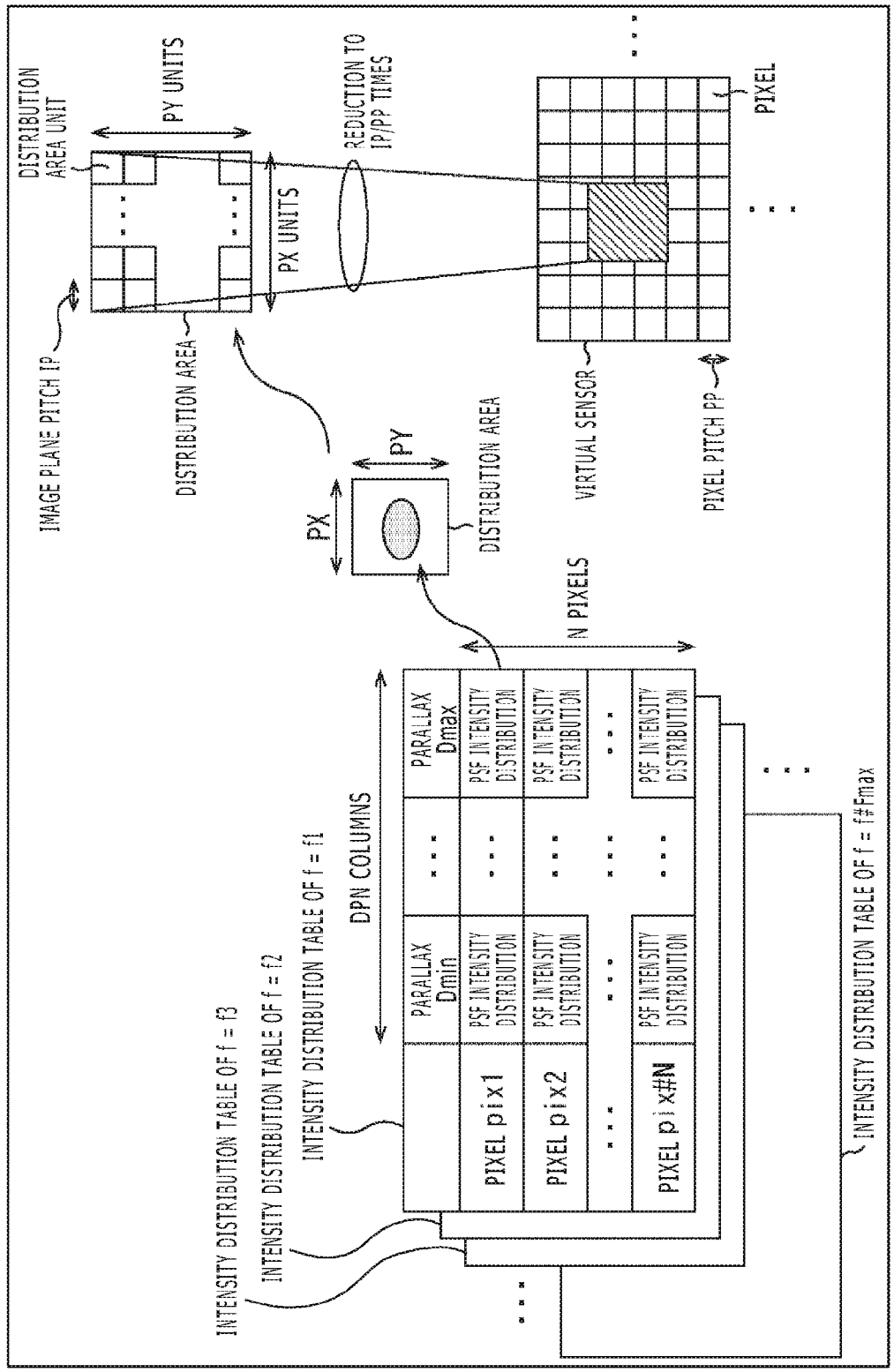
FIG. 40 is a view schematically depicting a PSF intensity distribution generated by the emulation lens information generation section 37.

FIG. 40 is a view schematically depicting a PSF intensity distribution generated by the emulation lens information generation section 37.

As described hereinabove with reference to FIG. 39, the PSF intensity distribution is generated for a real space point corresponding to each of N×DPN combinations of N pixels pix1 to pix#N configuring the virtual sensor and DPN parallaxes d that can be registered into a parallax map for each of the Fmax focus positions f at most.

It is assumed now that a table in which the horizontal direction indicates DPN parallaxes d while the vertical direction indicates N pixels pix1 to pix#N configuring the virtual sensor and in which a PSF intensity distribution for a real space point corresponding to a combination of a certain parallax d and a certain pixel pix#n is registered is referred to as intensity distribution table for the focus position f, as illustrated in FIG. 40.

The emulation lens information generation section 37 generates an intensity distribution table for each of the Fmax focus positions f.

The PSF intensity distribution registered in the intensity distribution table is recorded in a resolution of PX×PY by width×length in the distribution area as described hereinabove with reference to FIG. 39.

Accordingly, when PSF intensity distributions are recorded into arrays, the number of arrays of the PSF intensity distributions is Fmax×N×DPN×PX×PY at most.

Here, in the distribution area, a unit in which one light intensity of a PSF intensity distribution is recorded (unit of sampling of a PSF intensity distribution) is referred to as distribution area unit. The distribution area unit can be conceived, for example, as an area of a square shape.

Since the distribution area is a minimum square area surrounding a point on the virtual sensor reached by a ray emitted from a real space point as described hereinabove with reference to FIG. 39, it has a variable size.

Further, as described hereinabove with reference to FIG. 38, the PSF intensity distribution differs depending upon the focus position f, image height of the image formation position (distance between the real space point (point light source) and the optical axis) and the distance (parallax) to the image pickup object (real space point (point light source)).

Also the size (scale) of the minimum distribution area surrounding such a PSF intensity distribution as described above differs for each PSF intensity distribution.

In the light condensing process, as will be described later, an emulation image is generated by adding image formation values of rays that form an image on the virtual sensor according to the PSF intensity distributions recorded in distribution areas of different sizes.

Upon addition of image formation values according to PSF intensity distributions, it is necessary to make the scale of distributions of image formation values according to PSF intensity distributions recorded in distribution areas of different sizes coincide with the scale of the virtual sensor. Further, to this end, information representative of the scale of the PSF intensity distributions is required.

Therefore, the emulation lens information generation section 37 determines an image plane pitch that is a size (pitch) of distribution area units configuring a distribution area in which a PSF intensity distribution is recorded as information representative of the PSF intensity distribution.

If it is assumed now that the image plane pitch is IP and the pixel pitch of the virtual sensor is PP, then in the light condensing process, distributions of image formation values of rays determined from a PSF intensity distribution are reduced (or expanded) to IP/PP times and added on the virtual sensor.

It is to be noted that a PSF intensity distribution can be recorded not in a variable size but in a resolution of PX×PY in a distribution area of a fixed size.

Where the PSF intensity distribution is recorded in a distribution area not of a variable size but of a fixed size, only one image plane pitch is required for the fixed size.

However, since it is necessary to adjust the fixed size of a distribution area to a PSF intensity distribution that is spread most from the reaching position of a principal ray on the virtual sensor, the resolution of a PSF intensity distribution having a narrow distribution is degraded.

Figure 41:
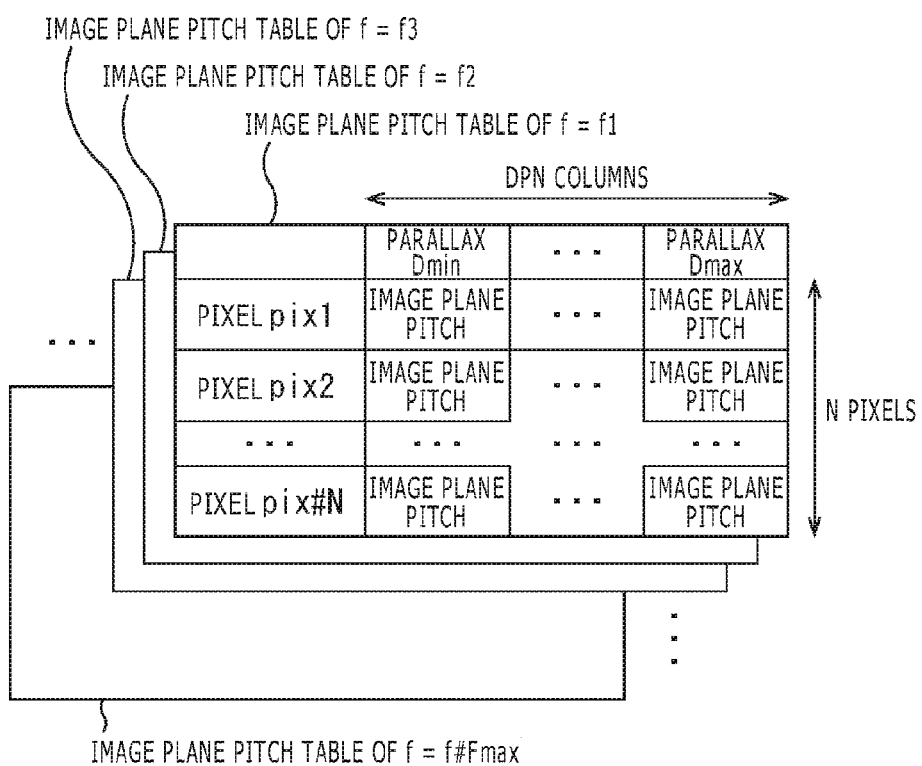
FIG. 41 is a view schematically depicting an image plane pitch generated by the emulation lens information generation section 37.

FIG. 41 is a view schematically depicting an image plane pitch generated by the emulation lens information generation section 37.

The image plane pitch is generated for each one PSF intensity distribution.

Now, it is assumed that a table in which the horizontal direction indicates DPN parallaxes d while the vertical direction indicates N pixels pix1 to pix#N configuring the virtual sensor and in which an image plane pitch of a PSF intensity distribution for a real space point corresponding to a combination of a certain parallax d and a certain pixel pix#n is registered, for example, as depicted in FIG. 41 is referred to as image plane pitch table for the focus position f.

The emulation lens information generation section 37 generates an image plane pitch table for each of Fmax focus positions f.

Accordingly, where image plane pitches are recorded into arrays, the number of arrays of image plane pitches is Fmax×N×DPN at most.

Figure 42:
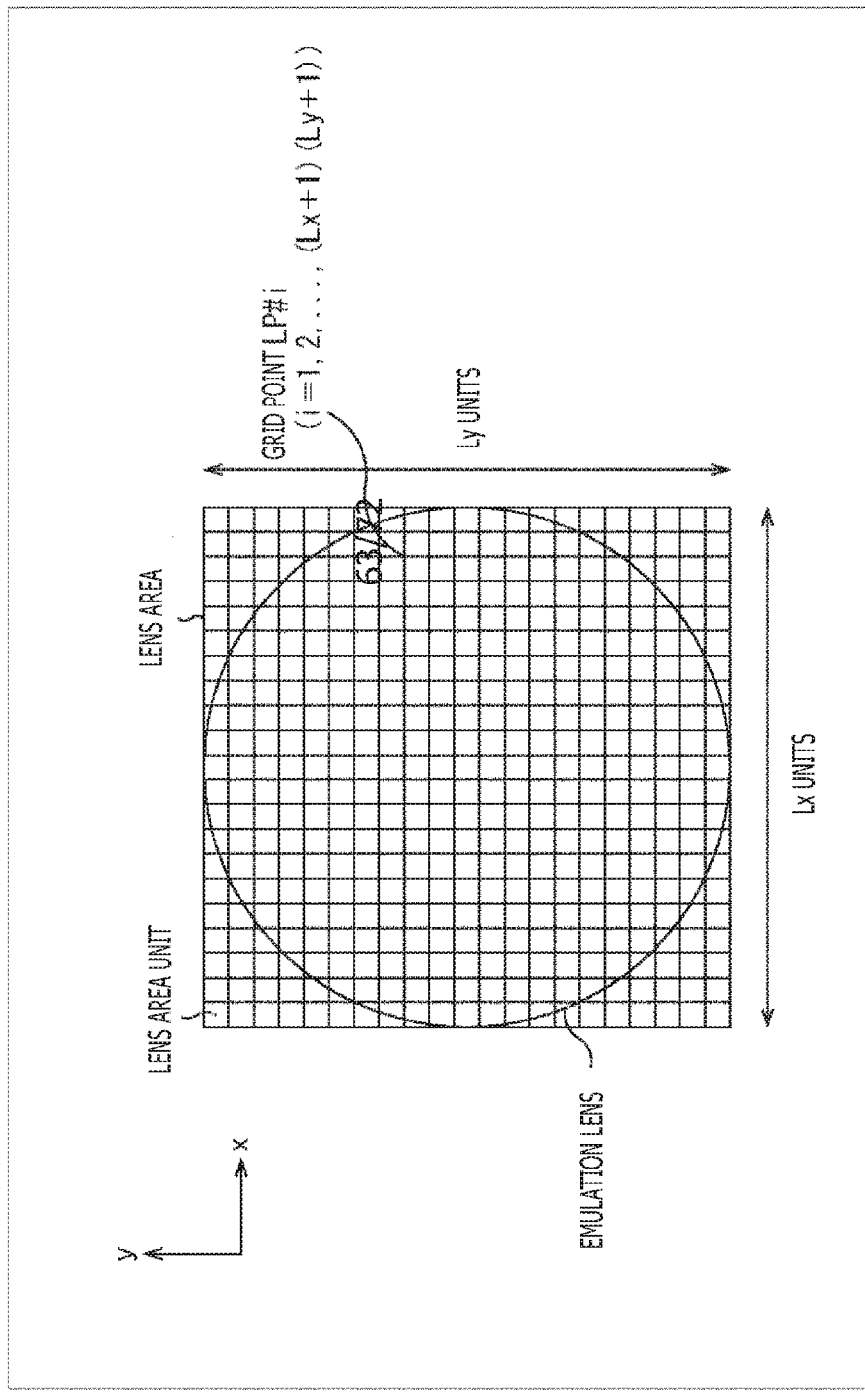
FIG. 42 is a view illustrating an example of a method for generating PSF angle component information.

FIG. 42 is a view illustrating an example of a method for generating PSF angle component information.

In particular, FIG. 42 is a front elevational view when the emulation lens is viewed from the front (image pickup object side).

The emulation lens information generation section 37 performs, for example, when the ray generation section 102 described hereinabove with reference to FIG. 30 generates rays, a process similar to that performed for the virtual lens for the emulation lens.

In particular, the emulation lens information generation section 37 sets, for example, an area including the front lens of the emulation lens as a lens area.

In FIG. 42, for example, a minimum rectangular area surrounding the front lens of the emulation lens is set as a lens area.

The emulation lens information generation section 37 divides (the emulation lens surrounded by) the lens area into lens area units of small regions. Then, the emulation lens information generation section 37 considers a real space point as a point light source and determines PSF angle component information representative of a position of a PSF intensity distribution reached by rays incident to the lens area units from the real space point as the point light source through the emulation lens.

In FIG. 42, the lens area is divided into totaling Lx×Ly lens area units including Lx lens area units in the horizontal direction and Ly lens area units in the vertical direction similarly as in the case of the virtual lens of FIG. 30.

Also in FIG. 42, a grid point that is a cross point between a straight line in the horizontal direction and another straight line in the vertical direction by which the lens area surrounding the emulation lens is divided into the lens area units is represented also as grid point LP#i (i=1, 2, . . . , (Lx+1) (Ly+1)) similarly as in the case of FIG. 30.

Here, it is assumed that, in the present embodiment, in order to simplify the description, the diameter is coincident between (the synthetic aperture of) the virtual lens and (the aperture of) the front lens of the emulation lens and also the size of the lens area and the division number Lx×Ly of the lens area are coincident between the virtual lens and the emulation lens.

It is to be noted that, since the light condensing process is performed using rays incident to the emulation lens, only it is necessary for the virtual lens to have a diameter equal to or greater than the diameter of the emulation lens.

Further, in order to make rays incident to the virtual lens and rays incident to the emulation lens correspond to each other, the lens area units of the virtual lens and the lens area units of the emulation lens are made coincide (in size) with each other.

FIG. 43 is a view illustrating an example of a method for generating PSF angle component information.

FIG. 43 depicts an outline where a real space whose image is picked up by a camera unit $21_i$ configuring the image pickup apparatus 11 as the virtual lens is viewed from the right with respect to the front of the image pickup apparatus similarly to FIG. 37.

The emulation lens information generation section 37 generates PSF angle component information for a real space point corresponding to each of a maximum real space point number N×DPN of real space points, namely, for each of combinations of a maximum number N of pixels configuring the virtual sensor and DPN parallaxes d that can be registered into a multilayer parallax map for each of the Fmax focus positions f at most.

The emulation lens information generation section 37 determines a reaching point AP#i at which a ray emitted from (the point light source of) the real space point and incident to the grid point LP#i of the emulation lens reaches the virtual sensor.

Then, the emulation lens information generation section 37 converts the reaching point AP#i of the virtual sensor into a point on (the distribution area) of the PSF intensity distribution and determines a set (in position) of the distribution area reaching point AP#i (distribution area unit reached by the ray) obtained by the conversion and the grid point LP#i as PSF angle component information.

It is to be noted that a ray emitted form a real space point and incident to the emulation lens may not necessarily reach the virtual sensor. In other words, among rays incident to the emulation lens, such rays as not reach the virtual sensor (are not received by the virtual sensor) as indicated by a broken line arrow mark in FIG. 43 exists.

Figure 44:
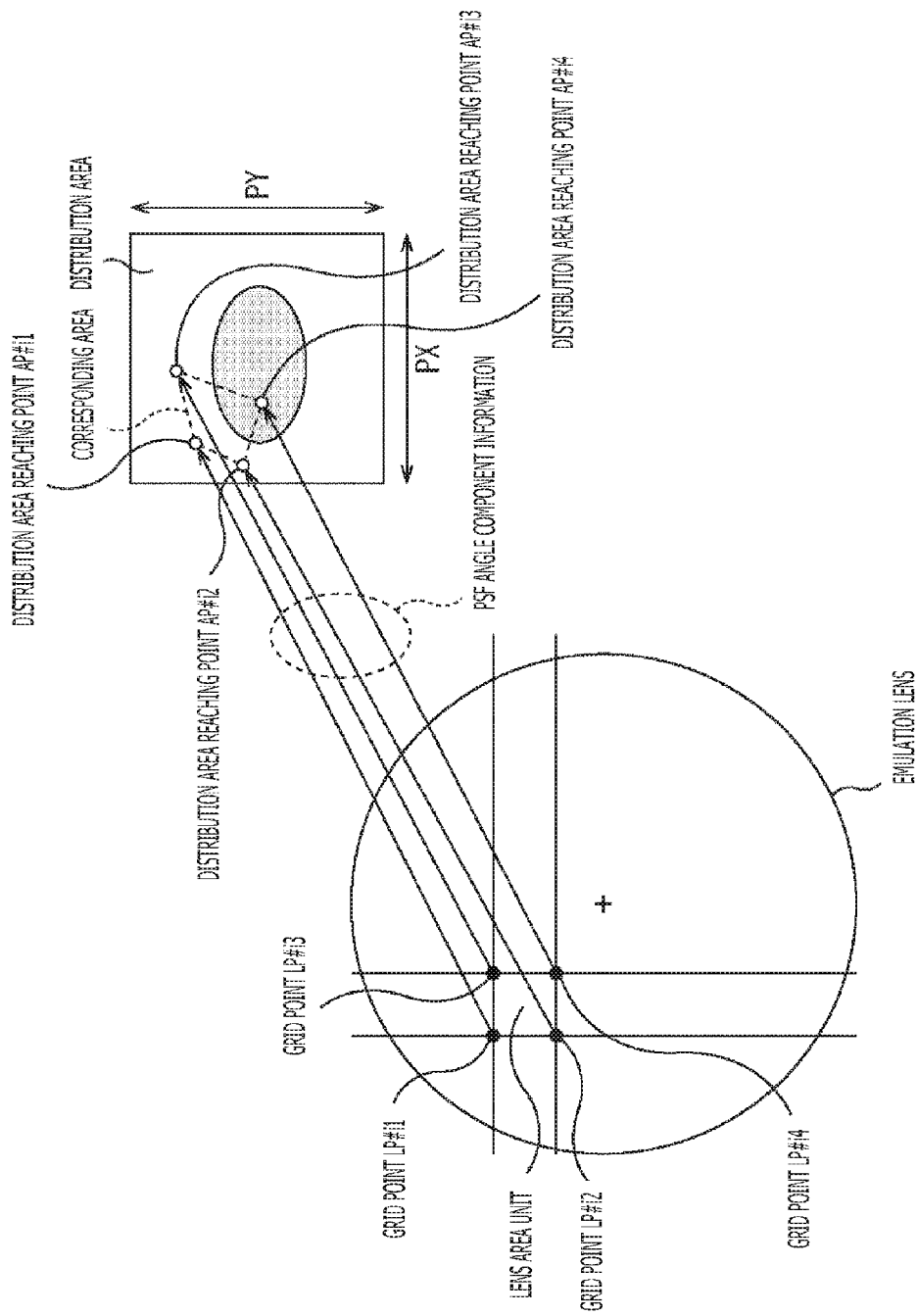
FIG. 44 is a view illustrating details of the PSF angle component information.

FIG. 44 is a view illustrating details of PSF angle component information.

The emulation lens information generation section 37 determines, for four grid points LP#i1, LP#i2, LP#i3 and LP#i4 that are four vertices of the lens area unit of the emulation lens, distribution area reaching points AP#i1, AP#i2, AP#i3 and AP#i4 that are reaching points on the PSF intensity distribution reached by rays emitted from the real space point and passing the grid points LP#i1, LP#i2, LP#i3 and LP#i4, respectively.

Then, the emulation lens information generation section 37 generates the set of the four grid points LP#i1, LP#i2, LP#i3 and LP#i4 that are the four vertices of the lens area unit of the emulation lens and the distribution area reaching points AP#i1, AP#i2, AP#i3 and AP#i4 as PSF angle component information representative of an area (position) of a PSF intensity distribution reached by rays that pass the lens area unit whose vertices are the four grid points LP#i1, LP#i2, LP#i3 and LP#i4.

After all, the PSF angle component information is a set of a distribution area reaching point AP#i and a grid point LP#i when a ray incident to the grid point LP#i of the emulation lens reaches the distribution area reaching point AP#i through the emulation lens.

Here, the area of the PSF intensity distribution reached by a ray passing the lens area unit is referred to also as corresponding area.

In FIG. 44, the corresponding area is a quadrangular region having vertices at the distribution area reaching points AP#i1, AP#i2, AP#i3 and AP#i4.

The granularity (resolution) of the distribution area reaching points AP#i is a size of the distribution area unit (FIG. 40) of the distribution area in which a PSF intensity distribution is recorded. In particular, the distribution area reaching points AP#i represent a position of a certain distribution area unit of a distribution area.

Figure 45:
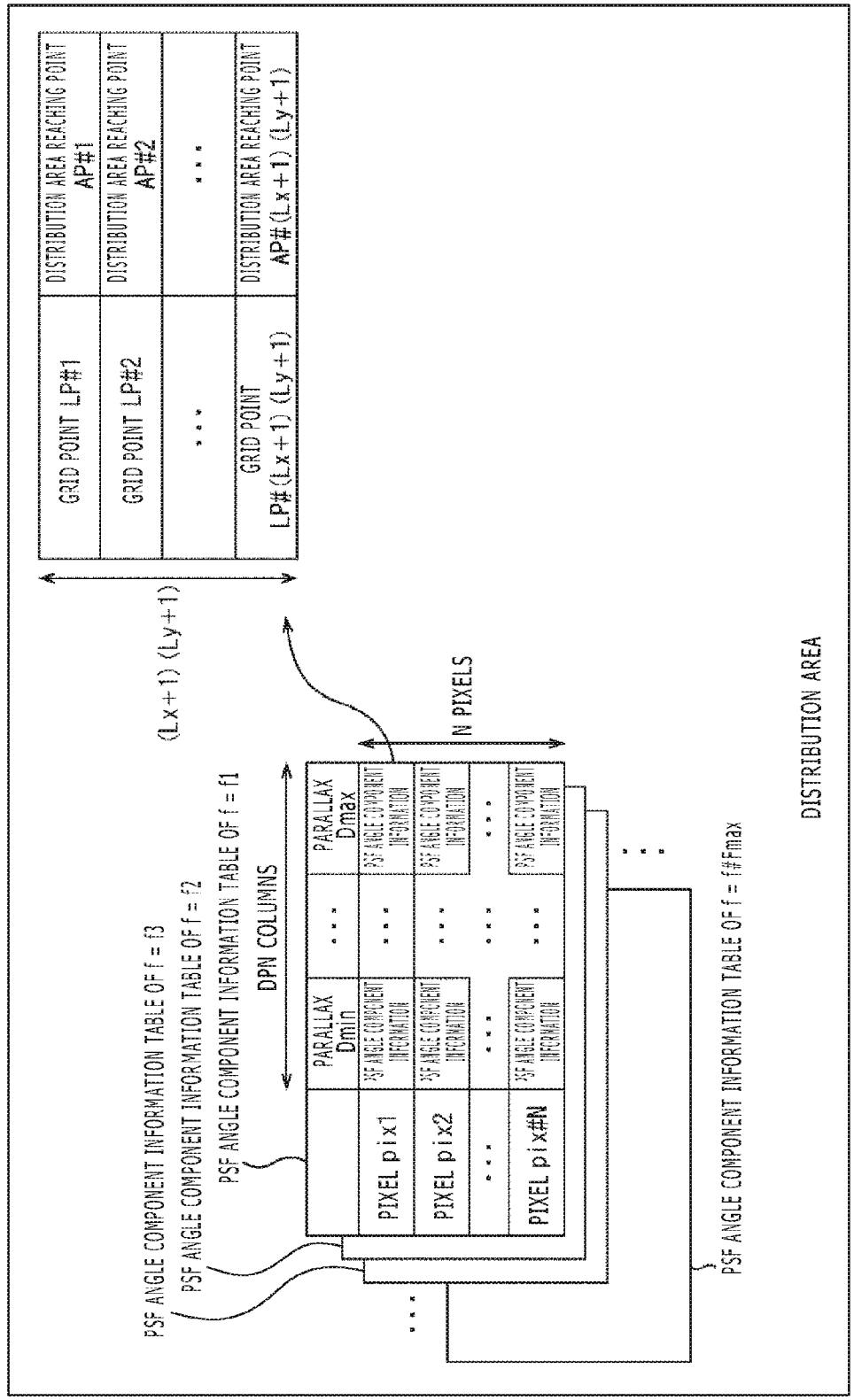
FIG. 45 is a view schematically depicting PSF angle component information generated by the emulation lens information generation section 37.

FIG. 45 is a view schematically depicting PSF angle component information generated by the emulation lens information generation section 37.

The PSF angle component information is generated for real space points corresponding to N×DPN combinations of the N pixels pix1 to pix#N configuring the virtual sensor and DPN parallaxes d that can be registered into a parallax map for each of the Fmax focus positions f at most.

Now, a table in which the horizontal direction indicates DPN parallaxes d while the vertical direction indicates N pixels pix1 to pix#N configuring the virtual sensor and in which PSF angle component information for a real space point corresponding to a combination of a certain parallax d and a certain pixel pix#n is registered, for example, as depicted in FIG. 45 is referred to as PSF angle component information table for the focus position f.

The emulation lens information generation section 37 generates a PSF angle component information table for each of the Fmax focus positions f.

The PSF angle component information registered in the PSF angle component information table is a set of a grid point LP#i of the emulation lens and a distribution area reaching point AP#i on the distribution area of the PSF intensity distribution reached by a ray incident to the grid point LP#i through the emulation lens.

In the present embodiment, since the lens area of the emulation lens is divided into PX×PY lens area units as described hereinabove with reference to FIG. 42, the number of grid points LP#i is (Lx+1) (Ly+1).

Accordingly, where the PSF angle component information is recorded into arrays, the number of arrays of the PSF angle component information is Fmax×N×DPN×(PX+1)×(PY+1) at most.

Figure 46:
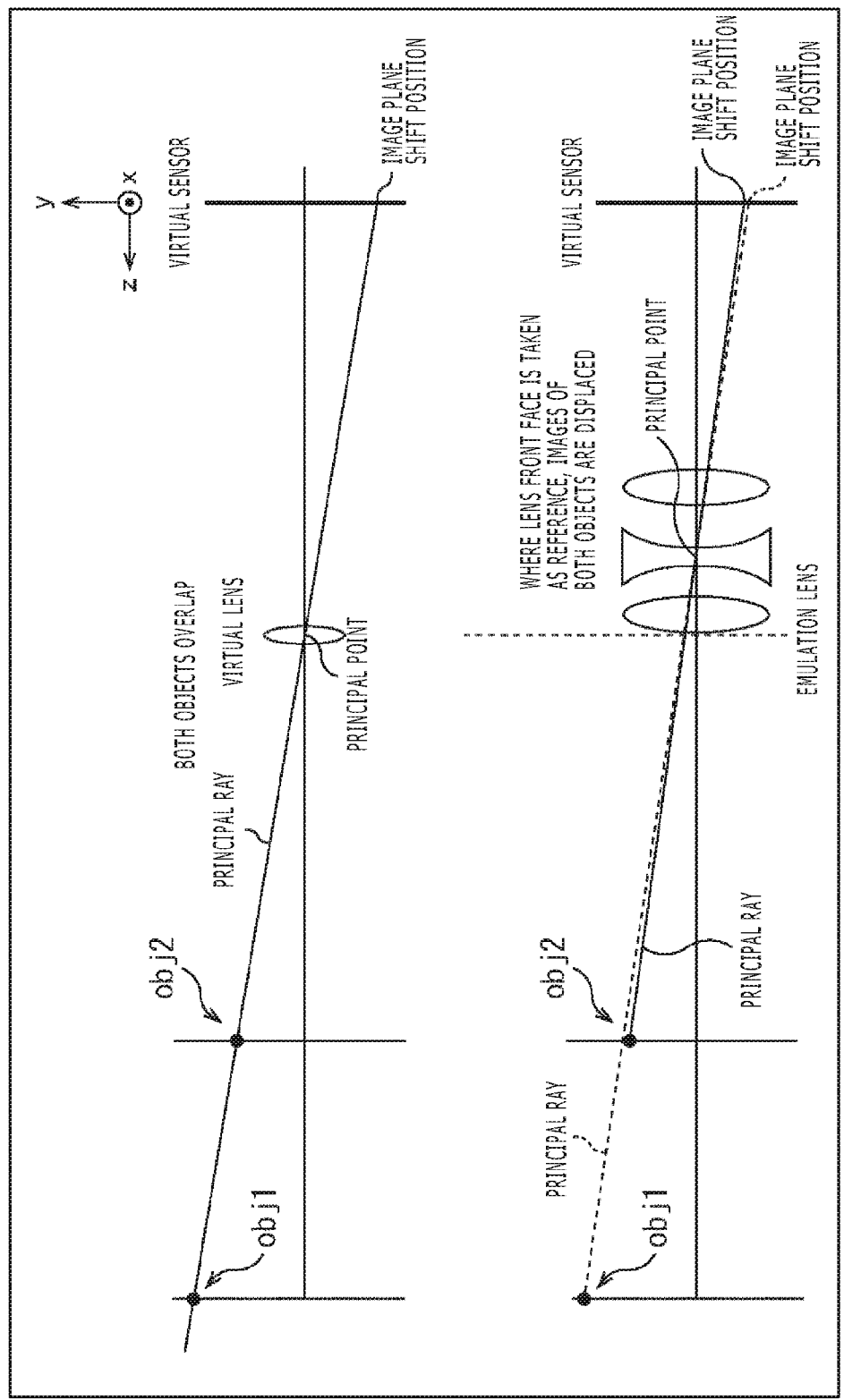
FIGS. 46A and 46B are views illustrating image plane shift information.

FIGS. 46A and 46B are views illustrating image plane shift information.

FIGS. 46A and 46B depicts an outline when a real space whose image is picked up by the camera unit 21$i$ configuring the image pickup apparatus 11 as the virtual lens is viewed from the right with respect to the front of the image pickup apparatus similarly to FIG. 37.

In the present embodiment, the virtual lens and the front lens of the emulation lens are made correspond to each other, and the incident ray reproduction section 36 reproduces rays incident to the virtual lens as rays incident to the emulation lens.

However, since an emulation lens generally has a plurality of lenses, the virtual lens and the emulation lens are displaced in position (in the z direction) of the entrance pupil.

Therefore, on the virtual sensor, an image observed through the virtual lens and an image observed through the emulation lens sometimes differ from each other.

FIG. 46A is a view illustrating an example of an image observed through the virtual lens on the virtual sensor.

In FIG. 46A, a straight line as a principal ray emitted from an object obj1 in a real space and another straight line as a principal ray emitted from another object obj2 positioned at the front side with respect to the object obj2 overlap with each other on the virtual lens.

Therefore, an image plane shift position of the object obj1 with respect to the virtual lens, namely, an image plane shift position that is a position on the virtual sensor reached by a principal ray emitted from the object obj1 through the virtual lens, and an image plane shift position of the object obj2 with respect to the virtual lens coincide with each other.

As a result, although the object obj2 is observed on the virtual sensor, the object obj1 positioned on the interior side than the object obj2 is hidden by the object obj2 and is not observed.

FIG. 46B is a view illustrating an example of an image observed through the emulation lens on the virtual sensor.

In FIG. 46B, the objects obj1 and obj2 are positioned at the same positions as those in the case of A of FIG. 46A.

In the emulation lens, the position of the entrance pupil and hence the principal point are displaced from those of the virtual lens. Therefore, on the emulation lens, a straight line as a principal ray emitted from the object obj1 in the real space and another straight line as a principal ray emitted from the object obj2 positioned on the front side with respect to the object obj2 do not overlap with other but are displaced from each other.

Accordingly, since an image plane shift position of the object obj1 with respect to the emulation lens and an image plane shift position of the object obj2 with respect to the emulation lens do not coincide with each other, both the object obj2 and the object obj1 positioned at the interior side with respect to the object obj2 are observed on the virtual sensor.

As described above, the image plane shift position of a real space point differs between the virtual lens and the emulation lens originating from the displacement in position between the entrance pupils of the virtual lens and the emulation lens.

Therefore, the emulation lens information generation section 37 generates image plane shift information representative of an image plane shift position with respect to the emulation lens as one kind of lens information in order to accurately reproduce light condensing of the emulation lens.

Here, the image plane shift information can be regarded as information for correcting the displacement in position of the entrance pupils of the virtual lens and the emulation lens, and from such a point of view as just described, the image plane shift information can be regarded as entrance pupil correction information.

Figure 47:
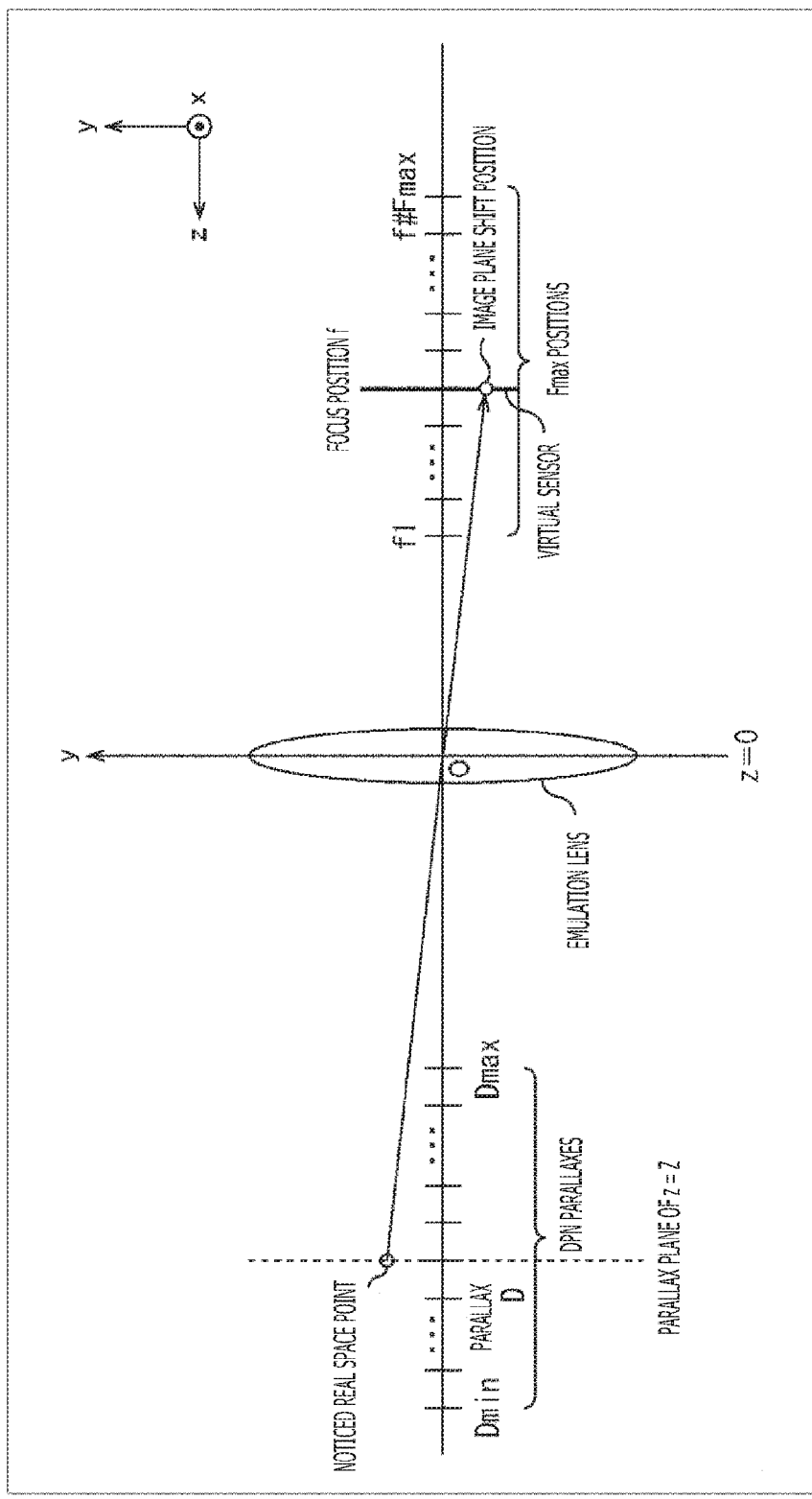
FIG. 47 is a view illustrating an example of a method for generating PSF angle component information.

FIG. 47 is a view illustrating an example of a method for generating image plane shift information.

FIG. 47 depicts an outline when a real space whose image is to be picked up by a camera unit 21$i$ configuring the image pickup apparatus 11 as the virtual lens is viewed from the right with respect to the front of the image pickup apparatus similarly to FIG. 37.

The emulation lens information generation section 37 generates image plane shift information for a real space point corresponding to each of a maximum real space point number N×DPN of real space points, namely, for each of combinations of a maximum number N of pixels configuring the virtual sensor and DPN parallaxes d that can be registered into the multilayer parallax map for each of the Fmax focus positions f at most.

The emulation lens information generation section 37 sets a reaching point at which a principal ray emitted from (a point light source of) a real space point and passing the principal point of the emulation lens reaches the virtual sensor as an image plane shift position and determines coordinates (distances) in the x-axis and y-axis directions, for example, from the center of the virtual sensor, which represents the image plane shift position, as image plane shift information.

FIG. 48 is a view schematically depicting image plane shift information generated by the emulation lens information generation section 37.

The image plane shift information is generated for real space points corresponding to N×DPN combinations of N pixels pix1 to pix#N configuring the virtual sensor and DPN parallaxes d that can be registered into a parallax map for each of Fmax focus positions f at most.

Now, a table in which the horizontal direction indicates DPN parallaxes d while the vertical direction indicates N pixels pix1 to pix#N configuring the virtual sensor and in which image plane shift information for a real space point corresponding to a combination of a certain parallax d and a certain pixel pix#n is registered, for example, as depicted in FIG. 48 is referred to as image plane shift information table for the focus position f.

The emulation lens information generation section 37 generates an image plane shift information table for each of the Fmax focus positions f.

Accordingly, where image plane shift information is recorded into arrays, the number of arrays of the image plane shift information is Fmax×N×DPN at most.

It is to be noted that the lens information of the emulation lens (PSF intensity distribution, image plane pitch, PSF angle component information and image plane shift information) can be determined by performing an arithmetic operation of ray tracing or the like using lens design data of the emulation lens, and can be determined, where the emulation lens is an existing optical lens, by actually measuring a ray using the optical lens.

Figure 49:
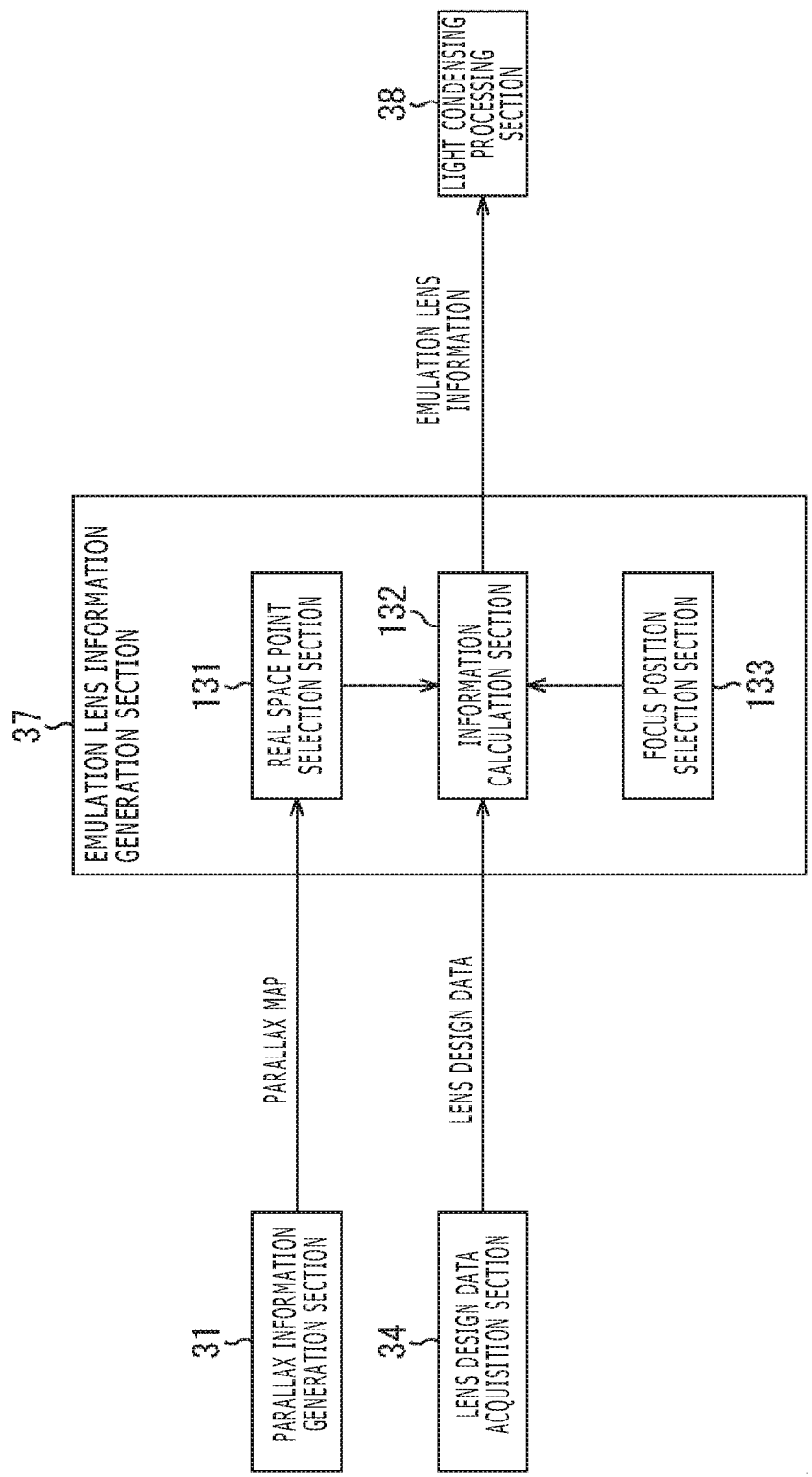
FIG. 49 is a block diagram depicting an example of a configuration of the emulation lens information generation section 37 that generates lens information.

FIG. 49 is a block diagram depicting an example of a configuration of the emulation lens information generation section 37 (FIG. 3) for generating lens information.

Referring to FIG. 49, the emulation lens information generation section 37 includes a real space point selection section 131, an information calculation section 132 and a focus position selection section 133.

The real space point selection section 131 refers to a multilayer parallax map supplied from the parallax information generation section 31 (FIG. 3) to the emulation lens information generation section 37 to select a noticed real space point from among a maximum real space point number N×DPN of real space points corresponding to combinations of the N pixels pix1 to pix#N configuring the virtual sensor and the DPN parallaxes d that can be registered into the multilayer parallax map.

The information calculation section 132 uses lens design data supplied from the lens design data acquisition section 34 (FIG. 3) to the emulation lens information generation section 37 to generate lens information for the noticed real space point selected by the real space point selection section 131 and the noticed focus position f selected by the focus position selection section 133 and supplies the generated lens information to the light condensing processing section 38.

The focus position selection section 133 selects a noticed focus position from among the Fmax focus positions f.

Figure 50:
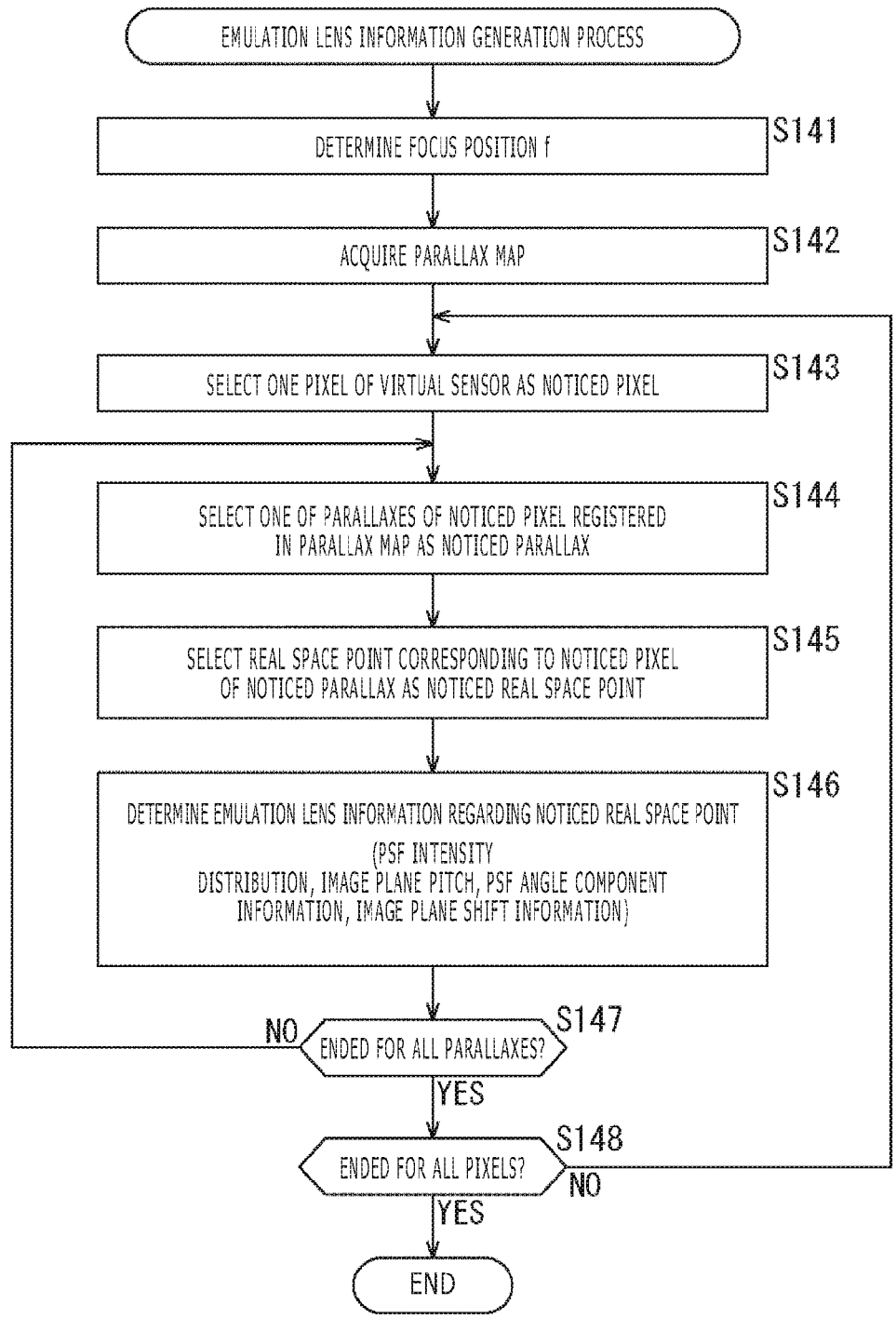
FIG. 50 is a flow chart illustrating an example of an emulation lens information generation process performed by the emulation lens information generation section 37.

FIG. 50 is a flow chart illustrating an example of an emulation lens information generation process performed by the emulation lens information generation section 37 of FIG. 49.

At step S141, the focus position selection section 133 selects a noticed focus position from among the Fmax focus positions f. Then, the processing advances to step S142.

Here, in the present embodiment, in order to reduce the information amount of the lens information, lens information is generated only for the noticed focus position. Selection of a noticed focus position can be performed, for example, in response to an operation of a user or the like. Further, as the noticed focus position, for example, a default focus position determined in advance can be selected.

It is to be noted that the lens information can be generated not only for the noticed focus position but for each of the Fmax focus positions f.

At step S142, the real space point selection section 131 acquires a multilayer parallax map supplied from the parallax information generation section 31. Then, the processing advances to step S143.

At step S143, the real space point selection section 131 selects, from among the pixels of the virtual sensor, one of the pixels that have not been selected as a noticed pixel as a noticed pixel. Then, the processing advances to step S144.

At step S144, the real space point selection section 131 selects, from among the parallaxes of the noticed pixel registered in the multilayer parallax map from the parallax information generation section 31, one of the parallaxes that have not been selected as a noticed parallax as yet as a noticed parallax. Then, the processing advances to step S145.

At step S145, the real space point selection section 131 selects a real space point corresponding to the noticed pixel having the noticed parallax as a noticed real space point. Then, the processing advances to step S146.

At step S146, the information calculation section 132 determines a PSF intensity distribution, an image plane pitch, PSF angle component information and image plane shift information, which are lens information for the noticed real space point, namely, for the set of the noticed focus position, noticed pixel and noticed parallax, in such a manner as described hereinabove with reference to FIGS. 39 to 48. Then, the processing advances to step S147.

At step S147, the real space point selection section 131 decides whether or not all of the parallaxes of the noticed pixel registered in the multilayer parallax map have been selected as a noticed parallax.

If it is decided at step S147 that all of the parallaxes of the noticed pixel registered in the multilayer parallax map have not been selected as a noticed parallax as yet, then the processing returns to step S144, and thereafter, similar processes are repeated.

On the other hand, if it is decided at step S147 that all of the parallaxes of the noticed pixel registered in the multilayer parallax map have been selected as a noticed parallax, then the processing advances to step S148.

At step S148, the real space point selection section 131 decides whether or not all of the pixels of the virtual sensor have been selected as a noticed pixel.

If it is decided at step S148 that all of the pixels of the virtual sensor have not been selected as a noticed pixel as yet, then the processing returns to step S143, and thereafter, similar processes are repeated.

On the other hand, if it is decided at step S148 that all of the pixels of the virtual sensor have been selected as a noticed pixel, then the emulation lens information generation process is ended.

<Light Condensing Process>

Figure 51:
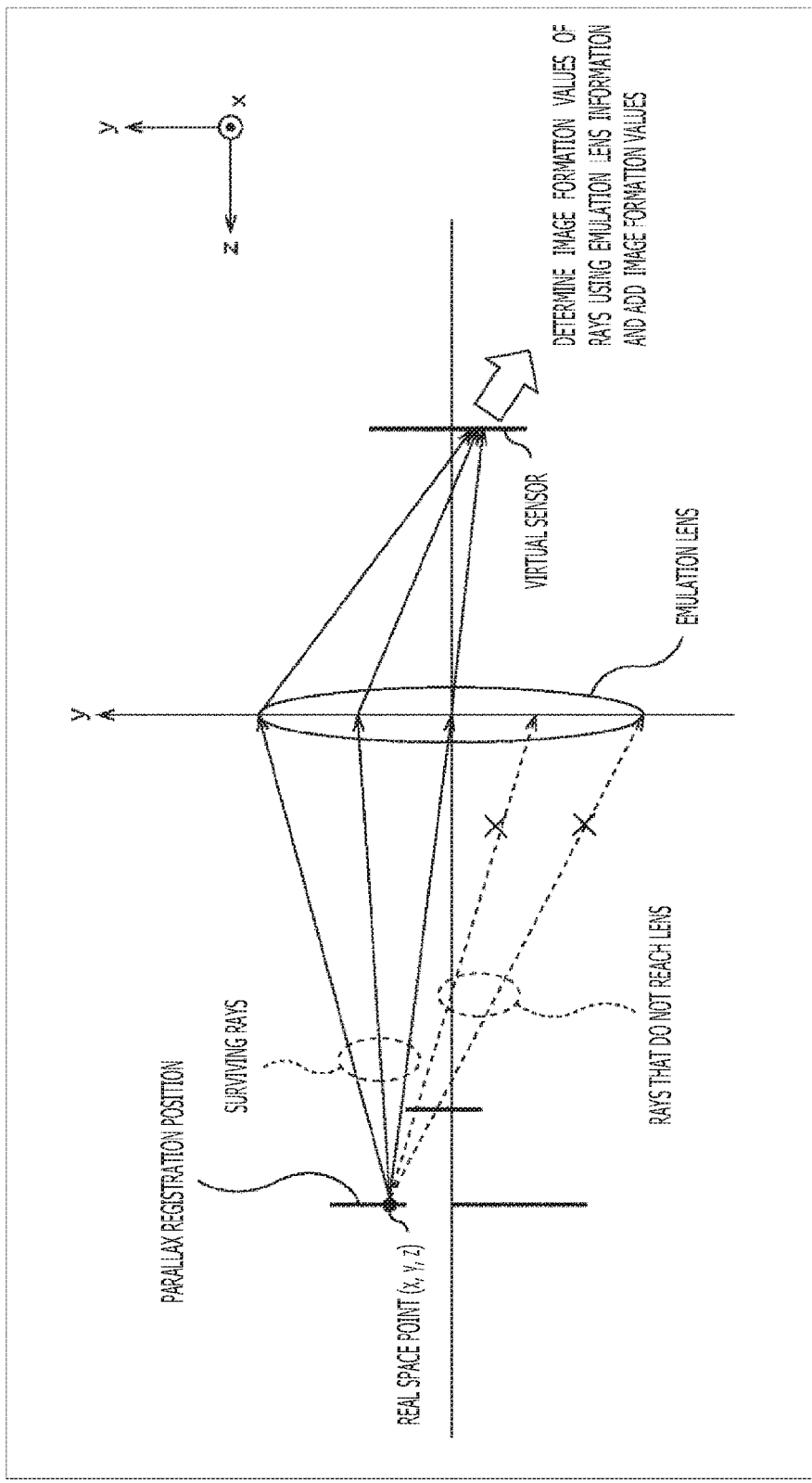
FIG. 51 is a view illustrating an outline of a light condensing process performed by a light condensing processing section 38.

FIG. 51 is a view illustrating an outline of the light condensing process performed by the light condensing processing section 38 of FIG. 3.

FIG. 51 depicts an outline when a real space whose image is to be picked up by a camera unit $21_i$ configuring the image pickup apparatus 11 as the virtual lens is viewed from the right with respect to the front of the image pickup apparatus similarly to FIG. 37.

The light condensing processing section 38 performs a process for determining, using lens information from the emulation lens information generation section 37, an image formation value when rays remaining as a result of a collision decision from among rays supplied from the incident ray reproduction section 36 form an image on the virtual sensor through the emulation lens and adding the image formation value on the virtual sensor as a light condensing process.

Figure 52:
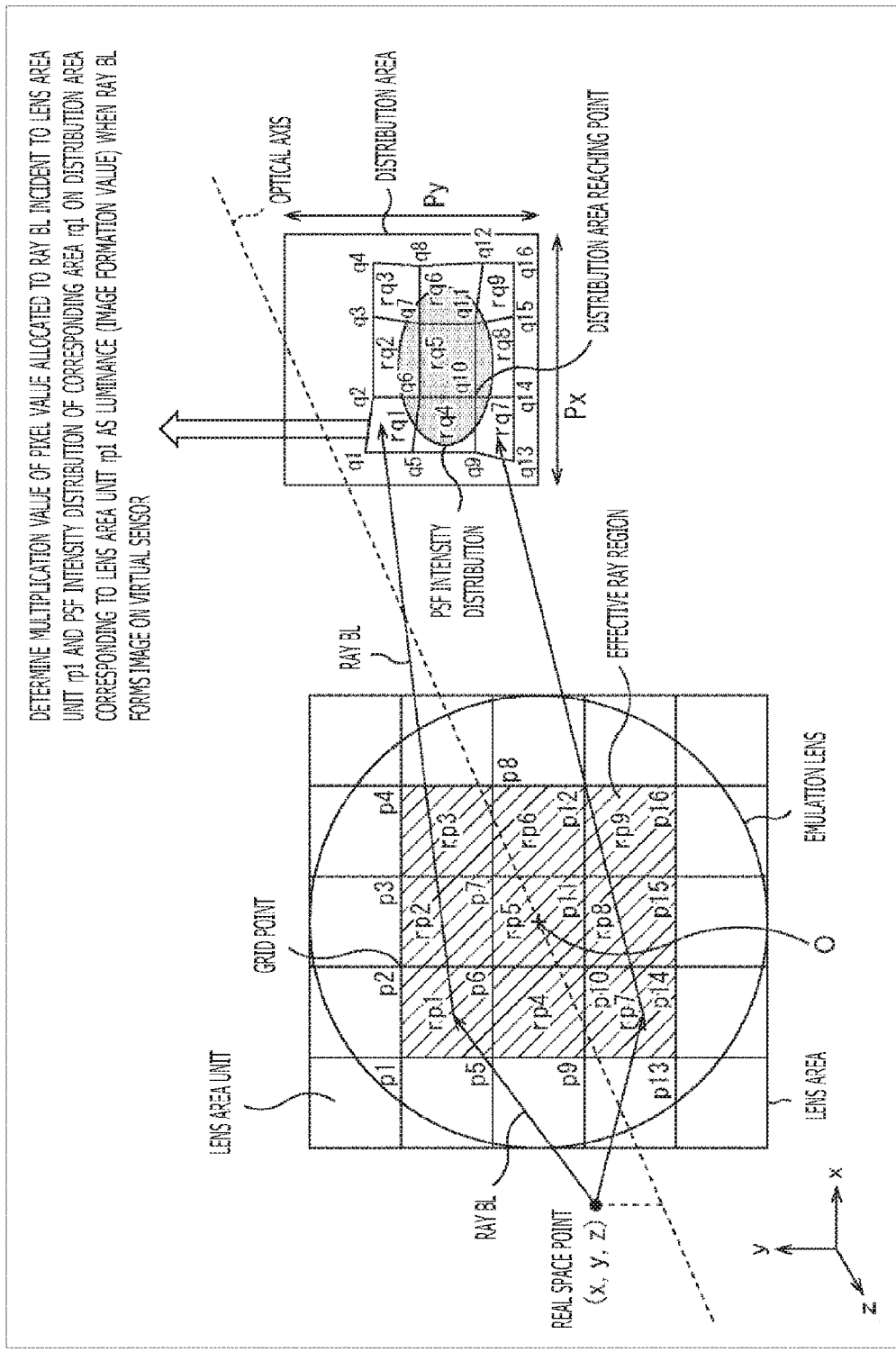
FIG. 52 is a view illustrating an example of a process for determining an image formation value from within the light condensing process.

FIG. 52 is a view illustrating an example of a process for determining an image formation value from within the light condensing process.

It is to be noted that, in FIG. 52, in order to avoid the figure from becoming complicated, the lens area of the emulation lens is divided into 5×5 lens area units.

As described hereinabove with reference to FIG. 43, a ray emitted from a real space point and incident to the emulation lens may not necessarily reach the virtual sensor. In other words, among rays incident to the emulation lens, rays that reach the virtual sensor and rays that do not reach the virtual sensor exist.

Now, a region of lens area units to which, from among rays emitted from a real space point and incident to the emulation lens, rays that reach the virtual sensor are incident is referred to as effective ray region.

In FIG. 52, 3×3 lens area units rp1 to rp9 at the center part from among 5×5 lens area units in regard to rays emitted from a certain real space point (x, y, z) are an effective ray region.

Further, in FIG. 52, distribution area reaching points reached by rays emitted from the real space point (x, y, z) and passing grid points p#i of the lens areas are distribution area unit q#i of the distribution areas in which a PSF intensity distribution is recorded.

The distribution area unit q#i that becomes a distribution area reaching point reached by a ray emitted from the real space point (x, y, z) and passing the grid point p#i of the lens area can be recognized from the PSF angle component information.

In FIG. 52, a ray BL emitted from the real space point (x, y, z) and passing the lens area unit rp1 reaches the corresponding area rq1 of (the distribution area that has recorded therein) the PSF intensity distribution.

Here, the lens area unit rp1 is a lens area unit having vertices at the grid points p1, p2, p5 and p6.

Further, in FIG. 52, rays emitted from the real space point (x, y, z) and passing the grid points p1, p2, p5 and p6 reach the distribution area units q1, q2, q5 and q6 of the distribution area in which a PSF intensity distribution is recorded. A region having vertices at the distribution area units q1, q2, q5 and q6 is the corresponding area rq1.

According to the PSF angle component information, it is recognized that rays emitted from the real space point (x, y, z) and passing the grid points p1, p2, p5 and p6 reach the distribution area units q1, q2, q5 and q6 of the distribution area in which PSF intensity distribution is recorded, respectively. As a result, it is recognized that the ray BL passing the lens unit rp1 having vertices at the grid points p1, p2, p5 and p6 reaches the corresponding area rq1 having the vertices at the distribution area units q1, q2, q5 and q6.

In FIG. 52, the corresponding area rq#j is a corresponding area of a ray emitted from the real space point (x, y, z) and passing the lens area unit rp#j.

The light condensing processing section 38 specifies the corresponding area rq1 to be reached by a ray BL emitted from the real space point (x, y, z) and passing the lens area unit rp1 using the PSF angle component information.

Then, the light condensing processing section 38 determines the product of the luminance allocated to the ray BL and the PSF intensity distribution in the corresponding area rq1, namely, the PSF intensity distribution recorded in (the position of) the distribution area units configuring the corresponding area rq1, as an image formation value when the ray BL forms an image on the virtual sensor through the emulation lens.

As described above, since the image formation value of the ray BL is the product of the luminance allocated to the ray BL and the PSF intensity distribution recorded in each of the distribution area units configuring the corresponding area rq1, such image formation values have a distribution whose granularity is the distribution area unit.

The light condensing processing section 38 determines an image formation value similarly also with regard to a ray emitted from the real space point (x, y, z) and passing a lens area unit other than the lens area unit rp1.

It is to be noted that, from among rays emitted from the real space point (x, y, z) and incident to the 5×5 lens area units, those rays that are incident to a lens area unit that is not the effective ray region (such rays are hereinafter referred to also as ineffective rays) do not reach the virtual sensor. Therefore, a lens area unit to which such ineffective rays are incident does not have a corresponding area to be reached by the ineffective rays. Accordingly, the image formation value can be determined only with regard to rays that pass the lens area units rp1 to rp9 that form the effective ray region.

Figure 53:
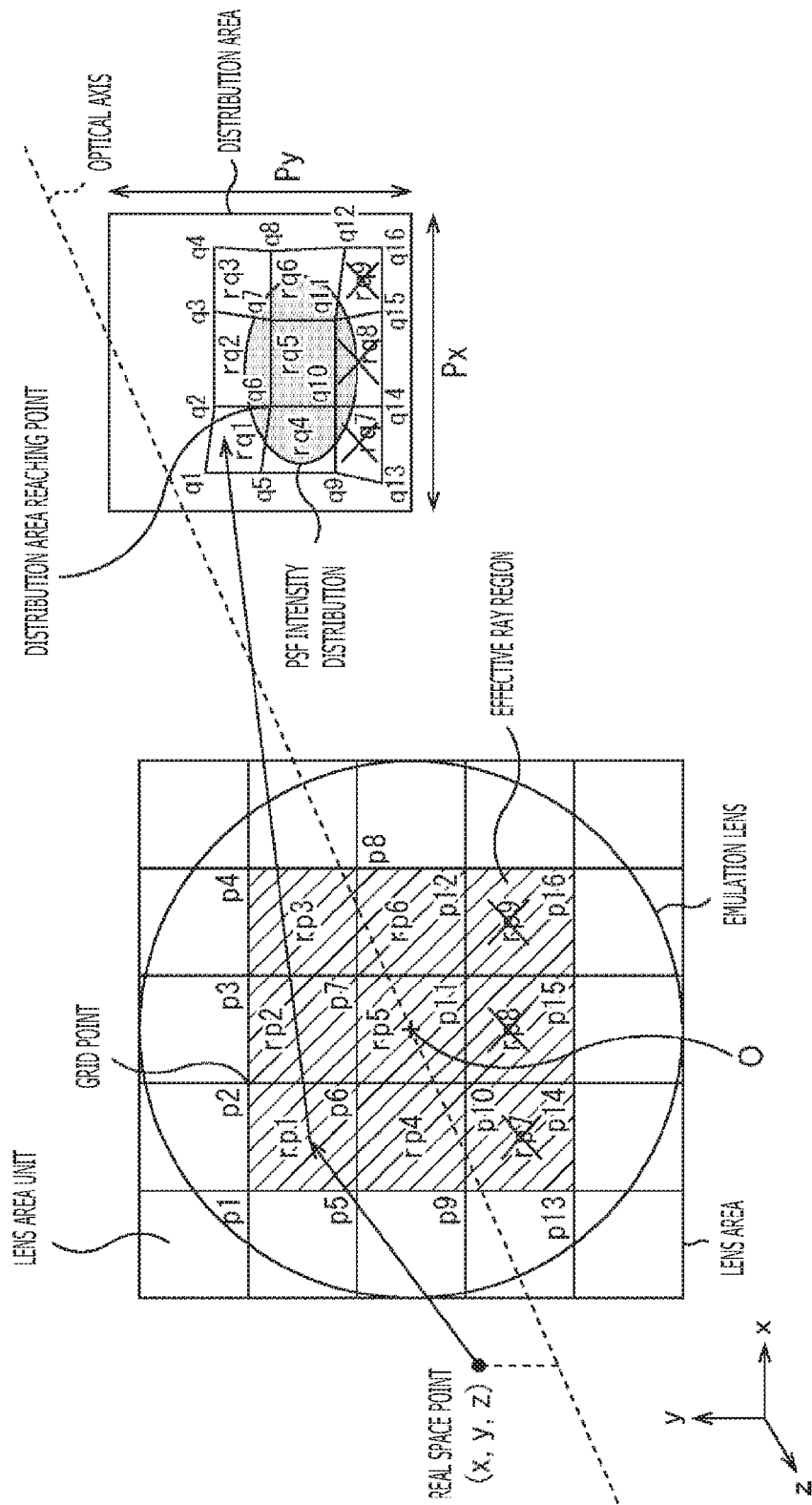
FIG. 53 is a view illustrating a different example of a process for determining an image formation value from within the light condensing process.

FIG. 53 is a view illustrating another example of the process for determining an image formation value in the light condensing process.

It is to be noted that, in FIG. 53, like elements to those of FIG. 52 are denoted by like reference symbols.

In FIG. 53, rays emitted from a real space point (x, y, z) do not reach lens area units rp7 to rp9 from among 3×3 lens area units rp1 to rp9 at a central portion, which is an effective ray region, of 5×5 lens area units, because they are blocked by an object existing on this side with respect to the real space point (x, y, z).

Therefore, in FIG. 53, (a distribution of) an image formation value is determined substantially only with regard to each of rays that pass, from among the lens area units rp1 to rp9 that form the effective ray region, the lens area units rp1 to rp6 reached by rays emitted from the real space point (x, y, z).

Figure 54:
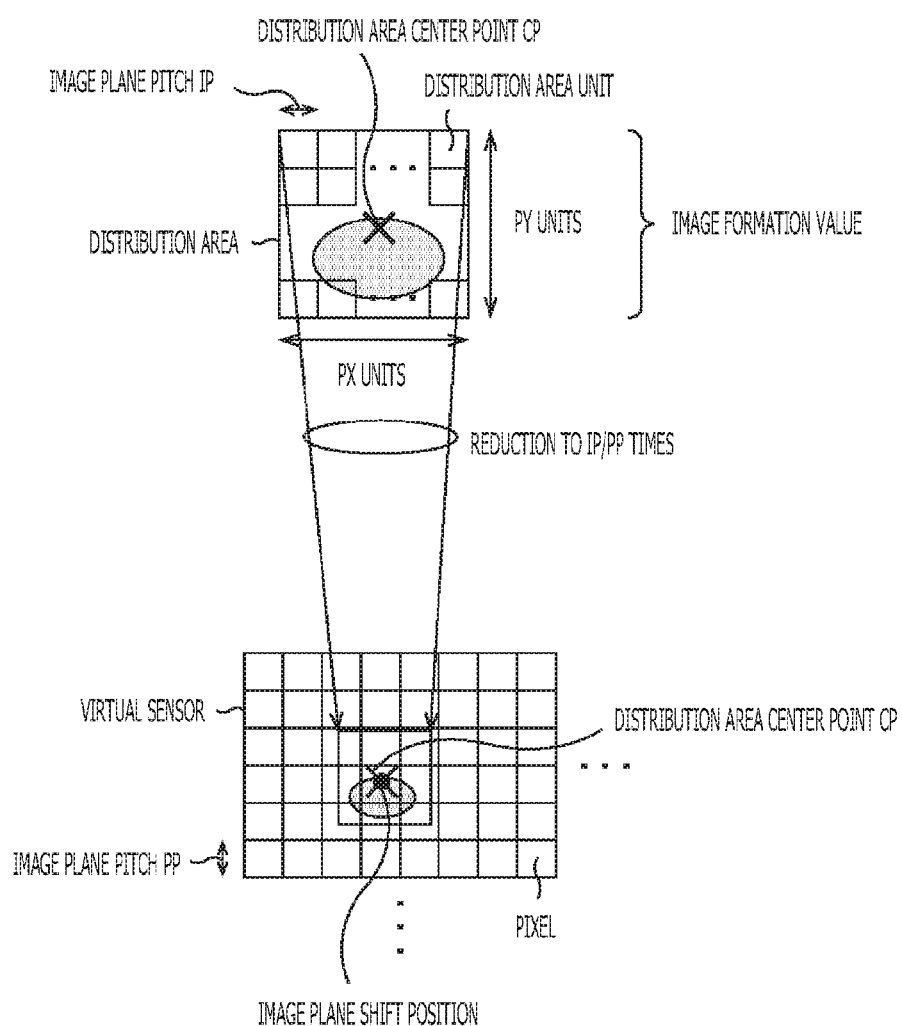
FIG. 54 is a view illustrating an example of a process for adding (a distribution of) an image formation value to a virtual sensor from within the light condensing process.

FIG. 54 is a view illustrating an example of a process for adding (a distribution of) image formation values on the virtual sensor from within the light condensing process.

As described hereinabove with reference to FIG. 52, image formation values of rays emitted from the real space point (x, y, z) indicate a distribution whose granularity is a distribution area unit. Now, it is assumed that, in order to facilitate the description, the distribution of image formation values of rays emitted from the real space point (x, y, z) is recorded in the distribution area in which a PSF intensity distribution used to determine the image formation values is recorded. In other words, it is assumed that image formation values of rays emitted from the real space point (x, y, z) are recorded in a unit of a distribution area unit in the distribution area in which the PSF intensity distribution used to determine the image formation values is recorded.

The light condensing processing section 38 adjusts the scale of the distribution area such that the scale of the distribution area in which the distribution of the image formation values of rays emitted from the real space point (x, y, z) is recorded is made coincide with the scale of the virtual sensor using an image plane pitch in regard to the real space point (x, y, z).

In particular, if it is assumed that the image plane pitch is IP and the pixel pitch of the virtual sensor is PP, then the light condensing processing section 38 performs a process for reducing (or expanding) the distribution area, in which the distribution of the image formation values of rays is recorded, to IP/PP times as adjustment of the scale of the distribution area.

Further, the light condensing processing section 38 performs positioning of the position at which rays emitted from the real space point (x, y, z) are condensed on the virtual sensor through the emulation lens depending upon the image plane shift position represented by the image plane shift information for the real space point (x, y, z).

In particular, the light condensing processing section 38 performs positioning between the distribution area after adjustment of the scale, in which the distribution of the image formation values of rays emitted from the real space point (x, y, z) are recorded, and the virtual sensor such that the center point CP of the distribution area and the image plane shift position of the virtual sensor coincide with each other.

After the light condensing processing section 38 preforms adjustment of the scale of the distribution area in which the distribution of image formation values is recorded and besides performs positioning between the distribution area after the adjustment of the scale and the virtual sensor in such a manner as described above, it adds the image formation values distributed in the distribution area on the virtual sensor in a unit of a pixel of the virtual sensor.

It is to be noted that the adjustment of the scale of (the distribution area that has recorded therein) the image formation values and the positioning may be performed in any order or may be performed at the same time.

Figure 55:
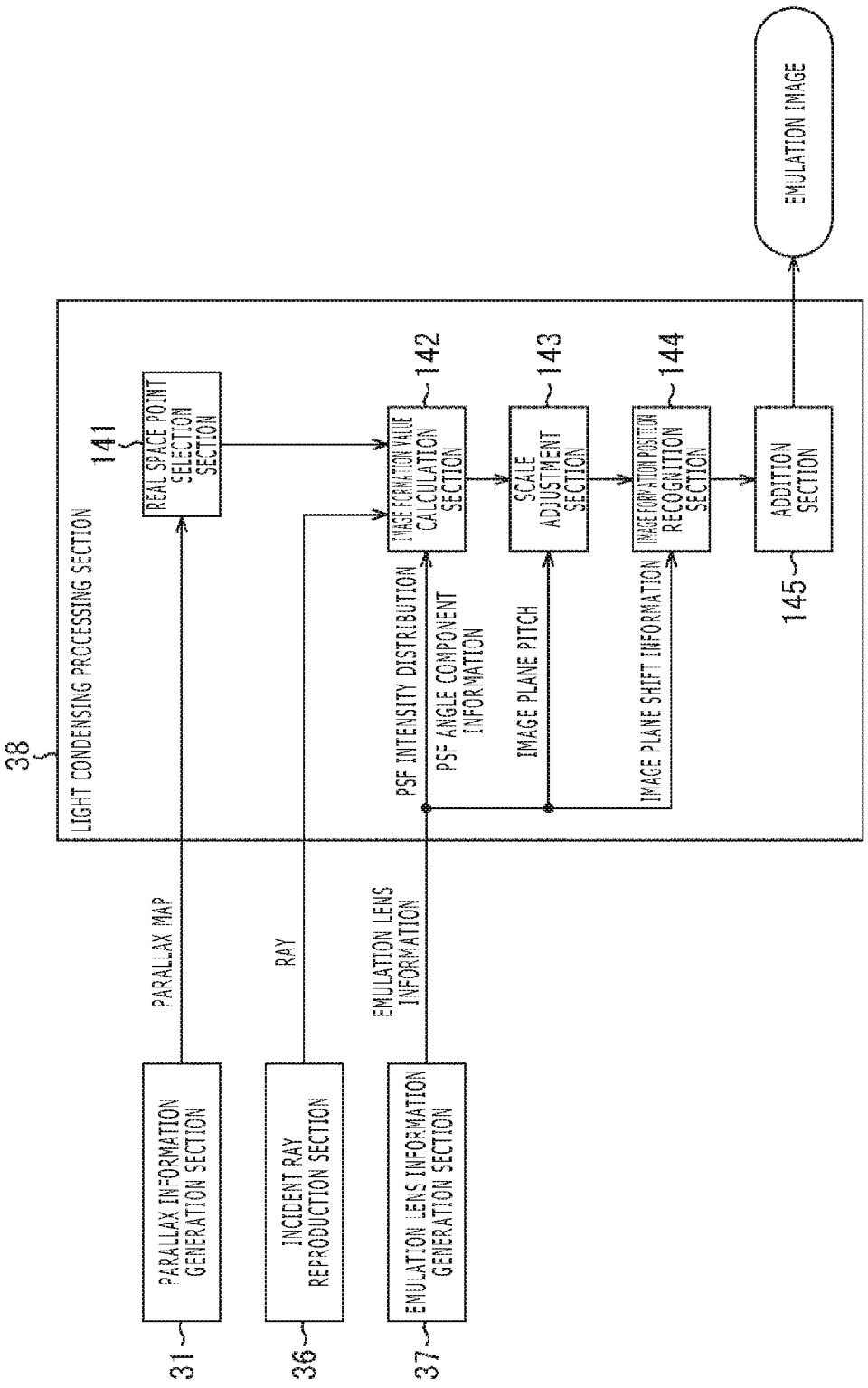
FIG. 55 is a block diagram depicting an example of a configuration of the light condensing processing section 38.

FIG. 55 is a block diagram depicting an example of a configuration of the light condensing processing section 38 of FIG. 3.

Referring to FIG. 55, the light condensing processing section 38 includes a real space point selection section 141, an image formation value calculation section 142, a scale adjustment section 143, an image formation position recognition section 144 and an addition section 145.

The real space point selection section 141 refers to a multilayer parallax map supplied from the parallax information generation section 31 (refer to FIG. 3) to the light condensing processing section 38 to select a noticed real space point from among a maximum real space point number N×DPN of real space points corresponding to combinations of N pixels pix1 to pix#N configuring the reference image HD1 and DPN parallaxes d that can be registered into the multilayer parallax map.

The image formation value calculation section 142 uses a PSF intensity distribution and PSF angle component information from within lens information supplied from the emulation lens information generation section 34 to the light condensing processing section 38 to determine a distribution area in which a distribution of image formation values of rays emitted from the noticed real space point selected by the real space point selection section 131 from among rays supplied from the incident ray reproduction section 36 to the light condensing processing section 38 is recorded, and supplies the distribution area to the scale adjustment section 143.

The scale adjustment section 143 uses an image plane pitch from within the lens information supplied from the emulation lens information generation section 34 to the light condensing processing section 38 to adjust the scale of the distribution area in which the distribution of the image formation values supplied from the image formation value calculation section 142 is recorded and supplies the distribution area of the adjusted scale to the image formation position recognition section 144.

The image formation position recognition section 144 recognizes, from image plane shift information from within the lens information supplied from the emulation lens information generation section 34 to the light condensing processing section 38, an image plane shift position that is an image formation position on the virtual sensor on which the rays passing through the emulation lens form an image, and supplies the recognized image plane shift position to the addition section 145 together with the distribution area after adjustment of the scale from the scale adjustment section 143.

The addition section 145 has a memory as the virtual sensor built therein and performs positioning of the distribution area after the adjustment of the scale from the image formation position recognition section 144 and the virtual sensor (recognition of the position on the virtual sensor at which the image formation values are to be added) depending upon the image plane shift position from the image formation position recognition section 144.

Further, the addition section 145 (cumulatively) adds the image formation values recorded in the distribution area after the positioning with the virtual sensor on the virtual sensor in a unit of a pixel of the virtual sensor.

Then, the addition section 145 supplies an image, in which pixel values are provided by results of the addition of the image formation values obtained on the virtual sensor, namely, on the memory, as an emulation image to the display apparatus 13 (FIG. 1).

Figure 56:
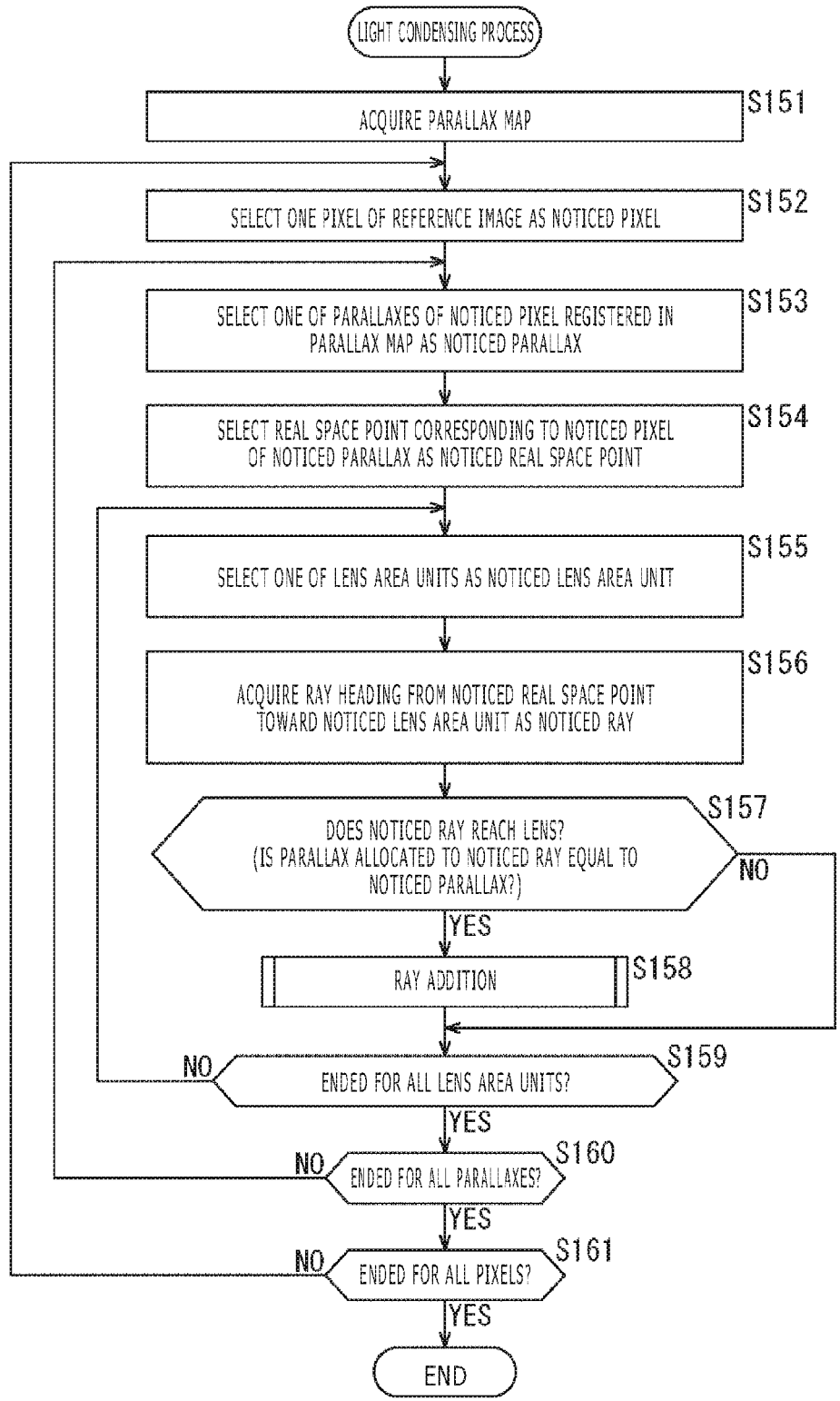
FIG. 56 is a flow chart illustrating an example of the light condensing process performed by the light condensing processing section 38.

FIG. 56 is a flow chart illustrating an example of the light condensing process performed by the light condensing processing section 38 of FIG. 55.

It is to be noted that, in the present embodiment, in order to reduce the information amount of lens information, lens information is generated only for a noticed focus position as described hereinabove with reference to FIG. 50. Therefore, the light condensing process is performed under the assumption that the focus position is set to a noticed focus position when lens information is generated.

However, the lens information can be generated in advance for each of the Fmax focus positions (FIG. 37). In this case, the light condensing processing section 38 sets a noticed focus position and can perform a light condensing process using lens information regarding the noticed focus position.

Alternatively, after the light condensing processing section 38 sets a noticed focus position, the emulation lens information generation section 37 can generate lens information in regard to the noticed focus position.

At step S151, the real space point selection section 141 acquires a multilayer parallax map supplied from the parallax information generation section 31. Thereafter, the processing advances to step S152.

At step S152, the real space point selection section 141 selects a pixel that has not been selected as a noticed pixel as yet from among the pixels of the reference image HD1 as a noticed pixel. Thereafter, the processing advances to step S153.

At step S153, the real space point selection section 141 selects one parallax that has not been selected as a noticed parallax as yet from among the parallaxes of the noticed pixel registered in the multilayer parallax map from the parallax information generation section 31 as a noticed pixel. Thereafter, the processing advances to step S154.

At step S154, the real space point selection section 141 selects a real space point corresponding to the noticed pixel having the noticed parallax as a noticed real space point. Thereafter, the processing advances to step S155.

At step S155, the image formation value calculation section 142 selects one lens area unit that has not been selected as a noticed lens area unit as yet from among the lens area units of the emulation lens as a noticed lens area unit. Thereafter, the processing advances to step S156.

At step S156, the image formation value calculation section 142 acquires a ray heading from the noticed real space point toward the noticed lens area unit from among rays supplied from the incident ray reproduction section 36 as a noticed ray. Thereafter, the processing advances to step S157.

At step S157, the image formation value calculation section 142 decides whether or not the noticed ray reaches the emulation lens from the noticed real space point.

If it is decided at step S157 that the noticed ray reaches the emulation lens, namely, when the parallax allocated to the noticed ray (parallax allocated by the incident ray reproduction process described hereinabove with reference to FIGS. 33 to 35) is equal to the noticed parallax, then the processing advances to step S158.

At step S158, the image formation value calculation section 142, scale adjustment section 143, image formation position recognition section 144 and addition section 145 perform a ray addition process hereinafter described for a noticed ray that reaches the simulation lens, namely, a noticed ray that remains as a result of the collision decision. Thereafter, the processing advances to step S159.

On the other hand, if it is decided at step S157 that the noticed ray does not reach the emulation lens, namely, if the parallax allocated to the noticed ray (parallax allocated by the incident ray reproduction process described hereinabove with reference to FIGS. 33 to 35) is not equal to the noticed parallax, then the processing skips step S158 and advances to step S159. Accordingly, when the noticed ray does not reach the simulation lens, the ray addition process is not performed for the noticed ray.

At step S159, the image formation value calculation section 142 decides whether or not all of the lens area units of the emulation lens have been selected as a noticed lens area unit.

If it is decided at step S159 that all of the lens area units of the emulation lens have not been selected as a noticed lens area unit, then the processing returns to step S155, and thereafter, similar processes area repeated.

On the other hand, if it is decided at step S159 that all of the lens area units of the emulation lens have been selected as a noticed lens area unit, then the processing advances to step S160.

At step S160, the real space point selection section 141 decides whether or not all of the parallaxes of the noticed pixel registered in the multilayer parallax map have been selected as a noticed parallax.

If it is decided at step S160 that all of the parallaxes of the noticed pixel registered in the multilayer parallax map have not been selected as a noticed parallax as yet, then the processing returns to step S153, and thereafter, similar processes are repeated.

On the other hand, if it is decided at step S160 that all of the parallaxes of the noticed pixel registered in the multilayer parallax map have been selected as a noticed parallax, then the processing advances to step S161.

At step S161, the real space point selection section 141 decides whether or not all of the pixels of the reference image HD1 have been selected as a noticed pixel.

If it is decided at step S161 that all of the pixels of the reference image HD1 have not been selected as a noticed pixel as yet, then the processing returns to step S152. Thereafter, similar processes are repeated.

On the other hand, if it is decided at step S161 that all of the pixels of the reference image HD1 haven been selected as a noticed pixel, then the addition section 145 supplies an image obtained by the processes described above and having pixel values provided by addition results of image formation values on the virtual sensor as an emulation image to the display apparatus 13 (FIG. 1), thereby ending the light condensing process.

Figure 57:
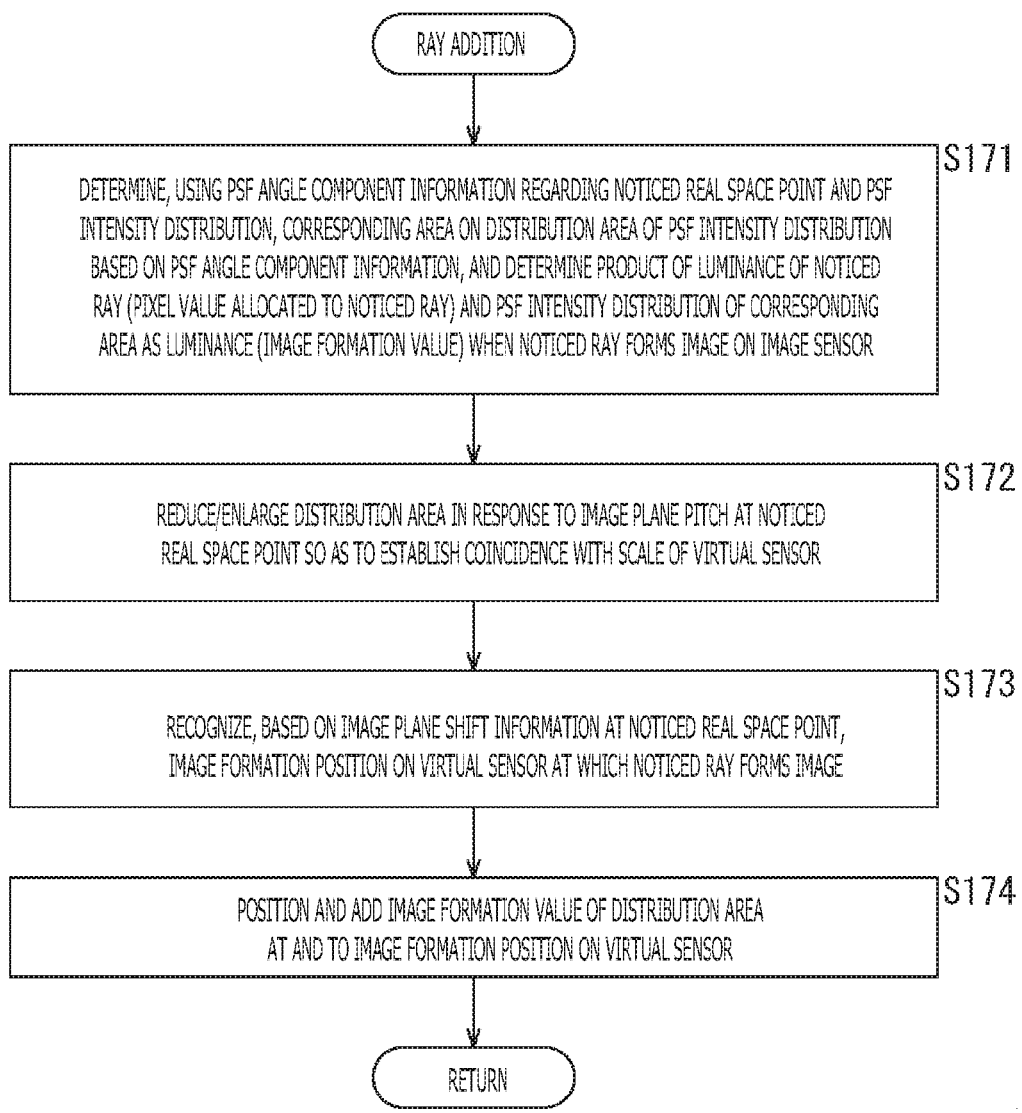
FIG. 57 is a flow chart illustrating an example of a ray addition process.

FIG. 57 is a flow chart illustrating an example of the ray addition process performed at step S158 of FIG. 56.

At step S171, the image formation value calculation section 142 determines, using (a distribution area having recorded therein) a PSF intensity distribution regarding (a noticed pixel and a noticed parallax corresponding to) a noticed real space point regarding a noticed focus position f and PSF angle component information from the emulation lens information generation section 37 as described hereinabove with reference to FIGS. 52 and 53, a corresponding area that is a position on the distribution area at which the PSF intensity distribution reached by the noticed ray is recorded.

Further, as described hereinabove with reference to FIGS. 52 to 53, the image formation value calculation section 142 determines the product of the PSF intensity distribution of the corresponding area and the luminance allocated to the noticed ray (luminance allocated by the incident ray reproduction process described hereinabove with reference to FIGS. 33 to 35) as (a distribution of) an image formation value of the noticed ray.

Then, the image formation value calculation section 142 supplies the distribution area in which the image formation value of the noticed ray is recorded to the scale adjustment section 143. Thereafter, the processing advances from step S171 to step S172.

At step S172, as described hereinabove with reference to FIG. 54, the scale adjustment section 143 reduces or expands the distribution area, in which the distribution of the image formation value from the image formation value calculation section 142 is recorded, using an image plane pitch regarding the noticed real space point regarding the noticed focus position f from the emulation lens information generation section 34 to adjust the scale of the distribution area to a scale coincident with the scale of the virtual sensor.

Further, the scale adjustment section 143 supplies the distribution area after the adjustment of the scale to the addition section 145 through the image formation position recognition section 144. Thereafter, the processing advances from step S172 to step S173.

At step S173, the image formation position recognition section 144 recognizes the image plane shift position, which is an image formation position on the virtual sensor at which the noticed ray forms an image through the emulation lens, from the image plane shift information regarding the noticed real space point regarding the noticed focus position f from the emulation lens information generation section 34, and supplies the image plane shift position to the addition section 145. Thereafter, the processing advances to step S174.

At step S174, the addition section 145 performs positioning between the distribution area after the adjustment of the scale obtained by the scale adjustment section 143 and the virtual sensor depending upon the image plane shift position from the image formation position recognition section 144.

In particular, the addition section 145 performs positioning between the distribution area after the adjustment of the scale and the virtual sensor such that the center point CP (FIG. 54) of the distribution area after the adjustment of the scale and the image plane shift position of the virtual sensor coincide with each other.

Then, the addition section 145 adds the image formation values recorded in the distribution area after the positioning with the virtual sensor on the virtual sensor in a unit of a pixel of the virtual sensor. In particular, the addition section 145 adds the storage values of the memory as the virtual sensor and the image formation values and rewrites the storage values of the memory with the addition values obtained by the addition. It is to be noted that the storage values of the memory as the virtual sensor are initialized to zero when the light condensing process (FIG. 56) is started.

The ray addition process ends therewith, and the processing returns.

As described above, in the lens emulation section 35 (FIG. 3), the incident ray reproduction section 46 reproduces rays that remain as a result of the collision decision and are to enter the virtual lens.

Further, the emulation lens information generation section 37 generates lens information, namely, a PSF intensity distribution, an image plane pitch, PSF angle component information and image plane shift information.

Further, the light condensing processing section 38 determines, as an image formation value when each of rays that remain as a result of the collision decision forms an image on the virtual sensor through the emulation lens, the product of the PSF intensity distribution and the luminance of the ray at a position of the PSF intensity distribution represented by the PSF angle component information.

Further, the light condensing processing section 38 adjusts the scale of the distribution of the image formation values of the rays on the basis of the image plane pitch so as to make the scale coincident with the scale of the virtual sensor.

Then, the light condensing processing section 38 performs positioning of the position on the virtual sensor at which the image formation value is to be added depending upon the image plane shift position and performs addition of the image formation value on the virtual sensor, and then generates an emulation image in which a pixel value is given by the addition value obtained by the addition.

According to such processes of the lens emulation section 35 as described above, light condensing equivalent to that by an actual optical lens is reproduced by a digital signal process, and as a result, an emulation image that reproduces (reflects) a blur degree or other light condensing characteristics of an actual optical lens can be generated.

Accordingly, even if the user does not purchase an actual optical lens, it can enjoy such a high-quality image pickup experience (experience of image pickup performed using a high-quality optical lens) that the user performs image pickup using the optical lens.

<Reduction of Information Amount of Lens Information>

Figures 58A, 58B:
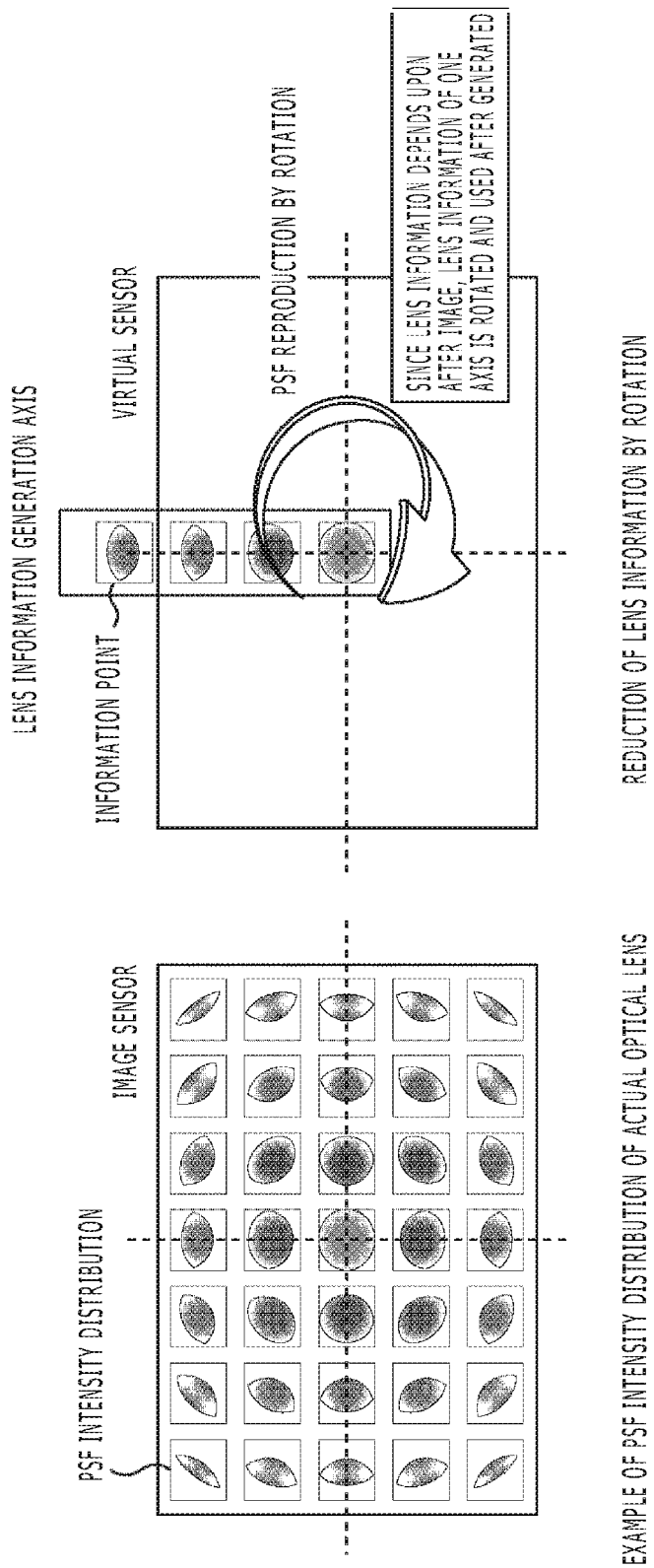
FIGS. 58A and 58B are views illustrating an outline of reduction of the information amount of lens information.

FIGS. 58A and 58B are views illustrating an outline of reduction of the information amount of lens information.

FIG. 58A depicts an example of a PSF intensity distribution from within lens information of an actual optical lens.

In particular, FIG. 58A schematically depicts a relationship between image formation positions on an actual image sensor at which rays form an image through the actual optical lens and a PSF intensity distribution applied to the rays that form an image at the image formation positions.

As described hereinabove with reference to FIG. 38, the PSF intensity distribution differs depending upon the focus position f, the image height at the image formation position (distance from the optical axis) and the distance (parallax) to the image pickup object (real space point).

In particular, for example, if the image height of the image formation position on an actual image sensor (distance of a real space point that forms an image at the image formation position from the optical axis) differs, then the PSF intensity distribution of the actual optical lens applied to the ray emitted from the real space point that forms an image at the image formation position differs.

Accordingly, in the actual image sensor, the PSF intensity distribution of the actual optical lens provides different infinite information if the image height of the image formation position differs.

Although the PSF intensity distribution differs if the image height of the image formation position differs in such a manner as described above, conversely speaking, where the image height is same, namely, where the real space point is positioned at the same distance from the optical axis, the PSF intensity distribution is common unless the focus position f and the parallax (distance to the real space point) vary.

In particular, in order to simplify the description, it is assumed now that the focus position f and the parallax are fixed.

The PSF intensity distribution in regard to a real space point corresponding to a position pos2 after a certain position pos1 of a certain image height r of an image sensor is rotated by a predetermined angle a around the optical axis coincides with the PSF intensity distribution after rotation when the PSF intensity distribution in regard to the real space point corresponding to the position pos1 is rotated by the predetermined angle a around the optical axis.

Since the PSF intensity distribution in regard to the real space point corresponding to the position pos2 coincides with the PSF intensity distribution after rotation when the PSF intensity distribution in regard to the real space point corresponding to the position pos1 is rotated by the predetermined angle a around the optical axis as described above, the image plane pitch in regard to the real space point corresponding to the position pos2 coincides with the image plane pitch in regard to the real space point corresponding to the position pos1.

Further, the PSF angle component information in regard to the real space point corresponding to the position pos2 coincides with PSF angle component information after rotation when the PSF angle component information in regard to the real space point corresponding to the position pos1 is rotated by the predetermined angle a around the optical axis.

Furthermore, (the image plane shift position represented by) the image plane shift information in regard to the real space point corresponding to the position pos2 coincides with the image plane shift information after rotation when the image plane shift information in regard to the real space point corresponding to the position pos1 is rotated by the predetermined angle a around the optical axis.

As described above, where the focus position f and the parallax are fixed, the lens information is common among real space points corresponding to positions of the image sensor at which the image height is same.

Therefore, the emulation lens information generation section 37 can reduce the information amount of lens information by generating lens information not for real space points corresponding to all pixels of the virtual sensor but only for real space points corresponding to a plurality of information points that are plural positions of part of the plane of the virtual sensor.

In particular, the emulation lens information generation section 37 determines, for example, (real space points of) a predetermined one axis extending in the plane of the virtual sensor from the center of the virtual sensor (optical axis) as a lens information generation axis of a target for generation of lens information and sets (real space points corresponding to) a plurality of positions on the lens information generation axis as information points for generating lens information.

Then, the emulation lens information generation section 37 generates lens information regarding (the real space points corresponding to) the information points of the lens information generation axis.

FIG. 58B depicts an example of the lens information generation axis.

In FIG. 58B, one axis extending in an upward direction from the center of the virtual sensor forms the lens information generation axis.

The lens information generated for the information points of such a lens information generation axis as described above can be applied, for example, to a light condensing process for rays emitted from a real space point corresponding to the position of the virtual sensor coincident with the lens generation axis after rotation when rotation is performed around the center of the virtual sensor such that the lens information generation axis is rotated by a rotational angle equal to that of the rotation.

Figure 59:
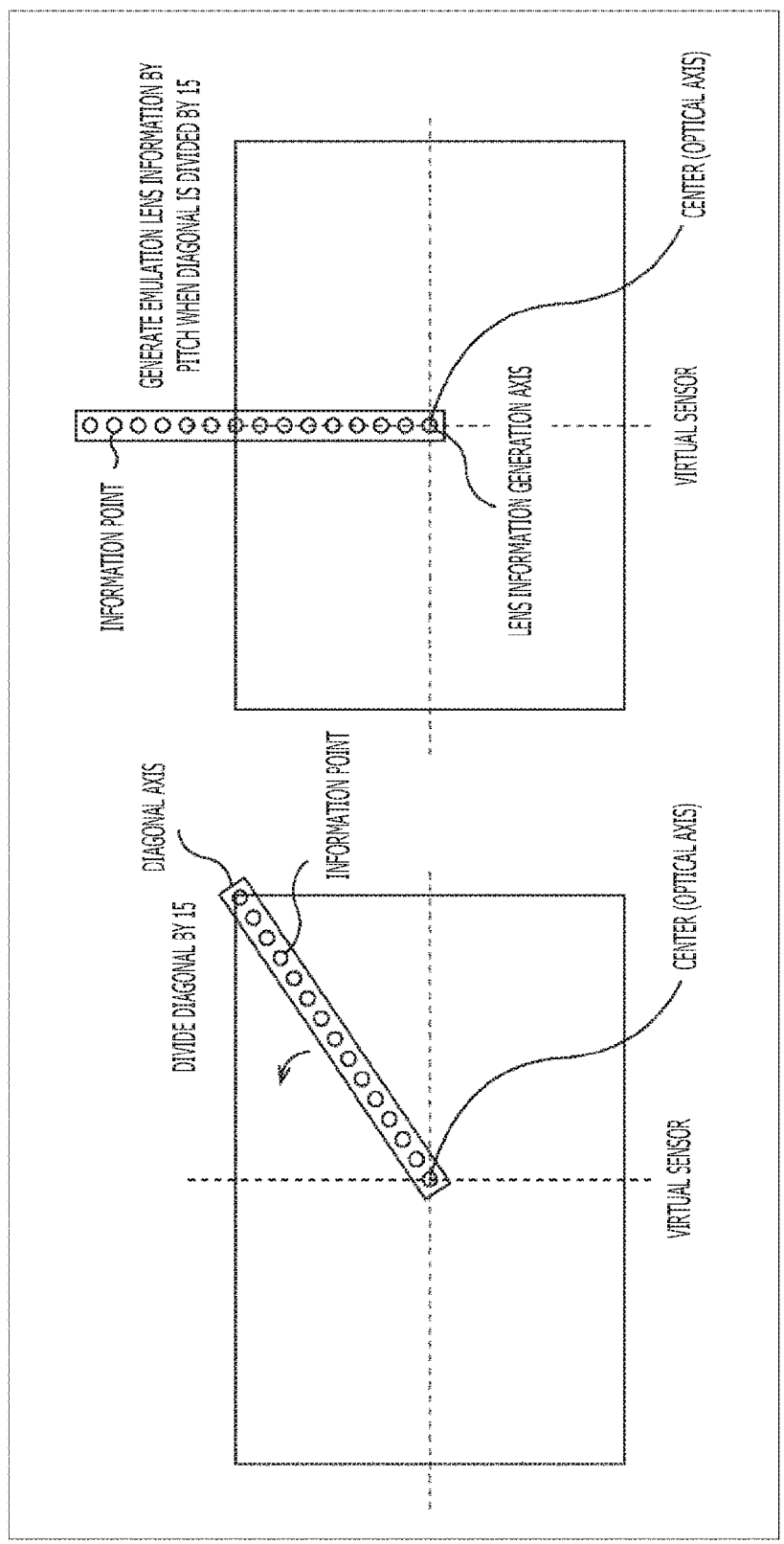
FIG. 59 is a view depicting a particular example of a lens information generation axis.

FIG. 59 is a view depicting a particular example of the lens information generation axis.

Now, an axis heading from the center of the virtual sensor toward one pixel at a diagonal of the virtual sensor as depicted in FIG. 59 is referred to as diagonal axis.

In FIG. 59, a plurality of positions such as 15 positions are set at equal distances as information positions on a diagonal axis.

Further, in FIG. 59, the diagonal axis to which the information points are set is rotated around the center of the virtual sensor such that it is directed in an upward direction, and the diagonal axis after the rotation is the lens information generation axis.

Accordingly, in FIG. 59, the lens information generation axis is a line segment that has a width of 0 and a vertical length equal to ½ the length of the diagonal of the virtual sensor (distance between pixels at the diagonal positions) and extends in the vertical direction (upward direction) from the center of the virtual sensor.

The emulation lens information generation section 37 can generate lens information only for real space points corresponding to the information points of such a lens information generation axis as described above. The real space points corresponding to the information points of the lens information generation axis are points in the plane represented by x=0.

It is to be noted that, although 15 or a like number of information points are sufficient in regard to the PSF intensity distribution, PSF angle component information and image plane pitch from within the lens information, for the image plane shift information, 15 or a like number of information points sometimes degrade the reproducibility of light condensing characteristics of the emulation lens in the light condensing process.

Therefore, for the image plane shift information, a value obtained by dividing the distance from the center of the virtual sensor to one pixel positioned at the diagonal (maximum value of the image height of the virtual sensor) by the pixel pitch of the virtual sensor (value proximate to ½ the number of pixels on the diagonal of the virtual sensor) or the like can be adopted as the number of information points to be provided on the lens information generation axis.

Here, if lens information is generated for real space points corresponding to N×DPN combinations of N pixels pix1 to pix#N configuring the virtual sensor and DPN parallaxes d that can be registered into a parallax map for each of Fmax focus positions f as described hereinabove with reference to FIGS. 40, 41, 45 and 48, then the number of arrays of the lens information becomes such a huge number as described below.

In particular, the number of arrays of the PSF intensity distribution is Fmax×N×DPN×PX×PY at most as described hereinabove with reference to FIG. 40. The number of arrays of the image plane pitch is Fmax×N×DPN at most as described hereinabove with reference to FIG. 41. The number of arrays of the PSF angle component information is Fmax×N×DPN×(PX+1)×(PY+1) at most as described hereinabove with reference to FIG. 45. The number of arrays of image plane shift information is Fmax×N×DPN at most as described hereinabove with reference to FIG. 48.

It is to be noted that PX and PY represent the horizontal (horizontal direction) and vertical (vertical direction) numbers of lens area units configuring a lens area, respectively, as described hereinabove with reference to FIG. 42.

On the other hand, if the number of information points on the lens information generation axis is represented as Ninfo, then the number of arrays of the lens information is such as described below.

In particular, the number of arrays of the PSF intensity distribution is Fmax×Ninfo×DPN×PX×PY at most. The number of arrays of the image plane pitch is Fmax×Ninfo×DPN at most. The number of arrays of the PSF angle component information is Fmax×Ninfo×DPN×(PX+1)×(PY+1) at most. The number of arrays of the image plane shift information is Fmax×Ninfo×DPN at most.

Accordingly, when lens information is generated only for the information points of the lens information generation axis, the information amount of the lens information can be reduced to Ninfo/N in comparison with that where lens information is generated for real space points corresponding to N×DPN combinations of N pixels pix1 to pix#N configuring the virtual sensor and DPN parallaxes d that can be registered into a parallax map for each of Fmax focus positions f.

For example, if the number of pixels N of the virtual sensor is 1892×1052 and the number Ninfo of the information points is 15, the information amount of the lens information can be reduced to 15/(1892×1052).

As a result, with the lens information generation axis, a blur degree or other light condensing characteristics of the emulation lens can be reproduced by a reduced data amount.

Figure 60:
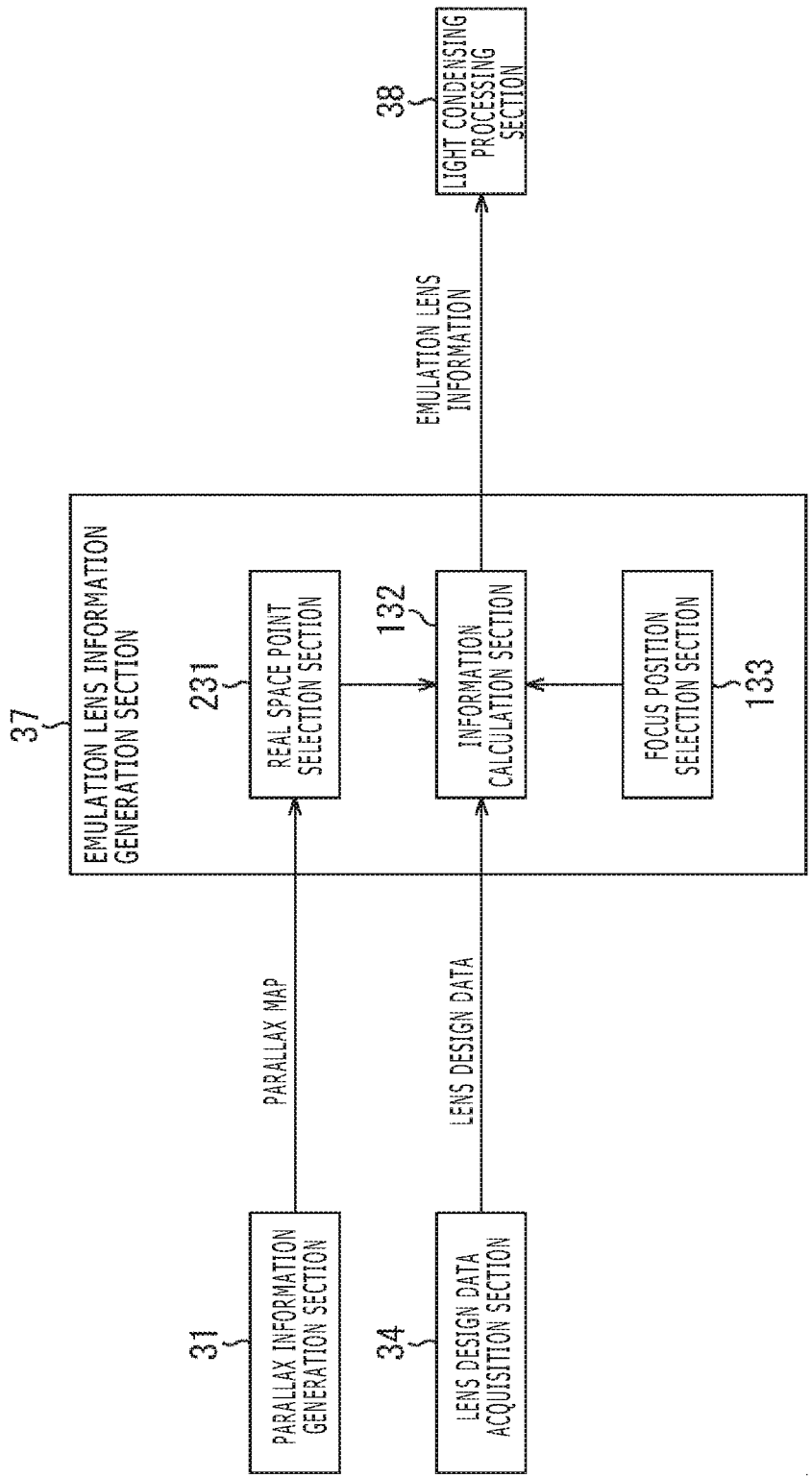
FIG. 60 is a block diagram depicting an example of a configuration of the emulation lens information generation section 37 where lens information is generated only for an information point of the lens information generation axis.

FIG. 60 is a block diagram depicting an example of a configuration of the emulation lens information generation section 37 of FIG. 3 where lens information is generated only for the information points of the lens information generation axis.

It is to be noted that, in FIG. 60, like elements to those in FIG. 49 are denoted by like reference numerals, and description of them is suitably omitted in the following description.

Referring to FIG. 60, the emulation lens information generation section 37 includes a real space point selection section 231, an information calculation section 132 and a focus position selection section 133.

Accordingly, the emulation lens information generation section 37 of FIG. 60 is common to the case of FIG. 49 in that it includes the information calculation section 132 and the focus position selection section 133.

However, the emulation lens information generation section 37 of FIG. 60 is different from the case of FIG. 49 in that it includes the real space point selection section 231 in place of the real space point selection section 131.

The real space point selection section 231 refers to a multilayer parallax map supplied from the parallax information generation section 31 (FIG. 3) to select a noticed real space point from among Ninfo×DPN real space points corresponding to combinations of Ninfo information points of a lens information generation axis on the virtual sensor and DPN parallaxes d that can be registered into the multilayer parallax map.

Figure 61:
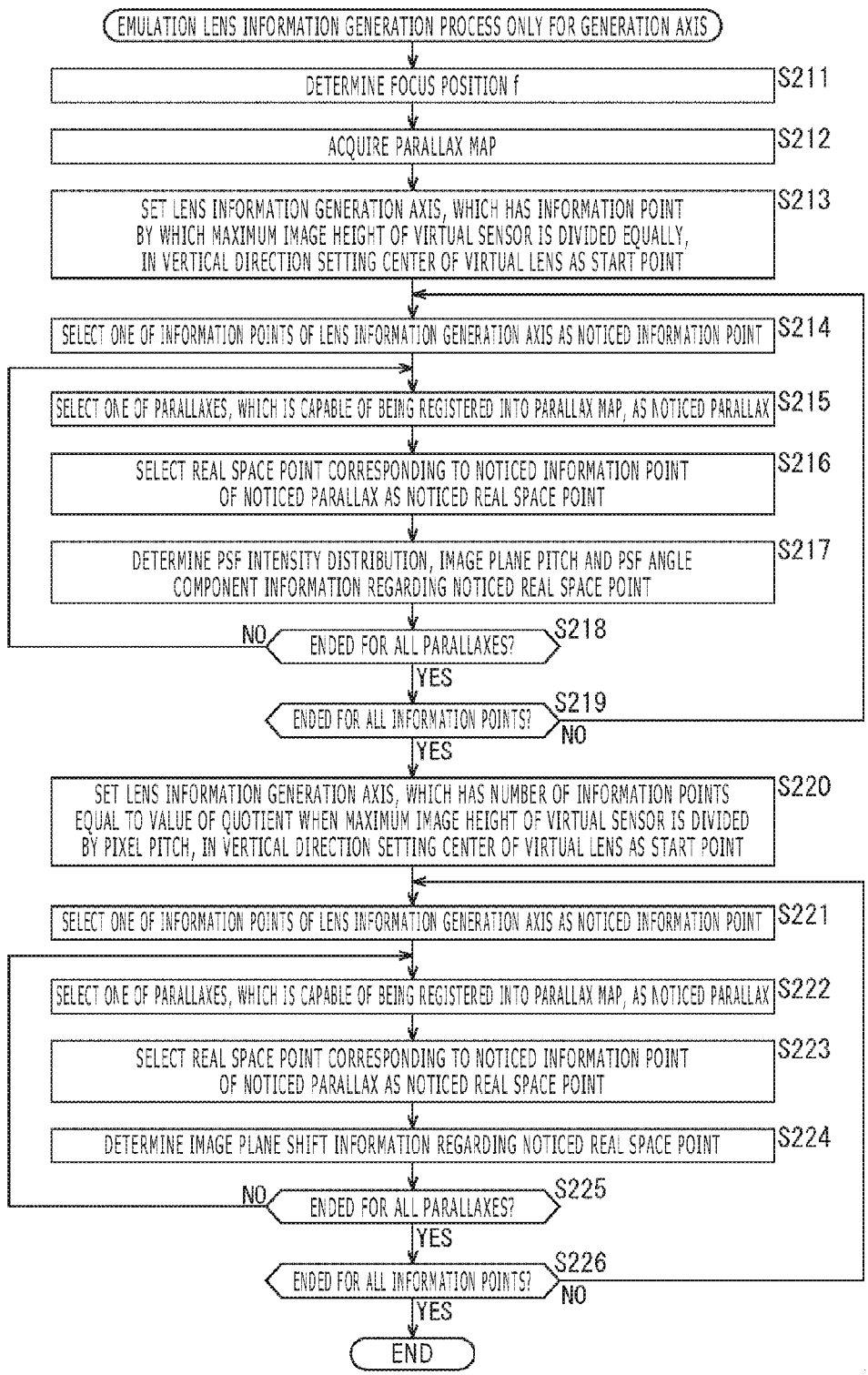
FIG. 61 is a flow chart illustrating an example of the emulation lens information generation process performed by the emulation lens information generation section 37.

FIG. 61 is a flow chart illustrating an example of an emulation lens information generation process performed by the emulation lens information generation section 37 of FIG. 60.

At step S211, the focus position selection section 133 selects a noticed focus position from among the Fmax focus positions f similarly as at step S141 of FIG. 50. Thereafter, the processing advances to step S212.

At step S212, the real space point selection section 231 acquires a multilayer parallax map supplied from the parallax information generation section 31 similarly as at step S142 of FIG. 50. Thereafter, the processing advances to step S213.

At step S213, the real space point selection section 231 sets a lens information generation axis to be used for generation of a PSF intensity distribution, PSF angle component information and an image plane pitch from within the lens information. Thereafter, the processing advances to step S214.

In particular, the real space point selection section 231 sets a lens information generation axis, which has a predetermined number of (for example, 15 or the like) information points determined in advance and which equally divides, for example, the maximum image height of the virtual sensor (distance from the center of the virtual sensor to one pixel on the diagonal), in a vertical direction (upward direction) from a start point set to the center of the virtual lens.

At step S214, the real space point selection section 231 selects, from among the information points of the lens information generation axis, one information point that has not been selected as a noticed information point as yet as a noticed information point. Thereafter, the processing advances to step S215.

At step S215, the real space point selection section 231 selects, from among parallaxes that are registered in the multilayer parallax map from the parallax information generation section 31 and can be registered into a pixel at the position of the noticed information point (pixel near to the noticed information point), one parallax that has not been selected as a noticed parallax as yet as a noticed parallax. Thereafter, the processing advances to step S216.

At step S216, the real space point selection section 231 selects a real space point corresponding to the noticed information point having the noticed parallax (position of the noticed information point on the plane of the virtual sensor) as a noticed real space point. Thereafter, the processing advances to step S217.

At step S217, the information calculation section 132 determines a PSF intensity distribution, an image plane pitch and PSF angle component information for the noticed real space point, namely, for a set of the noticed focus position, the noticed information point and the noticed parallax, in a similar manner as at step S146 of FIG. 50. Thereafter, the processing advances to step S218.

At step S218, the real space point selection section 231 decides whether or not all of the parallaxes that can be registered into the multilayer parallax map have been selected as a noticed parallax.

If it is decided at step S218 that all of the parallaxes that can be registered into the multilayer parallax map have not been selected as a noticed parallax as yet, then the processing returns to step S215, and thereafter, similar processes are repeated.

On the other hand, if it is decided at step S218 that all of the parallaxes that can be registered into the multilayer parallax map have been selected as a noticed parallax, then the processing advances to step S219.

At step S219, the real space point selection section 231 decides whether or not all of the information points of the lens information generation axis have been selected as a noticed information point.

If it is decided at step S219 that all of the information points of the lens information generation axis have not been selected as a noticed information point as yet, then the processing returns to step S214, and thereafter, similar processes are repeated.

On the other hand, if it is decided at step S219 that all of the information points of the lens information generation axis have been selected as a noticed information point, then the processing advances to step S220, and thereafter, image plane shift information is generated.

At step S220, the real space point selection section 231 sets a lens information generation axis to be used for generation of image plane shift information from within the lens information. Thereafter, the processing advances to step S221.

In particular, the real space point selection section 231 sets a lens information generation axis, on which, for example, the number of information points equal to the number of a value obtained by dividing the maximum image height of the virtual sensor by the pixel pitch of the virtual sensor are disposed at equal distances, in the vertical direction from a start point set to the center of the virtual lens.

At step S221, the real space point selection section 231 selects, from among the information points of the lens information generation axis, one information point that has not been selected as a noticed information point as yet as a noticed information point. Thereafter, the processing advances to step S222.

At step S222, the real space point selection section 231 selects, from among parallaxes that are registered in the multilayer parallax map from the parallax information generation section 31 and can be registered into a pixel at the position of the noticed information point, one parallax that has not been selected as a noticed parallax as yet as a noticed parallax. Thereafter, the processing advances to step S223.

At step S223, the real space point selection section 231 selects a real space point corresponding to the noticed information point having the noticed parallax as a noticed real space point. Thereafter, the processing advances to step S224.

At step S224, the information calculation section 132 determines image plane shift information for the noticed real space point, namely, for the set of the noticed focus position, the noticed information point and the noticed parallax, similarly as at step S146 of FIG. 50. Thereafter, the processing advances to step S225.

At step S225, the real space point selection section 231 decides whether or not all of the parallaxes that can be registered into the multilayer parallax map have been selected as a noticed parallax.

If it is decided at step S225 that all of the parallaxes that can be registered into the multilayer parallax map have not been selected as a noticed parallax as yet, then the processing returns to step S222, and thereafter, similar processes are repeated.

On the other hand, if it is decided at step S225 that all of the parallaxes that can be registered into the multilayer parallax map have been selected as a noticed parallax, then the processing advances to step S226.

At step S226, the real space point selection section 231 decides whether or not all of the information points of the lens information generation axis have been selected as a noticed information point.

If it is decided at step S226 that all of the information points of the lens information generation axis have not been selected as a noticed information point as yet, then the processing returns to step S221, and thereafter, similar processes are repeated.

On the other hand, if it is decided at step S226 that all of the information points of the lens information generation axis have been selected as a noticed information point, then the emulation lens information generation process is ended.

In the emulation lens information generation process of FIG. 61, lens information regarding real space points corresponding to sets of the parallaxes that can be registered into the multilayer parallax map and information points of the lens information generation axis is determined in such a manner as described above.

Figure 62B:
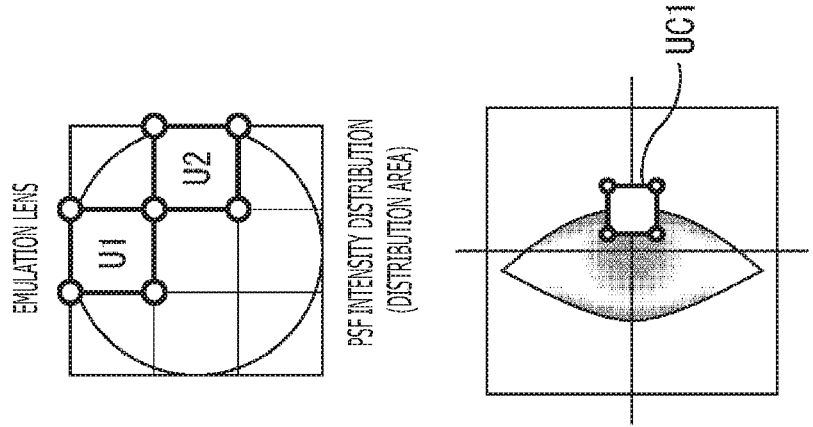
FIGS. 62A and 62B are views illustrating an example of a light condensing process performed using lens information generated for (a real space point corresponding to) an information point of the lens information generation axis.
Figure 62A:
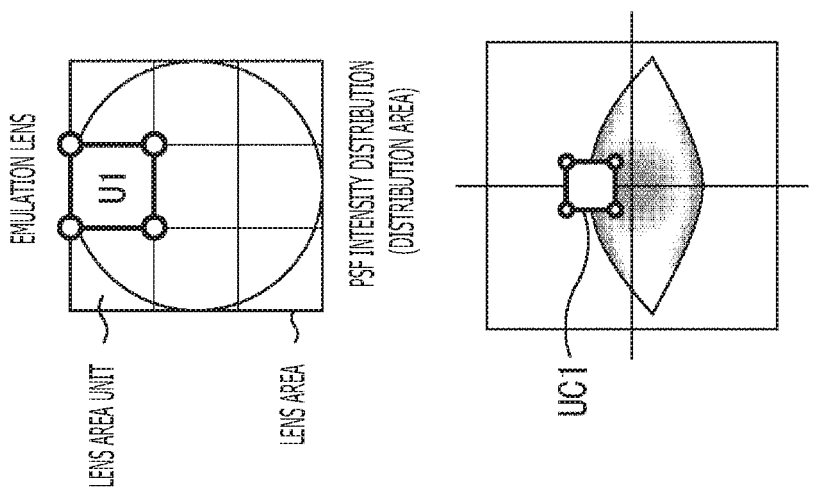

FIGS. 62A and 62B are views illustrating an example of a light condensing process performed using lens information generated for (the real space points corresponding to) the information points of the lens information generation axis in such a manner as described above.

As a method for performing a light condensing process using lens information generated for the information points of the lens information generation axis, a method for rotating the lens information (hereinafter referred to as lens information rotation method) and a method for rotating a ray to be used for a light condensing process (hereinafter referred to as ray rotation method) are available.

Now, an angle when (a pixel of) the virtual sensor or the lens information generation axis is rotated around the center of the virtual sensor such that, for example, the pixel (position) of the virtual sensor corresponding to a certain real space point rsp is positioned on the lens information generation axis is referred to as coincidence rotation angle ALPHA.

The pixel of the virtual sensor corresponding to the real space point rsp and the lens information generation axis form the coincidence rotation angle ALPHA around the center of the virtual sensor.

In the lens information rotation method and the ray rotation method, when (a pixel of) the virtual sensor or the lens information generation axis is rotated by the coincidence rotation angle ALPHA around the center of the virtual sensor such that the pixel of the virtual sensor corresponding to the real space point rsp is positioned on the lens information generation axis, an information point nearest to the pixel of the virtual sensor corresponding to the real space point rsp (hereinafter referred to as corresponding information point) is detected.

Here, the clockwise direction of the rotation angle upon rotation around the center of the virtual sensor is determined as positive direction. In this case, by rotating the lens information generation axis by the coincidence rotation angle +ALPHA around the center of the virtual sensor or by rotating the virtual sensor by the coincidence rotation angle −ALPHA around the center of the virtual sensor, the pixel of the virtual sensor corresponding to the real space point rsp comes to be positioned on the lens information generation axis.

In the following, in order to simplify the description, it is assumed that, upon detection of a corresponding information point, from between the lens information generation axis and the virtual sensor, for example, the lens information generation axis is rotated by coincidence rotation angle +ALPHA.

In the lens information rotation method and the ray rotation method, when the lens information generation axis is rotated by the coincidence rotation angle +ALPHA around the center of the virtual sensor, an information point nearest to the pixel of the virtual sensor corresponding to the real space point rsp is detected as a corresponding information point.

Then, a light condensing process is performed applying the lens information regarding (the real space point corresponding to) the corresponding information point to a ray emitted from the real space point rsp.

However, in the lens information rotation method, (the PSF intensity distribution, the PSF angle component information and the image plane shift information from within) the lens information regarding the corresponding information point is rotated by the coincidence rotation angle +ALPHA and applied to the ray emitted from the real space point rsp.

Meanwhile, in the ray rotation method, a ray emitted from the real space point rsp is rotated by the coincidence rotation angle −ALPHA, and lens information regarding the corresponding information point is applied to the ray after the rotation.

FIG. 62 depicts an example of a light condensing process by the lens information rotation method.

FIG. 62A depicts an example of calculation of an image formation value in the light condensing method where the noticed pixel of the virtual sensor corresponding to the noticed real space point is a pixel on the lens information generation axis (hereinafter referred to as on-axis pixel).

In particular, FIG. 62A depicts an example of (a distribution area having recorded therein) a PSF intensity distribution regarding a corresponding information point regarding a noticed pixel of the virtual sensor corresponding to a noticed real space point.

In FIG. 62A, a ray incident to a lens area unit U1 reaches a corresponding area UC1 of a PSF intensity distribution.

Where the noticed pixel of the virtual sensor corresponding to the noticed real space point is an on-axis pixel, for a ray emitted from the noticed real space point and incident to the lens area unit U1, the PSF intensity distribution regarding the corresponding information point to the noticed pixel is used as it is (without rotating the same), and the product of the luminance allocated to the ray incident to the lens area unit U1 and the PSF intensity distribution of the corresponding area UC1 is determined as an image formation value.

FIG. 62B depicts an example of calculation of an image formation value in a light condensing process where the noticed pixel of the virtual sensor corresponding to the noticed real space point is a pixel on a straight line provided by the lens information generation axis when the lens information generation axis is rotated, for example, by 90 degrees around the center of the virtual sensor (the pixel is referred to also as 90-degree rotation pixel).

In FIG. 62B, the coincidence rotation angle +ALPHA of a 90-degree rotation pixel that is the noticed pixel is 90 degrees.

Now, it is assumed that the corresponding information point to the 90-degree rotation pixel that is the noticed pixel coincides with the corresponding information point to the on-axis pixel in the case of FIG. 62A.

In this case, according to the lens information rotation method, for a ray emitted from the noticed real space point, an image formation value is determined using a PSF intensity distribution after rotation when a PSF intensity distribution regarding the corresponding information point to the noticed pixel is rotated, for example, by 90 degrees that is the coincidence rotation angle +ALPHA around the center of the distribution area in which the PSF intensity distribution is recorded.

For (a distribution area having recorded thereon) a PSF intensity distribution after rotation, a ray incident to the lens area unit U2 positioned at the position of the lens area unit U1 after rotation when the lens area unit U1 is rotated by 90 degrees that is the coincidence rotation angle +ALPHA around the optical axis reaches the corresponding area UC1 of the PSF intensity distribution.

Accordingly, where the noticed pixel is a 90-degree rotation pixel, as an image formation value of a ray emitted from the noticed real space point and incident to the lens area unit U2, the product of the luminance allocated to the ray incident to the lens area unit U2 and the PSF intensity distribution of the corresponding area UC1 is determined in the lens information rotation method.

Figure 63A:
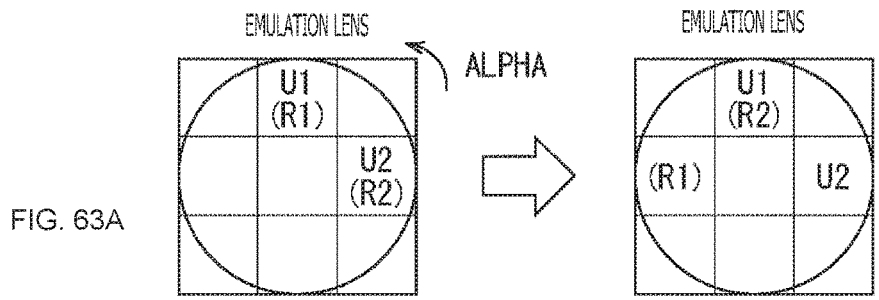
FIGS. 63A, 63B and 63C are views depicting an example of a light condensing process by a ray rotation method.
Figure 63B:
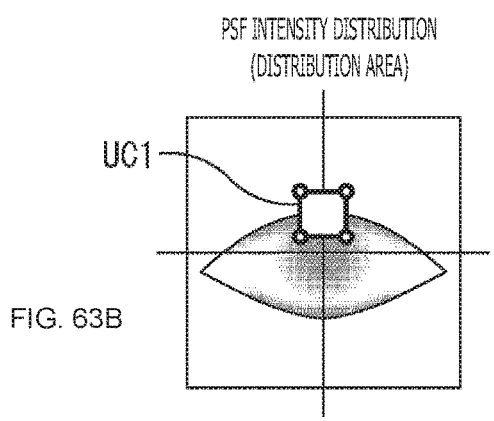
Figure 63C:
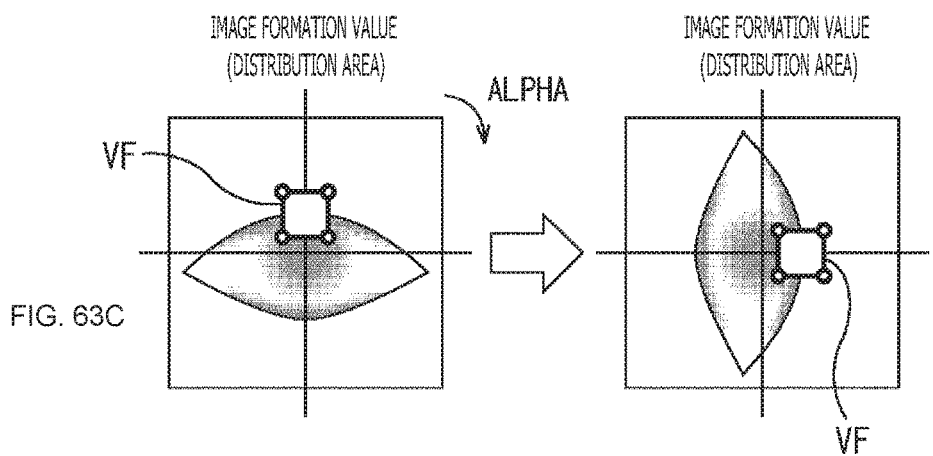

FIGS. 63A, 63B and 63C depicts an example of a light condensing process according to the ray rotation method.

Where the noticed pixel of the virtual sensor corresponding to the noticed real space point is an on-axis pixel, in the ray rotation method, the image formation value of a ray emitted from the noticed real space point is determined similarly as in the lens information rotation method.

On the other hand, where the noticed pixel of the virtual sensor corresponding to the noticed real space point is, for example, a 90-degree rotation pixel, in the ray rotation method, a ray after rotation when a ray emitted from the noticed real space point is rotated by coincidence rotation angle −ALPHA=−90 degrees is used to determine an image formation value of the ray.

FIG. 63A depicts rotation of a ray emitted from the noticed real space point.

Where the noticed pixel of the virtual sensor corresponding to the noticed real space point is a 90-degree rotation pixel, a ray to be incident to the emulation lens is rotated by the coincidence rotation angle −ALPHA=−90 degrees around the optical axis.

In FIG. 63A, before rotation of the ray, a ray R1 is incident to the lens area unit U1 from the noticed real space point, and another ray R2 is incident to the lens area unit U2 from the noticed real space point.

The lens area unit U2 is positioned at a position when the lens area unit U1 is rotated by the coincidence rotation angle +ALPHA=+90 degrees around the optical axis.

Accordingly, if a ray to be incident to the emulation lens is rotated by the coincidence rotation angle −ALPHA=−90 degrees around the optical axis, the ray R2 that has been incident to the lens area unit U2 before the rotation now enters the lens area unit U1.

FIG. 63B depicts an example of (a distribution area having recorded therein) a PSF intensity distribution regarding the corresponding information point regarding the 90-degree rotation pixel that is the noticed pixel.

In FIG. 63B, a ray incident to the lens area unit U1 reaches the corresponding area UC1 of the PSF intensity distribution similarly as in the case of FIG. 62A.

Since the ray R2 after the rotation enters the lens area unit U1, the image formation value VF of the ray R2 is determined as the product of the luminance of the ray R2 and the PSF intensity distribution of the corresponding area UC1 to the lens area unit U1.

FIG. 63 depicts an example of reverse rotation of the image formation value VF of the ray R2.

In the ray rotation method, when an image formation value VF is added to the virtual sensor, (the distribution area having recorded thereon) the image formation value VF is rotated reversely by the coincidence rotation angle −ALPHA=−90 degrees by which the ray has been rotated around the optical axis.

In particular, (the distribution area having recorded therein) the image formation value VF is added on the virtual sensor after it is rotated by the coincidence rotation angle +ALPHA=+90 degrees around the optical axis.

In the light condensing process performed using lens information generated for the lens information generation axis, the lens information rotation method may be adopted or the ray rotation method may be adopted.

According to the lens information rotation method, the arithmetic operation amount required for the light condensing process can be made smaller than that by the ray rotation method.

However, in the lens information rotation method, the reproducibility of the light condensing characteristics of the emulation lens may possibly be degraded.

In particular, in the lens information rotation method, lens information (except the image plane pitch) is rotated by the coincidence rotation angle +ALPHA.

In this case, the coordinate system of the distribution area reaching point AP#i (FIG. 44) represented, for example, by the PSF angle component information from within the lens information after the rotation is a coordinate system inclined by the coincidence rotation angle +ALPHA. Therefore, except a case in which the coincidence rotation angle +ALPHA is an integer multiple of 90 degrees, a displacement occurs between a position that may possibly become the distribution area reaching point AP#i represented by the PSF angle component information before the rotation and a position that may possibly become the distribution area reaching point AP#i represented by the PSF angle component information after the rotation.

Since the distribution area reaching point AP#i represented by the PSF angle component information represents a position on the PSF intensity distribution reached by a ray in a granularity of a distribution area unit (FIG. 40) of the distribution area, depending upon the granularity, the displacement appearing between the position that may possibly become the distribution area reaching point AP#i represented by the PSF angle component information before the rotation and the position that may possibly become the distribution area reaching point AP#i represented by the PSF angle component information after the rotation may have a bad influence on the reproduction of light condensing characteristics of the emulation lens.

In particular, in the corresponding area (FIG. 44) represented by the PSF angle component information after the rotation, the PSF intensity distribution sometimes overlaps partly with the PSF intensity distribution of some other corresponding area or a portion of the PSF intensity distribution which should originally be included in a certain corresponding area sometimes misses from the corresponding area.

Where the degree of the overlap or the missing of the PSF intensity distribution is high, the reproducibility of light condensing characteristics of the emulation lens degrades.

Therefore, for the light condensing process, the ray rotation method can be adopted.

However, if the granularity of the position, represented by the distribution area reaching point AP#i, on the PSF intensity distribution reached by a ray is sufficiently fine, then even if the lens information rotation method is used for the light condensing process, the light condensing characteristics of the emulation lens can be reproduced sufficiently accurately. Therefore, in this case, the lens information rotation method can be adopted.

FIG. 64 is a block diagram depicting an example of a configuration of the light condensing processing section 38 that performs a light condensing process using lens information generated on the lens information generation axis.

It is to be noted that, in FIG. 64, like portions to those of FIG. 55 are denoted by like reference numerals, and in the following description, description of them is suitably omitted.

Referring to FIG. 64, the light condensing processing section 38 includes a real space point selection section 141, an image formation value calculation section 242, a scale adjustment section 143, an image formation position recognition section 244, an addition section 245 and a rotation processing section 246.

Accordingly, the light condensing processing section 38 of FIG. 64 is common to the case of FIG. 55 in that it includes the real space point selection section 141 and the scale adjustment section 143.

However, the light condensing processing section 38 of FIG. 64 is different from the case of FIG. 55 in that it includes the image formation value calculation section 242, the image formation position recognition section 244 and the addition section 245 in place of the image formation value calculation section 142, the image formation position recognition section 144 and the addition section 145, respectively.

Further, the light condensing processing section 38 of FIG. 64 is different from the case of FIG. 55 in that it newly includes the rotation processing section 246.

The image formation value calculation section 242 determines a distribution area in which a distribution of image formation values of rays emitted from a noticed real space point selected by the real space point selection section 131 is recorded by the lens information rotation method or the ray rotation method, and supplies the distribution area to the scale adjustment section 143.

In particular, the image formation value calculation section 242 determines a distribution area in which a distribution of image formation values of rays emitted from a noticed real space point selected by the real space point selection section 131 from among rays supplied from the rotation processing section 246 and rotated by a coincidence rotation angle −ALPHA is recorded using a PSF intensity distribution and PSF angle component information supplied from the rotation processing section 246 in accordance with the ray rotation method, and supplies the distribution area to the scale adjustment section 143.

Alternatively, the image formation value calculation section 242 determines a distribution area in which a distribution of image formation values of rays emitted from a noticed real space point selected by the real space point selection section 131 and supplied from the rotation processing section 246 is recorded using a PSF intensity distribution and PSF angle component information supplied from the rotation processing section 246 and rotated by the coincidence rotation angle +ALPHA in accordance with the lens information rotation method, and supplies the distribution area to the scale adjustment section 143.

The image formation position recognition section 244 recognizes an image plane shift position that is an image formation position on the virtual sensor at which rays passing through the emulation lens form an image from image plane shift information supplied from the rotation processing section 246 or the image plane shift information rotated by the coincidence rotation angle +ALPHA, and supplies the image plane shift position to the addition section 245 together with the distribution area after adjustment of the scale from the scale adjustment section 143.

The addition section 245 performs a process similar to that of the addition section 145 of FIG. 55.

In particular, the addition section 245 has a memory as the virtual sensor built therein and performs positioning of the distribution area after adjustment of the scale from the image formation position recognition section 244 and the virtual sensor depending upon an image plane shift position from the image formation position recognition section 244.

Further, the addition section 245 adds the image formation values recorded in the distribution area after the positioning with the virtual sensor on the virtual sensor in a unit of a pixel of the virtual sensor.

Then, the addition section 245 supplies an image, in which pixel values are given by an addition result of the image formation values obtained on the virtual sensor, namely, on the memory, as an emulation image to the display apparatus 13 (FIG. 1).

It is to be noted that, when a light condensing process by the lens information rotation method is performed, the addition section 245 performs a process similar to that of the addition section 145 of FIG. 55 as described above.

On the other hand, when a light condensing process by the ray rotation method is performed, the addition section 245 first rotates (the image formation values recorded in) the distribution area after positioning reversely by the coincidence rotation angle −ALPHA when the ray has been rotated by the rotation processing section 246, namely, by the coincidence rotation angle +ALPHA, and then adds the image formation values recorded in the distribution area after the rotation on the virtual sensor.

To the rotation processing section 246, rays are supplied from the incident ray reproduction section 36 (FIG. 3) and lens information regarding the information points of the lens information generation axis is supplied from the emulation lens information generation section 34 (FIG. 3).

When a light condensing process by the lens information rotation method is performed, the rotation processing section 246 rotates the PSF intensity distribution, the PSF angle component information and the image plane shift information from within lens information regarding the information points of the lens information generation axis from the emulation lens information generation section 34 by the coincidence rotation angle +ALPHA when the lens information generation axis is rotated such that a pixel of the virtual sensor corresponding to the noticed real space point selected by the real space point selection section 141 comes to a pixel on the lens information generation axis.

Then, the rotation processing section 246 supplies the PSF intensity distribution and the PSF angle component information after the rotation to the image formation value calculation section 242 and supplies the image plane shift information after the rotation to the image formation position recognition section 244.

Furthermore, the rotation processing section 246 supplies the rays from the incident ray reproduction section 36 as they are to the image formation value calculation section 242 without rotating the same.

On the other hand, when a light condensing process by the ray rotation method is performed, the rotation processing section 246 rotates rays from the incident ray reproduction section 36 by the coincidence rotation angle −ALPHA when (a pixel of) the virtual sensor is rotated such that a pixel of the virtual sensor corresponding to the noticed real space point selected by the real space point selection section 141 becomes a pixel on the lens information generation axis.

Then, the rotation processing section 246 supplies the rays after the rotation to the image formation value calculation section 242.

Furthermore, the rotation processing section 246 supplies the PSF intensity distribution and the PSF angle component information from within the lens information regarding the information points of the lens information generation axis from the emulation lens information generation section 34 as they are to the image formation value calculation section 242 without rotating the same and supplies the image plane shift information as it is to the image formation position recognition section 244 without rotating the same.

FIG. 65 is a flow chart illustrating an example of a light condensing process performed by the light condensing processing section 38 of FIG. 64.

It is to be noted that, in the present embodiment, lens information is generated only for a noticed focus position in order to reduce the information amount of lens information as described hereinabove with reference to FIG. 61. Therefore, the light condensing process is performed assuming that the focus position is set to the noticed focus position when lens information is generated.

However, lens information can be generated in advance for each of the Fmax focus positions (FIG. 37). In this case, the light condensing processing section 38 sets a noticed focus position and can perform a light condensing process using lens information regarding the noticed focus position.

Alternatively, the emulation lens information generation section 37 can generate lens information for a noticed focus position after the noticed focus position is set by the light condensing processing section 38.

Here, in FIG. 65, it is assumed that a light condensing process by the ray rotation method is performed.

At steps S251 to S254, processes similar to those at steps S151 to S154 of FIG. 56 are performed.

In particular, the real space point selection section 141 acquires a multilayer parallax map supplied from the parallax information generation section 31 at step S251 and selects one pixel that has not been selected as a noticed pixel as yet from among the pixels of the reference image HD1 as a noticed pixel at step S252.

Further, at step S253, the real space point selection section 141 selects one parallax that has not been selected as a noticed parallax as yet from among the parallaxes of the noticed pixel registered in the multilayer parallax map from the parallax information generation section 31 as a noticed parallax. Then at step S254, the real space point selection section 141 selects a real space point corresponding to the noticed pixel having the noticed parallax as a noticed real space point.

Then, the processing advances from step S254 to step S255, at which the rotation processing section 246 calculates the coincidence rotation angle −ALPHA when the virtual sensor is rotated such that a pixel of the virtual sensor corresponding to the noticed real space point selected by the real space point selection section 141 becomes a pixel on the lens information generation axis. Then, the processing advances to step S256.

At step S256, the rotation processing section 246 selects one lens area unit that has not been selected as a noticed lens area unit as yet from among the lens area units of the emulation lens as a noticed lens area unit. Then, the processing advances to step S257.

At step S257, the rotation processing section 246 acquires a ray heading from the noticed real space point toward the noticed lens area unit from among rays supplied from the incident ray reproduction section 36 as a noticed ray. Then, the processing advances to step S258.

At step S258, the rotation processing section 246 rotates the noticed ray by the coincidence rotation angle −ALPHA calculated at step S255 around the optical axis and supplies the noticed ray after the rotation to the image formation value calculation section 242. Then, the processing advances to step S259.

At step S259, the image formation value calculation section 242 decides whether or not the noticed ray after the rotation from the rotation processing section 246 reaches the emulation lens from the noticed real space point.

If it is decided at step S259 that the noticed ray after the rotation reaches the emulation lens, namely, if the parallax allocated to the noticed ray after the rotation (parallax allocated by the incident ray reproduction process described hereinabove with reference to FIGS. 33 to 35) is equal to the noticed parallax, then the processing advances to step S260.

At step S260, for the noticed ray after rotation decided to reach the emulation lens by the image formation value calculation section 242, the scale adjustment section 143, the image formation position recognition section 244 and the addition section 245, namely, for the noticed ray after rotation obtained by rotating the noticed ray that remains as a result of the collision decision, a ray addition process hereinafter described is performed. Then, the processing advances to step S261.

On the other hand, if it is decided at step S259 that the noticed ray after rotation does not reach the emulation lens, namely, if the parallax allocated to the noticed ray after rotation is not equal to the noticed parallax, then the processing skips step S260 and advances to step S261.

Accordingly, when the noticed ray after rotation does not reach the emulation lens, the ray addition process is not performed for the noticed ray after rotation.

At steps S261 to S263, processes similar to those at steps S159 to S161 of FIG. 56 are performed.

In particular, at step S261, the rotation processing section 246 decides whether or not all of the lens area units of the emulation lens have been selected as a noticed lens area unit. Then, if it is decided that all of the lens area units of the emulation lens have not been selected as a noticed lens area unit, then the processing returns to step S256, and thereafter, similar processes are repeated.

On the other hand, if it is decided at step S261 that all of the lens area units of the emulation lens have been selected as a noticed lens area unit, then the processing advances to step S262, at which the real space point selection section 141 decides whether or not all of the parallaxes of the noticed pixel registered in the multilayer parallax map have been selected as a noticed parallax.

If it is decided at step S262 that all of the parallaxes of the noticed pixel registered in the multilayer parallax map have not been selected as a noticed parallax as yet, then the processing returns to step S253, and thereafter, similar processes are repeated.

On the other hand, if it is decided at step S262 that all of the parallaxes of the noticed pixel registered in the multilayer parallax map have been selected as a noticed parallax, then the processing advances to step S263, at which the real space point selection section 141 decides whether or not all of the pixels of the reference image HD1 have been selected as a noticed pixel.

If it is decided at step S263 that all of the pixels of the reference image HD1 have not been selected as a noticed pixel, then the processing returns to step S252, and thereafter, similar processes are repeated.

On the other hand, if it is decided at step S263 that all of the pixels of the reference image HD1 have been selected as a noticed pixel, then the addition section 245 supplies an image, in which the pixel values are provided by addition results of the image formation values on the virtual sensor, obtained by the processes till then as an emulation image to the display apparatus 13 (FIG. 1), thereby ending the light condensing process.

Figure 66:
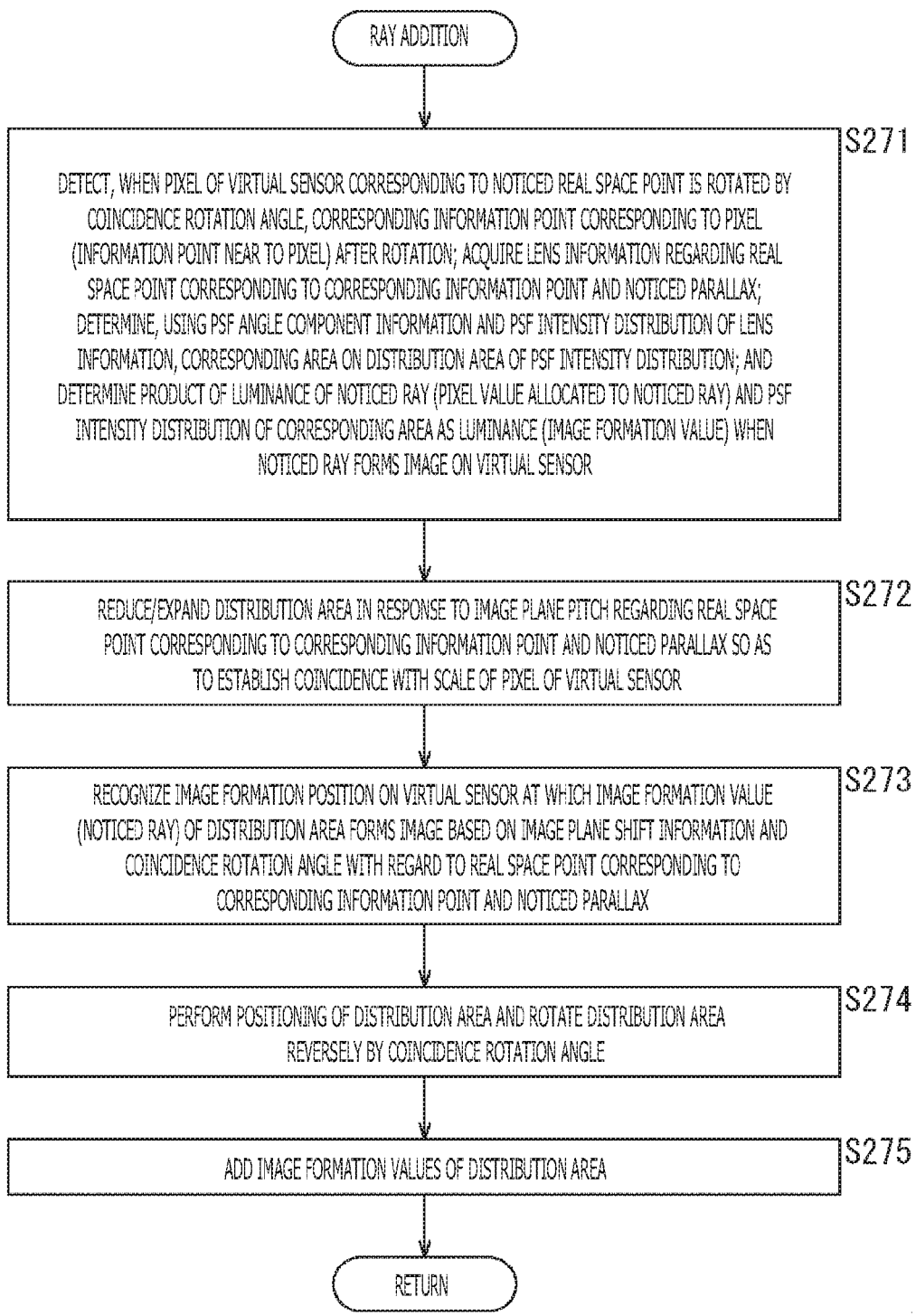
FIG. 66 is a flow chart illustrating an example of the ray addition process.

FIG. 66 is a flow chart illustrating an example of the ray addition process performed at step S260 of FIG. 65.

At step S271, the image formation value calculation section 242 detects a corresponding information point, which is an information point nearest to a pixel (position) after rotation of the virtual sensor corresponding to a noticed real space point when the pixel is rotated by the coincidence rotation angle −ALPHA calculated at step S255 of FIG. 65, from among the information points of the lens information generation axis.

Further, the image formation value calculation section 242 acquires lens information regarding a real space point corresponding to the corresponding information point and the noticed parallax from within the lens information regarding the information points of the lens information generation axis from the rotation processing section 246.

Then, the image formation value calculation section 242 determines a corresponding area that is a position on the distribution area in which a PSF intensity distribution in which a noticed ray after rotation from the rotation processing section 246 reaches is recorded using (a distribution area having recorded therein) a PSF intensity distribution and the PSF angle component information regarding the noticed focus position f from within the lens information regarding a real space point corresponding to the corresponding information point and the noticed parallax.

Further, the image formation value calculation section 242 determines the product of the PSF intensity distribution of the corresponding area and the luminance allocated to the noticed ray after rotation (luminance allocated by the incident ray reproduction process described hereinabove with reference to FIGS. 33 to 35) as (a distribution of) an image formation value of the noticed ray after rotation.

Then, the image formation value calculation section 242 supplies the distribution area in which the image formation value of the noticed ray after rotation is recorded to the scale adjustment section 143. Thereafter, the processing advances from step S271 to step S272.

At step S272, the scale adjustment section 143 acquires lens information regarding the real space point corresponding to the corresponding information point and the noticed parallax from within the lens information regarding the information points of the lens information generation axis from the emulation lens information generation section 34.

Then, the scale adjustment section 143 reduces or expands the distribution area in which the distribution of image formation values from the image formation value calculation section 242 is recorded using the image plane pitch regarding the noticed focus position f from within the lens information regarding the real space point corresponding to the corresponding information point and the noticed parallax to adjust the scale of the distribution area so as to coincide with the scale of the virtual sensor.

Further, the scale adjustment section 143 supplies the distribution area after the adjustment of the scale to the addition section 245 through the image formation position recognition section 244. Thereafter, the processing advances from step S272 to step S273.

At step S273, the image formation position recognition section 244 acquires lens information regarding the real space point corresponding to the corresponding information point and the noticed parallax from within the lens information regarding the information point of the lens information generation axis from the rotation processing section 246.

Then, the image formation position recognition section 244 recognizes the image plane shift position that is an image formation position on the virtual sensor at which a noticed ray before rotation forms an image through the emulation lens from the image plane shift information regarding the noticed focus position f and the coincidence rotation angle −ALPHA by which the noticed ray is rotated by the rotation processing section 246 from within the lens information regarding a real space point corresponding to the corresponding information point and the noticed parallax and supplies the image plane shift position to the addition section 245. Then, the processing advances to step S274.

At step S274, the addition section 245 performs positioning of the distribution area after adjustment of the scale obtained by the scale adjustment section 143 and the virtual sensor depending upon the image plane shift position from the image formation position recognition section 244.

In particular, the addition section 245 performs positioning of the distribution area after adjustment of the scale and the virtual sensor such that the center point CP (FIG. 54) of the distribution area after adjustment of the scale and the image plane shift position of the virtual sensor coincide with each other.

Further, at step S274, the addition section 245 rotates (the image formation values recorded in) the distribution area after positioning reversely around the optical axis (or the center point CP) by the coincidence rotation angle −ALPHA when the noticed ray is rotated by the rotation processing section 246, namely, around the optical axis (or the center point CP) by the coincidence rotation angle +ALPHA. Then, the processing advances to step S275.

At step S275, the addition section 245 adds the image formation values recorded in the distribution area after rotation on the virtual sensor in a unit of a pixel of the virtual sensor. That is, the addition section 245 adds storage values of the memory as the virtual sensor and the image formation values and rewrites the storage values of the memory with the addition values obtained as a result of the addition.

The ray addition process ends therewith, and the processing returns.

As described above, where lens information is generated for real space points corresponding to a plurality of information points that are a plurality of positions of part of the plane of the virtual sensor and a light condensing process is performed using the lens information, a blur degree or other light condensing characteristics of the emulation lens can be reproduced accurately by a reduced data amount.

It is to be noted that, while, in the present embodiment, a line segment (FIG. 59) that has a length equal to ½ the length of the diagonal of the virtual sensor and extends in the vertical direction from the center of the virtual sensor is adopted as the lens information generation axis, as the lens information generation axis, an arbitrary one axis extending from the center of the virtual sensor can be adopted.

In particular, as the lens information generation axis, for example, a line segment interconnecting the center of the virtual sensor and one pixel of a diagonal of the virtual sensor can be adopted.

Further, the plurality of information points are not limited to a plurality of points that equally divide the lens information generation axis extending from the center of the virtual sensor.

In particular, as the plurality of information points, for example, a plurality of points arranged on a straight line or not arranged on a straight line where the image height of the plane of the virtual sensor differs can be adopted. It is to be noted that image heights of a plurality of information points are preferably scattered evenly within a range from zero to a maximum value of the image height of the virtual sensor.

Figure 67:
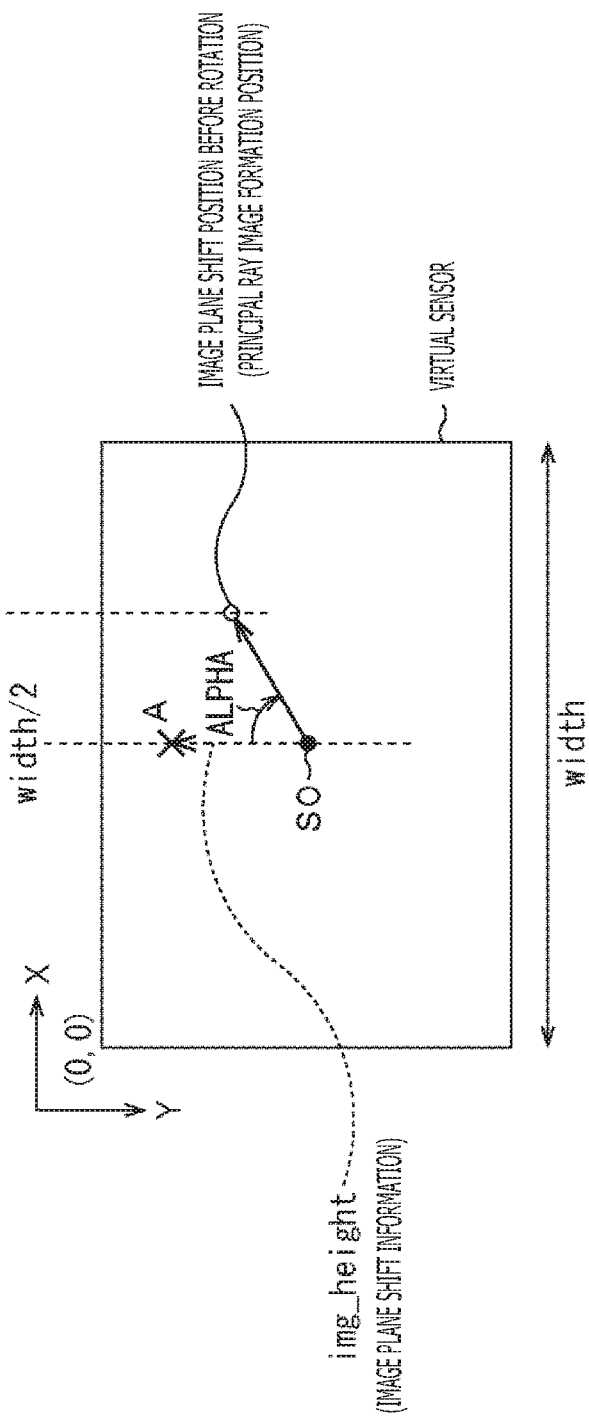
FIG. 67 is a view illustrating a method for determining an image plane shift position that is an image formation position on the virtual sensor on which rays before rotation form an image where the light condensing process by the ray rotation method is performed.

FIG. 67 is a view illustrating a method for determining, where a light condensing process by the ray rotation method (FIGS. 65 and 66) is performed, an image plane shift position that is an image formation position on the virtual sensor at which rays before rotation form an image (a method for recognizing the image formation position at step S273 in FIG. 66).

Here, it is assumed that the image plane shift position is represented, for example, by a coordinate (x, y) of a two-dimensional coordinate system in which the origin is a pixel at the left upper corner of the virtual sensor and the pixel pitch of the virtual sensor is 1.

Further, it is assumed that the image plane shift information represents distances (micrometer) in the x direction and the y direction from the optical axis (center of the virtual sensor) S0 of the image plane shift position.

The image formation position recognition section 244 recognizes an image plane shift position that is an image formation position on the virtual sensor at which a noticed ray before rotation forms an image (the position is hereinafter referred to also as image plane shift position before rotation) from the image plane shift information regarding the real space point corresponding to the corresponding information point having the noticed parallax and the coincidence rotation angle −ALPHA by which the noticed ray has been rotated by the rotation processing section 246 as described hereinabove in connection with step S273 of FIG. 66.

Here, the corresponding information point is a point on the sensor information generation axis extending in an upward direction from the center SO of the virtual sensor, and image plane shift information img_height regarding a real space point corresponding to such a corresponding information point and the noticed parallax represents a distance from the center S0 of the virtual sensor to a position A on a straight line that passes the center SO and extends in a vertical direction. The position A is a position on the virtual sensor reached by a principal ray, which is emitted from the real space point corresponding to the corresponding information point and the noticed parallax, through the emulation lens.

Now, it is assumed that the horizontal width of the virtual sensor (distance between a pixel at the left end and a pixel at the right end) is denoted as width and the pixel pitch of the virtual sensor (distance between adjacent pixels) is denoted as Sensor pitch.

The image plane shift position before rotation that is an image formation position on the virtual sensor at which a noticed ray before rotation forms an image is a position when the position A is rotated reversely by the coincidence rotation angle −ALPHA when the noticed ray has been rotated, namely, a position rotated by the coincidence rotation angle +ALPHA.

Accordingly, the x coordinate X of the image plane shift position before rotation can be determined in accordance with an expression X=width/2+(img_height×cos(90 degrees−ALPHA))/Sensor pitch.

Also the y coordinate of the image plane shift position before rotation can be determined similarly.

The image formation position recognition section 244 determines and recognizes (the x coordinate and the y coordinate of) the image plane shift position before rotation in such a manner as described above.

Then, the addition section 245 performs positioning of the distribution area after adjustment of the scale and the virtual sensor depending upon the image plane shift position before rotation obtained by reversely rotating the position (image plane shift position) A represented by the image plane shift information img_height regarding the real space point corresponding to the corresponding information point and the noticed parallax by the coincidence rotation angle −ALPHA when the noticed ray is rotated (by rotating the position A by the coincidence rotation angle +ALPHA).

In particular, the addition section 245 performs positioning of the distribution area after adjustment of the scale and the virtual sensor such that the center point CP (FIG. 54) of the distribution area after adjustment of the scale and the image plane shift position before rotation of the virtual sensor coincide with each other.

It is to be noted that, as described above, since the image plane shift position before rotation is determined by rotating the position (image plane shift position) represented by the image plane shift information img_height regarding the real space point corresponding to the corresponding information point and the noticed parallax, a rounding error arising from the rotation occurs.

By this rounding error, the accuracy of the image plane shift position before rotation is degraded, and arising from the degradation of the accuracy of the image plane shift position before rotation, the reproducibility of the light condensing characteristics of the emulation lens in the light condensing process sometimes degrades.

Therefore, in order to suppress the degradation of the accuracy of the image plane shift position before rotation, interpolation can be performed for the (image plane shift position represented by) the image plane shift information.

As interpolation of (an image plane shift position represented by) image plane shift information, interpolation in a direction of arrangement of information points (direction perpendicular to the optical axis) (direction of the image height) and interpolation in the parallax direction are available.

Figure 68:
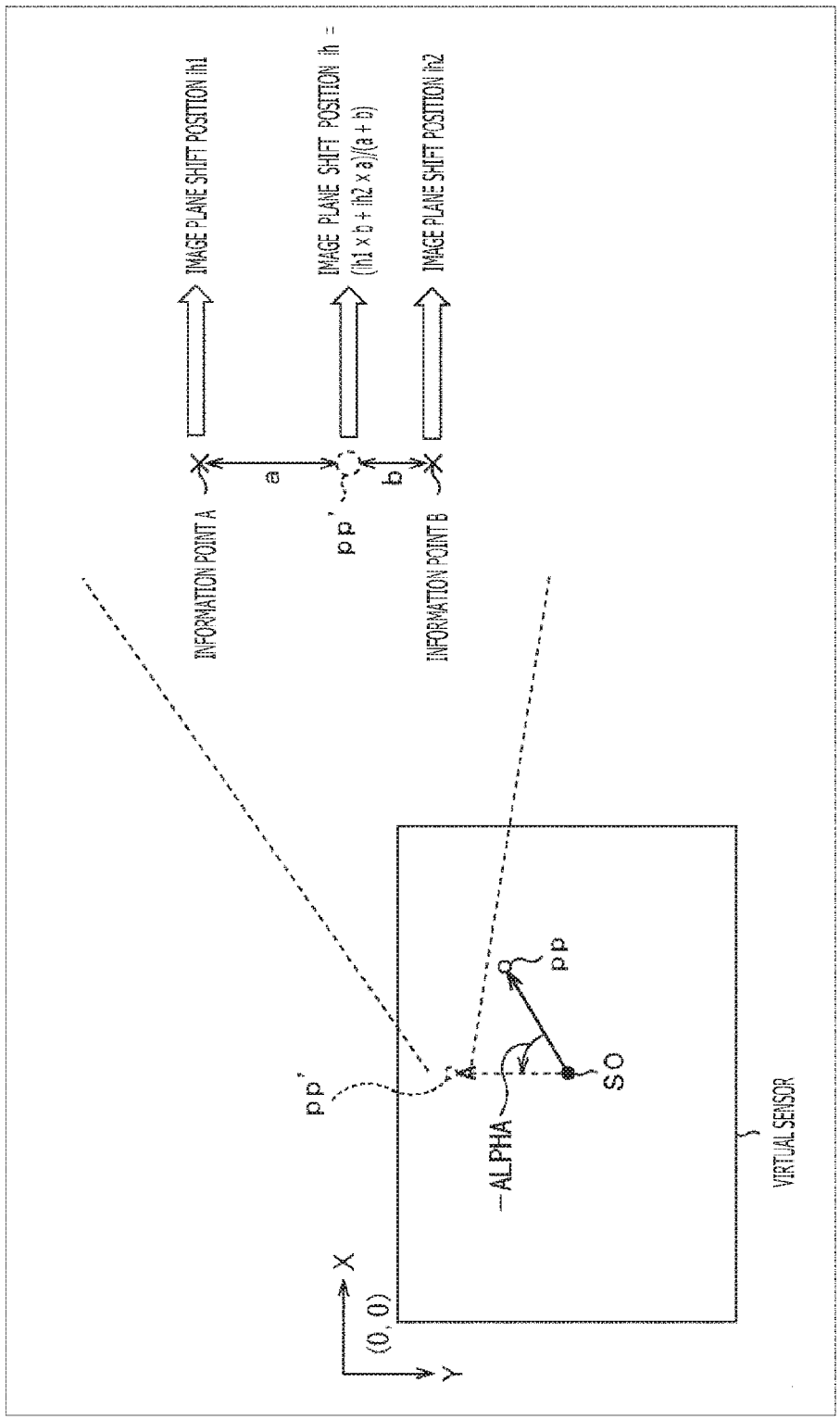
FIG. 68 is a view illustrating interpolation of image plane shift information in a juxtaposition direction of information points.

FIG. 68 is a view illustrating interpolation in a direction of arrangement of the information points of (the image plane shift position represented by) the image plane shift information.

The light condensing process by the ray rotation method is performed using lens information regarding a real space point corresponding to a corresponding information point and a noticed parallax, which is an information point nearest to a pixel (position) after rotation when a pixel (position) of the virtual sensor corresponding to a noticed real space point is rotated by the coincidence rotation angle −ALPHA (such lens information is hereinafter referred to merely as lens information regarding a corresponding information point).

In FIG. 68, a pixel (position) pp' after rotation when a pixel (position) pp of the virtual sensor corresponding to a noticed real space point is rotated by the coincidence rotation angle −ALPHA is positioned between adjacent information points A and B, and a corresponding information point that is an information point nearest to the pixel pp' after the rotation is an information point B.

In this case, as the interpolation in the direction of arrangement of the information points, interpolation in which image plane shift positions ih1 and ih2 regarding the information points A and B between which the pixel pp' after the rotation is sandwiched are used is performed, for example, in accordance with the ratio between the distances a and b from the pixel pp' after the rotation to the information points A and B, respectively.

In particular, in the interpolation in the direction of arrangement of the information points, the image plane shift position ih as an interpolation value in the direction of arrangement of the information points is determined, for example, in accordance with an expression ih=(ih1×b+ih2×a)/(a+b).

Then, the image plane shift position ih is used as the interpolation value in the direction of arrangement of the information points in place of the image plane shift position ih2 regarding the information point B that is the corresponding information point to perform positioning of image formation positions of rays emitted from the noticed real space point.

Figure 69:
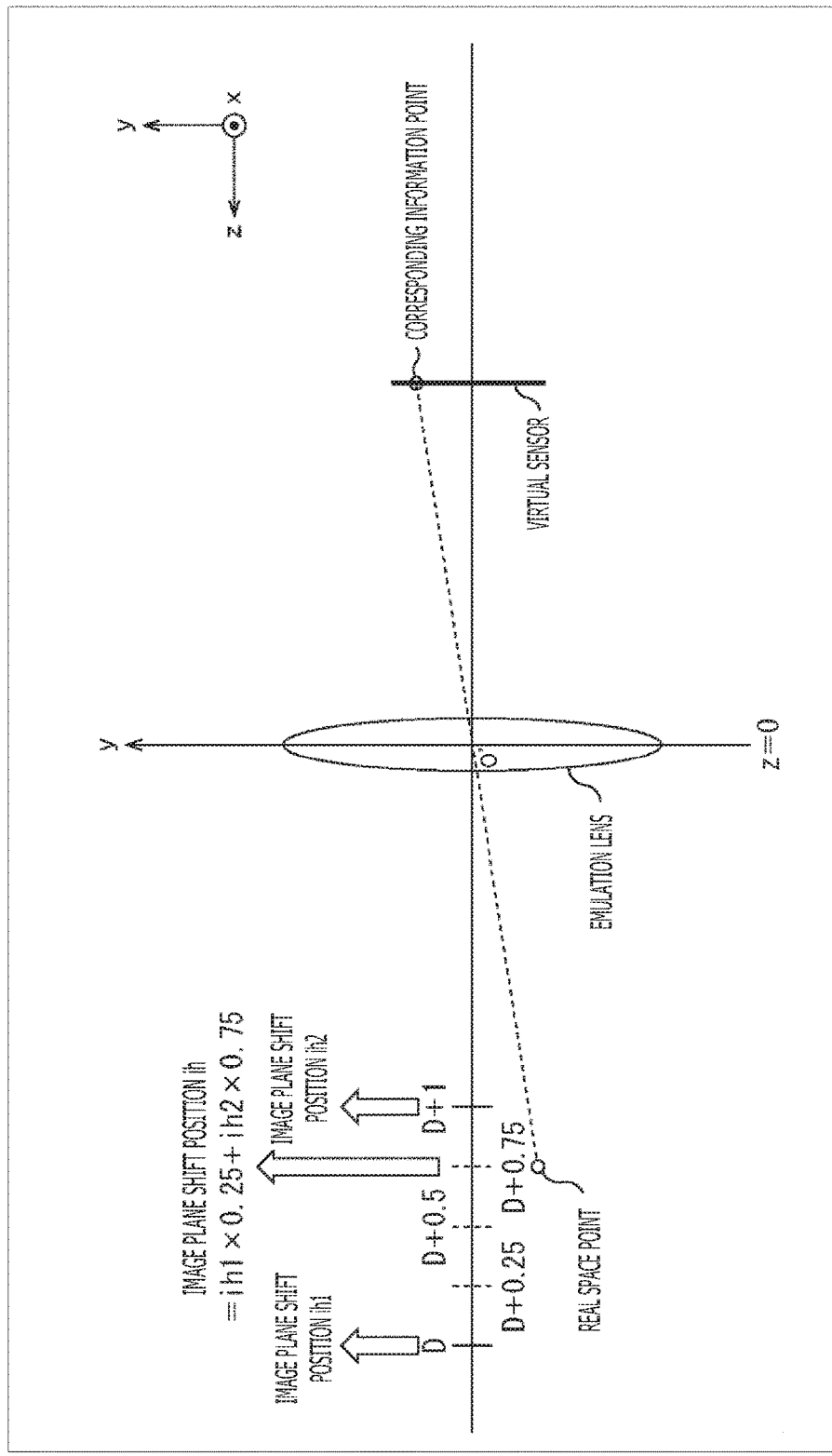
FIG. 69 is a view illustrating interpolation of image plane shift information in a parallax direction.

FIG. 69 is a view illustrating interpolation in the parallax direction of (the image plane shift position represented by) image plane shift information.

In the present embodiment, a parallax is determined, for example, with the accuracy of ¼ pixel as described hereinabove with reference to FIG. 6, and the parallax of the accuracy of ¼ pixel is integrated and used.

Therefore, although, for example, in FIG. 32 and so forth, the parallax d that can be registered into a parallax map is DPN=Dmax−Dmin+1 integral values of 1 pixel increments from the minimum value Dmin to the maximum value Dmax, it is possible to register parallaxes of the accuracy of ¼ pixel in a parallax map and, when a parallax registered in the parallax map is to be used, integrate the parallax.

As described above, where parallaxes of an accuracy equal to or lower than the accuracy of a pixel such as the accuracy of ¼ pixel are registered in a parallax map, in interpolation of image plane shift information in the parallax direction, a parallax of an accuracy equal to or lower than the accuracy of a pixel registered in the parallax map can be used as it is without integrating the same.

For example, it is assumed now that parallaxes of the accuracy of ¼ pixel are registered in a parallax map.

In the emulation lens information generation process of FIG. 61, (an image plane shift position represented by) image plane shift information as lens information regarding a noticed real space point corresponding to a noticed information point and a noticed parallax is determined by selecting a parallax that can be registered into the parallax map as a noticed parallax.

As parallaxes that can be registered into a parallax map and are selected as a noticed parallax by the emulation lens information generation process, DPN=Dmax−Dmin+1 integral values of 1 pixel increments from the minimum value Dmin to the maximum value Dmax are used.

Accordingly, in the emulation lens information generation process, an image plane shift position is determined for a parallax of an integral value.

In FIG. 69, a parallax of a next magnitude smaller than a parallax D of a certain integral value has an integral value D+1. Then, an image plane shift position ih1 is determined for the parallax D of an integral value, and another image plane shift position ih2 is determined for the parallax D+1 of an integral value of the next magnitude.

On the other hand, in the light condensing process of FIG. 65, as the parallax of a noticed pixel selected from within a reference image, a noticed parallax is selected from among parallaxes registered in a parallax map (step S253).

In this case, the parallaxes registered in the parallax map are integrated and selected as a noticed parallax.

Then, in the light condensing process, the ray addition process (FIG. 66) is performed using lens information regarding a real space point corresponding to a corresponding information point and the noticed parallax.

For (the image plane shift position represented by) the image plane shift information from within the lens information used in the ray addition process, interpolation in the parallax direction can be performed using the parallaxes registered in the parallax map without integrating them.

In particular, in FIG. 69, the parallax (noticed parallax) of the real space point corresponding to the corresponding information point and the noticed parallax is D+0.75 that is a parallax of the accuracy of ¼ pixel.

Here, in the case where the parallax registered in the parallax map is a parallax of the accuracy of ¼ pixel, as a parallax of the accuracy of ¼ pixel from the parallax D of an integral value to the parallax D+1 of a next integral value, D+0.25, D+0.5 and D+0.75 are available.

When a parallax registered in the parallax map is integrated and used, if it is assumed that the integration is performed, for example, by truncation after the decimal point, then where the noticed parallax is D, D+0.25, D+0.5 or D+0.75, they are all integrated into the integral value D.

Then, the ray addition process (FIG. 66) is performed using the image plane shift position ih1 for the noticed parallax integrated to the integral value D.

As interpolation in the parallax direction, interpolation in which the image plane shift positions ih1 and ih2 for the parallaxes D and D+1 of integral values between which the noticed parallax D+0.75 that has not been integrated is sandwiched are used is performed in accordance with a ratio between the distances of 0.75 and 0.25 from the noticed parallax D+0.75 to the parallaxes D and D+1 of integral values.

In particular, in the interpolation in the parallax direction, an image plane shift position ih as an interpolation value in the parallax direction is determined in accordance with an expression ih=ih1×0.25+ih2×0.75.

Then, in place of the image plane shift position ih1 for the noticed parallax integrated to the integer value D, the image plane shift position ih as an interpolation value in the parallax direction is used to perform (positioning of an image formation position of a ray from within) the ray addition process.

Where such interpolation of (the image plane shift position represented by) image plane shift information is performed, the reproducibility of the light condensing characteristics of the emulation lens in the light condensing process can be improved.

It is to be noted that, for image plane shift information, it is possible to perform only one of the interpolation in the arrangement direction of information points and the interpolation in the parallax direction or perform both of them.

<Emulation Result>

Figure 70:
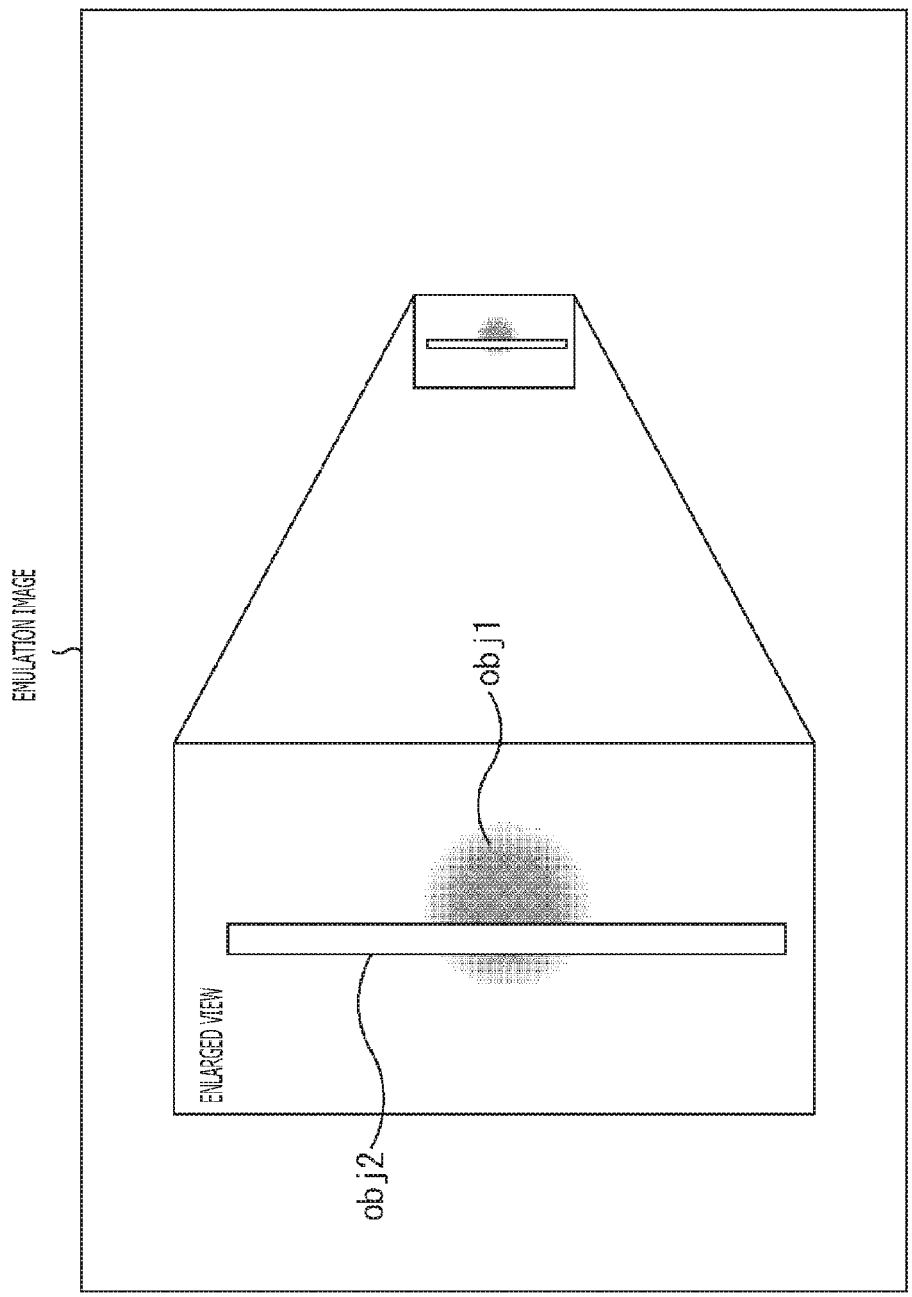
FIG. 70 is a view depicting an example of an emulation image obtained as a result of the lens emulation process by the lens emulation section 35.

FIG. 70 is a view depicting an example of an emulation image obtained as a result of a lens emulation process by the lens emulation section 35 (FIG. 3).

FIG. 70 depicts an emulation image obtained from a picked up image when an image of a real space in which a bar-like object obj2 is disposed at the front side of an object obj1 is taken.

According to the emulation image, it can be confirmed that rays emitted from a portion of the object obj1 hidden by the bar-like object obj2 collide with the object obj2 and cannot be viewed.

Figure 71B:
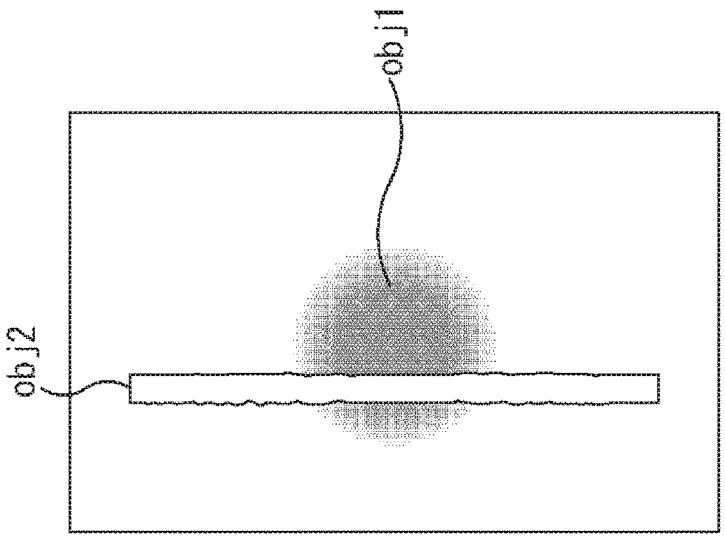
FIGS. 71A and 71B are views depicting a different example of an emulation image obtained as a result of the lens emulation process by the lens emulation section 35.
Figure 71A:
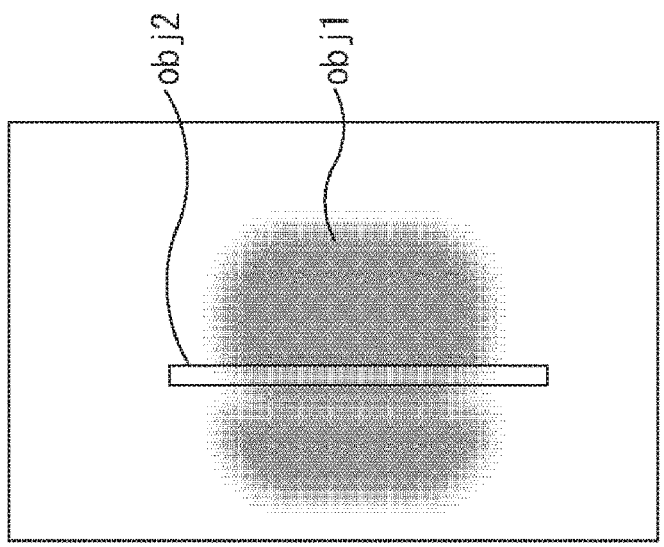

FIGS. 71A and 71B are views depicting another example of the emulation image obtained as a result of a lens simulation process by the lens emulation section 35.

It is to be noted that the emulation image of FIGS. 71A and 71B are emulation images obtained from a picked up image obtained by picking up an image of a real space in which a bar-like object obj2 is disposed at the front side of an object obj1 similarly to FIG. 70.

FIG. 71A depicts an emulation image where, as the image plane shift position, not a position on the virtual sensor at which a principal ray reaches through the emulation lens but a position on the virtual sensor at which a principal ray reaches through the virtual lens is adopted.

Where, in the light condensing process, as the image plane shift position, not a position on the virtual sensor at which a principal ray reaches through the emulation lens but a position on the virtual sensor at which a principal ray reaches through the virtual lens is adopted, an error arising from displacement in position of the input pupil between the virtual lens and the emulation lens occurs with the position of the virtual sensor to which an image formation value of a principal ray is to be added. Therefore, in FIG. 71A, in the emulation image, a portion of the object obj1 at the interior side, which should be hidden by the bar-like object obj2 and not be able to be viewed, is viewed.

FIG. 71B depicts an emulation image where interpolation of image plane shift information is not performed.

In FIG. 71B, it can be confirmed that, by an influence of a rounding error arising from rotation (of the image plane shift position represented by) the image plane shift information, a line segment that forms a profile of the bar-like object obj2 and extends in the vertical direction is uneven.

By adopting a position on the virtual sensor at which a principal ray reaches through the emulation lens as the image plane shift position or by performing interpolation of image plane shift information, such a state as depicted in FIGS. 71A and 71B can be prevented from occurring in an emulation image.

<Explanation of Computer to which Present Technology is Applied>

While the series of processes described above can be executed by hardware, it may otherwise be executed by software. In the case where the series of processes is executed by software, a program which constructs the software is installed into a computer for universal use or the like.

FIG. 72 is a block diagram depicting an example of a configuration of one embodiment of a computer into which the program for executing the series of processes described above is installed.

The program can be recorded in advance into a hard disk 405 or a ROM (Read Only Memory) 403 as a recording medium built in the computer.

Alternatively, the program can be stored (recorded) in a removable recording medium 411. Such a removable recording medium 411 as just described can be provided as so-called package software. Here, as the removable recording medium 411, for example, a flexible disk, a CD-ROM (Compact Disc Read Only Memory), an MO (Magneto Optical) disk, a DVD (Digital Versatile Disc), a magnetic disk, a semiconductor memory and so forth are available.

It is to be noted that, in addition to installation from such a removable recording medium 411 as described above into the computer, the program can be downloaded into the computer through a communication network or a broadcasting network and installed into the hard disk 405 built in the computer. In particular, the program can be transferred, for example, from a download site by wireless transfer to the computer through an artificial satellite for digital satellite broadcasting or by wired transfer to the computer through a network such as a LAN (Local Area Network) or the Internet.

The computer has a CPU (Central Processing Unit) 402 built therein, and an input/output interface 410 is connected to the CPU 402 through a bus 401.

If an inputting section 407 is operated by a user or the like to input an instruction to the CPU 402 through the input/output interface 410, then a program stored in the ROM (Read Only Memory) 403 is executed. Alternatively, the CPU 402 loads the program stored in the hard disk 405 into a RAM (Random Access Memory) 404 and executes the program.

Consequently, the CPU 402 performs a process in accordance with the flow charts described hereinabove or performs a process carried out by the configuration of the block diagram described above. Then, the CPU 402 outputs a result of the process, for example, from an outputting section 406 through the input/output interface 410, transmits the result of the process from a communication section 408, or causes the result of the process to be recorded on the hard disk 405 or the like as occasion demands.

It is to be noted that the inputting section 407 is configured from a keyboard, a mouse, a microphone and so forth. Meanwhile, the outputting section 406 is configured from an LCD (Liquid Crystal Display), a speaker and so forth.

Here, in the present specification, the processes performed in accordance with the program by the computer need not be carried out in a time series in the order as described in the flow charts. In particular, the processes to be executed in accordance with the program by the computer include processes executed in parallel or individually (for example, processes by parallel processing or by an object).

Further, the program may be processed by a single computer (processor) or may be processed in a distributed manner by a plurality of computers. Further, the program may be transferred to and executed by a remote computer.

Further, in the present specification, the term system signifies an aggregation of a plurality of components (devices, modules (parts) or the like) and all components may or may not be accommodated in the same housing. Accordingly, a plurality of apparatus accommodated in separate housings and connected to each other through a network and also one apparatus wherein a plurality of modules are accommodated in a single housing are systems.

It is to be noted that the embodiment of the present technology is not restricted to the embodiment described above and can be altered in various manners without departing from the subject matter of the present technology.

For example, the present technology can assume a configuration for cloud computing wherein one function is shared and processed cooperatively by a plurality of apparatus through a network.

Further, the steps described hereinabove in connection with the flow charts can be executed by a single apparatus or can be executed in a shared manner by a plurality of apparatus.

Furthermore, where a plurality of processes are included in one step, the plurality of processes included in the one step may be executed by one apparatus or may be executed in a shared manner by a plurality of apparatus.

Further, the effects described in the present specification are illustrative to the end and are not restrictive, and other effects may be exhibited.

It is to be noted that the present technology can assume such configurations as described below.

<1>
An image processing apparatus, including:
a light condensing processing section configured to perform a light condensing process for condensing rays to be incident to a virtual lens having a synthetic aperture configured from a plurality of image pickup sections that pick up images of a plurality of visual points from a real space point in a real space on a virtual sensor through an emulation lens of an emulation target using lens information that is generated for a real space point corresponding to a plurality of information points that are a plurality of positions of part of a plane of the virtual sensor and defines rays that pass the emulation lens.

<2>
The image processing apparatus according to <1>, in which the light condensing processing section performs the light condensing process using the lens information for a real space point corresponding to the plurality of information points on a lens information generation axis that is one given axis extending from the center of the virtual sensor.

<3>
The image processing apparatus according to <2>, in which the light condensing processing section rotates the rays emitted from the real space point or lens information of the lens information generation axis by a rotation angle when the pixels of the virtual sensor or the lens information generation axis is rotated around the center of the virtual sensor such that a pixel of the virtual sensor corresponding to the real space point is positioned on the lens information generation axis, and performs the light condensing process.

<4>
The image processing apparatus according to <3>, in which the light condensing processing section performs the light condensing process using the lens information for a real space point corresponding to one of the information points corresponding to a pixel of the virtual sensor when the pixels of the virtual sensor or the lens information generation axis is rotated by the rotation angle.

<5>
The image processing apparatus according to any one of <1> to <4>, in which the light condensing processing section performs the light condensing process for adding image formation values when the rays form an image on the virtual sensor through the emulation lens on the virtual sensor.

<6>
The image processing apparatus according to <5>, in which the light condensing processing section performs the light condensing process in which:
positioning of a position on the virtual sensor at which the image formation values are added is performed depending upon an image plane shift position that is a position on the virtual sensor at which a principal ray emitted from the real space point reaches through the emulation lens; and
the image formation values are added on the virtual sensor.

<7>
The image processing apparatus according to <6>, in which the light condensing processing section performs the positioning of the position on the virtual sensor at which the image formation values are added depending upon a position when the image plane shift position is rotated by the rotation angle reversely.

<8>
The image processing apparatus according to <7>, in which the light condensing processing section performs the light condensing process using the image plane shift position obtained by interpolation using image plane shift information included in the lens information and representative of the image plane shift position.

<9>
The image processing apparatus according to <8>, in which the light condensing processing section performs the light condensing process using the image plane shift position obtained by interpolation in a parallax direction and a direction of arrangement of the information points using the image plane shift information included in the lens information.

<10>
The image processing apparatus according to any one of <1> to <9>, in which
the light condensing processing section performs the light condensing process for adding, on the virtual sensor, image formation values when the rays form an image on the virtual sensor through the emulation lens using the rays and a PSF (Point Spread Function) intensity distribution that represents a response of the emulation lens to a point light source and is included in the lens information.

<11>
The image processing apparatus according to <10>, in which the light condensing processing section performs the light condensing process for adding a product between the PSF intensity distribution at a position of the PSF intensity distribution represented by PSF angle component information, which represents a position of the PSF intensity distribution at which the ray reaches and included in the lens information and a luminance of the rays, as the image formation values on the virtual sensor.

<12>
The image processing apparatus according to <11>, in which the light condensing processing section performs the light condensing process for adding the image formation values on the virtual sensor based on an image plane pitch that represents a scale of the PSF intensity distribution and is included in the lens information and a pixel pitch representative of a scale of the pixels of the virtual sensor.

<13>
The image processing apparatus according to <12>, in which the light condensing processing section makes a scale of a distribution of the image formation values determined as a product between the PSF intensity distribution and the luminance of the rays based on the image plane pitch and the pixel pitch coincide with a scale of the virtual sensor and adds the image formation values on the virtual sensor.

<14>

An image processing method, including:

performing a light condensing process for condensing rays to be incident to a virtual lens having a synthetic aperture configured from a plurality of image pickup sections that pick up images of a plurality of visual points from a real space point in a real space on a virtual sensor through an emulation lens of an emulation target using lens information that is generated for a real space point corresponding to a plurality of information points that are a plurality of positions of part of a plane of the virtual sensor and defines rays that pass the emulation lens.

REFERENCE SIGNS LIST

11 Image pickup apparatus, 12 Image processing apparatus, 13 Display apparatus, $21_1$ to $21_7$ Camera unit, 31 Parallax information generation section, 32 Calibration data acquisition section, 33 Saturated pixel restoration section, 34 Lens design data acquisition section, 35 Lens emulation section, 36 Incident ray reproduction section, 37 Emulation lens information generation section, 38 Light condensing processing section, 41 Reference parallax map generation section, 42 Multilayer parallax map generation section, 51 Saturation decision section, 52 Restoration section, 61 Standard luminance picked up image generation section, 62 Low luminance picked up image generation section, 71 Parallax information acquisition section, 72 Standard luminance picked up image generation section, 73 Low luminance picked up image generation section, 74 Saturation decision section, 75 Restoration section, 101 Real space point selection section, 102 Ray generation section, 103 Collision decision section, 104 Luminance allocation section, 131 Real space point selection section, 132 Information calculation section, 133 Focus position selection section, 141 Real space point selection section, 142 Image formation value calculation section, 143 Scale adjustment section, 144 Image formation position recognition section, 145 Addition section, 231 Real space point selection section, 242 Image formation value calculation section, 244 Image formation position recognition section, 245 Addition section, 246 Rotation processing section, 401 Bus, 402 CPU, 403 ROM, 404 RAM, 405 Hard disk, 406 Outputting section, 407 Inputting section, 408 Communication section, 409 Drive, 410 input/output interface, 411 Removable recording medium

The invention claimed is:

1. An image processing apparatus, comprising:
a light condensing processing section configured to perform a light condensing process to condense rays to be incident to a virtual lens, the virtual lens having a synthetic aperture configured from a plurality of image pickup sections that pick up images of a plurality of visual points from a real space point in a real space on a virtual sensor through an emulation lens of an emulation target, wherein
the light condensing process is performed using lens information that is generated for the real space point corresponding to a plurality of information points that are a plurality of positions of part of a plane of the virtual sensor and defines rays that pass the emulation lens, and
the light condensing processing section is implemented by at least one processor.

2. The image processing apparatus according to claim 1, wherein
the light condensing processing section is further configured to execute the light condensing process using the lens information for the real space point corresponding to the plurality of information points on a lens information generation axis that is one given axis extending from a center of the virtual sensor.

3. The image processing apparatus according to claim 2, wherein the light condensing processing section is further configured to:
rotate rays emitted from the real space point or lens information of the lens information generation axis by a rotation angle when pixels of the virtual sensor or the lens information generation axis is rotated around the center of the virtual sensor such that a pixel of the virtual sensor corresponding to the real space point is positioned on the lens information generation axis; and
execute the light condensing process.

4. The image processing apparatus according to claim 3, wherein
the light condensing processing section is further configured to execute the light condensing process using the lens information for the real space point corresponding to one of the information points corresponding to the pixel of the virtual sensor when the pixel of the virtual sensor or the lens information generation axis is rotated by the rotation angle.

5. The image processing apparatus according to claim 1, wherein the light condensing processing section is further configured to execute the light condensing process to add image formation values when the rays form an image on the virtual sensor through the emulation lens on the virtual sensor.

6. The image processing apparatus according to claim 5, wherein
the light condensing processing section is further configured to execute the light condensing process in which:
positioning of a first position on the virtual sensor at which the image formation values are added is performed depending upon an image plane shift position that is a second position on the virtual sensor at which a principal ray emitted from the real space point reaches through the emulation lens; and
the image formation values are added on the virtual sensor.

7. The image processing apparatus according to claim 6, wherein
the light condensing processing section is further configured to execute the positioning of the first position on the virtual sensor at which the image formation values are added based on a position when the image plane shift position is rotated by a rotation angle reversely.

8. The image processing apparatus according to claim 7, wherein
the light condensing processing section is further configured to execute the light condensing process using the image plane shift position obtained by interpolation using image plane shift information included in the lens information and representative of the image plane shift position.

9. The image processing apparatus according to claim 8, wherein
the light condensing processing section is further configured to execute the light condensing process using the image plane shift position obtained by interpolation in a parallax direction and a direction of arrangement of the information points using the image plane shift information included in the lens information.

10. The image processing apparatus according to claim 1, wherein the light condensing processing section is further configured to execute the light condensing process to add, on the virtual sensor, image formation values when the rays form an image on the virtual sensor through the emulation lens using the rays and a Point Spread Function (PSF) intensity distribution that represents a response of the emulation lens to a point light source and is included in the lens information.

11. The image processing apparatus according to claim 10, wherein the light condensing processing section is further configured to execute the light condensing process to add a product between the PSF intensity distribution at a position of the PSF intensity distribution represented by PSF angle component information, which represents a position of the PSF intensity distribution at which the rays reach and included in the lens information and a luminance of the rays, as the image formation values on the virtual sensor.

12. The image processing apparatus according to claim 11, wherein the light condensing processing section is further configured to execute the light condensing process to add the image formation values on the virtual sensor based on an image plane pitch that represents a scale of the PSF intensity distribution and is included in the lens information and a pixel pitch representative of a scale of pixels of the virtual sensor.

13. The image processing apparatus according to claim 12, wherein the light condensing processing section is further configured to:

make a scale of a distribution of the image formation values determined as the product between the PSF intensity distribution and the luminance of the rays based on the image plane pitch and the pixel pitch coincide with a scale of the virtual sensor; and add the image formation values on the virtual sensor.

14. An image processing method, comprising:

performing a light condensing process for condensing rays to be incident to a virtual lens, the virtual lens having a synthetic aperture configured from a plurality of image pickup sections that pick up images of a plurality of visual points from a real space point in a real space on a virtual sensor through an emulation lens of an emulation target, wherein the light condensing process is performed using lens information that is generated for the real space point corresponding to a plurality of information points that are a plurality of positions of part of a plane of the virtual sensor and defines rays that pass the emulation lens.

* * * * *